US009552596B2

(12) United States Patent
Waldman et al.

(10) Patent No.: US 9,552,596 B2
(45) Date of Patent: Jan. 24, 2017

(54) TRACKING CONTENT THROUGH SERIAL PRESENTATION

(71) Applicant: SPRITZ TECHNOLOGY, INC., Stoneham, MA (US)

(72) Inventors: Francis Abbott Waldman, Stoneham, MA (US); Maik Steffen Maurer, Ismaning (DE); Oleg Skrypnyuk, Munich (DE)

(73) Assignee: Spritz Technology, Inc., Salt Lake City, UT (US)

( * ) Notice: Subject to any disclaimer, the term of this patent is extended or adjusted under 35 U.S.C. 154(b) by 506 days.

(21) Appl. No.: 14/047,975

(22) Filed: Oct. 7, 2013

(65) Prior Publication Data
US 2014/0188766 A1  Jul. 3, 2014

Related U.S. Application Data

(63) Continuation-in-part of application No. 13/919,848, filed on Jun. 17, 2013, which is a continuation-in-part
(Continued)

(51) Int. Cl.
G06F 17/30 (2006.01)
G06Q 30/02 (2012.01)

(52) U.S. Cl.
CPC ..... G06Q 30/0283 (2013.01); G06F 17/30994 (2013.01); G06Q 30/0255 (2013.01)

(58) Field of Classification Search
CPC .......................... G06Q 30/0255; G06Q 30/025
See application file for complete search history.

(56) References Cited

U.S. PATENT DOCUMENTS 4,845,645 A  7/1989 Matin et al.
4,932,416 A  6/1990 Rosenfeld
(Continued)

FOREIGN PATENT DOCUMENTS

CA  2 619 015 A1  8/2009
CN  1461435 A  12/2003
(Continued)

OTHER PUBLICATIONS

Android Push Notifications, http://developer.android.com/guide/topics/ui/notifiers/notifications.html.
(Continued)

*Primary Examiner* — William Bashore
*Assistant Examiner* — Nathan Shrewsbury
(74) *Attorney, Agent, or Firm* — Mauriel Kapouytian Woods LLP; Lana Akopyan; Michael Mauriel

(57) ABSTRACT

Computer systems, methods, and computer program products for tracking content using serial presentation are disclosed. Some embodiments track an aggregated quantity of words displayed by Rapid Serial Visual Presentation (RSPV) in a digital media item across a plurality of user electronic devices. Some embodiments track what words are displayed by RSVP. Some embodiments track a percentage of words displayed by RSVP across a plurality of user sessions. Some embodiments track trends in the percentage of words displayed by RSVP. Some embodiments use RSVP tracking and trending information to enhance search results. Some embodiments analyze RSVP consumption across a plurality of sessions to determine opportunities for improving content consumption and improving selection of sub-content items. These and other embodiments are further disclosed herein.

46 Claims, 98 Drawing Sheets

Related U.S. Application Data of application No. 13/730,163, filed on Dec. 28, 2012, now abandoned.

(60) Provisional application No. 61/862,014, filed on Aug. 3, 2013, provisional application No. 61/875,112, filed on Sep. 9, 2013.

(56) References Cited

U.S. PATENT DOCUMENTS

| | | | |
|---|---|---|---|
| 5,137,027 A | 8/1992 | Rosenfeld | |
| 5,873,109 A | 2/1999 | High | |
| 5,995,101 A | 11/1999 | Clark et al. | |
| 6,018,774 A | 1/2000 | Mayle et al. | |
| 6,067,069 A | 5/2000 | Krause | |
| 6,078,935 A | 6/2000 | Nielsen | |
| 6,098,085 A | 8/2000 | Blonder et al. | |
| 6,113,394 A | 9/2000 | Edgar | |
| 6,130,968 A | 10/2000 | McIan et al. | |
| 6,292,176 B1 | 9/2001 | Reber et al. | |
| 6,353,824 B1 | 3/2002 | Boguraev et al. | |
| 6,409,513 B1 | 6/2002 | Kawamura et al. | |
| 6,515,690 B1 | 2/2003 | Back et al. | |
| 6,553,373 B2 | 4/2003 | Boguraev et al. | |
| 6,556,987 B1* | 4/2003 | Brown | G06F 17/30707 |
| 6,568,939 B1 | 5/2003 | Edgar | |
| 6,652,283 B1 | 11/2003 | Van Schaack et al. | |
| 6,686,928 B1 | 2/2004 | Reber et al. | |
| 6,816,174 B2 | 11/2004 | Tiongson et al. | |
| 6,865,572 B2 | 3/2005 | Boguraev et al. | |
| 6,925,613 B2 | 8/2005 | Gibson | |
| 7,139,006 B2 | 11/2006 | Wittenburg et al. | |
| 7,159,172 B1 | 1/2007 | Bentley et al. | |
| 7,173,621 B2 | 2/2007 | Reber et al. | |
| 7,272,787 B2 | 9/2007 | Nakamura et al. | |
| 7,365,741 B2 | 4/2008 | Chincholle et al. | |
| 7,395,500 B2 | 7/2008 | Whittle et al. | |
| 7,404,142 B1 | 7/2008 | Tischer | |
| 7,454,717 B2 | 11/2008 | Hinckley et al. | |
| 7,475,334 B1 | 1/2009 | Kermani | |
| 7,478,322 B2 | 1/2009 | Konttinen | |
| 7,549,114 B2 | 6/2009 | Bederson et al. | |
| 7,598,977 B2 | 10/2009 | Ryall et al. | |
| 7,613,731 B1 | 11/2009 | Larson | |
| 7,627,590 B2 | 12/2009 | Boguraev et al. | |
| 7,647,345 B2 | 1/2010 | Trepess et al. | |
| 7,710,411 B2 | 5/2010 | Reber et al. | |
| 7,730,397 B2 | 6/2010 | Tischer | |
| 7,783,978 B1 | 8/2010 | Andrews et al. | |
| 7,835,581 B2 | 11/2010 | Mathan et al. | |
| 7,946,707 B1 | 5/2011 | McDonald, II et al. | |
| 7,991,195 B2 | 8/2011 | Mathan et al. | |
| 7,991,920 B2 | 8/2011 | Back et al. | |
| 7,996,045 B1 | 8/2011 | Bauer et al. | |
| 8,059,136 B2 | 11/2011 | Mathan | |
| 8,069,466 B2 | 11/2011 | Shelton et al. | |
| 8,165,407 B1 | 4/2012 | Khosla et al. | |
| 8,214,309 B1 | 7/2012 | Khosla et al. | |
| 8,244,475 B2 | 8/2012 | Aguilar et al. | |
| 8,245,142 B2 | 8/2012 | Mizrachi et al. | |
| 8,249,397 B2 | 8/2012 | Wood et al. | |
| 8,265,743 B2 | 9/2012 | Aguilar et al. | |
| 8,274,592 B2 | 9/2012 | Watkins et al. | |
| 8,285,052 B1 | 10/2012 | Bhattacharyya et al. | |
| 8,292,433 B2 | 10/2012 | Vertegaal | |
| 8,307,282 B2 | 11/2012 | Saito et al. | |
| 8,335,751 B1 | 12/2012 | Daily et al. | |
| 8,363,939 B1 | 1/2013 | Khosla et al. | |
| 8,369,652 B1 | 2/2013 | Khosla et al. | |
| 8,374,687 B2 | 2/2013 | Mathan et al. | |
| 8,418,057 B2 | 4/2013 | Knight et al. | |
| 8,458,152 B2 | 6/2013 | Fogg et al. | |
| 8,472,791 B2 | 6/2013 | Gargi | |
| 8,483,816 B1 | 7/2013 | Payton et al. | |
| 2002/0133521 A1 | 9/2002 | Campbell et al. | |
| 2003/0038754 A1 | 2/2003 | Goldstein et al. | |
| 2003/0043196 A1 | 3/2003 | Gibson | |
| 2003/0184560 A1 | 10/2003 | Pierce | |
| 2004/0004632 A1 | 1/2004 | Knight et al. | |
| 2004/0024747 A1 | 2/2004 | Boguraev et al. | |
| 2004/0044950 A1* | 3/2004 | Mills | G06F 17/2795 715/205 |
| 2004/0107195 A1 | 6/2004 | Trepess | |
| 2005/0120306 A1 | 6/2005 | Klassen et al. | |
| 2006/0069562 A1 | 3/2006 | Adams et al. | |
| 2006/0100984 A1 | 5/2006 | Fogg et al. | |
| 2007/0061720 A1 | 3/2007 | Kriger | |
| 2007/0185704 A1* | 8/2007 | Yoshimura | G10L 17/26 704/10 |
| 2007/0245241 A1 | 10/2007 | Bertram et al. | |
| 2008/0141126 A1 | 6/2008 | Johnson et al. | |
| 2009/0066722 A1* | 3/2009 | Kriger | G06Q 30/02 345/619 |
| 2009/0083621 A1 | 3/2009 | Kermani | |
| 2009/0094105 A1 | 4/2009 | Gounares et al. | |
| 2009/0187825 A1 | 7/2009 | Sandquist et al. | |
| 2009/0189904 A1 | 7/2009 | Roth | |
| 2009/0249247 A1 | 10/2009 | Tseng et al. | |
| 2010/0280403 A1 | 11/2010 | Erdogmus et al. | |
| 2010/0318426 A1* | 12/2010 | Grant | G06F 17/30864 705/14.66 |
| 2011/0010611 A1 | 1/2011 | Ross | |
| 2011/0115819 A1 | 5/2011 | Hanson | |
| 2011/0117969 A1 | 5/2011 | Hanson | |
| 2012/0054672 A1* | 3/2012 | McDowell | G09B 17/003 715/784 |
| 2012/0265758 A1 | 10/2012 | Han et al. | |
| 2012/0317498 A1 | 12/2012 | Logan et al. | |
| 2013/0100139 A1 | 4/2013 | Schliesser et al. | |
| 2013/0125175 A1 | 5/2013 | Hao et al. | |
| 2013/0159850 A1 | 6/2013 | Cohn | |
| 2013/0218982 A1 | 8/2013 | Hymel et al. | |
| 2013/0222378 A1 | 8/2013 | Koivusalo | |
| 2014/0040344 A1 | 2/2014 | Gehring et al. | |
| 2014/0115527 A1* | 4/2014 | Pepper | G06F 17/30 715/781 |

FOREIGN PATENT DOCUMENTS

| | | |
|---|---|---|
| EP | 1 162 587 A1 | 12/2001 |
| EP | 1 727 052 A1 | 11/2006 |
| EP | 2 323 357 A1 | 5/2011 |
| JP | 2007-141059 A1 | 6/2007 |
| KR | 2002-0011933 A | 2/2002 |
| WO | WO 98/41937 A1 | 9/1998 |
| WO | WO 02/12994 A1 | 2/2002 |
| WO | WO 02/37256 A2 | 5/2002 |
| WO | WO 2006/100645 A2 | 9/2006 |
| WO | WO 2008/051510 A2 | 5/2008 |

OTHER PUBLICATIONS

U.S. Appl. No. 13/547,982, filed Jul. 12, 2012, Maurer et al.
U.S. Appl. No. 13/973,835, filed Aug. 22, 2013, Waldman et al.
U.S. Appl. No. 13/973,867, filed Aug. 22, 2013, Waldman et al.
U.S. Appl. No. 13/919,848, filed Jun. 17, 2013, Waldman et al.
U.S. Appl. No. 13/730,163, filed Dec. 28, 2012, Waldman et al.
Brysbaert, "Interhemispheric transfer and the processing of foveally presented stimuli," Behavioural Brain Research, 1994, pp. 151-161, vol. 64.
Brysbaert et al., "Visual Constraints in Written Word Recognition: Evidence From the Optimal Viewing Position Effect," Journal of Research in Reading, 2005, pp. 216-228, vol. 28, Issue 3.
Brysbaert et al., "Word skipping: Implications for theories of eye movement control in reading," Eye Guidance in Reading and Scene Perception, 1998, pp. 125-147, Chapter 6.
Clark et al., "Word Ambiguity and the Optimal Viewing Position in Reading," Preprint submitted to Elsevier Preprint, 1998, pp. 1-50.
Engbert et al., "SWIFT: A Dynamical Model of Saccade Generation during Reading," Psychological Review, 2005, pp. 777-813, vol. 112, No. 4.

(56) References Cited

OTHER PUBLICATIONS

Findlay et al., "Saccade target selection in visual search: the effect of information from the previous fixation," Vision Research, 2001, pp. 87-95, vol. 41.
Kliegl et al., "Tracking the Mind During Reading: The Influence of Past, Present, and Future Words on Fixation Durations," J. of Exp. Psyc., 2006, pp. 12-35, vol. 135, No. 1.
McConkie et al., "Eye Movement Control During Reading:II. Frequency of Refixating a Word," Center for the Study of Reading, 1989, pp. 1-30, Technical Report No. 469.
Nazir et al., "Letter visibility and word recognition: The optimal viewing position in printed words," Perception & Psychophysics, 1992, pp. 315-328, vol. 52, No. 3.
O'Regan et al., "Convenient Fixation Location Within Isolated Words of Different Length and Structure," Journal of Experimental Psychology, 1984, pp. 250-257, vol. 10, No. 2.
Rayner et al., "Asymmetry of the effective visual field in reading," Perception & Psychophysics, 1980, pp. 537-544, vol. 27, No. 6.
Rayner, "Eye Movements in Reading and Information Processing: 20 Years of Research," Psychological Bulletin, 1998, pp. 372-422, vol. 124, No. 3.
Schoonbaert et al., "Letter position coding in printed word perception: Effects of repeated and transposed letters," Language and Cognitive Processes, 2004, pp. 333-367, vol. 19, No. 3.
Staub et al., "Eye movements and on-line comprehension processes," The Oxford handbook of psycholinguistics, 2007, pp. 327-342, Chapter 19.
Stevens et al., "Letter visibility and the viewing position effect in visual word recognition," Perception & Psychophysics, 2003, pp. 133-151, vol. 65, No. 1.
Vitu et al., "Optimal landing position in reading isolated words and continuous text," Perception & Psychophysics, 1990, pp. 583-600, vol. 47, No. 6.
Vitu, "The influence of parafoveal preprocessing and linguistic context on the optimal landing position effect," Perception & Psychophysics, 1991, pp. 58-75, vol. 50.
Bruijn et al., "RSVP Browser: Web Browsing on Small Screen Devices," Personal and Ubiquitous Computing, 2002, pp. 245-252, vol. 6, Issue 4.
International Search Report and Written Opinion issued in corresponding International Application No. PCT/US2013/050081 dated Oct. 31, 2013.
"Advanced Content Tracking with Google Analytics: part 1" posted Feb. 21, 2012 at http://cutroni.com/blog/2012/02/21/advanced-content-tracking-with-google-analytics-part-1/#wrap).
U.S. Appl. No. 14/523,805, filed Oct. 24, 2014, Waldman et al.
International Search Report and Written Opinion issued in corresponding International Application No. PCT/US2014/054867 dated Jan. 2, 2015.
International Search Report and Written Opinion issued in corresponding International Application No. PCT/US2013/077883 dated Apr. 16, 2014.

* cited by examiner

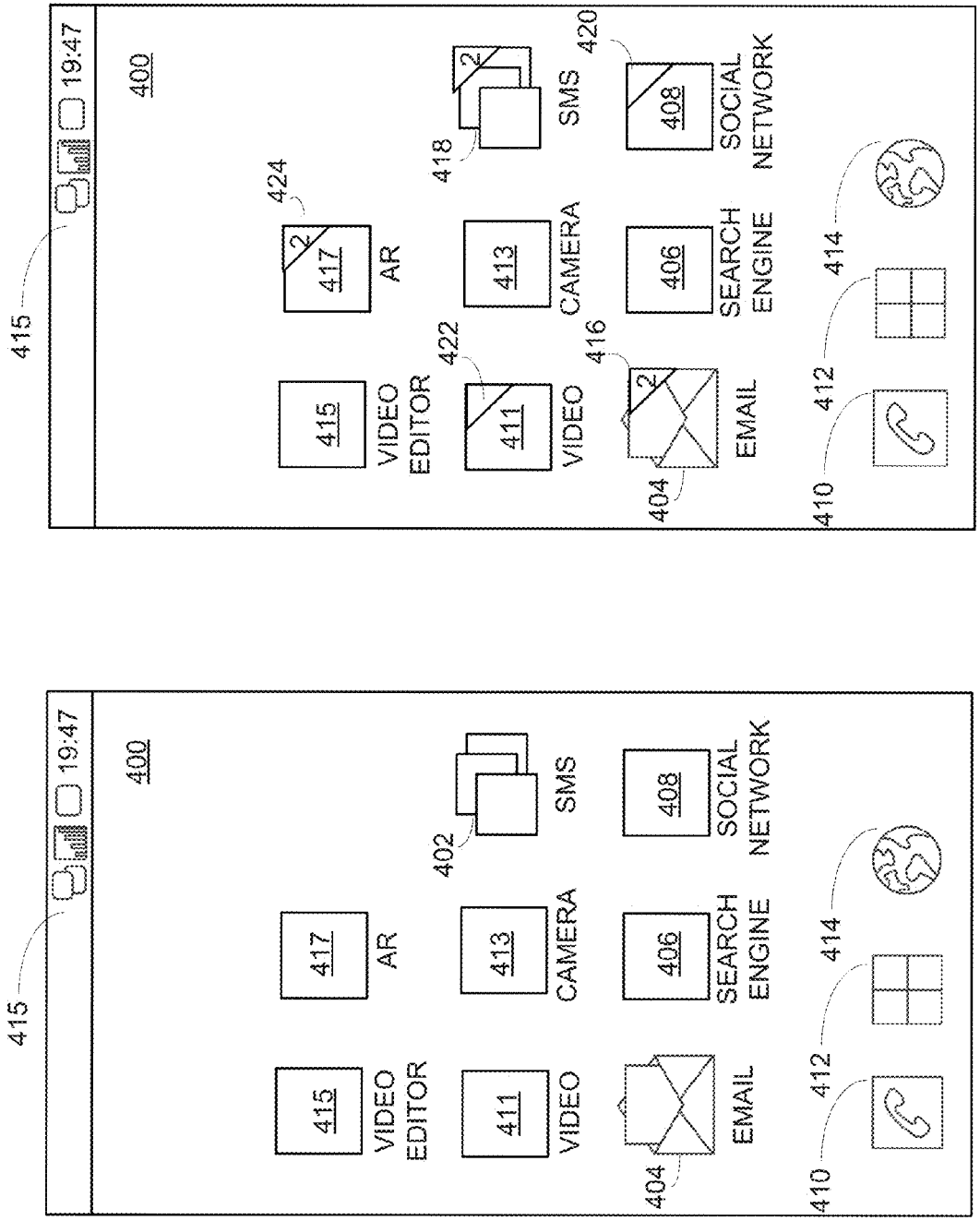

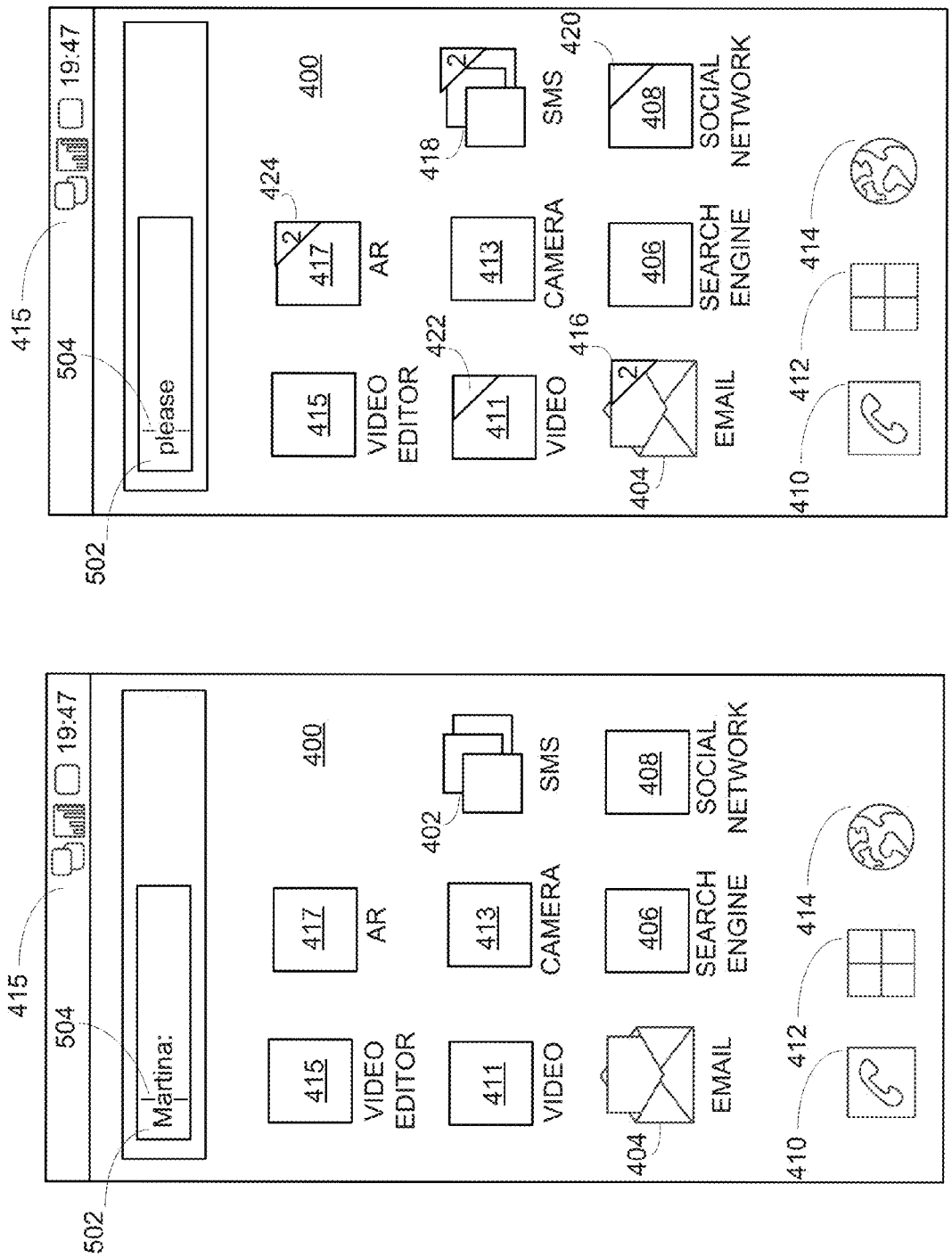

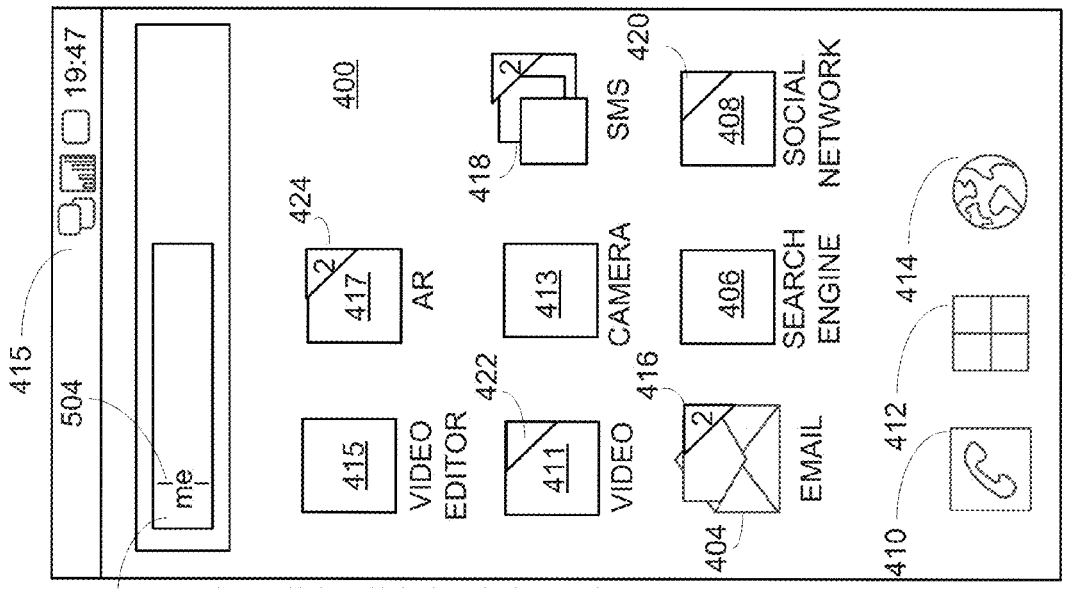
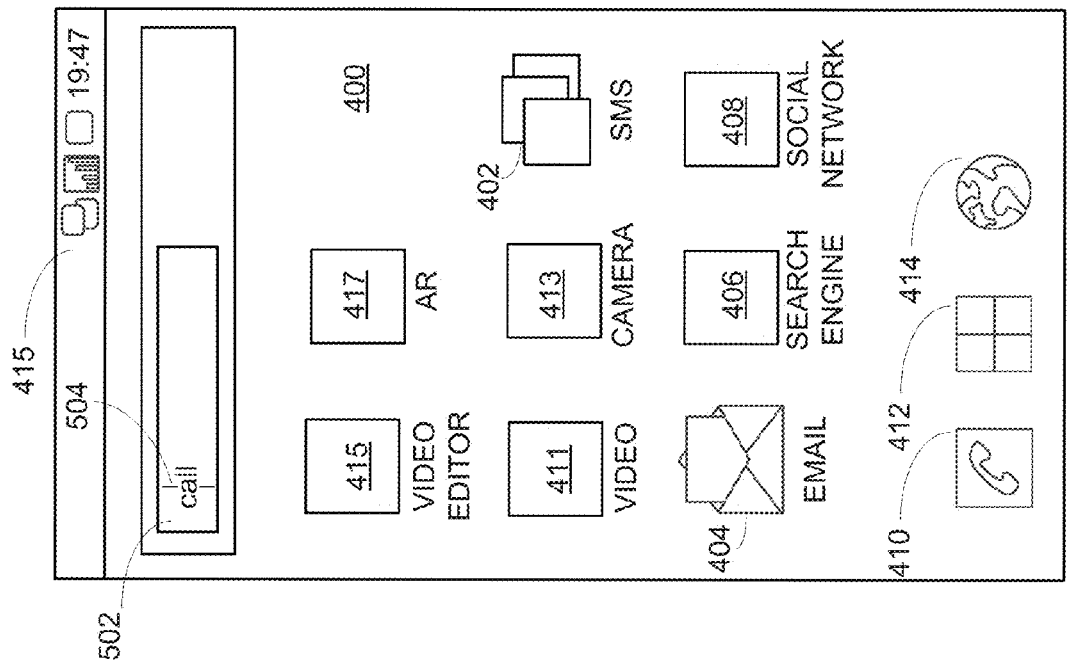

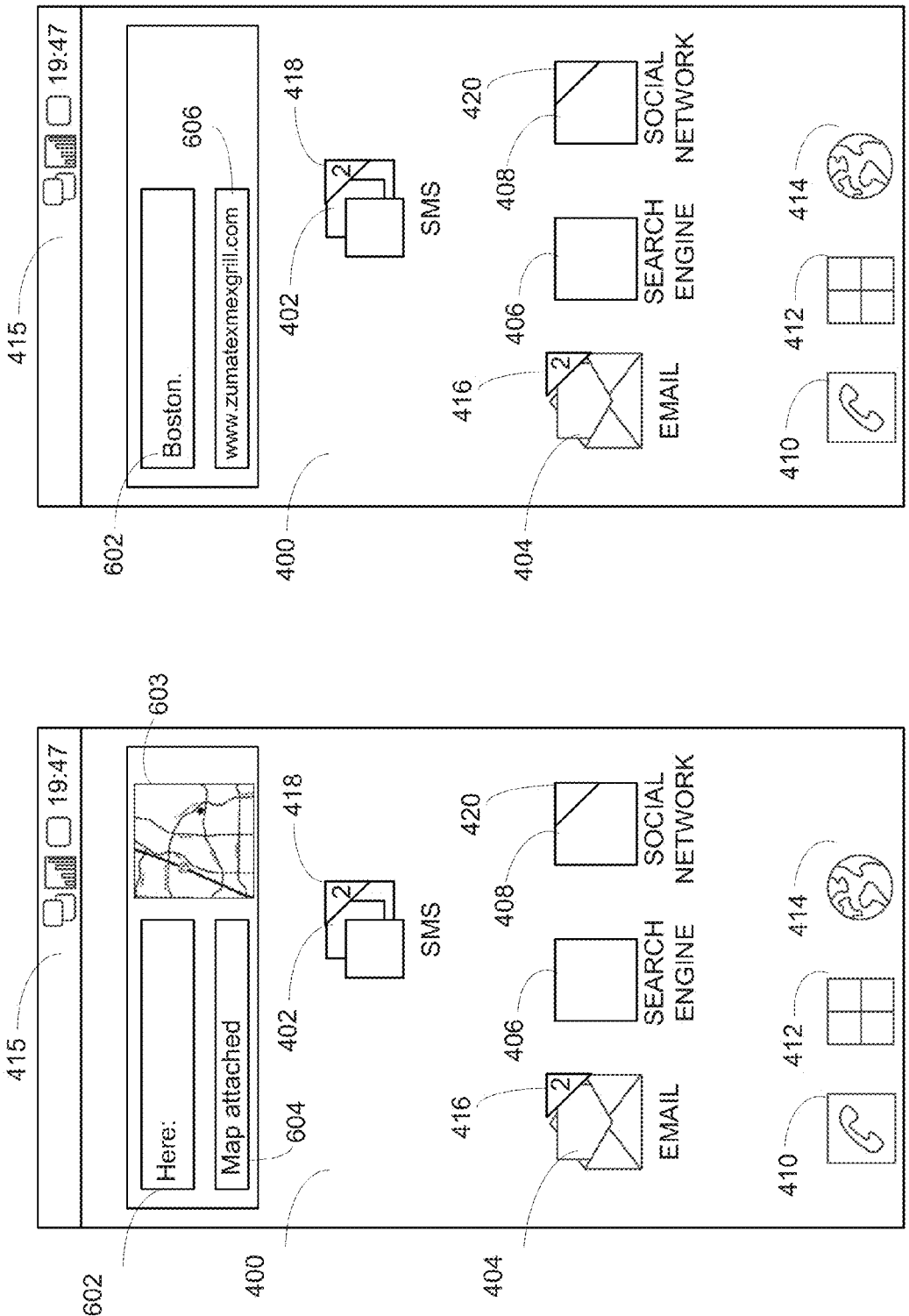

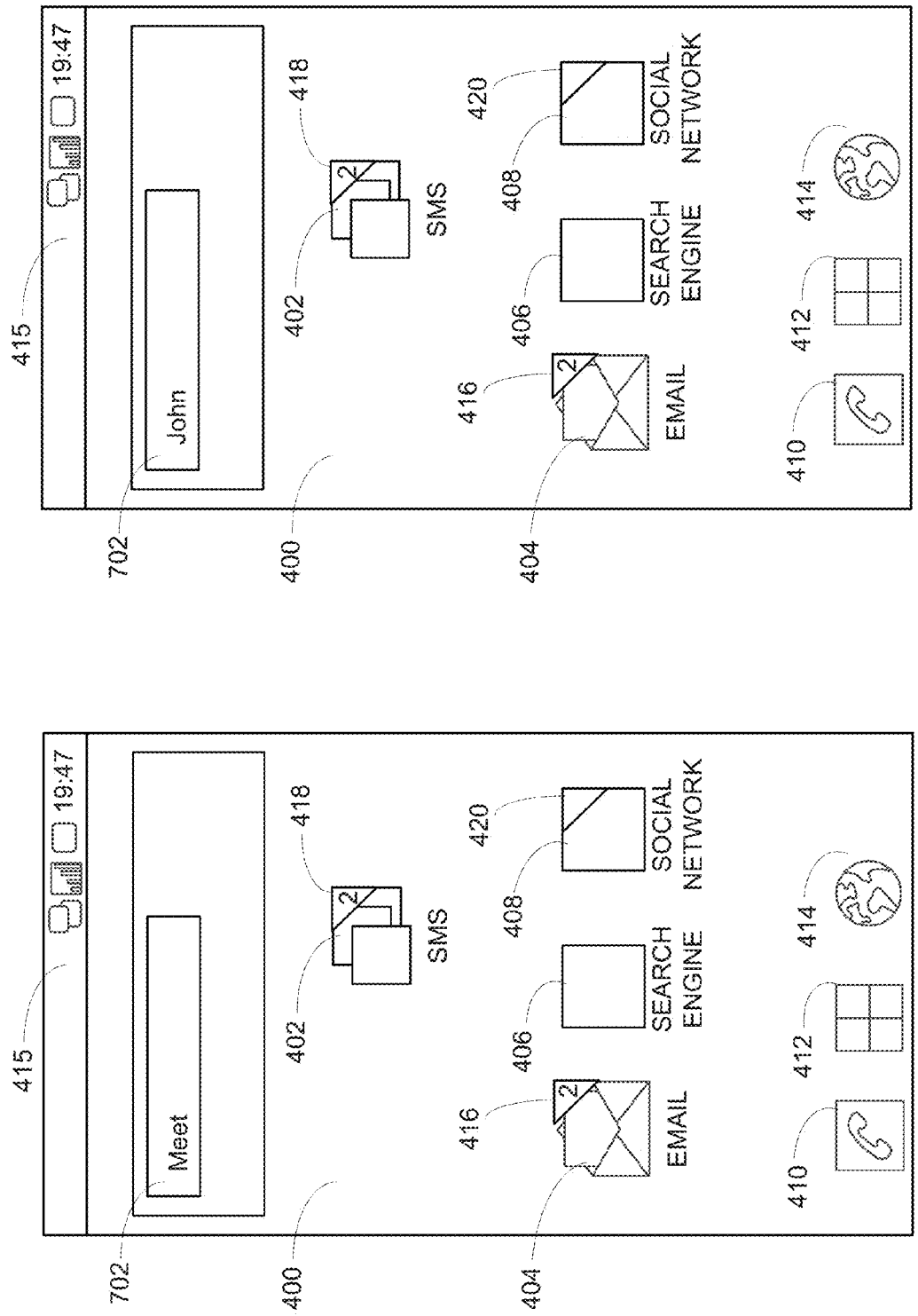

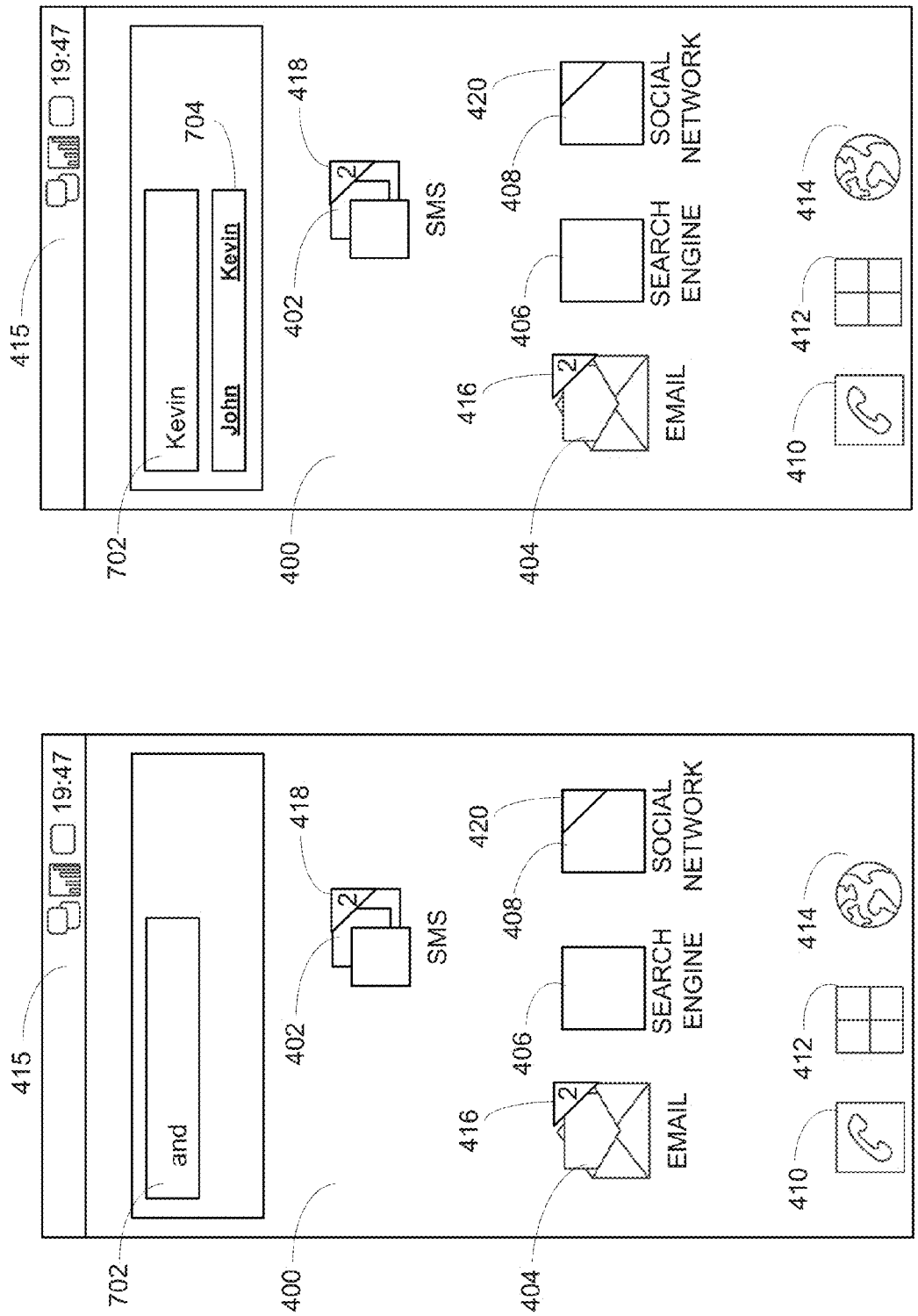

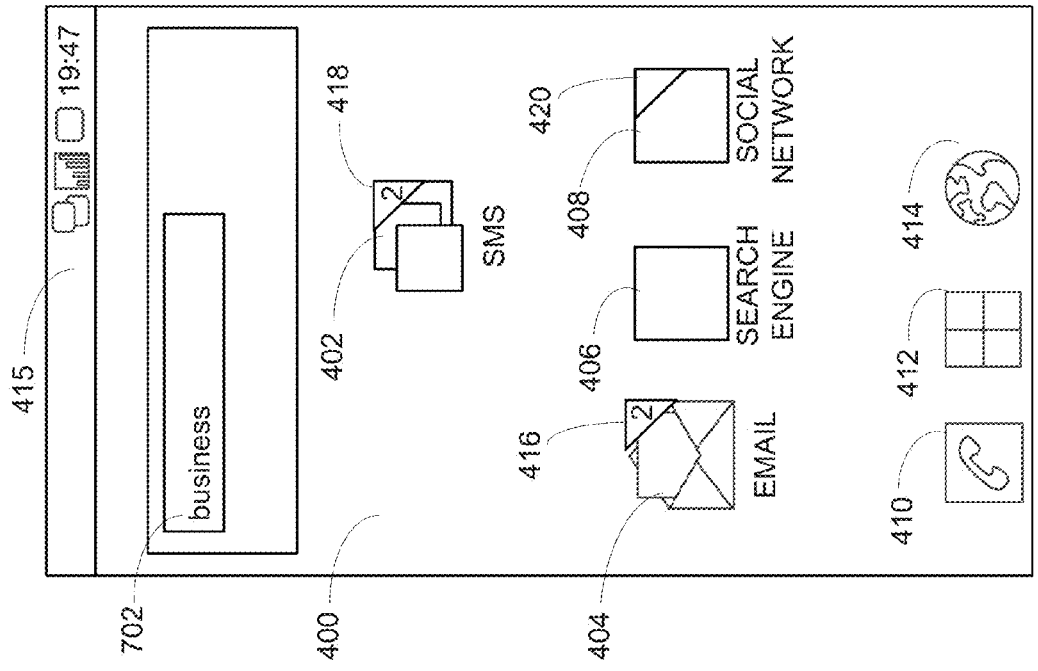
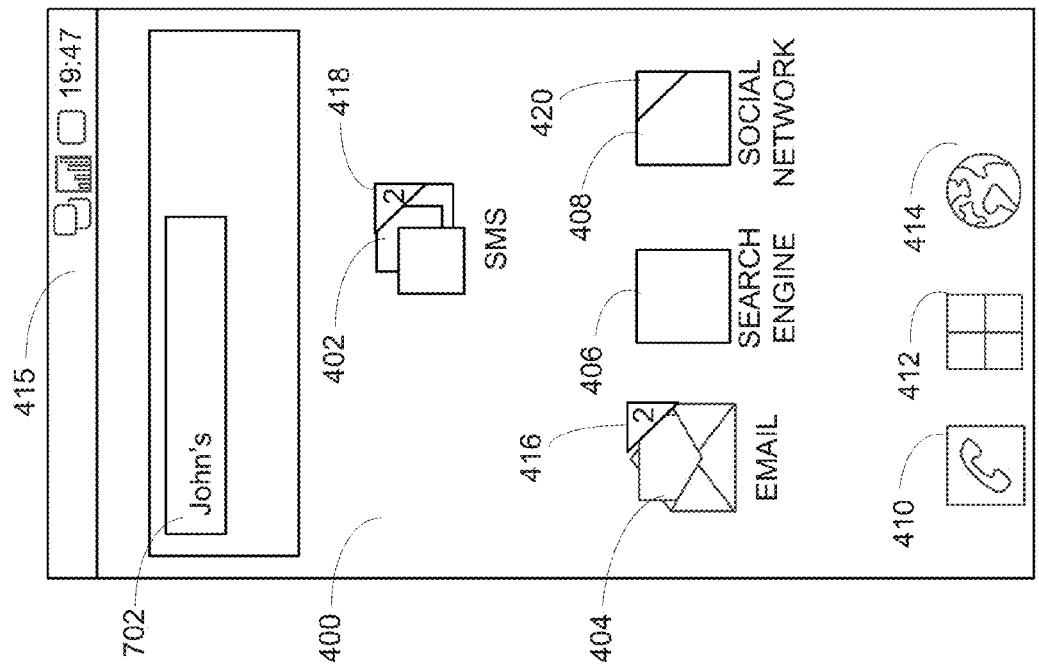

FIG. 19

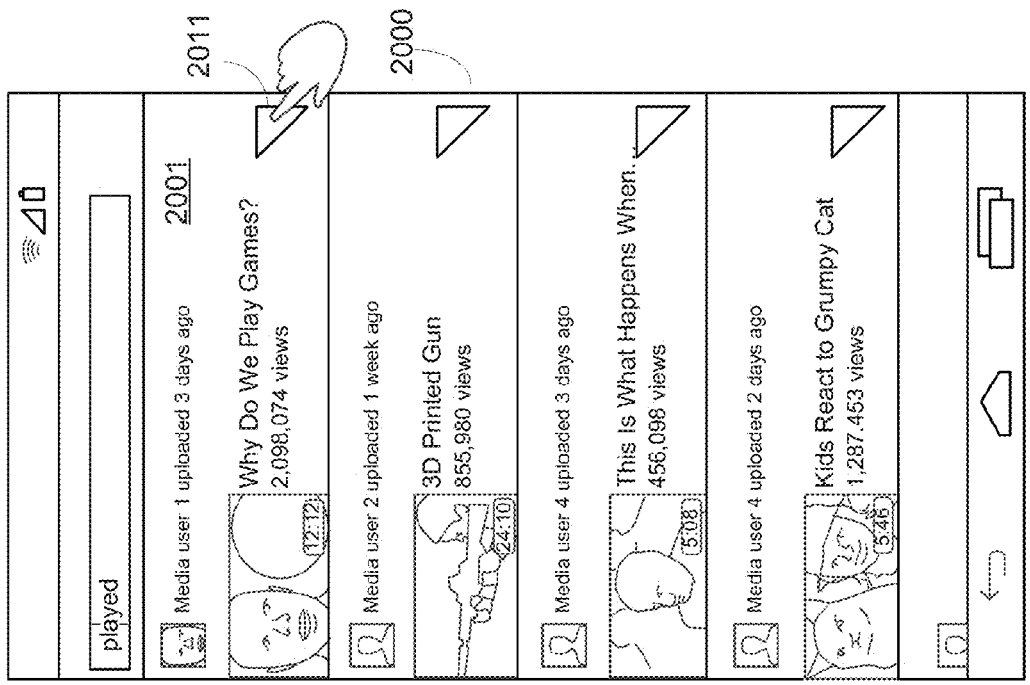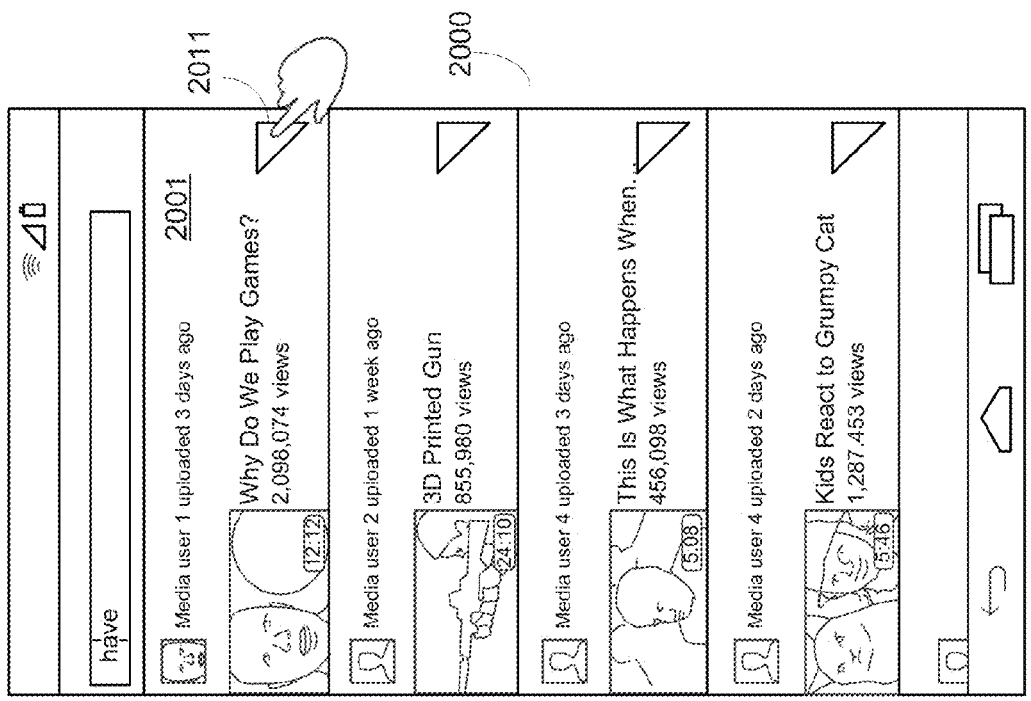

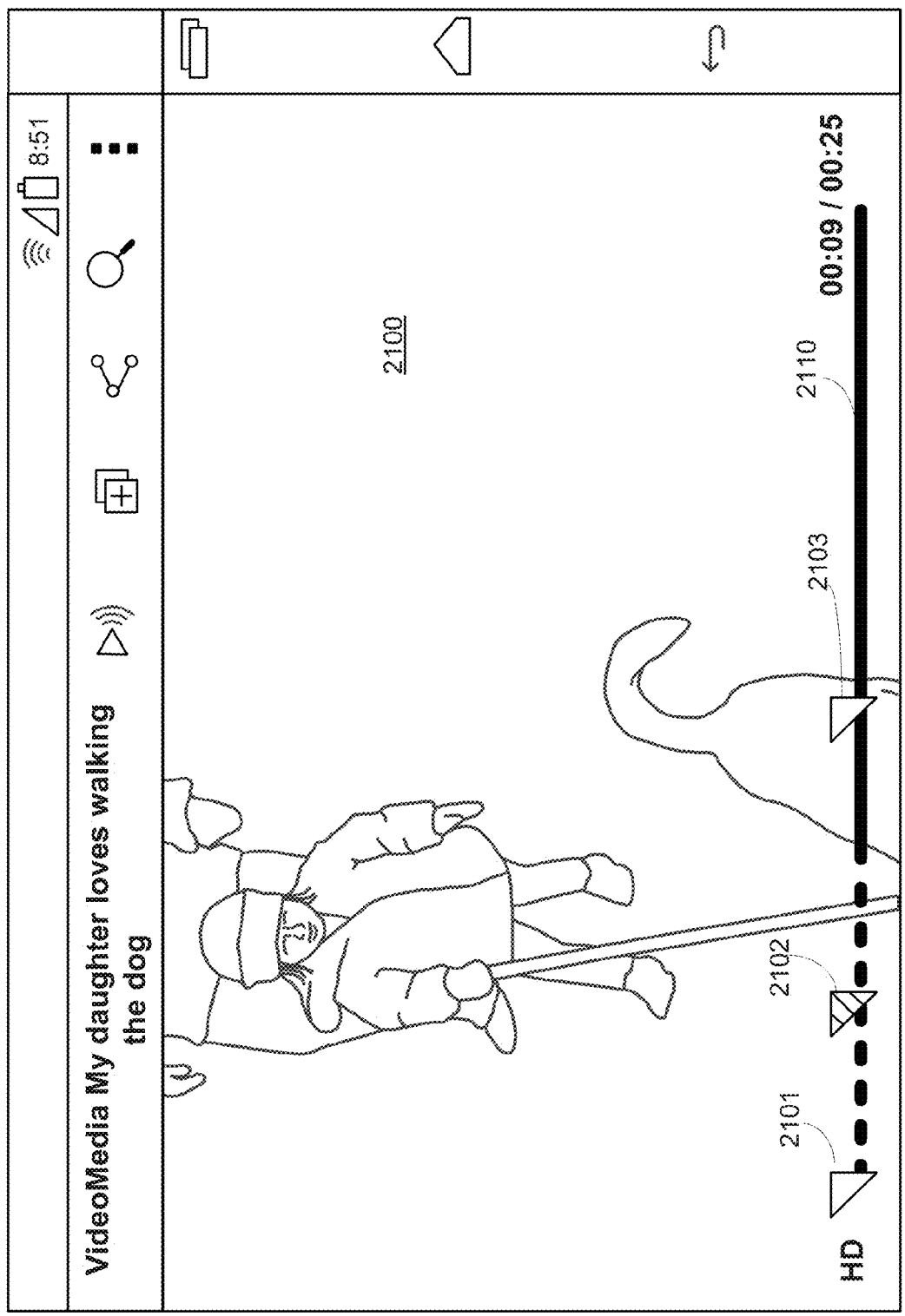

TRACKING CONTENT THROUGH SERIAL PRESENTATION

CROSS REFERENCE TO RELATED APPLICATIONS

This application is a continuation-in-part of U.S. application Ser. No. 13/919,848 filed Jun. 17, 2013 which is a continuation-in-part of U.S. application Ser. No. 13/730,163 filed on Dec. 28, 2012. This application claims the benefit of U.S. Provisional Application Ser. No. 61/862,014 filed on Aug. 3, 2013 and U.S. Provisional Application Ser. No. 61/875,112 filed on Sep. 9, 2013. The subject matter of this application is also related to the subject matter of the following co-pending U.S. patent application: U.S. application Ser. No. 13/547,982 filed on Jul. 12, 2012. The disclosures of all five of these applications are hereby incorporated by reference in their entirety.

BACKGROUND

Electronic devices and systems are frequently relied upon to provide information to users. Content providers and distributors naturally desire to track usage of that content. Content providers and advertisers rely on tracking content use and advertisement use on the Internet to determine appropriate distribution and pricing schemes and to identify relevant content and ads to present to particular users. Providers of paid content typically either offer subscriptions to periodicals or content libraries and/or offer per item pricing for particular publications.

Presently available systems for tracking content usage typically determine whether a particular piece of content was accessed by a user by, for example, tracking page hits for freely available content and tracking purchases of and/or logins to restricted access content. Also, techniques have been proposed for determining and tracking certain types of interactions with webpage content such as scrolling (see, for example, "Advanced Content Tracking with Google Analytics: part 1" posted Feb. 21, 2012 at http://cutroni.com/blog/2012/02/21/advanced-content-tracking-with-google-analytics-part-1/#wrap).

SUMMARY

Although existing content tracking schemes can determine whether content was accessed, systems and methods are needed to better determine whether content, particularly text content, was in fact consumed, i.e., read by the user. Also, there is a need to better track partial consumption to determine, for example, how much text in a given piece of content was read. This can facilitate better content targeting as well as more accurate and flexible pricing schemes. Furthermore, more accurately determining whether and how much of a particular piece of content was consumed can facilitate providing more accurate search results than simply relying on known metrics such as page hits and links.

Communications devices, including PCs, smartphones, tablets, e-readers, etc. continue to grow in popularity, and have become an integral part of both personal and business communications. As a result, users continue to spend more time using their communications devices during the course of a day reading e-mails, reading web sites, sending short message service (SMS) messages, etc.

Rapid serial visual presentation (RSVP) is a method of displaying textual content in which each word of the textual content is displayed in sequential order, one at a time, at a certain display rate, at a fixed location on a display. RSVP was first introduced in the 1970s as a technique for presenting text one word at a time in a display. Many references since then have provided information on the use of RSVP in a variety of applications. Commercially available products based on RSVP include "Zap Reader" (www.zapreader.com/reader) and "Spreeder" (www.spreeder.com). Some prior methods exist for improving the effectiveness of an RSVP by varying the display time of a word in the display based on word length and word type (see, U.S. Pat. No. 6,130,968 to McIan et al. ("McIan")) and based on word frequency (see WO/37256 by Goldstein et al. ("Goldstein 2002")). While these techniques are beneficial in improving comprehension of the displayed text, new techniques and methods are needed to further increase a user's reading speed, and improve the presentation of dense content on electronic displays.

Isolated efforts have also been made to apply RSVP to particular applications (e.g., email applications) in mobile communications devices (see US 2011/0115819 by Hanson). However, the challenges and opportunities for integrating RSVP into user interfaces for increasing the density of displayable content remain largely unexplored. Moreover, despite the increased need for more accurately tracking content consumption, RSVP has not yet been exploited for that purpose.

In accordance with embodiments of the present invention, computer-implemented methods, computer program products, and systems are provided for provisioning content and tracking content use, the content including textual content that is displayable using RSVP. A particular embodiment identifies content, including textual content, to be displayed using RSVP on an electronic device to a user, displays that content to the user using RSVP, and generates content tracking information by tracking a number of words of the textual content that is displayed using RSVP. In some embodiments, a user session identifier is stored and related to a content identifier in an electronic database.

In some embodiments, other variables are tracked and stored and are associated with the content identifier including, for example, variables that track a number of total words, a number of words left or remaining in content, a block size, a number of words downloaded, a block finished indicator and a content finished indicator. In some embodiments, reading speed is calculated and used to select content and/or determine aspects of content presentation. In some embodiments, tracked textual content is provided in the context of tracked content including various mixed media types including, for example, maps, images, video, audio, and/or augmented reality.

In some embodiments, tracked RSVP data is aggregated by user, media, and other categories. In some embodiments, RSVP aggregated data analytics (including totals, averages, percentages, and/or rates of change corresponding to such data) corresponding to digital media items are utilized to determine or enrich search ranking results related to those items. In other embodiments, RSVP data is used to track the amount or percentage of words that users viewed prior to leaving a content item. In a particular aspect of such an embodiment, particular words or keywords that are near points at which significant user exits occur are tracked and graphically displayed so that a content provider can analyze how to potentially alter content to improve reader retention rates. Also, in some embodiments, the number of user selections of displayed sub-content within a particular piece of content is tracked and graphically displayed relative to a percentage of words read. In some embodiments, drops in total user sessions and corresponding rises in total selections of sub-content items are used to compute, for each drop in sessions between sentences, a relative drop ratio.

BRIEF DESCRIPTION OF THE DRAWINGS

FIGS. 4a-4b illustrate screenshot diagrams of an exemplary homescreen in accordance with one embodiment of the present invention.

FIGS. 5a-5d illustrate screenshot diagrams of an exemplary homescreen including a designated rapid serial visual presentation ("RSVP") display area, which displays textual content associated with a notification event using RSVP in accordance with one embodiment of the present invention.

FIGS. 6a and 6b illustrate screenshot diagrams of an exemplary homescreen including a designated RSVP display area, along with a notification indicating the presence of an attachment or URL in accordance with one embodiment of the present invention.

FIGS. 7a-7c illustrate screenshot diagrams of an exemplary homescreen including a designated RSVP display area in accordance with one embodiment of the present invention.

FIG. 7d illustrates a screenshot diagram of an exemplary homescreen including a designated RSVP display area, along with a notification indicating the presence of multiple levels of RSVP content in accordance with one embodiment of the present invention.

FIGS. 7e-7h illustrate screenshot diagrams of an exemplary homescreen including a designated RSVP display area displaying the additional levels of RSVP content indicated in FIG. 7d in accordance with one embodiment of the present invention.

FIG. 19 illustrates a screenshot diagram of an exemplary spreadsheet application interface including a designated RSVP display area in accordance with one embodiment of the present invention.

FIGS. 20a-20d show screenshot diagrams of an exemplary video item listing page for displaying RSVP content related to video items in accordance with one embodiment of the present invention.

FIGS. 21a-21g illustrate the playing of a video supplemented by RSVP content, the video and associated RSVP content being displayed by an embodiment of the present invention.

DETAILED DESCRIPTION

The present description is made with reference to the accompanying drawings, in which various example embodiments are shown. However, many different example embodiments may be used, and thus the description should not be construed as limited to the example embodiments set forth herein. Rather, these example embodiments are provided so that this disclosure will be thorough and complete. Various modifications to the exemplary embodiments will be readily apparent to those skilled in the art, and the generic principles defined herein may be applied to other embodiments and applications without departing from the spirit and scope of the disclosure. Thus, the present disclosure is not intended to be limited to the embodiments shown, but is to be accorded the widest scope consistent with the principles and features disclosed herein.

Figure 1:
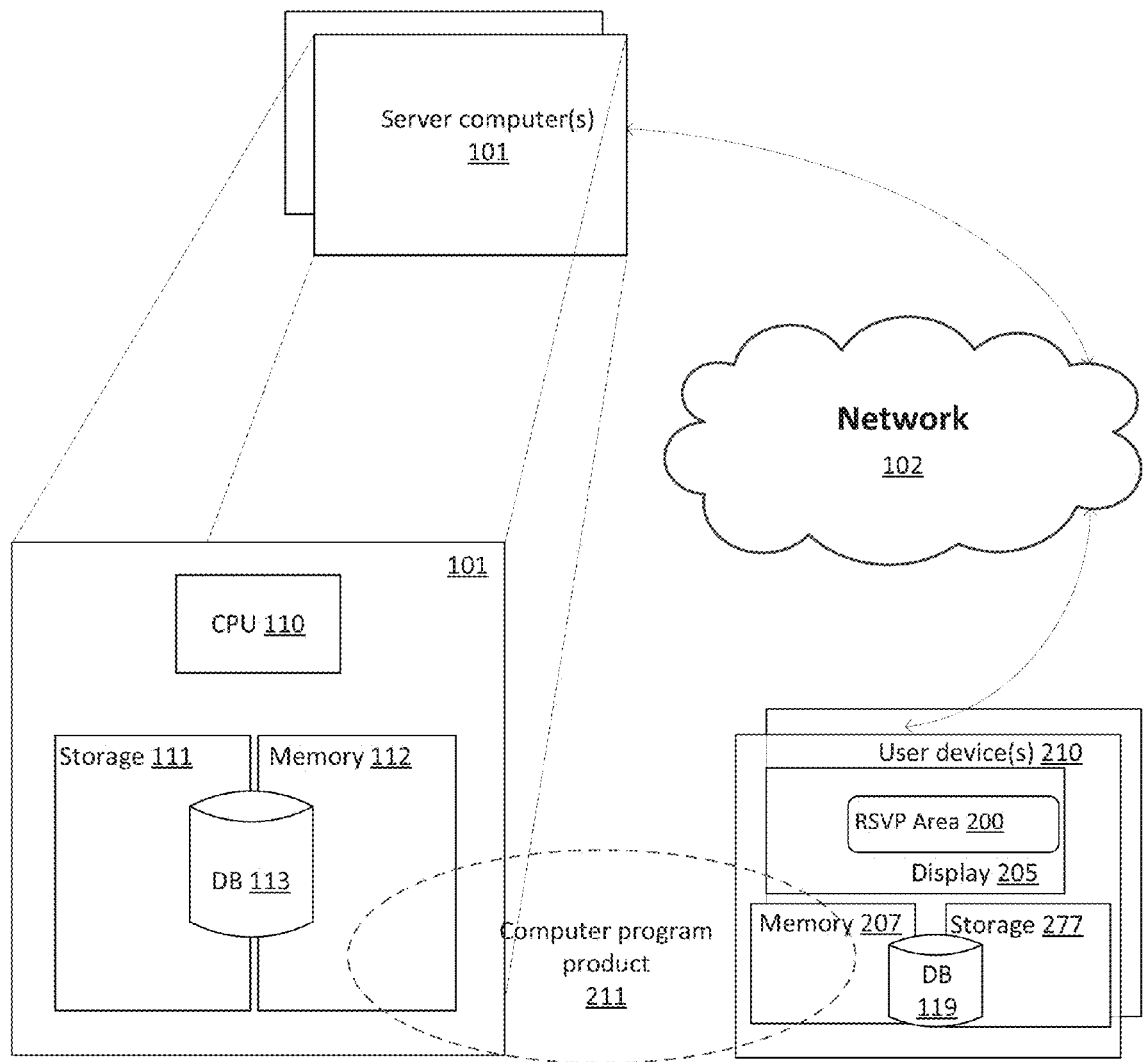
FIG. 1 is a diagram of a computer system in the context of a computer network in accordance with one embodiment of the present invention.

Referring to FIG. 1, computer system 100, according to an embodiment of the present invention includes one or more server computers 101, network 102, one or more user devices 210 and computer program product 211. Computer program product 211 may be provided in a transitory or non-transitory computer readable medium; however, in a particular embodiment, it is provided in a non-transitory computer readable medium (e.g., persistent (i.e., non-volatile) storage, volatile memory (e.g., random access memory), or various other well-known non-transitory computer readable mediums).

User device 210 includes display 205 memory 207, storage 277, and database 119. Display 205 may be implemented as a touch screen display but is not limited thereto. Display 205 further includes designated Rapid Serial Visual Presentation ("RSVP") display area (DRDA) 200 on display 205.

Server computer 101 further includes central processing unit (CPU) 110, storage 111, memory 112 and database (DB) 113. Server computer 101 may be any computing device capable of hosting computer product 211 for access by one or more client computers, for example user device 210, over a network such as the Internet, for example network 102. Server computer 101 communicates with one or more client computers via the Internet and may employ protocols such as the Internet protocol suite (TCP/IP), Hypertext Transfer Protocol (HTTP) or HTTPS, instant-messaging protocols, or other protocols.

Memory 112 and 207 may include any known computer memory device. Storage 111 and 277 may include any known computer storage device.

Although not illustrated, memory 112 and 207 and/or storage 111 and 277 may also include any data storage equipment accessible by the server computer 101 and user device 210, respectively, such as any memory that is removable or portable, (e.g., flash memory or external hard disk drives), or any data storage hosted by a third party (e.g., cloud storage), and is not limited thereto.

DB 113 may reside in both memory 112 and storage 111 to provide optimized seek time and response time. Similarly, database ("DB") 119 may reside in both of memory 207 and storage 277. In some implementations described herein, a database such as DB 119 does not necessarily need to be separately maintained on the user device. However, in some implementations, maintaining a user-side database for the presentation and tracking systems and methods described herein will be beneficial.

User device(s) 210 and server computer(s) 101 access and communicate via the network 102. Network 102 includes a wired or wireless connection, including a Wide Area Networks (WANs) and cellular networks or any other type of computer network used for communication between devices.

The content tracking system, according to an embodiment of the present invention, is implemented on user device 210 and server computer 101 by computer program product 211. Specifically, computer program product 211 includes instructions for executing the content tracking method and system on server computer 101 and user device 210 and the instructions are stored on computer readable memory 112 and memory 207, respectively. Computer program product 211 includes instructions to serially present text in the DRDA 200 and to execute tracks for carrying out related content tracking and content selection and presentation methods described further herein. In some embodiments, portions of computer program product 211 are distributed across multiple servers and devices.

User device 210 may include any type of electronic device capable of controlling text display. Some examples include desktop computers and portable electronic devices such as mobile phones, smartphones, multi-media players, e-readers, tablet/touchpad, notebook, or laptop PCs, smart televisions, smart watches, head mounted displays, and other communication devices. In some implementations (e.g., a smart phone or e-reader), the display 205 may be packaged together with the rest of device 210. However, in other implementations, a separate display device (e.g., a monitor) maybe be attached to device 210. While the illustrated embodiment shows a graphical border around DRDA 200, DRDA 200 simply refers to a region (e.g., a window) on display 205 where text is serially presented in accordance with an embodiment of the present invention and in particular implementations, DRDA 200 may or may not be outlined by a graphical border.

In the illustrated embodiment, computer program product 211 is loaded into memory 207 to configure device 210 in accordance with the present invention. In one embodiment, text data may be loaded into memory for text processing and display processing by device 210 as will be further described herein. Text data loaded into memory for text processing and display processing may be retrieved from persistent storage on a user device such as device 210 and/or may be received from one or more server computers 101 through a connection to network 102 (e.g., the Internet). One or more server computers 101 may be for example, one or more advertiser computers, one or more search engine computers, one or more web servers, one or more application servers, etc. In an alternative embodiment, at least some processing/pre-processing of text data for display in accordance with the principles illustrated herein may be carried out by one or more remote computers such as server computers 101 and then sent to end user device 210 for display in DRDA 200 on display 205. In such an alternative, some or all of a computer program product such as computer program product 211 for implementing an embodiment of the present invention may reside on one or more computers such as server computers 101 that are remote from end user device 210. In some embodiments, the entire computer program product may be stored and executed on remote computers and the results presented within a browser application component (e.g. a media player application) of user device 210 (browser application and media player application not separately shown).

Although not illustrated, user device 210 may also include a processor and an input and output subsystem. In some implementations (e.g., a smart phone or e-reader), user device 210 may include a wireless transceiver and one or more input interfaces including a touch enabled display, a trackball, keyboard, microphone, smart television controller, etc.

User content, including textual data is loaded into memory 112 and/or memory 207 for text processing, display processing, and tracking, as further described herein. Text data loaded into memory for text processing and display processing may be retrieved from persistent storage on a user device such as device 210 and/or may be received from one or more server computers 101 through a connection to network 102 (e.g., the Internet).

One or more server computers 101 may include, for example, one or more advertiser computers, search engine computers, content provider computers, broadcasting provider computers, web servers, application servers and the like. Some of the content tracking and processing, including textual content tracking and processing, may be carried out by one or more remote computers such as server computers 101 and then sent to end user device 210 for RSVP display in DRDA 200 on display 205. The results of the processed content, including textual content, may be presented within a browser or other software application installed on user device 210. In some embodiments, the processing for RSVP display and content tracking may occur entirely offline on user device 210 and, optionally, the results of the content tracking methods described herein may then be transmitted to server computer 101 when a connection to network 102 is available.

According to an aspect of the present invention, content providers and advertisers may determine content and sequence of serial display and sub-displays. Additionally, a user may specify in user preferences used to determine sequencing and sorting of serially displayed content and how to choose or sort the sub-content. The content served as sub-content may be based on keywords corresponding to the words that have been serially displayed from the content.

Program product 211 may be configured to enable system 100 to take into account preferences of multiple entities, for example, the user, content providers, and advertisers, when serially presenting content in serial display and sub-display. Alternatively, program product 211 may be configured to only apply the settings and preferences of one of the entities or always override all settings based on a specific settings profile.

In an embodiment of the invention, text (which includes, for example, strings of characters—e.g., letters, numbers, symbols, etc.—which constitute words, numeric figures, and combinations of both with punctuation marks and symbols—note that words may include words represented by any human language including, without limitation, words represented by roman characters, script elements, or pictographic characters—) is presented serially (for example, one word at a time) within DRDA 200. As referenced herein, a "display element" will refer to a group of text data that is displayed at one time within DRDA 200. In other words, display elements are displayed serially. In the primary embodiment discussed herein, a display element will generally consist of one word. However, in alternative embodiments, two words may be presented as a single display element. Also, in the primary embodiment, two words are sometimes part of a single display element such as, for example, when a number e.g., "9," is displayed together with a unit, e.g. "feet," so that, for example, the text "9 feet" may constitute a single display element and be presented together.

In a conventional RSVP system, each word is centered in the display area, and the optimal fixation position shifts as words of differing lengths are sequentially displayed, resulting in saccade movements as the eyes shift to the optimal fixation position. The reader has to refocus on the display every time a new word appears that is of a different length than the previous word. The reader's eyes will move from one character to the next to find the optimal position, which is also referred to as a recovery saccade. In addition, when a longer word follows a shorter one, the saccadic movement direction will be from right to left. When reading text in lines in a traditional paragraph display, most saccadic movement is from left to right so the reader is accustomed to this type of eye movement. Only occasionally, if the optimal fixation position is not found directly, the reader may have to move back from right to left. Thus conventional RSVP forces the reader to experience saccades which are not normal. Conventional RSVP approaches offer no solution to these problems. In order to prevent or minimize recovery saccades in an RSVP, it is preferable to display each word such that the optimal fixation position does not shift in the display. The focal point of the reader can then remain fixed on the optimal fixation position, which is a specific point in each word that is determined by the total number of characters or width of the word. This Optimal Recognition Position (ORP), can be identified in the display such that the reader's eyes are directed to focus there as the words are serially presented. An RSVP which incorporates an ORP is hereinafter referred to as "ORP-RSVP." With an ORP-RSVP, text can then be presented at a faster rate because no saccades occur during the presentation. In addition, the elimination of saccades reduces eye fatigue and makes it more comfortable, resulting in a better reading experience for the user. Embodiments described herein may be implemented using conventional RSVP or ORP-RSVP.

With respect to embodiments implemented using ORP-RSVP, a corresponding method embodiment for serially displaying text on an electronic display comprises identifying an ORP for a plurality of words to be displayed and serially displaying the plurality of words such that the ORP of each word is displayed at a fixed display location on the electronic display. In some embodiments, the ORP is identified as a character in the word. In another embodiment, the ORP is identified as a proportionate position relative to the width of the word in pixels. In some embodiments, visual aids are used to mark the fixed display location (see e.g., hash marks) and/or an ORP within the word (e.g., different colored font). In some embodiments, for words that are four or more characters, a word is displayed so that the fixed display location is closer to the beginning than to the end of the word.

In addition, words are rarely greater than 13 characters (according to Sigurd, only 0.4% of the words in the English language are longer than 13 characters—see Sigurd, B. et al, "Word Length, Sentence Length and Frequency—ZIPF Revisited", Studia Lingustica 58(1), pp 37-52, Blackwell Publishing Ltd, Oxford UK, 2004) and therefore, for the vast majority of words, it is preferable to limit the number of characters to the right side of the fixation point to 8 characters. Also, in some embodiments, a word having a length of greater than thirteen characters is divided into first and second display elements such that a first portion of the word is displayed first (along with a hyphen) and then the second portion of the word is displayed next. In some embodiments, an empirically determined ORP of each display element is presented at a fixed location of the DRDA 200. For example, each word of a plurality of words is serially presented and positioned in the display such that the ORP is displayed at a fixed display location within DRDA 200 and this enables recognition of each word in succession with minimal saccade by the reader. Determining and displaying the ORP for display elements, and presenting display elements within DRDA 200 is described in more detail in co-pending U.S. application Ser. No. 13/547,982, which is incorporated by reference above.

Configuring text content for RSVP display may include parsing text into a plurality of display elements, inserting blank elements at the end of a sentence, and determining a multiplier for each display element that can be used, along with user selected settings and/or other display parameters, to determine a display time for each display element. While, in some embodiments, each element may be displayed for the same amount of time, it has been demonstrated empirically that a longer display time is beneficial for comprehension of longer words. It has also been demonstrated empirically that a longer pause between sentences is beneficial for comprehension of longer sentences. Further details of certain systems and methods for preparing and displaying text using RSVP are described in co-pending U.S. application Ser. No. 13/547,982 referenced above.

Figure 2A:
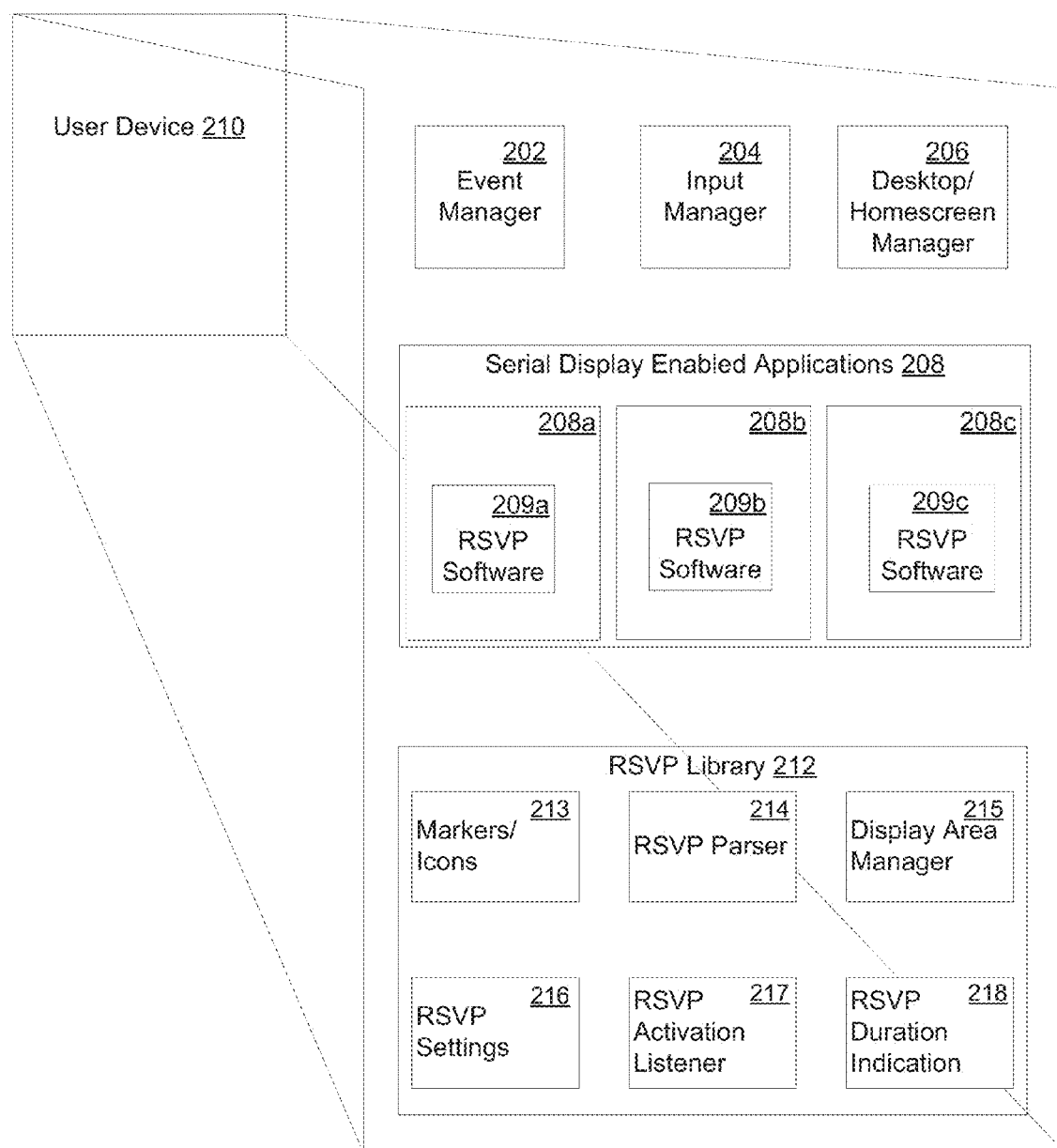
FIG. 2a is a block diagram of exemplary software modules included in the computer program product loaded on the user device of FIG. 1 in accordance with one embodiment of the present invention.

FIG. 2a is a block diagram illustrating the configuration of user device 210 of FIG. 1 and the software modules included in the portion of computer program product 211 loaded on user device 210. A number of modules are illustrated inside user device 210 to indicate modules in the device associated with text display functionality in accordance with an embodiment of the present invention. Serial display enabled applications 208 include program instructions stored on user device 210. The configuration of the modules is illustrated separately in FIG. 2a for clarity of explanation and is not limited to this specific configuration. The modules may be configured as a single combined module or configured within other modules within user device 210.

User device 210 includes desktop/homescreen manager 206 to control various elements to be displayed on a homescreen (e.g., a "homescreen" of a smart phone running a mobile operating system such as iOS™, Android™, or Windows Phone™ or a "desktop" display of a PC, laptop, etc., running an operating system such as Windows™, or Mac™ OS; or a homescreen/desktop screen of an intermediate portable device such as notepad, touchpad, e-book reader, smart watch, head mounted display etc. running a corresponding operating system). For example, desktop/homescreen manager 206 may control the icons, widgets, tiles, windows, folders, etc. and other information that may be displayed on a desktop or homescreen. Input manager 204 manages inputs received from one or more input mechanisms such as a touch-screen, trackball, keyboard, mouse, microphone, eye-tracking, a gesture detector, or other natural interface input detector, etc. For example, text input may be provided using a virtual (i.e., touch screen) or physical keyboard, mouse, trackball, etc. Alternatively, or in addition, a user may provide voice/speech input via a microphone, which may then be converted to text. Various serial display enabled applications 208 (including, for example, applications 208a, 208b, and 208c) may run on the device and may provide data to be displayed through desktop/homescreen manager 206.

Various messages (e.g., email, SMS) may be received over a network such as a wireless communications network connected to the Internet, via a wireless interface (not separately shown). Information received from the network, such as from one or more remote servers, may be provided to the applications 208 by event manager 202, and information may be passed from applications 208 back to the network. Event manager 202 may manage notification events that are presented to a user, e.g., through display 205. For example, event manager 202 may receive notification events from the wireless network. Notification events may include, for example receipt of text messages, emails, voicemails, social network updates, file transfers, etc. Event manager 202 may in turn forward the notification events to corresponding applications. For example, an email notification may be forwarded to the email application. The application may then instruct the desktop or homescreen manager 206 to display status or notification information to alert the user.

As will be described in further detail below, RSVP library 212 allows user device 210 to present display elements using RSVP. In accordance with an embodiment of the present invention, applications 208a, 208b, and 208c, which may be email applications, messaging application, social networking applications, word processing applications, spreadsheet applications, photo applications, map applications, webpage editors, browser applications, search applications, video application, augmented reality applications, etc., may communicate with RSVP library 212 through an RSVP application programming interface (API) (not separately shown). For example, each application 208a, 208b, and 208c may include application-specific RSVP software, such as RSVP software 209a, 209b, and 209c, respectively, which may allow applications 208a, 208b, and 208c to detect presence of RSVP content. Upon detecting RSVP content, RSVP software, such as RSVP software 209a, 209b, and/or 209c may call RSVP library 212 via the API. In response, RSVP library 212 may display RSVP notification markers/icons, display DRDA 200, display RSVP content in DRDA 200, etc. In some embodiments, the application specific RSVP software, such as RSVP software 209a, 209b, and/or 209c may instead be included in RSVP library 212. In some embodiments, application-specific RSVP software, such as RSVP software 209a, 209b, and 209c may additionally include logic to allow embedding of textual content within a file.

The RSVP library 212, in accordance with an embodiment of the present invention, includes RSVP notification markers or icons 213, RSVP parser 214, designated RSVP display area manager 215, RSVP settings 216, RSVP activation listener 217, and RSVP duration indication 218. Although the software modules are illustrated separately in this example for clarity of explanation, one or more modules may be combined or arranged in other ways.

RSVP notification markers or icons 213 are displayed by RSVP library 212 to alert a user of the presence of RSVP content. RSVP markers or icons 213 may also include icons indicating sponsored content. RSVP parser 214 parses textual data into individual display elements suitable for display in DRDA 200. Alternatively, a parser may be invoked before serving content to a user. Designated RSVP display area manager 215 displays DRDA 200 when appropriate user input is received. Appropriate input includes a system event that notifies the RSVP library 212 that user-selected content is serially displayable, in offline or online mode, to serially display content automatically or user-initiated input requesting RSVP display of the content.

RSVP settings 216 include settings related to displaying display elements using RSVP such as, the speed of display, font, font color, selection of the type of user input to activate RSVP display, block size for textual content and the like. RSVP activation listener 217 detects appropriate user input which is intended to select a RSVP notification marker/icon. RSVP duration indication 218 determines the duration of the RSVP content, which may be displayed, for example adjacent to DRDA 200. In some embodiments, the duration may be displayed as an amount of time (e.g., in seconds). Alternatively, or in addition, the duration may be displayed graphically, for example as a status bar. The duration of RSVP content may be computed, for example, based on reading speed. In this case, if reading speed is 500 words per minute, and the content contains 1000 words, then the duration is computed as two (2) minutes.

Figure 2B:
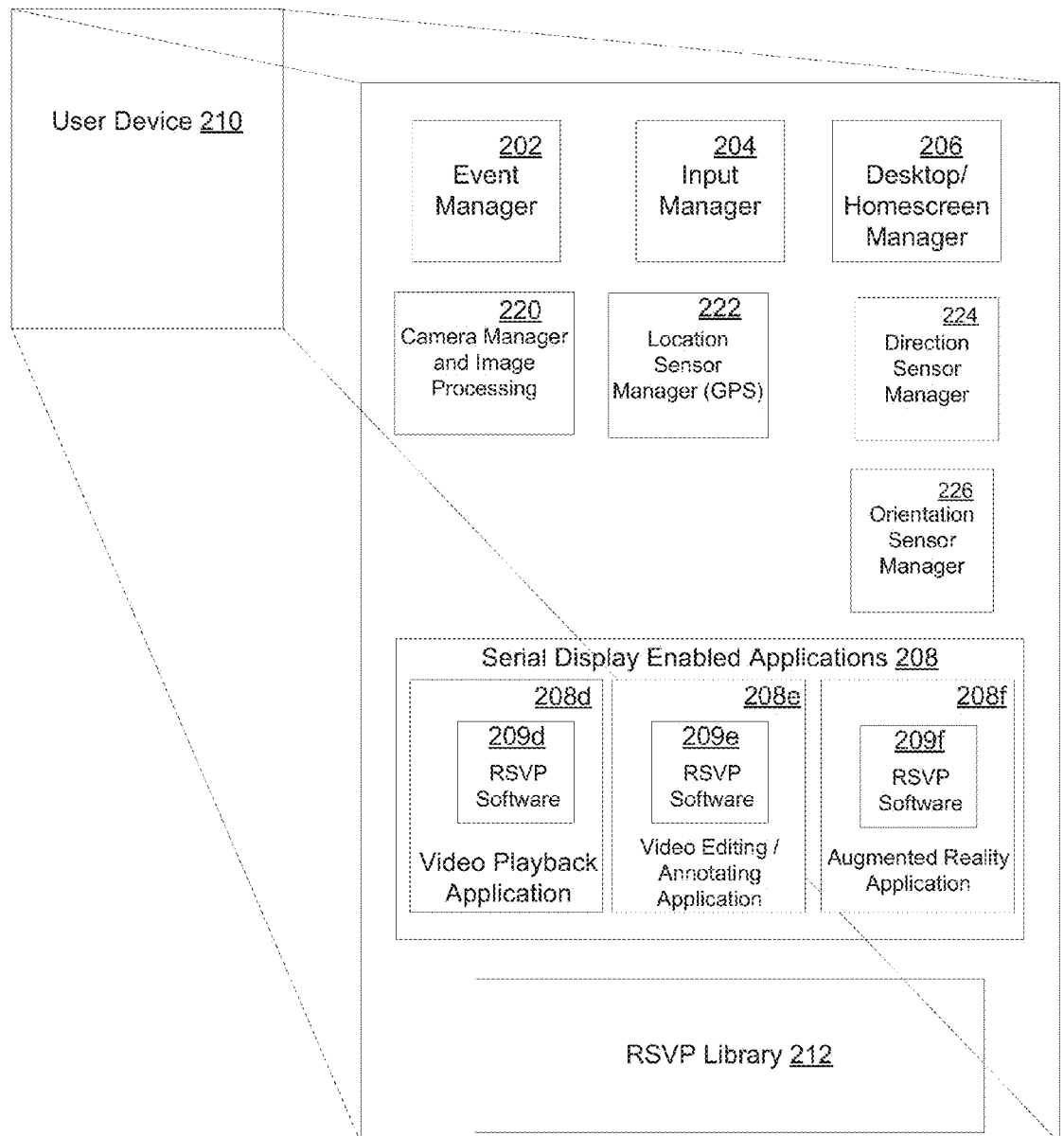
FIG. 2b shows a specific implementation of the embodiment of FIG. 2a in which the specific RSVP-enabled applications include both video-related applications and an augmented reality (AR) application.

FIG. 2b shows a specific implementation of the embodiment of FIG. 2a in which the specific RSVP-enabled applications include both video-related applications and an augmented reality (AR) application. Specifically, the implementation shown in FIG. 2b includes video playback application 208d, video editing/annotating application 208e, and augmented reality application 208f. In one embodiment, each application 208d, 208e, and 208f includes application-specific RSVP software, such as RSVP software 209d, 209e, and 209f, respectively, which enables applications 208d, 208e, and 208f to detect presence of RSVP content. Upon detecting RSVP content, RSVP software, such as RSVP software 209d, 209e, and/or 209f may call RSVP library 212 via an API (not separately shown) and RSVP library 212 may respond as described above in the context of FIG. 2a. In an alternate embodiment, the application specific RSVP software, such as RSVP software 209d, 209e, and/or 209f may instead be included in RSVP library 212. In one embodiment, application specific RSVP software, such as RSVP software 209d and/or 209e may additionally include logic to allow embedding of textual content within a video file. Also, it will be understood by those skilled in the art, that particular embodiments of such applications may be used to enhance a video stream (rather than a file) with added textual content for RSVP display. For example, adding RSVP content to may comprise adding that content to a database that relates the added content to video stream content so that the video and RSVP content may be provided together in a stream for display by an RSVP-enabled media player application. Alternatively, in some implementations, the RSVP content may be converted in advance to an existing media player file format (or data stream protocol)

and combined with the video content (in a file or stream) so that an existing media player application can display the RSVP content without requiring additional RSVP specific software. In all embodiments described herein, it will be understood that even if the particular embodiment is described in terms of a "file," the principles can also be applied to data streams in alternative embodiments.

Additional components of user device 210 that are relevant to AR applications are also shown. These include camera manager and image processing application 220, location sensor manager 222 (implemented with GPS), direction sensor manager 224, and orientation sensor manager 226.

Figure 2C:
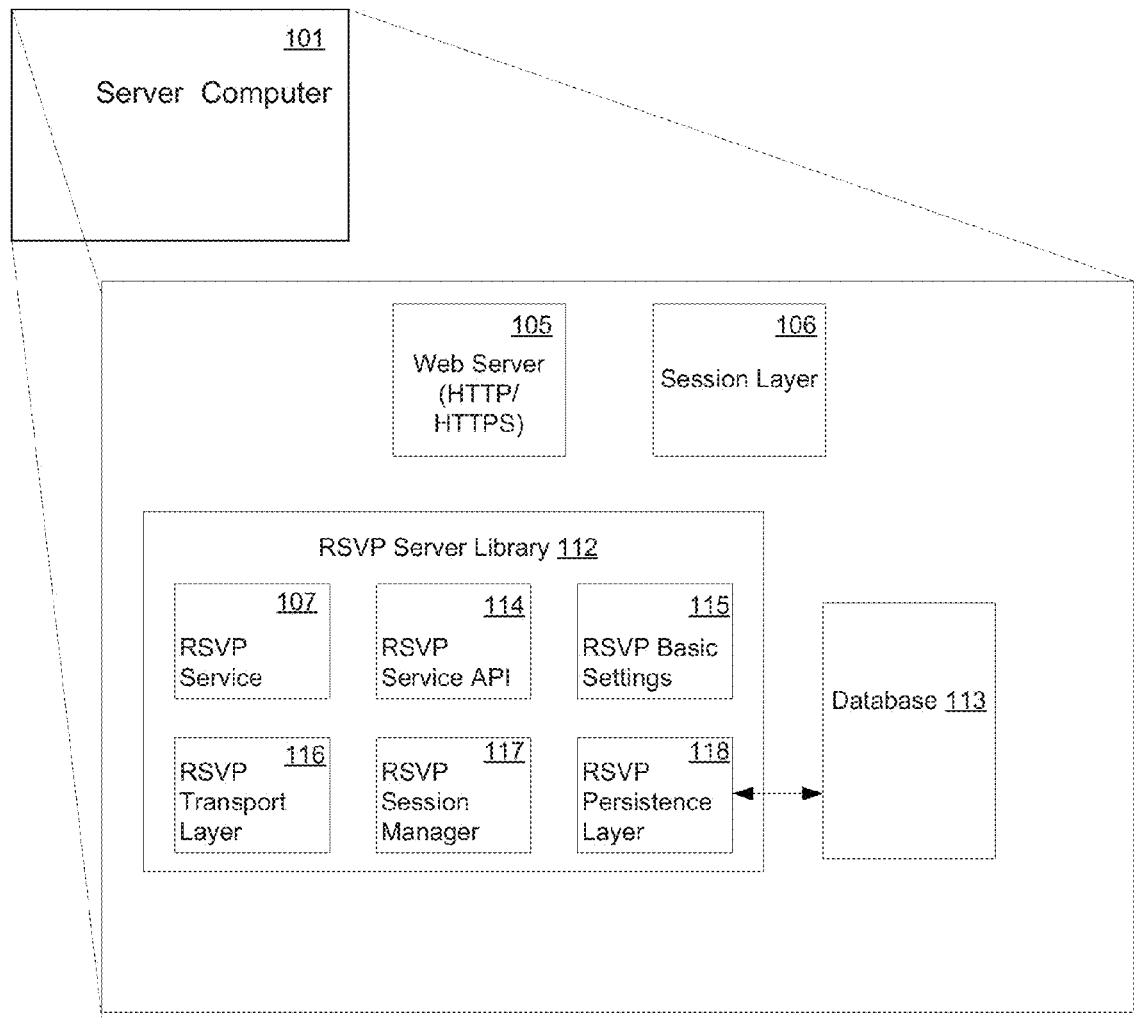
FIG. 2c illustrates a configuration of server computer 101 of FIG. 1, according to an embodiment of the present invention.

FIG. 2c illustrates a configuration of server computer 101 of FIG. 1, according to an embodiment of the present invention. Server computer 101 is in communication with the serial display enabled applications 208 included on various user devices, as described with reference to FIGS. 1, 2a, and 2c above. Server computer 101 includes a web server 105 for HTTP/HTTPS connection, and a session layer 106. Server computer 101 is configured by a portion of computer program product 211 to include RSVP server library 112. RSVP server library 112 includes RSVP service 107, RSVP service API 114, RSVP basic settings 115, RSVP transport layer 116, RSVP session manager 117 and RSVP persistence layer 118. RSVP persistence layer 118 interfaces with database 113 to update and retrieve tracked information.

Figure 2D:
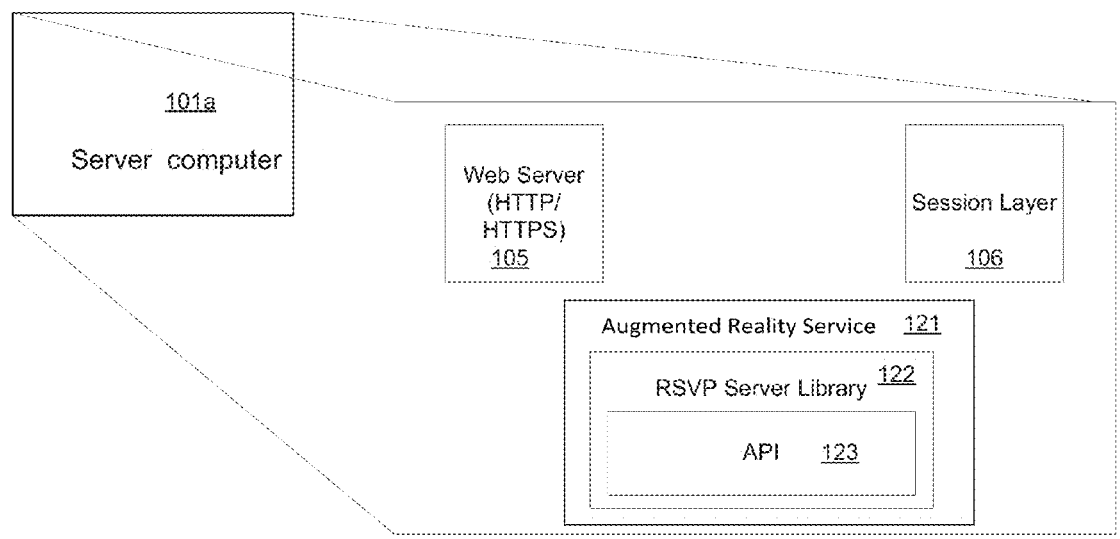
FIG. 2d shows additional server-side architecture for a server 101 of FIG. 1 configured to implement server-side components of an RVSP-enabled augmented reality (AR) service according to an embodiment of the present invention.

FIG. 2d shows additional server-side architecture for a server 101 of FIG. 1 configured to implement server-side components of an RVSP-enabled augmented reality (AR) service. Specifically, as shown, server 101 includes, in addition to web server 105 and session layer 106, and augmented reality service application 121. AR application 121 includes RSVP server library 122 and API 123. Those skilled in the art will appreciate that the arrangement shown in FIG. 2d could be adapted to provide server-side components of other RSVP applications such as, for example, a video content and/or search application, a photo application, a social networking application, a search engine, news service, a word processing application, a spreadsheet application, a photo application, a map application, a webpage editor, or various other types of applications that would benefit from RSVP capabilities. Moreover, in various embodiments, different divisions of tasks between server and user (client-side) devices can be implemented. In some embodiments, content is selected and formatted for RSVP presentation at the server and sent to the user device for RSVP display. In other embodiments, content is selected and formatted for RSVP display after it is received at the user device. Therefore, in some alternative embodiments, server-side RSVP software will not be separately necessary for particular applications.

Figure 3:
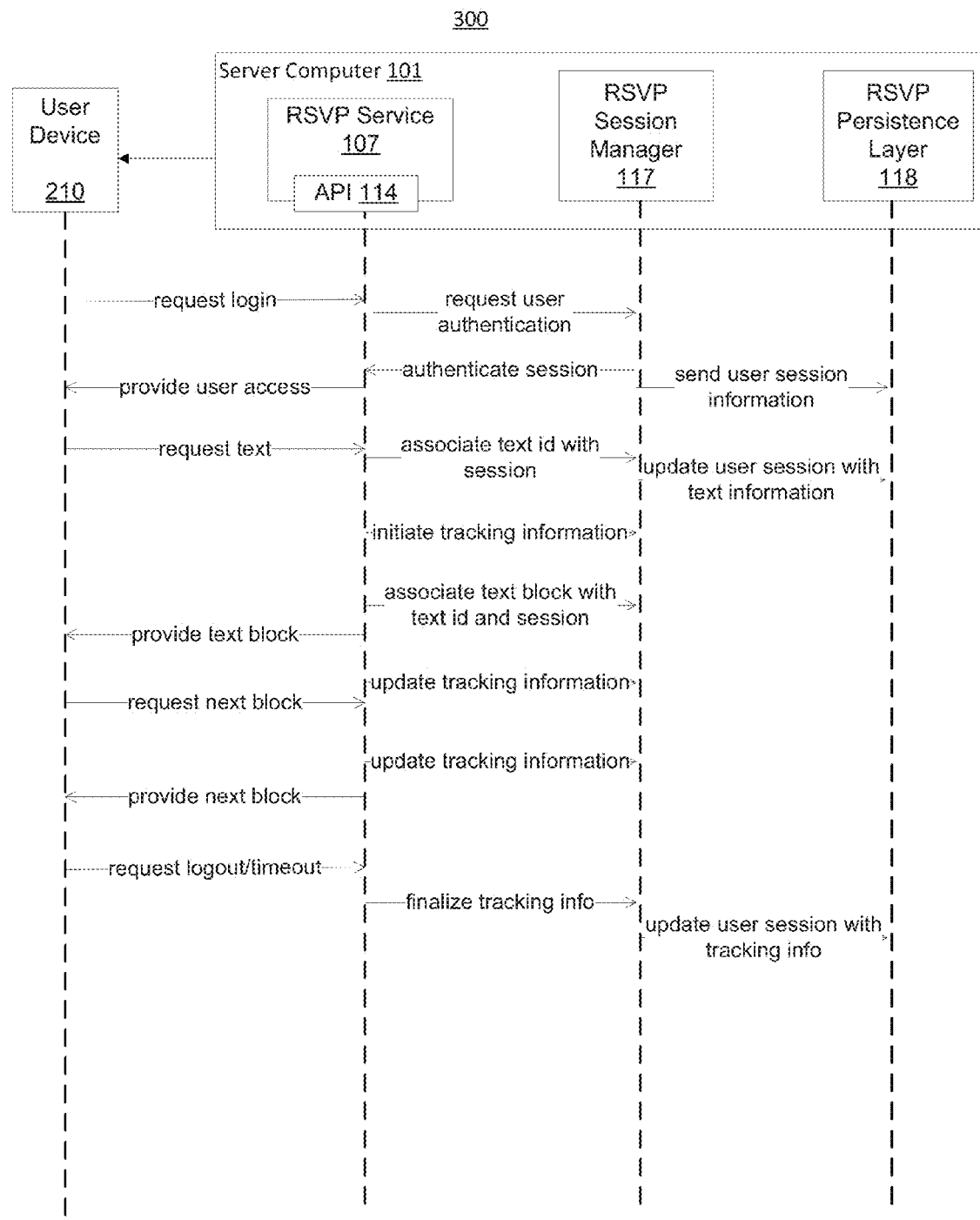
FIG. 3 is a process flow diagram illustrating a method for serially displaying and tracking content including textual content, according to an embodiment of the present invention.

FIG. 3 is a process flow diagram illustrating a method 300, for serially displaying and tracking content including textual content, according to an embodiment of the present invention. Each process flow in FIG. 3 includes the steps and the data necessary to carry out those steps. In FIG. 3, user device 210 communicates with server computer 101 requesting textual content and providing tracking information.

User device 210 sends a login request to server computer 101. The request is processed via RSVP API 114 by RSVP service 107. RSVP service 107 requests user authentication from the RSVP session manager 117 which responds by authenticating the session. The RSVP service 107 responds to user device 210 and provides user access. The RSVP session manager 117 sends user session information to RSVP persistence layer 118. Although FIG. 3 illustrates the use of a user login/authentication, embodiments of the present invention are not limited thereto. A user login may not be necessary, for example, when tracking unrestricted content. User activity may be tracked without login credentials, for example by using temporary session variables, or other user tracking techniques may also be utilized in various implementations of embodiments of the present invention.

User device 210 proceeds to request text from RSVP service 107. RSVP service 107 associates the Text ID with the user session and provides the information to RSVP session manager 117. The RSVP session manager 117 updates the user session with text information and provides the updated information to RSVP persistence layer 118. RSVP service 107 initializes tracking information and updates RSVP session manager 117. RSVP service 107 associates the text block with the Text ID and session and provides the information to RSVP session manager 117.

RSVP service 107 provides a text block to user device 210. The RSVP service 107 updates tracking information and provides the information to the RSVP session manager 117. For example, the text block information is used to update the tracking information.

After user device 210 finishes displaying the requested block, the device requests the next text block from the RSVP service 107. The RSVP service 107 updates tracking information and provides the information to the RSVP session manager 117. The RSVP service 107 provides the next text block to user device 210.

When the display and tracking is finished or timed out, user device 210 request logout/timeout from RSVP service 107. The RSVP service 107 updates and finalizes the tracking information and provides the information to the RSVP session manager 117. The RSVP session manager 117 updates user session with tracking information and provides the updated information to the RSVP persistence layer 118.

FIG. 4a is an illustrative homescreen 400 of a mobile communications device which has enabled display of textual information using RSVP in accordance with an exemplary embodiment. Homescreen 400 includes icons 402, 404, 406, 408, 410, 412, and 414 corresponding to various different applications. Homescreen 400 also includes status area 415 which may show notification events or indicators such as battery, signal strength, etc. FIG. 4b is an illustrative homescreen 400 which displays RSVP notification markers/icons 416, 418 and 420. RSVP notification markers/icons 416, 418 and 420 indicate presence of RSVP content, i.e., content that is configured to be displayed using RSVP. As shown, notification markers/icons 416, 418 and 420 are overlaid on top of icons 404, 402 and 408, respectively. In some embodiments, RSVP notification markers/icons may include a numerical indicator as shown in RSVP notification markers/icons 416 and 418. The numerical indicators may indicate the quantity of notifications associated with that application. For example, RSVP notification marker/icon 416 indicates that there are two new email messages. As will be apparent to one of skill in the art, the numerical indicators may be incremented as additional notification events are received and decremented as notification events are viewed. In some embodiments, notification markers/icons may also be color coded. For example, a notification marker/icon may be a certain color when new notification events are present, and a different color when all notification events have been viewed. Alternatively, notification markers/icons may be removed once notification events have been viewed. Although notification markers/icons 416, 418 and 420 are shown overlaid on top of icons 404, 402 and 408, in some embodiments, notification markers/icons may be displayed adjacent to, above, or below icons 404, 402 and 408. In other embodiments, notification markers/icons 416, 418 and 420 may be displayed in other areas of homescreen 400. For example, notification markers/icons may be displayed in status area 415. In other implementations, such as on desktop or laptop PCs, notification markers/icons may be displayed in the taskbar area typically located in the bottom right corner. In some embodiments, application specific notification markers/icons, DRDA, etc. may be implemented. For example, a social networking application may employ customized RSVP notification markers/icons and/or DRDA such that the RSVP notification markers/icons and/or DRDA are consistent with the application UI.

In yet another embodiment, for certain applications, notification markers/icons may not be displayed. For example, for SMS and/or email applications, where notification events typically include textual content, RSVP display may be enabled by default such that content associated with all notification events for these applications may be displayed using RSVP upon user selection of a notification event or upon user interaction with a selectable item (e.g., an email or a text message). As another example, even when an underlying application's content is non-textual, the content items may be known to be associated with textual descriptions. For example, a video application icon on a homescreen may be enabled to display textual descriptions, using RSVP, of new or featured video items by default from a home screen such that the video application's icon is selectable for RSVP display of such descriptions by default without the need for a separate RSVP-specific notification marker.

FIGS. 5a-5d illustrate screenshot diagrams of an exemplary homescreen including a designated RSVP display area, which displays textual content associated with a notification event using RSVP in accordance with one embodiment of the present invention. As shown in FIGS. 5a-5d, upon user selection of a notification marker/icon, textual content associated with the corresponding notification event is displayed using RSVP in DRDA 502. The user may select a notification marker/icon a number of different ways. For example, in a smartphone with a touch enabled display implementation, the user may touch and hold the notification marker/icon. Alternatively, the user may tap the notification marker/icon, swipe across the notification marker/icon, etc. In one embodiment, user selection of notification markers/icons may be determined by eye-tracking, gesture detection, or other natural interface input detection. As will be apparent to one of ordinary skill in the art, various different user input methods may be used to select the notification marker/icon. In other implementations, such as on a desktop or laptop PC, smart television, or on devices without a touch enabled display, user selection of notification markers/icons may be provided using, for example a keyboard, mouse, trackball, eye-tracking, smart television remote controller, etc. It should be noted that user selection of notification markers/icons does not necessarily require clicking or tapping a particular notification marker/icons. User selection may be made simply by "rolling" or "hovering" over a notification marker/icon. In one embodiment, the desired method may be selected in RSVP settings 308 (see FIG. 3).

In the example illustrated in FIGS. 5a-5d, if the user selects notification marker/icon 418, DRDA 502 may be displayed on homescreen 400, and DRDA 502 may display, using RSVP, the first of two SMS messages, which reads "Martina: please call me." It should be noted that FIGS. 5a-5d illustrate time sequence snapshots of the content displayed in DRDA 502. For example, FIG. 5a shows that DRDA 502 displays "Martina:" at time 1, FIG. 5b shows that DRDA 502 displays "please" at second time, FIG. 5c shows that DRDA 502 displays "call" at third time, and FIG. 5d shows that DRDA 502 displays "me" at fourth time. DRDA 502 may display an ORP of each word at a fixed display location between hash marks 504. As previously discussed, an empirically determined ORP of each display element may be presented at a fixed location of DRDA 502, the fixed display location being between hash marks 504. It should be noted that hash marks 504 are shown in some but not all subsequent figures to avoid overcomplicating the figures, and particular embodiments of the invention may be implemented using either ORP-RSVP or conventional RSVP. In addition, although DRDA 502 is shown displayed on top of the display, DRDA 502 may be positioned in any portion of the display. Although the embodiment illustrated in FIGS. 5a-5d shows display of textual content associated with a notification event using RSVP on a homescreen, in some embodiments, content may be displayed using RSVP on a screen other than the homescreen, such as, for example, a "lock screen." As will be apparent to one of skill in the art, notification events are often displayed on a "lock screen." In such an instance, selecting the notification(s) on the lock screen may result in content associated with the notification event being displayed in a DRDA using RSVP on the "lock screen."

FIGS. 6a and 6b illustrate screenshot diagrams of an exemplary homescreen including a designated RSVP display area, along with a notification indicating the presence of an attachment or URL in accordance with one embodiment of the present invention. As shown, the RSVP content may include one or more file attachments and/or URLs. If there is an attachment and/or URL included in the RSVP content, a notification indicating the presence of an attachment and/or URL may be displayed with the DRDA. In one embodiment, a thumbnail image corresponding to the attachment or URL may be displayed in addition to, or instead of, the notification. FIG. 6a illustrates DRDA 602 with a notification 604 indicating the presence of a map attachment. Also shown is thumbnail 603, which corresponds to the map attachment. Although thumbnail 603 is shown displayed adjacent to DRDA 602, thumbnail 603 may be displayed anywhere on the display. Various types of attachments may be included with RSVP content. For example, in addition to maps, photos, documents (e.g., PDFs), etc. may also be attached to RSVP content. FIG. 6b illustrates an example with a notification 606 indicating that a URL is included with the RSVP content. As discussed above in the example of a map attachment, a thumbnail image (not shown in FIG. 6b) corresponding to the URL may be displayed in addition to, or instead of, notification 606. It should be noted that although notifications 604 and 606 are displayed underneath DRDA 602, notifications 604 and 606 may be displayed adjacent to, above, or below DRDA 602. Alternatively, the notifications may be displayed in any other location on the display. In some embodiments, the content of a webpage corresponding to the URL may be displayed using RSVP in DRDA 602. In other embodiments, an application corresponding to the attachment may be launched to open the attachment and/or URL. For example, a photo application may be launched to open a photo, or a web browser may be launched to open a URL included with RSVP content. The process of displaying content included in an attachment and/or content of a webpage corresponding to a URL included with RSVP content is described in more detail in the description of FIG. 12.

Figure 7H:
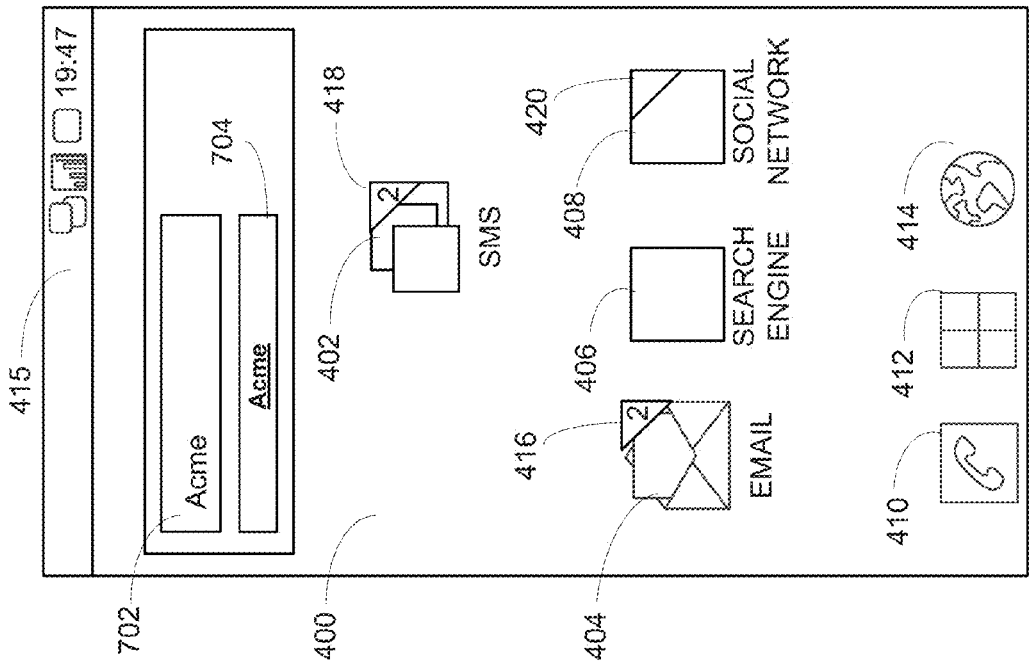
Figure 7G:
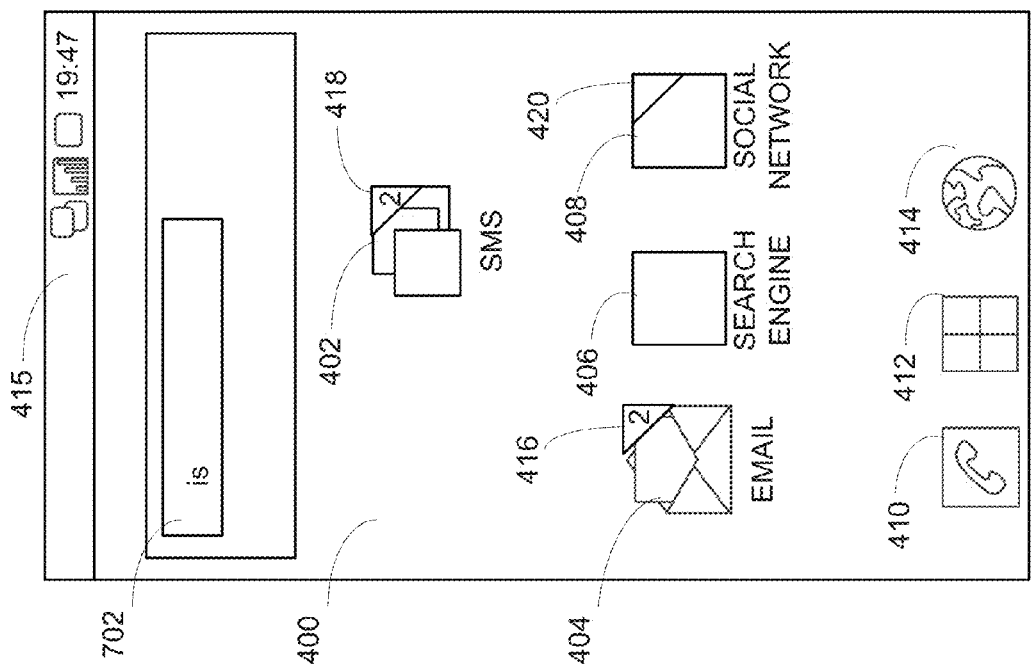

FIGS. 7a-7c illustrate screenshot diagrams of an exemplary homescreen including a designated RSVP display area, and FIG. 7d illustrates a screenshot diagram of an exemplary homescreen including a designated RSVP display area, along with a notification indicating the presence of multiple levels of RSVP content in accordance with one embodiment of the present invention. It should be noted that FIGS. 7a-7d illustrate time sequence snapshots of the content displayed in DRDA 702. For example, FIG. 7a shows that DRDA 702 displays "Meet" at time 1, FIG. 7b shows that DRDA 702 displays "John" at second time, FIG. 7c shows that DRDA 702 displays "and" at third time, and FIG. 7d shows that DRDA 702 displays "Kevin" at fourth time. In one embodiment, RSVP content may include multiple or "cascading" levels of RSVP content. For example, RSVP content may itself include further RSVP content. The presence of additional levels of RSVP content (sometimes referenced herein as "sub-content") may be indicated by, for example displaying a notification similar to the notifications used to indicate the presence of an attachment and/or URL (see FIGS. 6a and 6b). FIGS. 7a-7d illustrate DRDA 702 which displays the message "Meet John and Kevin." However, this message includes additional RSVP content as indicated by notification 704 in FIG. 7d, which displays "John" and "Kevin." "John" and "Kevin" are selectable items within notification 704 which represent further embedded RSVP content. For example, if the user selects "John", the RSVP content associated with "John" may be displayed.

FIGS. 7e-7h illustrate screenshot diagrams of an exemplary homescreen including a designated RSVP display area displaying the additional level of RSVP content associated with "John" in accordance with one embodiment of the present invention. DRDA 702 displays "John's business is Acme." As discussed above, FIGS. 7e-7h illustrate time sequence snapshots of the content displayed in DRDA 702. The message "John's business is Acme" may further include embedded RSVP content, as indicated by "Acme" in notification 704. If the user selects "Acme," the RSVP content associated with "Acme" may be displayed (not separately shown). Similarly, if the user selects "Kevin," RSVP content associated with "Kevin" may be displayed in DRDA 702 (not separately shown). It should be noted that although additional RSVP content was embedded in "John" and "Kevin," RSVP content may also be embedded in phrases, sentences, paragraphs, etc. For example, "John's business is Acme" may have been embedded in "Meet John" instead of just "John."

Figure 8A:
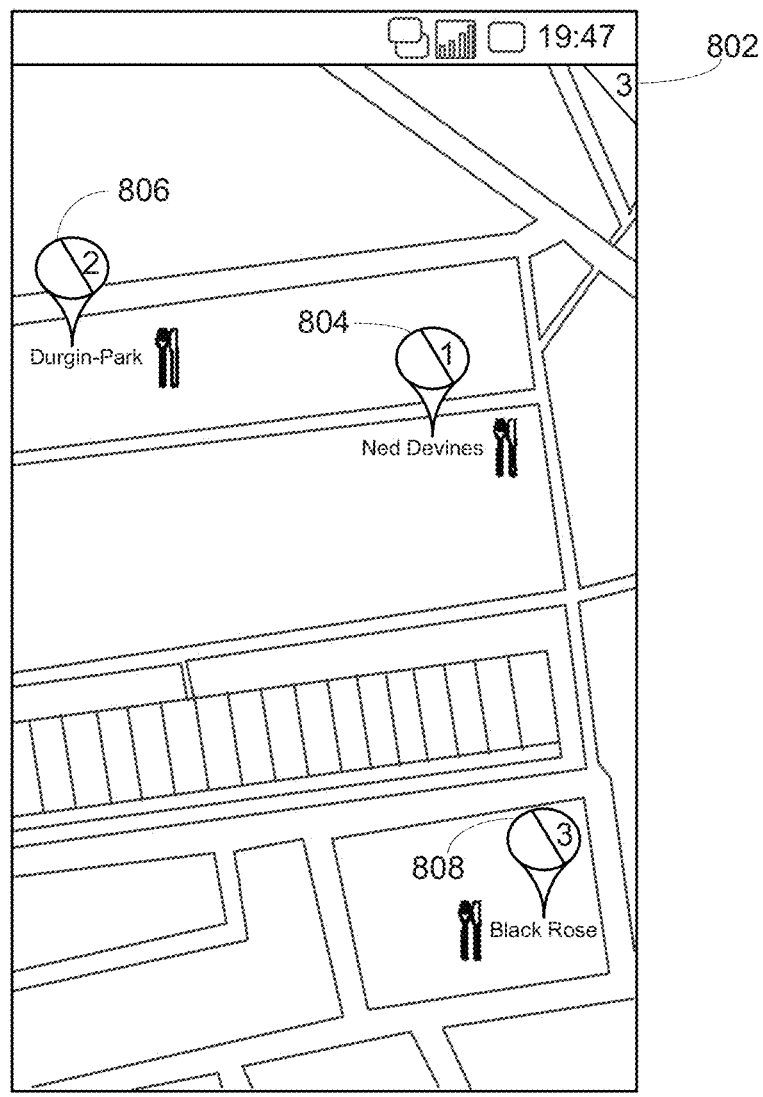
FIGS. 8a-8c illustrate screenshot diagrams of an exemplary maps application in accordance with one embodiment of the present invention.
Figure 8C:
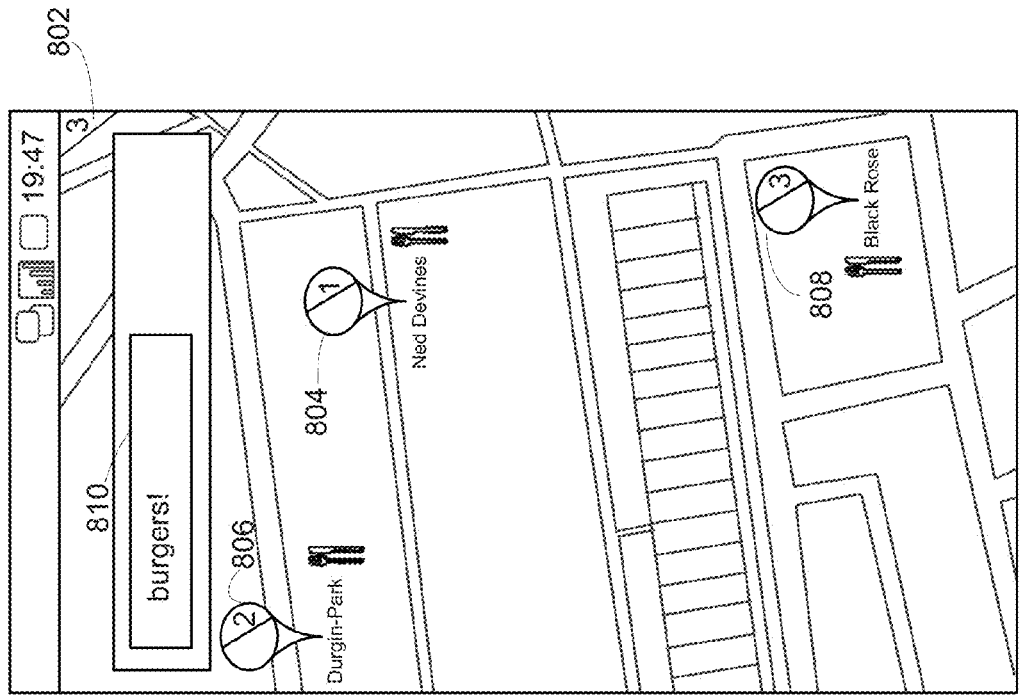
Figure 8B:
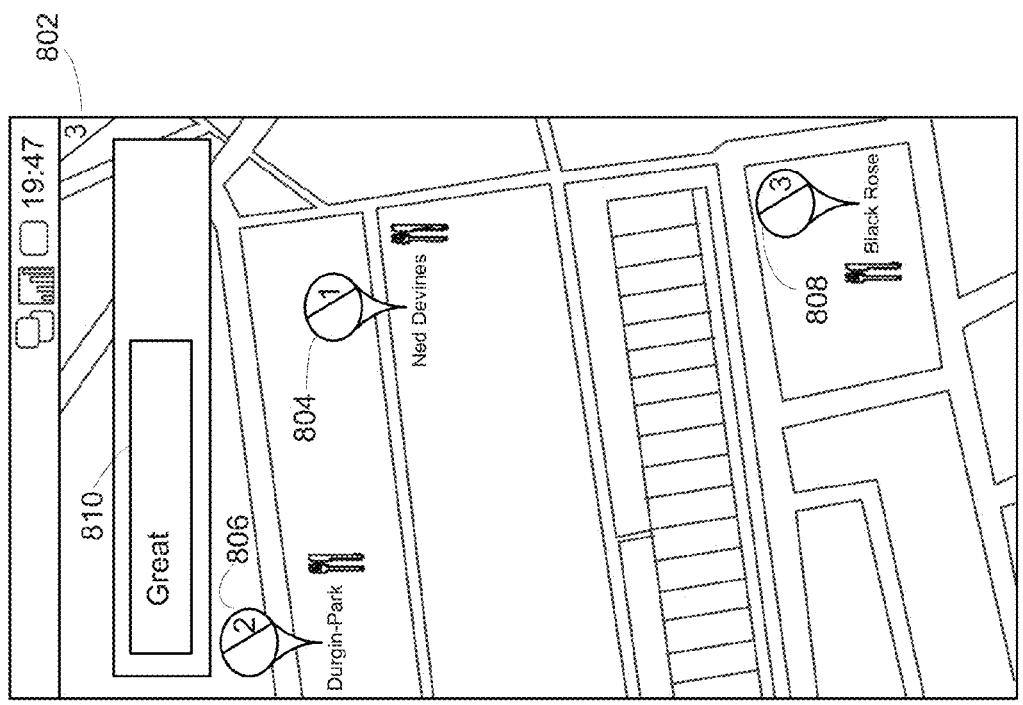

FIGS. 8a-8c illustrate a screenshot diagram of an exemplary maps application in accordance with one embodiment of the present invention. RSVP content may be implemented in virtually any application. For example, FIG. 8a shows a maps application in which the presence of RSVP content is indicated by notification markers/icons 804, 806 and 808. Notification 802 may be included to indicate the quantity of notification markers/icons displayed on the map, and to notify the user of "global" RSVP content corresponding to the whole map (as opposed to RSVP content corresponding to specific locations on the map, which are specified by markers/icons 804, 806 and 808). For example, notification 802 may have associated with it RSVP content such as "Check out these three restaurants." Thus, if notification 802 is selected by the user, DRDA 810 may display "Check out these three restaurants" (this message is not separately shown in the figures and DRDA 810 is not separately shown in FIG. 8a). It should be noted that although notification 802 is shown in the top-right corner, notification 802 may be displayed anywhere on the display. As shown, notification markers/icons 804, 806 and 808 include numerical indicators. In one embodiment, the numerical indicators may be used to denote quantity. In other embodiments, the numerical (or, alternatively, alphabetical) indicators may be used to indicate a preferred viewing order. For example, notification markers/icons 804, 806 and 808 may be used to indicate presence of RSVP content related to restaurants at specified locations on the map, and the numerical indicators alert the user to view the notifications in the specified order. If the user selects notification marker/icon 804, DRDA 810 may be displayed as shown in FIG. 8b. As shown in FIGS. 8b and 8c, DRDA 810 may display "Great burgers!," which is associated with notification marker/icon 804, using RSVP. It should be noted that FIGS. 8b-8c illustrate time sequence snapshots of the content displayed in DRDA 810. For example, FIG. 8b shows that DRDA 810 displays "Great" at time 1, and FIG. 8c shows that DRDA 810 displays "burgers" at second time. In one embodiment, DRDA 810 may automatically display RSVP content associated with markers 804, 806 and 808 in sequential order after user selection of notification 802. For example, if the user selects notification 802, DRDA 810 may display "Check out these three restaurants" and then automatically display "Great burgers!", (associated with marker 804) and then automatically display RSVP content associated with markers 806 and 808. In one alternative, the map is automatically moved to center the marker for which text is currently being displayed by RSVP.

Figure 9B:
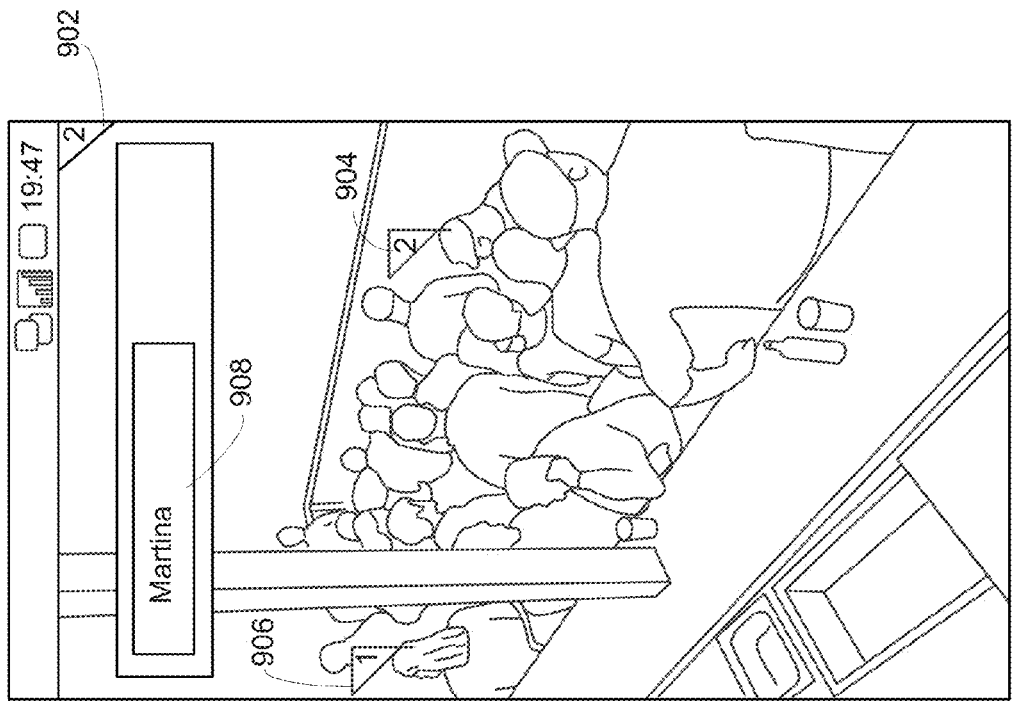
FIGS. 9a-9d illustrate screenshot diagrams of an exemplary photo application in accordance with one embodiment of the present invention.
Figure 9A:
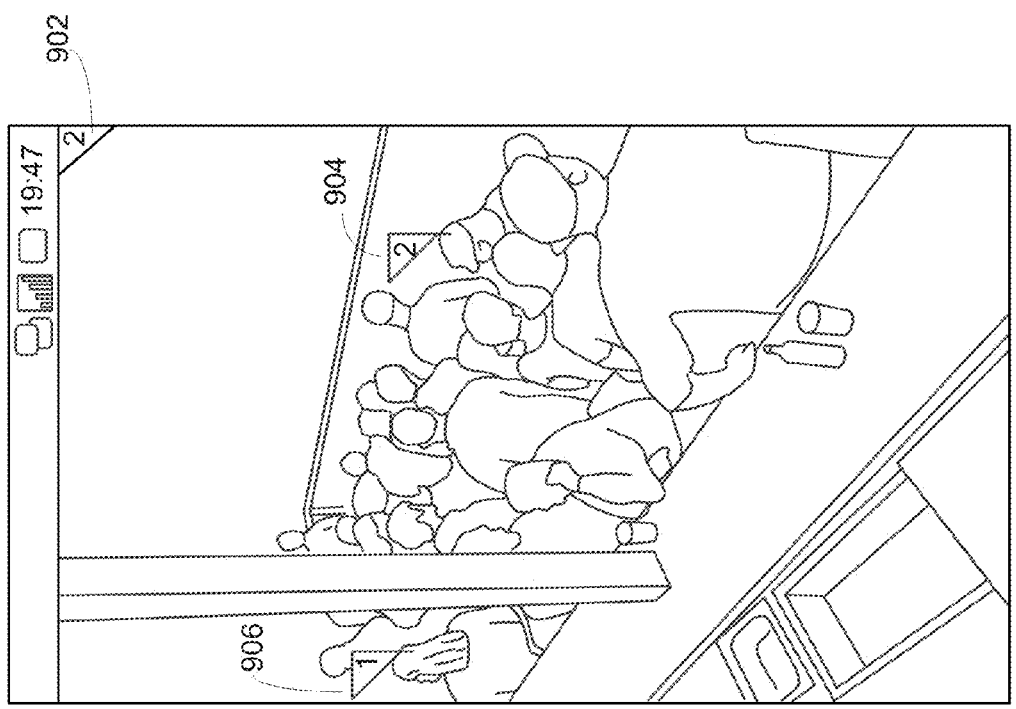
Figure 9C:
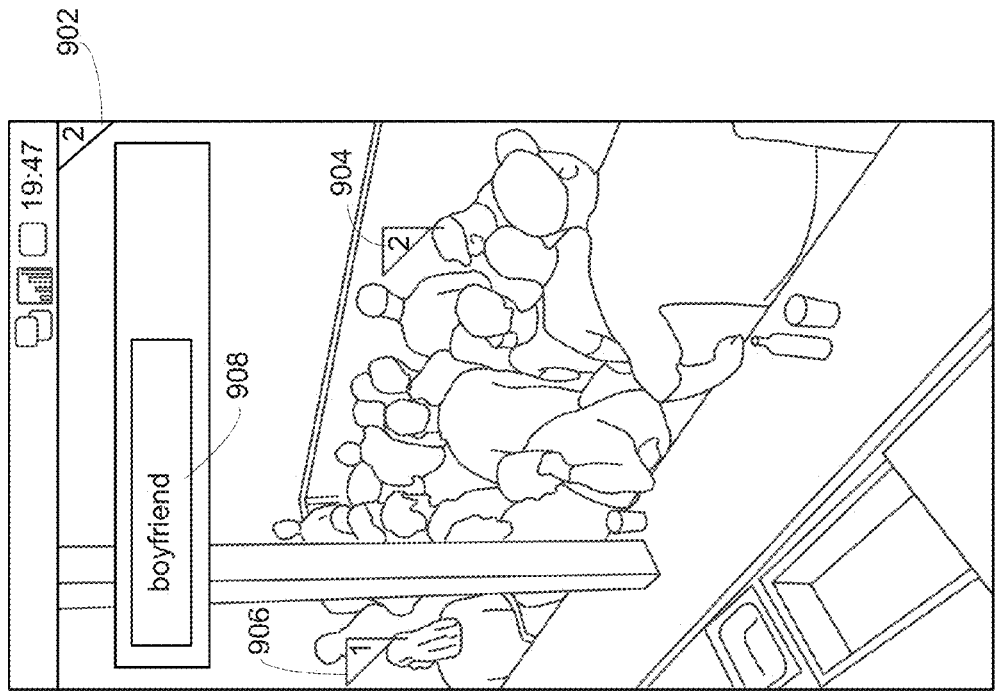
Figure 9D:
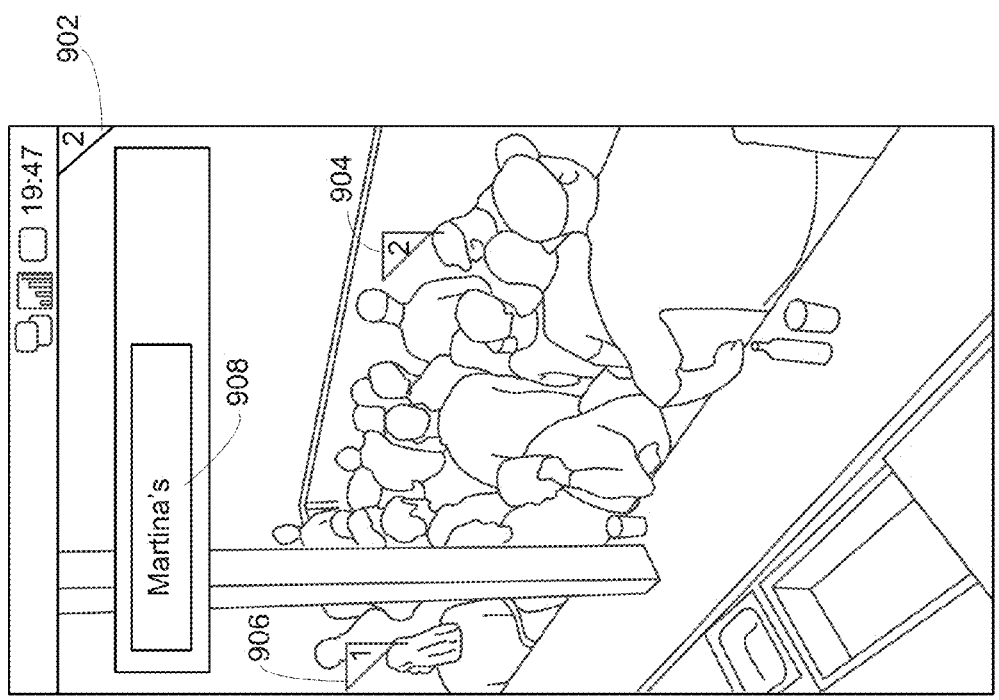

FIGS. 9a-9d illustrate screenshot diagrams of an exemplary photo application in accordance with one embodiment of the present invention. As shown in the example of FIGS. 9a-9d, RSVP content may be embedded in a photo. As shown in FIG. 9a, notification 902 may be displayed to indicate the quantity of notification markers/icons, and to notify the user of "global" RSVP content associated with the whole photo (as opposed to RSVP content associated with specific locations on the photo, which are specified by markers/icons 904, and 906). For example, notification 902 may have associated with it RSVP content such as "These are my friends." Thus, if notification 902 is selected by the user, DRDA 908 may display "These are my friends" using RSVP (this message is not separately shown in the figures and DRDA 908 is not separately shown in FIG. 9a). It should be noted that although notification 902 is shown in the top-right corner, notification 902 may be displayed anywhere on the display. Notification markers/icons 904 and 906 may be displayed to indicate presence of "local" RSVP content associated with the location on the photo specified by the notification marker/icon. For example, as shown in FIG. 9b, upon user selection of notification marker/icon 906, DRDA 908 may be displayed, and "Martina," which is associated with the location on the photo specified by notification marker/icon 906 may be displayed in DRDA 908. Similarly, as shown in FIGS. 9c and 9d, upon user selection of notification marker/icon 904, DRDA 908 may be displayed, and "Martina's boyfriend," which is associated with the location on the photo specified by notification marker/icon 904 may be displayed using RSVP in DRDA 908. It should be noted that FIGS. 9c-9d illustrate time sequence snapshots of the content displayed in DRDA 908. For example, FIG. 9c shows that DRDA 908 displays "Martina's" at time 1, and FIG. 9d shows that DRDA 908 displays "boyfriend" at second time. The process of embedding RSVP content in photos is described in more detail in the description of FIG. 17. In one embodiment, DRDA 908 may automatically display RSVP content associated with markers 904, and 906 in sequential order after user selection of notification 902. For example, if the user selects notification 902, DRDA 908 may display "These are my friends" and then automatically display "Martina" (associated with marker 906), and then automatically display "Martina's boyfriend" (associated with marker 904). In a particular embodiment, when RSVP content is played automatically for multiple markers, each marker is visually highlighted (e.g., bolded) while the RSVP content associated with that marker is being displayed.

Figure 10A:
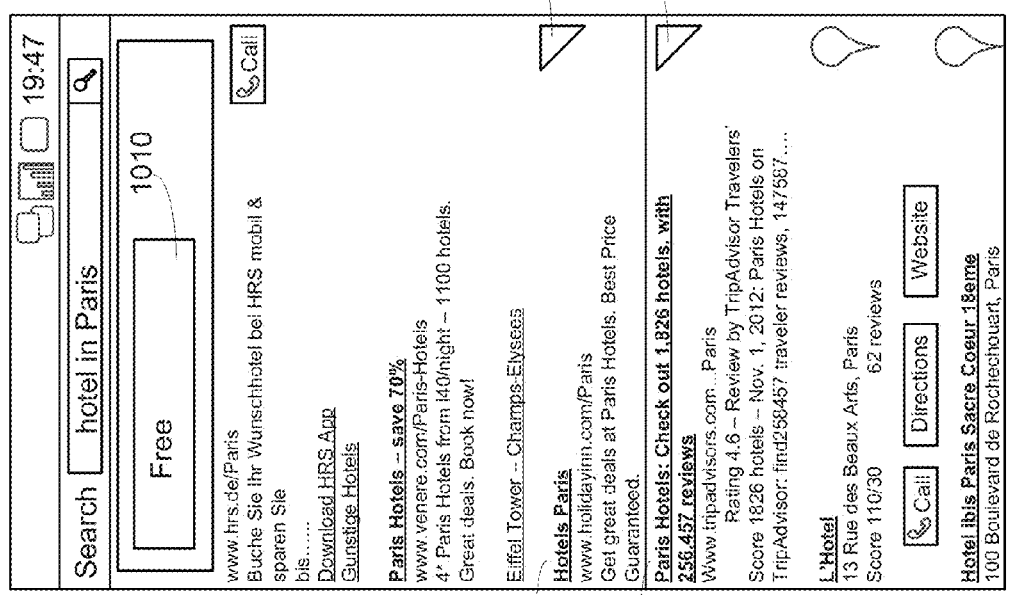
FIGS. 10a-10c illustrate screenshot diagrams of an exemplary search results page in accordance with one embodiment of the present invention.
Figure 10B:
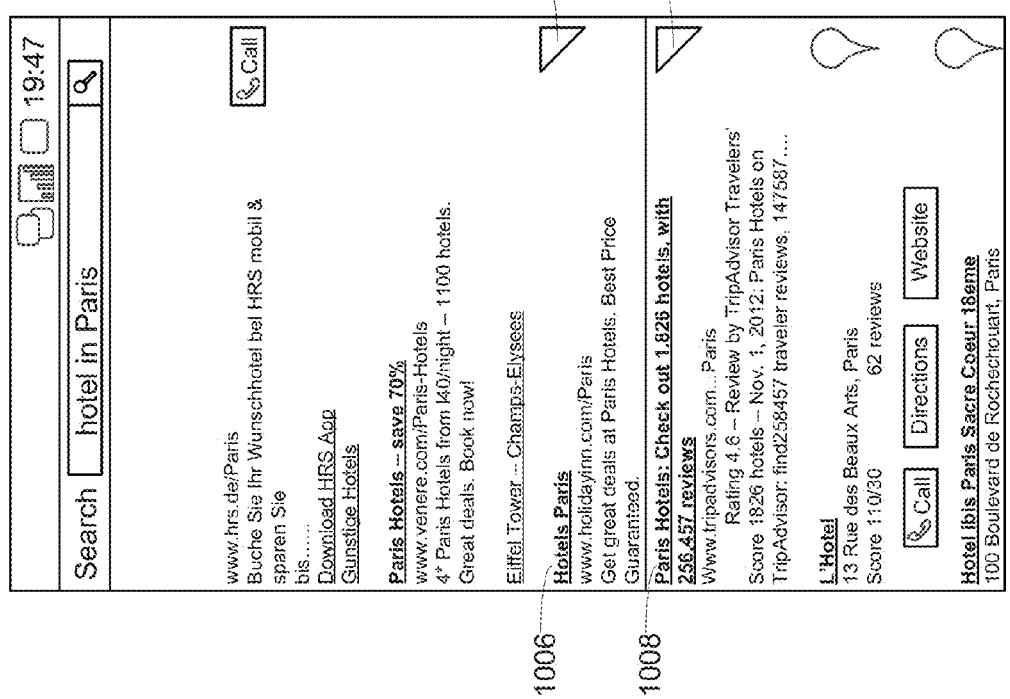
Figure 10C:
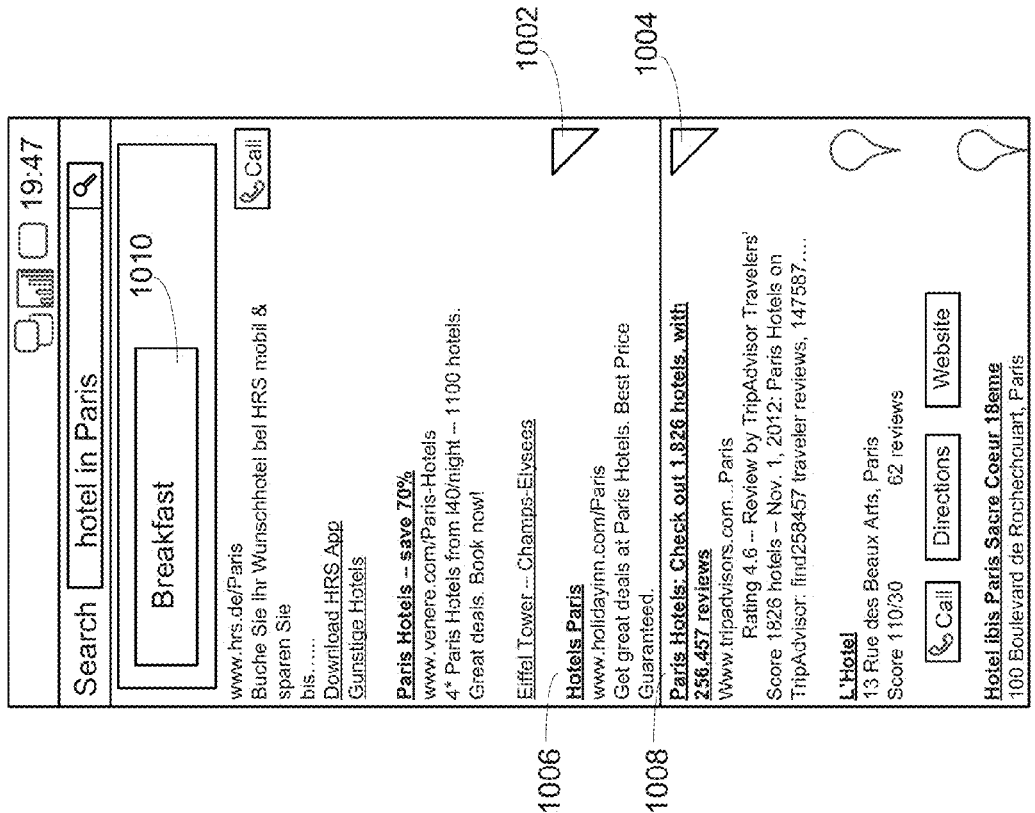

FIGS. 10*a*-10*c* illustrate screenshot diagrams of an exemplary search results page in accordance with one embodiment of the present invention. Another example in which RSVP content may be employed is in the display of search results, including sponsored search results, display advertisements, etc. FIG. 10*a* shows a screenshot of a search results page for a search query "hotel in paris." As shown, one or more search results corresponding to the search query may be displayed. One or more of the search results (or sponsored search results, display advertisements, etc.) may be displayed with a notification marker/icon indicating the presence of RSVP content associated with that search result (or sponsored search results, display advertisements, etc.). For example, notification markers/icons 1002 and 1004 may be displayed adjacent to search results 1006 and 1008, respectively, to indicate presence of RSVP content associated with those search results. Search result 1006 may be a sponsored search result. In some embodiments, notification markers/icons 1002 and 1004 may be displayed above, below, or in any other location on the display. In one embodiment, advertisers and/or search engine providers may choose to embed specifically chosen content as RSVP content in the search results in order to include more information than what is displayable in the provided space. In another embodiment, content from a webpage may be embedded as RSVP content. For example, in the case of sponsored search result 1006, the advertiser may provide content which the advertiser wishes to be embedded as RSVP content (e.g., "Free Breakfast" as shown in FIGS. 10*b* and 10*c*). However, in some embodiments, like in the case of search result 1008, content from the corresponding webpage (e.g., HTML text) may be embedded as RSVP content. The process of embedding RSVP content in search results (or sponsored search results, display advertisements, etc.) is described in more detail in the description of FIG. 16.

Upon user selection of notification marker/icon 1002, DRDA 1010 may be displayed as shown in FIGS. 10*b* and 10*c*, and "Free breakfast" may be displayed using RSVP in DRDA 1010. It should be noted that FIGS. 10*b*-10*c* illustrate time sequence snapshots of the content displayed in DRDA 1010. For example, FIG. 10*b* shows that DRDA 1010 displays "Free" at time 1, and FIG. 10*c* shows that DRDA 1010 displays "breakfast" at second time.

Figure 11B:
FIGS. 11a-11b illustrate screenshot diagrams of an exemplary news website homepage enabled for dense content in accordance with one embodiment of the present invention.
Figure 11A:

FIGS. 11*a*-11*b* illustrate screenshot diagrams of an exemplary news website homepage configured with RSVP content in accordance with one embodiment of the present invention. In one embodiment, RSVP content may be employed on websites to advantageously increase content density. This allows websites that provide large quantities of content such as, for example, news portals and ecommerce sites, to benefit from faster selection and reading of content by the visitor, especially on communication devices which have small displays. For instance, in the example of a news website, news headlines 1102, 1104, 1106, 1108, 1110, 1112, and 1114 may be presented as shown in FIG. 11*a*. As shown in FIG. 11*b*, upon user selection of one of headlines 1102, 1104, 1106, 1108, 1110, 1112, and 1114, DRDA 1116 may be displayed, and the contents of the corresponding story may be displayed using RSVP in DRDA 1116. In one embodiment, the content of the news story may be configured using a <meta> HTML tag. For example, the story may be configured using <meta name="RSVP" content="RSVP content goes here">. Thus, when the browser application opens the page, it may search for the <meta name="RSVP"> tag, and display the text included in the content parameter using RSVP.

Figure 12:
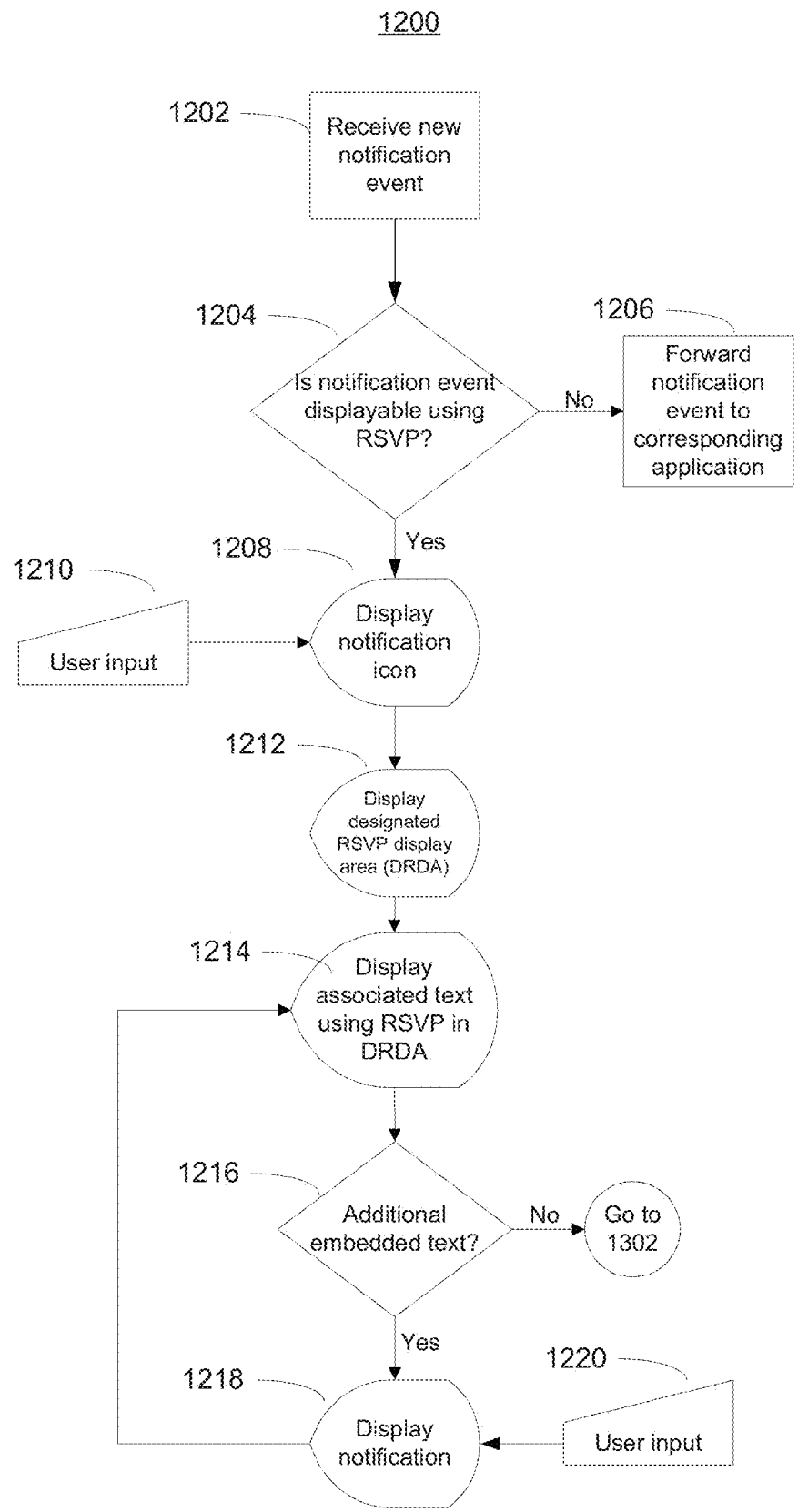
FIG. 12 is a flow chart diagram of a process of displaying RSVP content on a homescreen or desktop in accordance with one embodiment of the present invention.

FIG. 12 is a flowchart diagram of process 1200 for displaying RSVP content on a homescreen in accordance with one embodiment of the invention. A new notification event is received at step 1202. As previously described, a new notification event may include receipt of a new email message, SMS message, file transfer, etc. In one embodiment, the notification event may have been received as a result of a "push" notification. Alternatively, the notification event may have been received in response to a request from user device 210. It may be determined in step 1204 if the notification event is displayable using RSVP. In one embodiment, this determination includes determining if the corresponding application allows display of content using RSVP. For instance, as a result of user settings, certain applications may have disabled or may not allow displaying content using RSVP. If it is determined that the notification event is not displayable using RSVP, the notification event is forwarded to the corresponding application in step 1206, which may handle the notification event in the conventional manner. For example, if the notification is for a SMS message, the notification is forwarded to the SMS application, if it for an email message, it is forwarded to the email application, etc.

However, if the notification event is determined to be displayable using RSVP, a notification marker/icon may be displayed in step 1208. In one embodiment, the notification marker/icon may be overlaid on top of the icon representing the corresponding application (see, FIG. 4*b*). In other embodiments the notification marker/icon may be displayed adjacent to, above or below the icon representing the corresponding application. As previously described, the notification marker/icon may also include a numerical indicator, which may correspond to the number of notification events for the corresponding application. The notification marker/icon may be selected in response to user input received at step 1210. The user input may include, for example a touch and hold of the notification marker/icon, a tap of the notification marker/icon, a selection of the notification marker/icon using a mouse or trackball, etc. As previously discussed, in some embodiments, a notification marker/icon may be selected by simply "hovering" over the notification marker/icon. In response to user selection of the notification marker/icon, the designated RSVP display area (DRDA) may be displayed in step 1212. Textual content associated with the notification event may be displayed using RSVP in the DRDA in step 1214. In one embodiment, the textual content associated with the notification event may be displayed in the DRDA as long as appropriate user input is present. For example, in the case where appropriate user input is a press and hold of the notification icon/marker, if the user releases the notification icon/marker, the DRDA stops displaying the RSVP content and is then hidden. In one embodiment, the amount and type of content that gets displayed in DRDA may be defined or selected in RSVP Settings 308 (FIG. 3). For example, in the case of an email, it may be selected that the sender name, subject of the email and the body of the email may be displayed using RSVP in DRDA. Alternatively, it may be selected that only the sender name and subject of the email be displayed using RSVP in DRDA. In some embodiments, RSVP content may contain additional embedded RSVP content as illustrated in, for example FIGS. 7a-7h. It may be determined in step 1216 if additional embedded text is present. If so, a notification (e.g., notification 704 in FIG. 7d) may be displayed in step 1218. In response to user input received at step 1220, the additional embedded text may be displayed in DRDA using RSVP. In some embodiments, steps 1218 and 1220 may be optional. In other words, all available RSVP content may be automatically displayed sequentially without awaiting user input.

Figure 13:
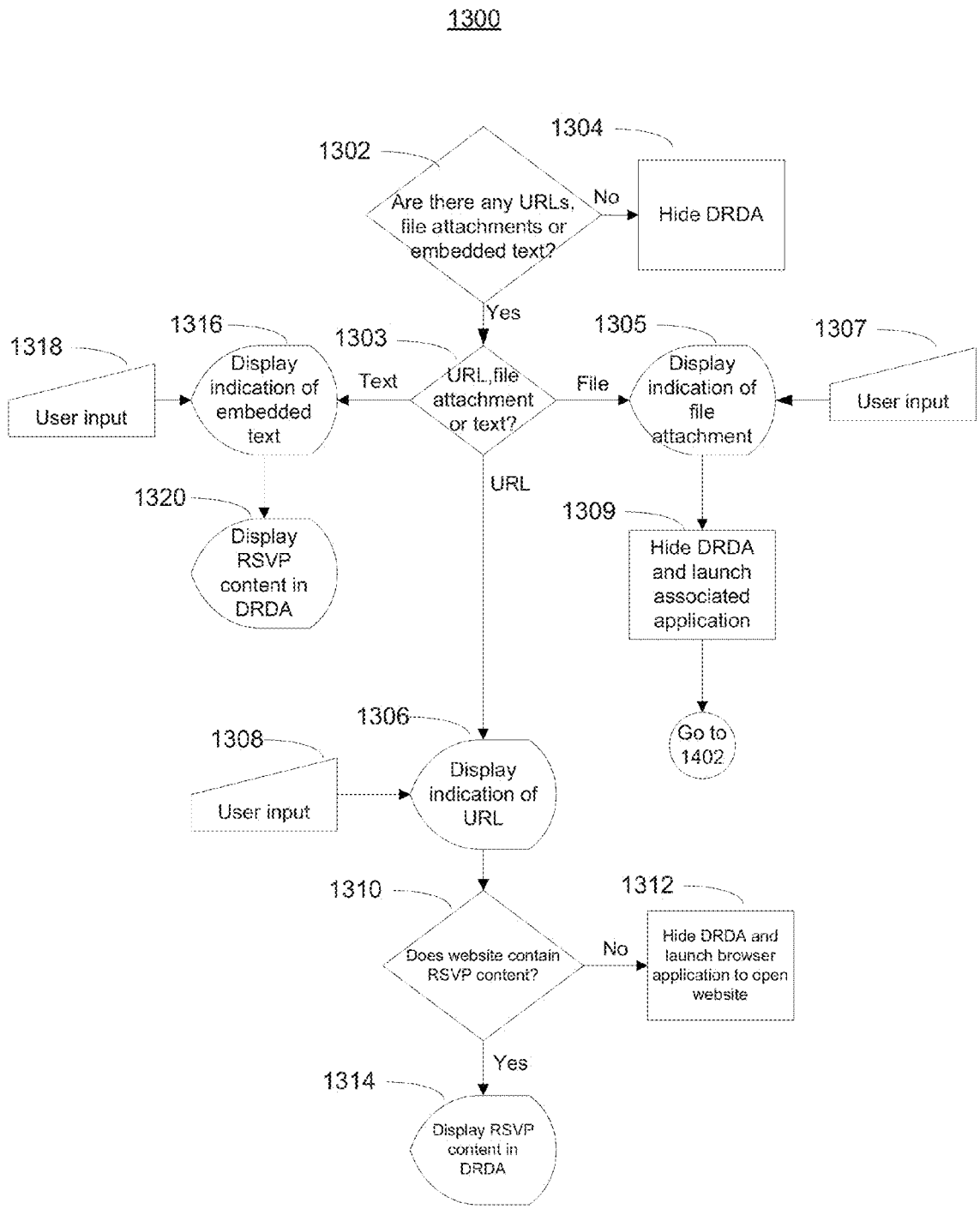
FIG. 13 is a flow chart diagram of a process of displaying RSVP content included in file attachments, embedded text, and URLs in accordance with one embodiment of the present invention.

FIG. 13 is a flowchart diagram of process 1300 for displaying embedded text (see e.g., FIG. 7d), an attachment and/or URL included with RSVP content in accordance with one embodiment of the invention. Upon completion of displaying RSVP content, which may or may not have been associated with a notification event, it is determined in step 1302 whether the RSVP content includes sub-content such as additional embedded text, an attachment and/or a URL. If the RSVP content is determined to not include embedded text, an attachment and/or a URL, the DRDA is hidden in step 1304. If the RSVP content is determined to include embedded text, an attachment and/or a URL, it is determined in step 1303 whether embedded text, a file attachment or a URL is included. If it is determined that a file attachment is included, an indication of the presence of an attachment is displayed in step 1305 (as shown in FIG. 6a). The file attachment may be, for example a photo, a map, a document, etc. User input indicating selection of the file attachment is received in step 1307. In step 1309, the DRDA is hidden and the application associated with the file attachment is launched to open the attachment. For example, if the file attachment is a photo, a photo viewer application may be launched to open the photo. In one embodiment, the file attachment itself may contain embedded RSVP content. The process of opening a file which may contain RSVP content and displaying the RSVP content within an application interface is described in more detail in the description of FIG. 14a.

If it is determined in step 1303 that a URL is included in the RSVP content, an indication of the presence of a URL is displayed in step 1306 (as shown in FIG. 6b). User input indicating selection of the URL is received in step 1308. In one embodiment, the webpage corresponding to the URL may contain RSVP content. As previously described, RSVP content may be embedded in a webpage using, for example a <meta> HTML tag. It is determined in step 1310 if the webpage corresponding to the URL contains RSVP content. If it is determined that the webpage does not contain RSVP content, the DRDA is hidden and a browser application is launched in step 1312 to display the webpage corresponding to the URL. If, however, the webpage is determined to contain RSVP content, the RSVP content is displayed in the DRDA using RSVP in step 1314.

If it is determined in step 1303 that embedded text is included in the RSVP content, an indication of the presence of embedded text is displayed in step 1316 (as shown in FIG. 7d). User input indicating selection of the embedded text is received in step 1318. In step 1320, the RSVP content is displayed in the DRDA using RSVP.

Figure 14A:
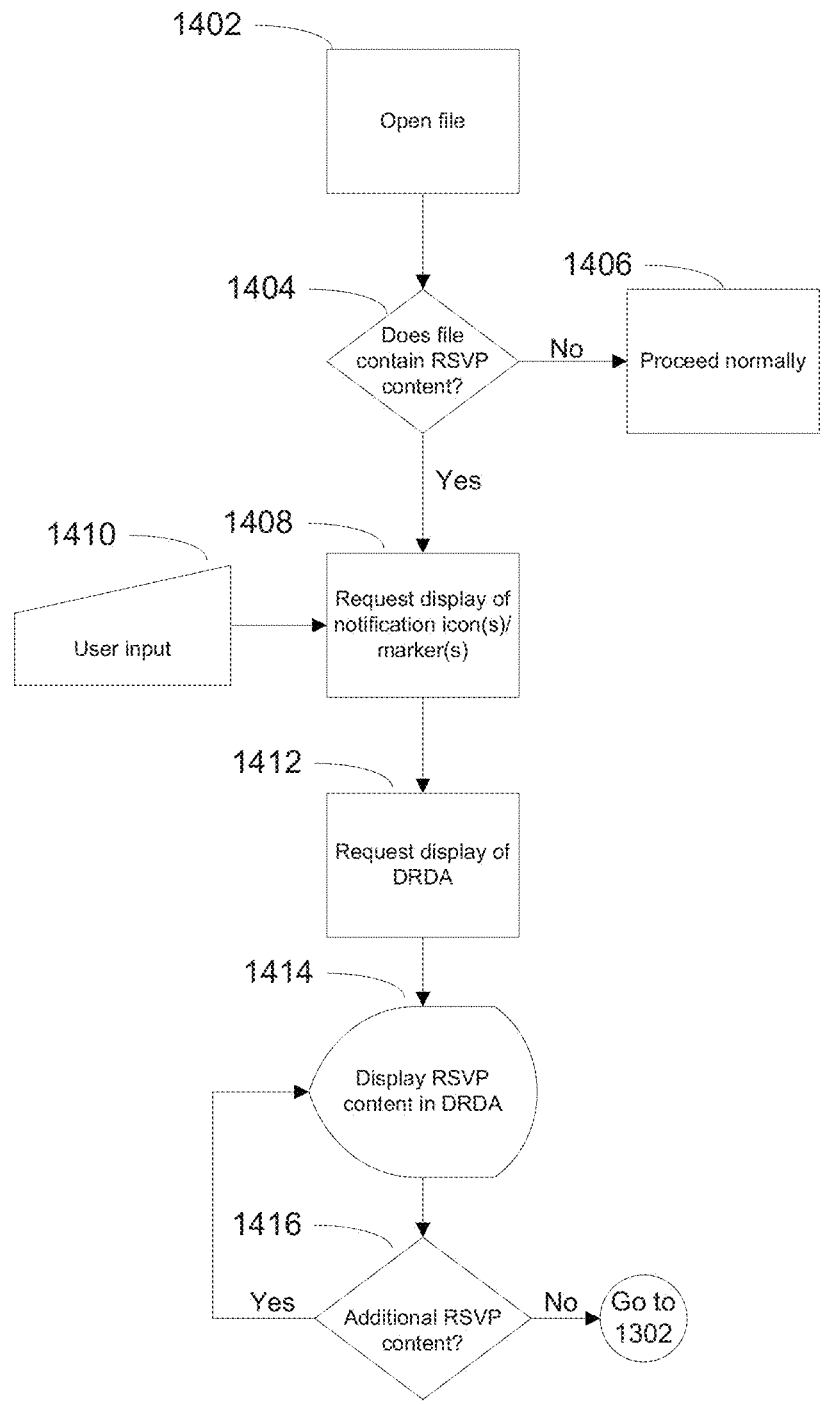
FIG. 14a is a flow chart diagram of a process of displaying RSVP content within an application in accordance with one embodiment of the present invention.

FIG. 14a is a flowchart diagram of process 1400 for displaying, within an application, RSVP content that is embedded in a file in accordance with one embodiment of the present invention. For example, process 1400 may be used by a photo application to display a photo which contains embedded RSVP content, or by a browser application to display an advertisement which contains embedded RSVP content, etc. In step 1402, the file may be opened by the application. In step 1404, it may be determined if the file contains RSVP content (e.g., content that is configured to be displayed using RSVP). In one embodiment, this determination may be made by RSVP library 204 (FIG. 2). The application may request RSVP library 204 to determine if the file includes RSVP content. In one embodiment, RSVP library 204 may detect the presence of RSVP content by searching the contents of the notification event for meta data, such as a <meta> tag in HTML pages, EXIF data in photos, etc. In another embodiment, the application may include application specific RSVP software (e.g., 209a-209c in FIG. 2), which may determine if the file contains RSVP content. Although FIG. 14a illustrates opening a file within an application interface, the same logic is applicable to initiating a stream of data within a browser or other application.

If it is determined that the file contains no RSVP content, the application may proceed as normal in step 1406. For example, if the file is a photo, and it does not contain RSVP content, the application may simply display the photo normally. If however, it is determined that the file contains RSVP content, the application requests display of notification markers/icons in appropriate locations in step 1408. In the example of a photo, the notification markers/icons may need to be displayed in specific locations on the photo. In one embodiment, the application may request, for example, RSVP library 204 to display the notification markers/icons. In another embodiment, the application may request the operating system to display the notification markers/icons. In yet another embodiment, the application may obtain the notification markers/icons from RSVP library 204, and display the notification markers/icons. In an alternate embodiment, step 1408 of displaying notification markers/icons is optional. A user device may be configured (e.g., using RSVP settings 308 in FIG. 3) such that certain applications may display all content using RSVP. For example, applications such as an email application, a SMS application, etc. which primarily receive textual data, may be configured to display all content using RSVP. In such instances, displaying a notification marker/icon indicating the presence of RSVP content is not necessary as further described with respect to FIG. 14b.

Continuing with the description of FIG. 14a, upon receiving user input comprising selection of a particular notification marker/icon at step 1410, the application may request display of the DRDA in step 1412. In one embodiment, the application may request, for example RSVP library 204 to display the DRDA. In another embodiment, the application may request the operating system to display the DRDA. In yet another embodiment, the application may itself (e.g., using RSVP software 209a-209c in FIG. 2) display the DRDA. The RSVP content associated with the user selected notification marker/icon may be displayed in the DRDA using RSVP in step 1414. It is determined in step 1416 if additional RSVP content is present. If so, the additional RSVP content may be automatically displayed sequentially. For example, as shown in FIGS. 7a-7c and 8a-8d, if there are multiple notification markers/icons, DRDA may automatically sequentially display the RSVP content associated with each marker/icon. In another embodiment, user input may be requested before displaying RSVP content associated with each marker/icon. As previously discussed, the RSVP content may include one or more attachments. After displaying RSVP content, process 1300 may be used to display any attachments included with the RSVP content.

Figure 14B:
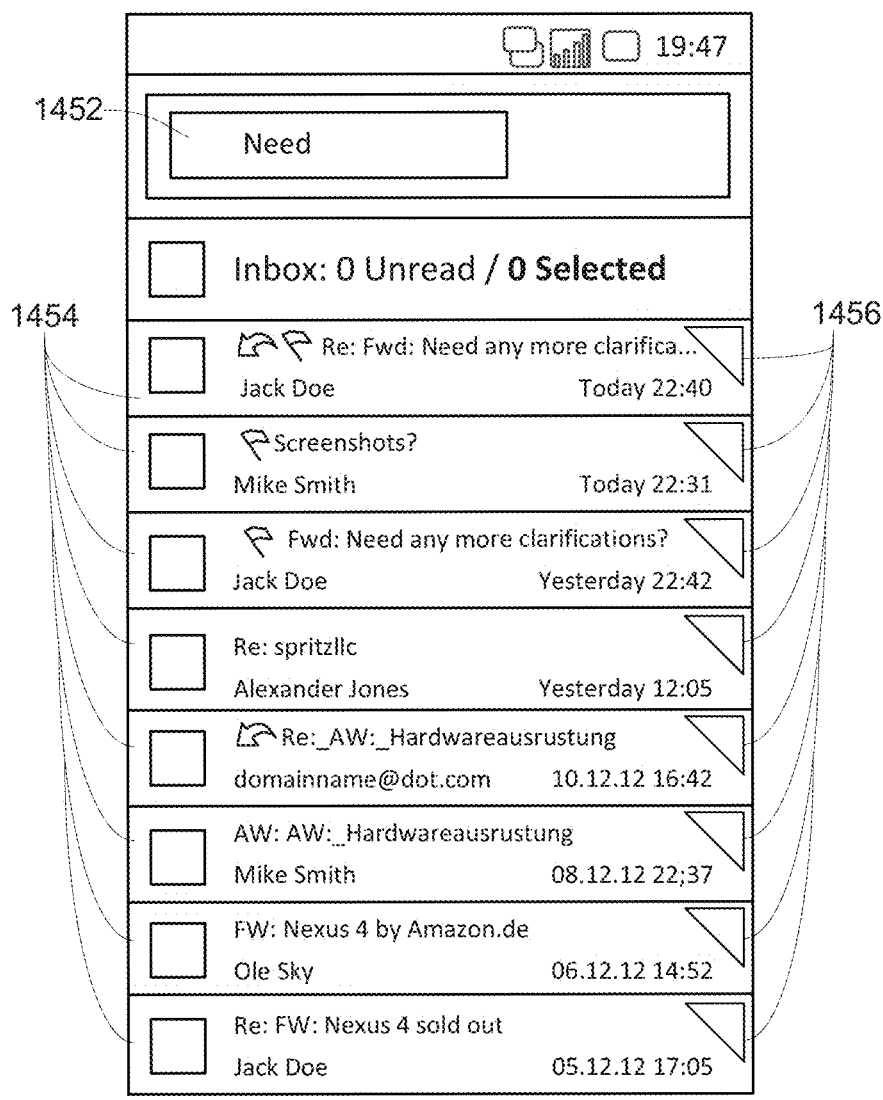
FIG. 14b is a screenshot diagram of an exemplary email application interface including a designated RSVP display area in accordance with one embodiment of the present invention.

FIG. 14b is a screenshot diagram 1450 of an exemplary email application on a mobile device in accordance with one embodiment of the present invention. Screenshot diagram 1450 shows a list of email items 1454 which are displayed in a user's inbox. In one embodiment, process 1400, as discussed above, may be employed by the email application to display the content of selected emails using RSVP. A user may select an email by for example, "touching and holding" an email item 1454. Upon user selection of an email, DRDA 1452 may be displayed, and the content of the email may be displayed in DRDA 1452 using RSVP. In one embodiment, the content displayed in DRDA 1452 may include the body of the email. Although notification markers/icons 1456 are shown, displaying notification markers/icons 1456 is optional. As discussed above, a user device may be configured (e.g., using RSVP settings 308 in FIG. 3) such that certain applications may display all content using RSVP. An email application, which primarily receives textual data, may display all content using RSVP. In such instances, displaying a notification marker/icon indicating the presence of RSVP content is not necessary. In one such example, an application may simply list item titles (e.g., emails) without using RSVP notification markers/icons and then, upon receipt of a particular user interface action (e.g., a tap and hold) with respect to an item, the application will display content of that item using RSVP in a DRDA while continuing to display at least a portion of the list of other items. As another example, even when an underlying application's content is non-textual, the content items may be known to be associated with textual descriptions. For example, a video application may be enabled to display a list of video items that are associated with RSVP-displayable textual descriptions and the video item's representation is selectable using a particular user interface action for RSVP display of such descriptions by default without the need for a separate RSVP-specific notification marker.

Figure 15:
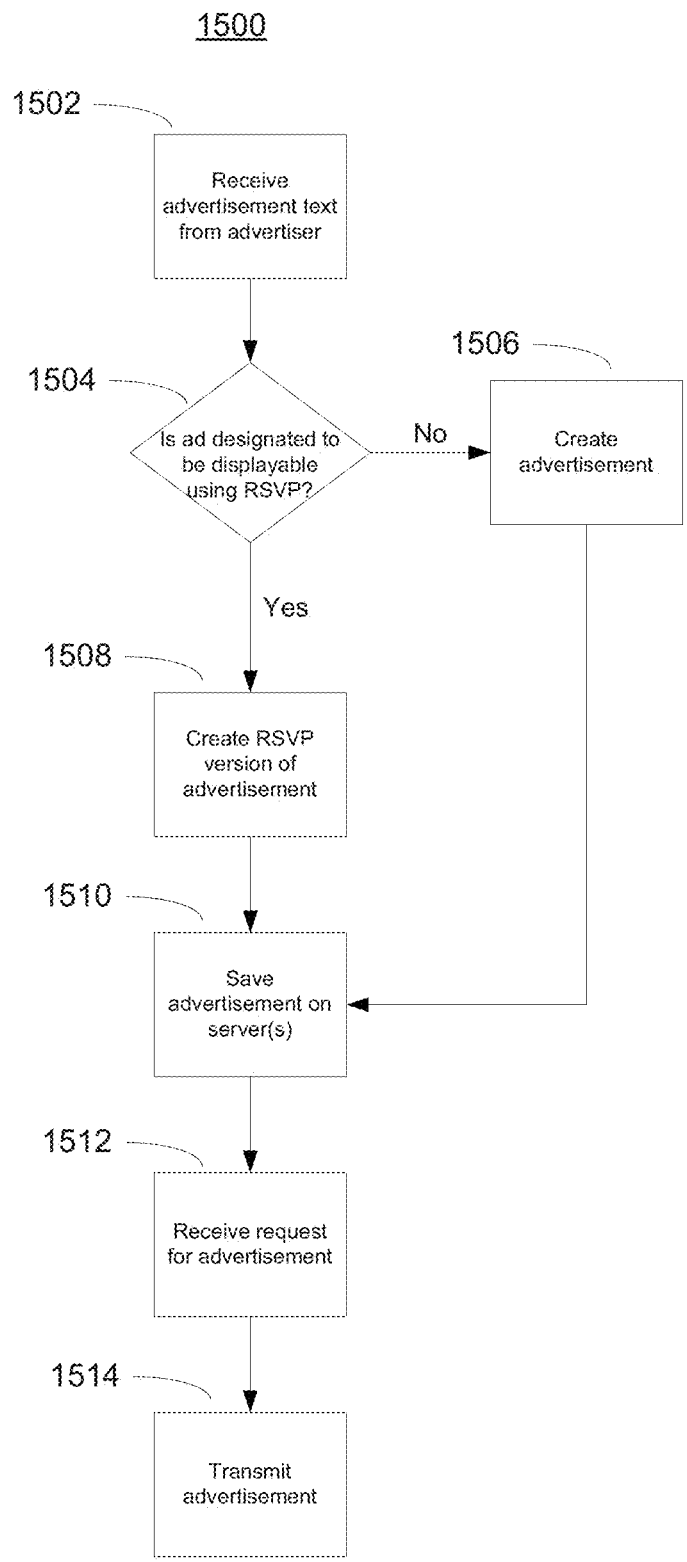
FIG. 15 is a flow chart diagram of a process of creating an RSVP version of an online advertisement in accordance with one embodiment of the present invention.

FIG. 15 is a flow chart diagram of process 1500 for creating an RSVP version of an online advertisement in accordance with one embodiment of the present invention. Online advertisers, who are looking to increase the amount of content that is presented to users in a given amount of screen space, may benefit from incorporating RSVP content into their advertisements. Textual information to be incorporated into an advertisement may be received from an advertiser in step 1502. It may be determined in step 1504, whether the advertiser would like to embed the textual information as RSVP content in the advertisement. If it is determined that the advertiser does not want to include RSVP content in the advertisement, a non-RSVP version of the advertisement may be created in step 1506. If it is determined that the advertisement is to include RSVP content, an RSVP version of the advertisement may be created in step 1508. The RSVP content may be configured using, for example meta-data tags as previously discussed. In step 1510, a RSVP or non-RSVP version of the advertisement may be saved on one or more servers. One or more servers may receive a request for an advertisement in step 1512. In one embodiment, the request may be from a browser application (e.g., for a banner advertisement). In another embodiment, the request may be from a desktop or mobile application which displays advertisements within its interface. In response to the request, the advertisement may be transmitted to the application in step 1514. In one embodiment, when the advertisement is received by the application, process 1400 may be used to display the advertisement. In one embodiment, the advertisement may be displayed with one or more notification markers/icons similar to those shown in FIG. 4b, 8a, 9a, or 10a to indicate the presence of content that is displayable using RSVP. The notification markers/icons may be overlaid on top of the advertisement, or may be displayed adjacent to, above, or below the advertisement.

Figure 16:
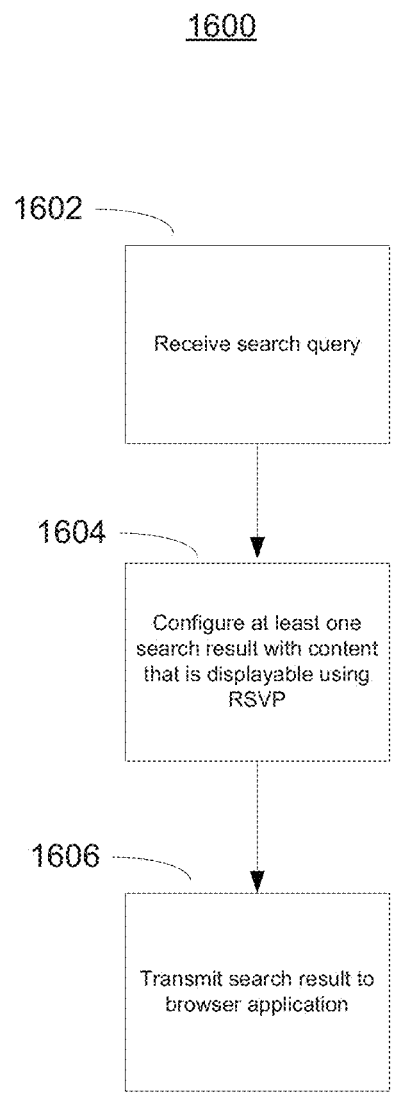
FIG. 16 is a flow chart diagram of a process of configuring search results with RSVP content in accordance with one embodiment of the present invention.

In addition to display advertisements, RSVP content may also be incorporated in, for example sponsored search results. FIG. 16 is a flow chart diagram of a process 1600 for configuring search results with RSVP content in accordance with one embodiment of the present invention. One or more servers may receive a search query in step 1602. In response to the search query, at least one search result corresponding to the search query may be configured with content that is displayable using RSVP in step 1604. In step 1606, the at least one search result may be transmitted to a browser application for display in the browser application. In one embodiment, the search result(s) may be displayed as shown in FIGS. 10a-10c.

Figure 17:
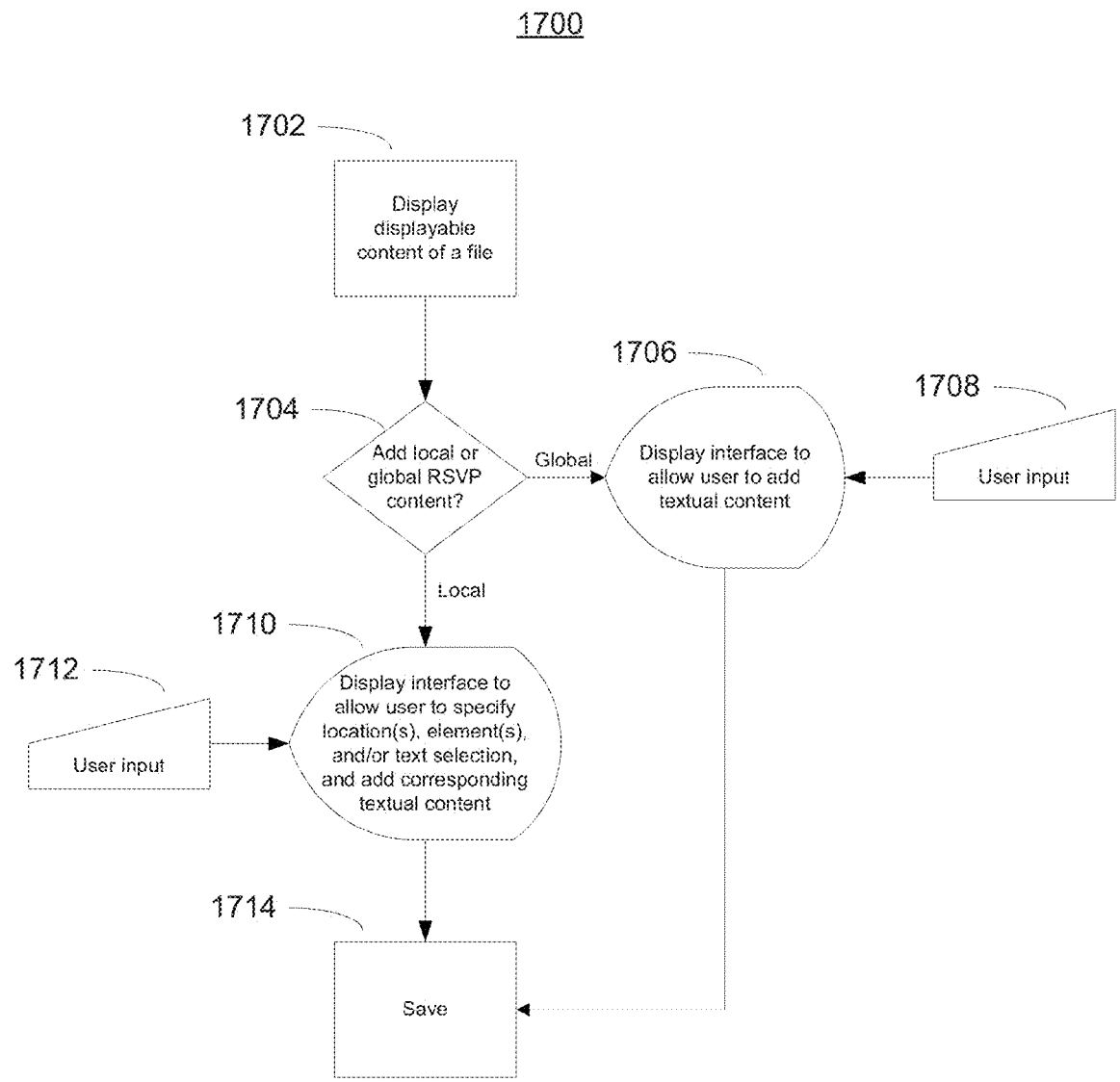
FIG. 17 is a flow chart diagram of a process of embedding RSVP content in a file in accordance with one embodiment of the present invention.

In some embodiments, users may embed RSVP content into files such as for example, photos, presentations, maps, etc. FIG. 17 is a flow chart diagram of a process 1700 for embedding RSVP content in a file (e.g., map, photo, diagram, presentation, word processing document, spreadsheet, etc.) in accordance with one embodiment of the present invention. In step 1702, displayable contents of a file may be displayed by the appropriate application. For example, a diagram may be displayed in a drawing application (e.g., Microsoft Visio™), or a presentation may be displayed in a presentation application (e.g., Microsoft PowerPoint™). In some embodiments, the application may be a desktop application while in other embodiments, the application may be a mobile application, or a web based application accessible via a browser. A user may specify whether to add "global" RSVP content or "local" RSVP content in step 1704. In one embodiment, an interface which allows the user to choose between "global" and/or "local" RSVP content may be displayed. In some embodiments, both "local" and "global" RSVP content may be embedded. As used herein, "global" content refers to RSVP content associated with the file (e.g., photo, map, presentation, and/or diagram) in its entirety. In the case of a map, in the example shown in FIG. 8b, notification 802 indicates presence of "global" RSVP content, such as "Check out these three restaurants" and is associated with the whole displayed map. By contrast, notifications 804, 806, and 808 indicate presence of "local" RSVP content associated with each location specified by notifications 804, 806, and 808. Similarly, in the case of a photo, in the example shown in FIG. 9a, notification 902 indicates presence of "global" RSVP content, such as "These are my friends," and is associated with the whole photo. By contrast, notifications 904 and 906 indicate presence of "local" RSVP content associated with each location specified by notifications 904 and 906. In another embodiment, "global" content may include a description of the file's contents. In such an embodiment, selecting a file (e.g., by clicking on, or "hovering" over the file's icon or name) that includes embedded "global" RSVP content from a file management interface (e.g., Windows Explorer™) or a homescreen may result in the "global" content being displayed using RSVP. It should be noted that in such an embodiment, viewing the "global" RSVP content does not require opening the file with an associated application.

If the user chooses to add "global" RSVP content, an interface which allows the user to input textual content, which will be embedded as "global" RSVP content is displayed in step 1706. In the embodiment described above where "global" content includes a description of the file, the "global" content may be provided in the metadata of the file.

For example, a user may right-click the file icon, select an option to enter an RSVP description for the file, and input the textual content.

User input including textual content may be received in step 1708. In embodiments where text input is required, text input may be provided using a virtual (i.e., touch screen) or physical keyboard, mouse, trackball, etc. Alternatively, or in addition, the user may provide voice/speech input via a microphone. The voice/speech input may then be converted to text. If the user chooses to add "local" RSVP content, an interface which allows the user to specify location(s), element(s), and/or text selection, and add the corresponding textual content, which will be embedded as "local" RSVP content is displayed in step 1710. For example, the user may specify locations on photos, maps, etc., specify elements or objects in photos, diagrams and presentations, etc. User input including specified location(s), element(s), and/or text selection, and add the corresponding textual content may be received in step 1712. In one embodiment, the interface may also allow selection of text such that RSVP content may be associated with the selected text. In the case of a photo, in addition to specifying locations on the photo, the user may select areas of the photo, such as, for example a face of a person. The location(s), element(s), and/or text selection information and the corresponding textual content may be saved in step 1714. In one embodiment, location(s), element(s), and/or text selection information and the corresponding textual content may be saved in the meta data of the file. For example, in the case of a photo, the location(s), element(s), and/or text selection information and the corresponding textual content may be saved in the EXIF data. In one embodiment, the textual content may be saved as plain text, in which case, the textual data may be converted to RSVP content (e.g., text that is configured to be displayed using RSVP) prior to displaying. In other embodiments, the textual content may be converted to RSVP content, and the RSVP content may be saved in the meta data of the file.

Figure 18A:
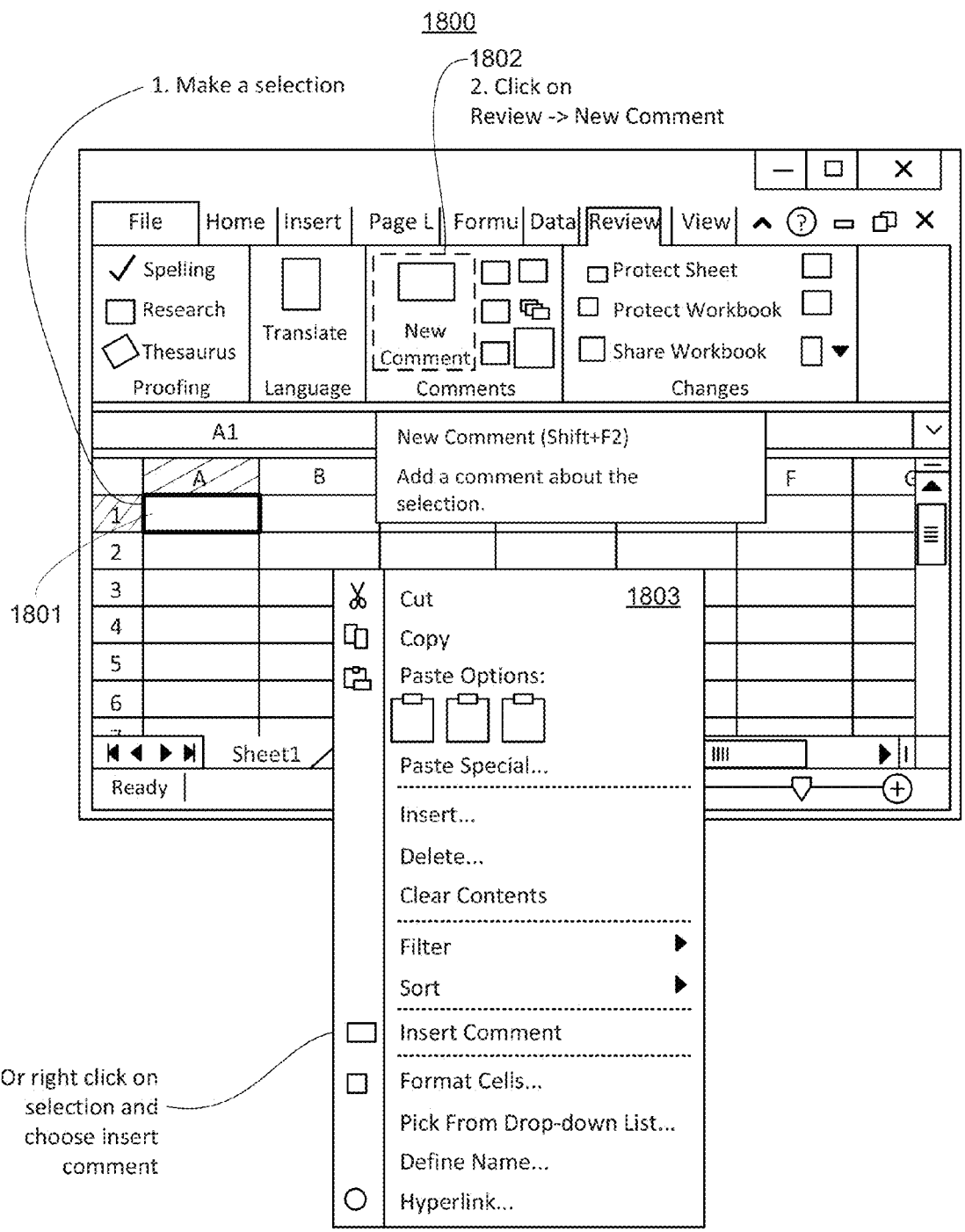
FIGS. 18a and 18b illustrate screenshot diagrams of an exemplary spreadsheet application interface illustrating a process of embedding RSVP content in a spreadsheet document in accordance with one embodiment of the present invention.
Figure 18B:
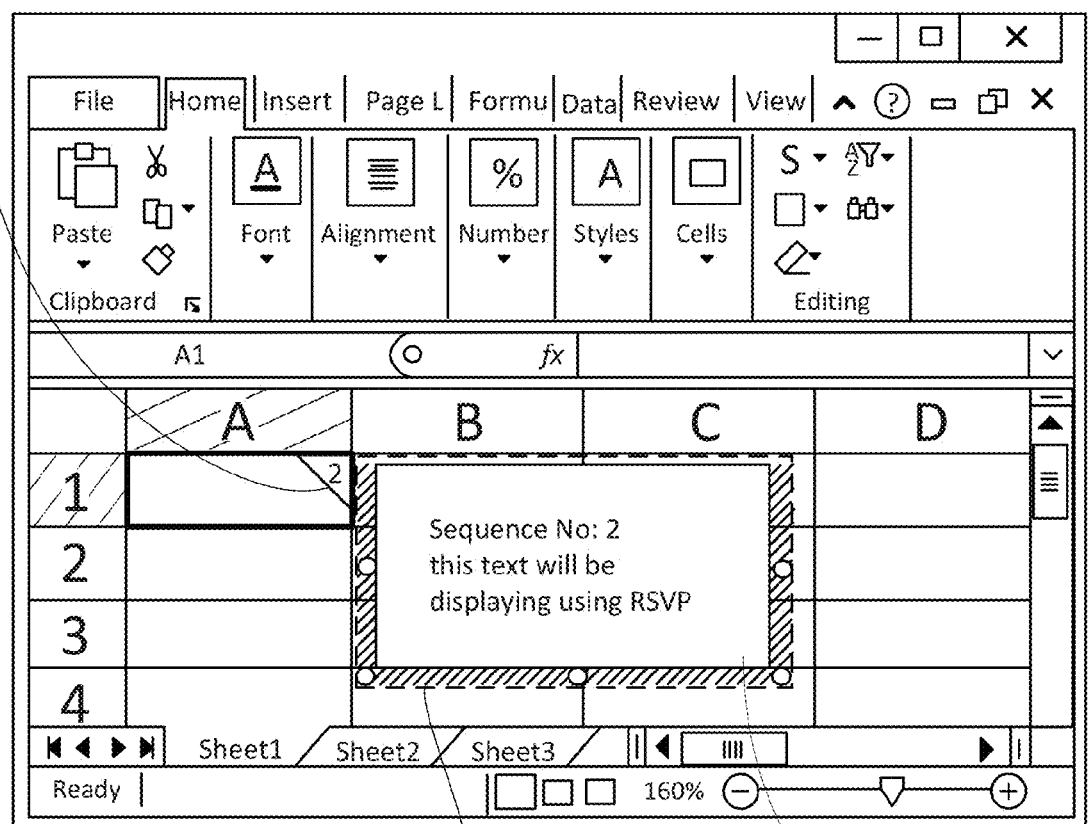

FIGS. 18*a* and 18*b* illustrate screenshot diagrams of an exemplary spreadsheet application interface illustrating a process of embedding RSVP content in a file such as for example, a spreadsheet document in accordance with one embodiment of the present invention. RSVP content may be embedded as a comment on any cell in a spreadsheet document. To embed RSVP content, a cell 1801 may be selected as shown in FIG. 18*a*. Once selected, a user may click on for example, "New Comment," icon 1802 or may right-click on the cell. Right-clicking on the cell may display a menu, from which "Insert Comment" may be selected. Selecting "New Comment" or "Insert Comment" may result in the display of input field 1804 as shown in FIG. 18*b*. The user may specify a sequence number for the comment, if any, and provide the text for the comment in input field 1804. The text entered into input field 1804 is displayable using RSVP. In one embodiment, the content of every cell and/or every comment corresponding to a cell may be displayable using RSVP. Optionally, a notification marker/icon may be displayed indicating the presence of content or a comment including RSVP content. A process similar to that shown in FIGS. 18*a* and 18*b* may be used to embed RSVP content in a word processing document. For example, text may be selected, and a corresponding comment may be input by a user. The comment may then be embedded in the word processing document, and may subsequently be displayed in a DRDA using RSVP upon user selection of the comment.

Figure 19:
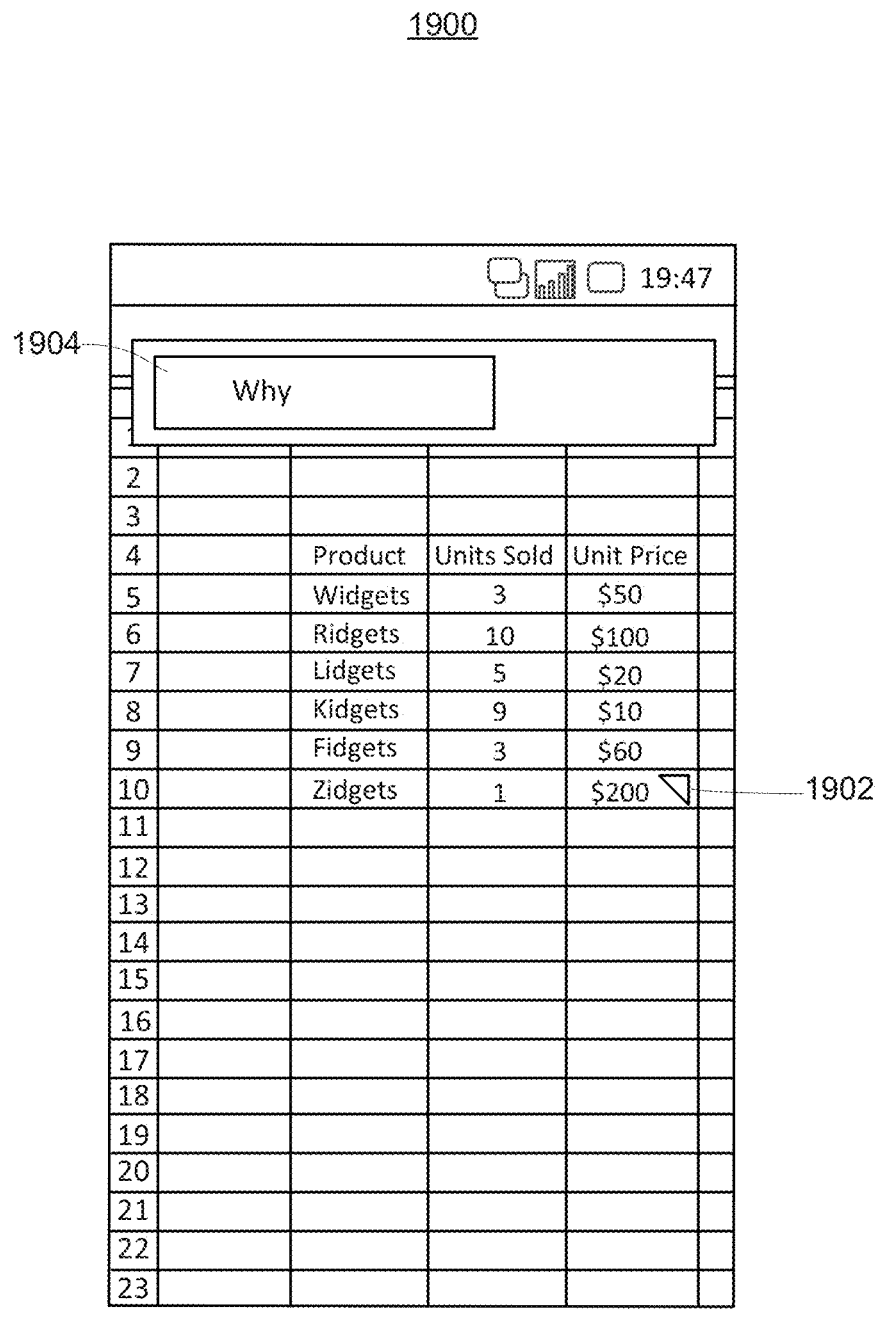

FIG. 19 illustrates a screenshot diagram of an exemplary spreadsheet application interface including a designated RSVP display area in accordance with one embodiment of the present invention. Screenshot 1900 illustrates a spreadsheet application interface including DRDA 1904 displaying RSVP content that was embedded in the spreadsheet document. As shown, notification marker/icon 1902 indicates presence of RSVP content associated with the corresponding cell. In addition, notification marker/icon 1902 may also include a numerical indicator (not shown). Upon user selection of notification icon/marker 1902, DRDA 1904 may be displayed, and the corresponding RSVP content may be displayed in DRDA 1904. In one embodiment, the spreadsheet application may be configured to allow the content and/or comments corresponding to all cells to be displayed using RSVP whether or not an author has specially embedded content designated for RSVP display. In such an instance, notification markers/icons indicating presence of RSVP content may not be displayed. A user may for example, "touch and hold" a cell, and as a result, DRDA 1904 may be displayed. The corresponding content and/or comment may then be displayed using RSVP in DRDA 1904.

Figures 20A, 20B:
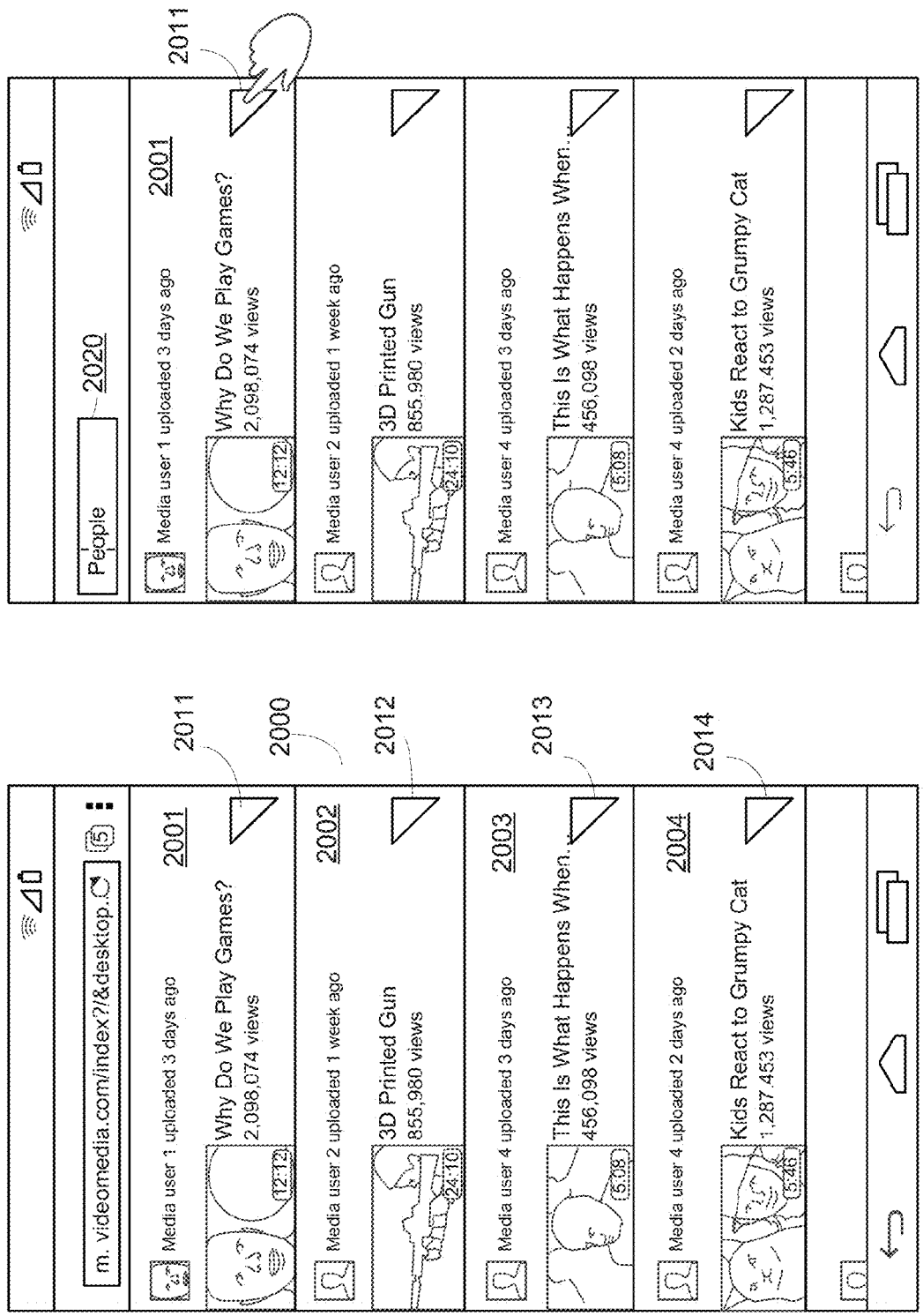

FIGS. 20*a*-20*d* show screenshot diagrams of an exemplary video item listing window in accordance with one embodiment of the present invention. FIG. 20*a* shows a web application window 2000 (which may correspond to a web page) including a list of featured video items within a browser-based video content application. Video item listings with links to corresponding video content are provided by many different known video content applications, e.g., YouTube™. However, in the illustrated embodiment, the video item listing is supplemented by providing access to related RSVP content. As shown, a list is displayed of featured video item representations 2001, 2002, 2003, and 2004. Markers/icons 2011, 2012, 2013, and 2014 are displayed with, respectively, video item representations 2001, 2002, 2003, and 2004. Each marker indicates the presence of RSVP content associated with the corresponding video item.

As shown in FIG. 20*b*, upon user selection of notification marker 2011, DRDA 2020 may be displayed and, as shown in FIGS. 20*b*-20*d*, RSVP content related to video item 2001 is displayed in DRDA 2020. FIGS. 20*b*-10*d* show time-sequence snapshots of the content displayed in DRDA 2020. For example, FIG. 20*b* shows that DRDA 2020 displays the word "People" at a first time; FIG. 20*c* shows that DRDA 2020 displays the word "have" at a next time; and FIG. 20*d* shows that DRDA 2020 displays the word "played" at third time.

As shown in FIGS. 20*a*-20*d*, this embodiment allows a user to receive more information about a particular video within the context of a small-screen display before deciding whether to leave window 2000 and navigate to a new window related to a particular video item. The application interface is able to continue displaying window 2000 including the illustrated list of video items while displaying additional information about a selected video item in DRDA 2020. This may be particularly useful in the context of video content applications because once the decision is made to view a particular video, a large data stream may be initiated which can take significant time to display and can also spend a significant quantity of data against monthly maximums or otherwise incur additional charges for a user. Also, it might be useful for a user to be able to quickly and easily obtain information about a particular video via RSVP text content without having to leave display of window 2000 so that a user can quickly learn additional information about several videos before selecting a video for viewing.

Although window 2000 shows a list of featured video items, in alternative embodiments, window 2000 may display a list of video items in response to a user search, or it may display items automatically recommended for a particular user.

FIGS. 21a-21g illustrate the playing of a video supplemented by RSVP content, the video and associated RSVP content being displayed by an embodiment of the present invention.

Figure 21A:
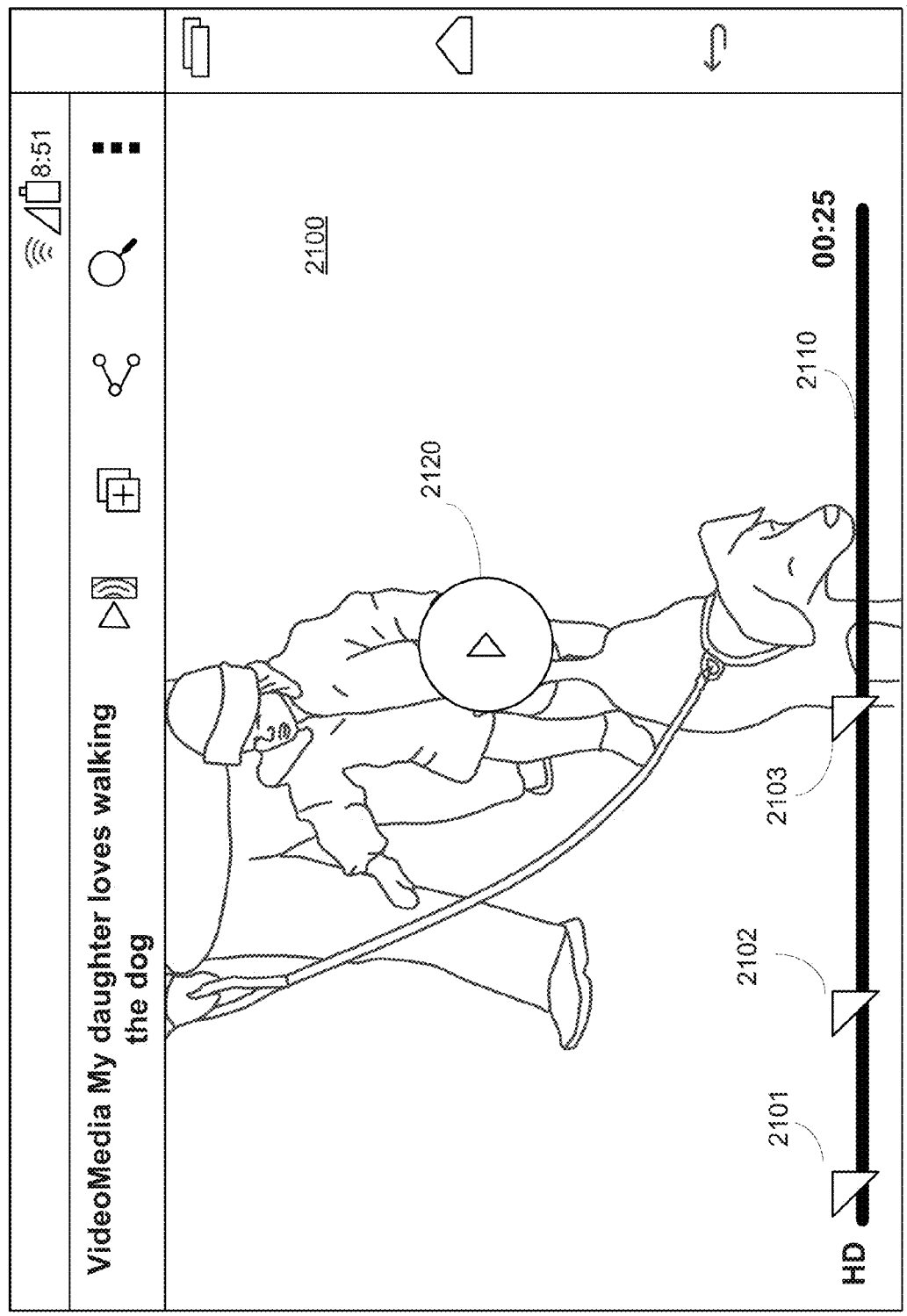

In FIG. 21a, shows video display window 2100 displaying an initial frame of the video "My daughter loves walking the dog." As shown, display window 2100 includes progress bar (timeline bar) 2110. Markers 2101, 2102, and 2103 are displayed along progress bar 2110 to indicate time points in the video that are associated with RSVP content.

When a user selects start icon 2120, the video begins playing normally in window 2100. When the video reaches frames associated with RSPV content, the RSVP content associated with the relevant marker 2101, 2102, or 2103 becomes displayable in response to a user selection as shown in subsequent figures.

Figure 21B:
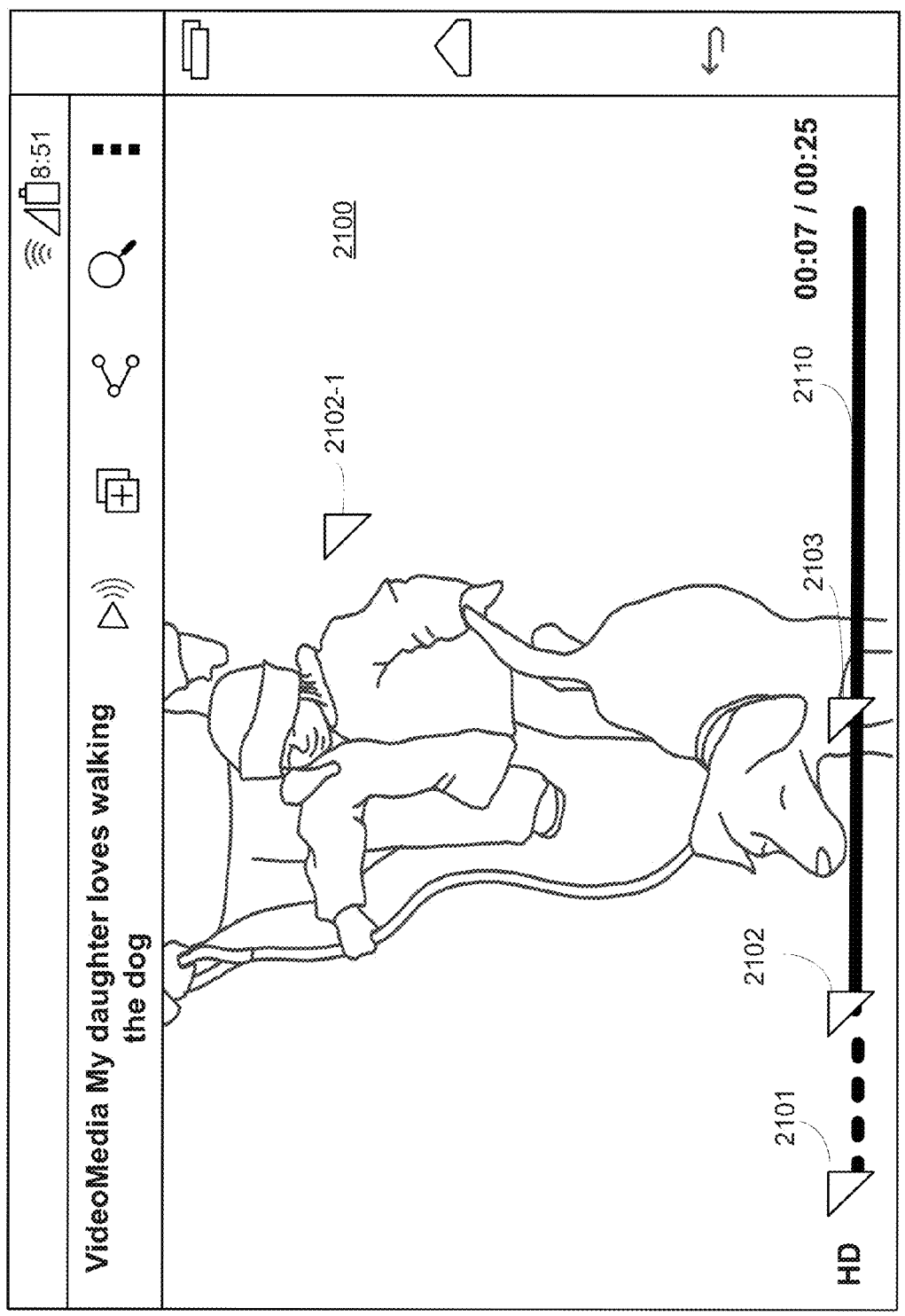
Figure 21C:
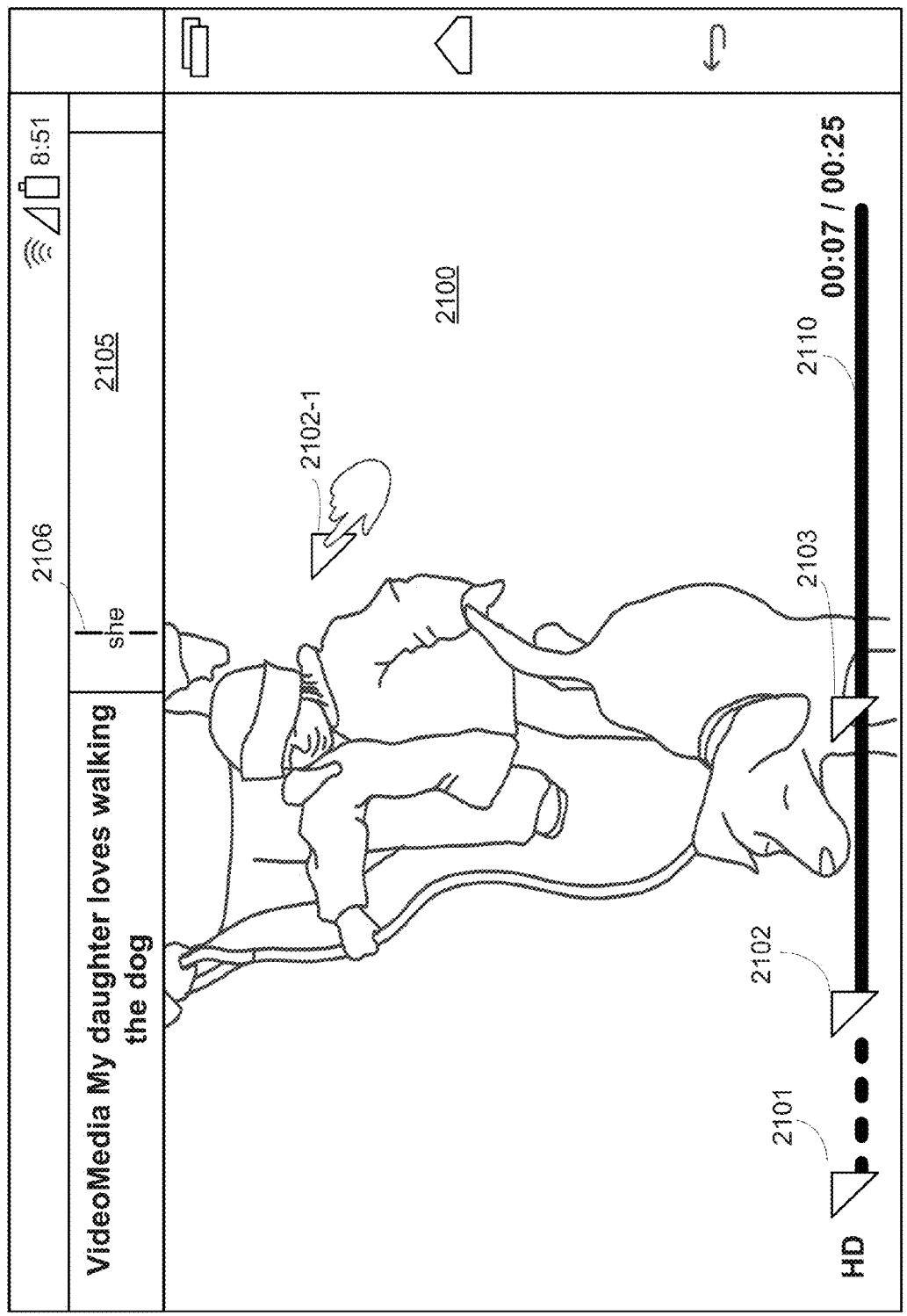
Figure 21D:
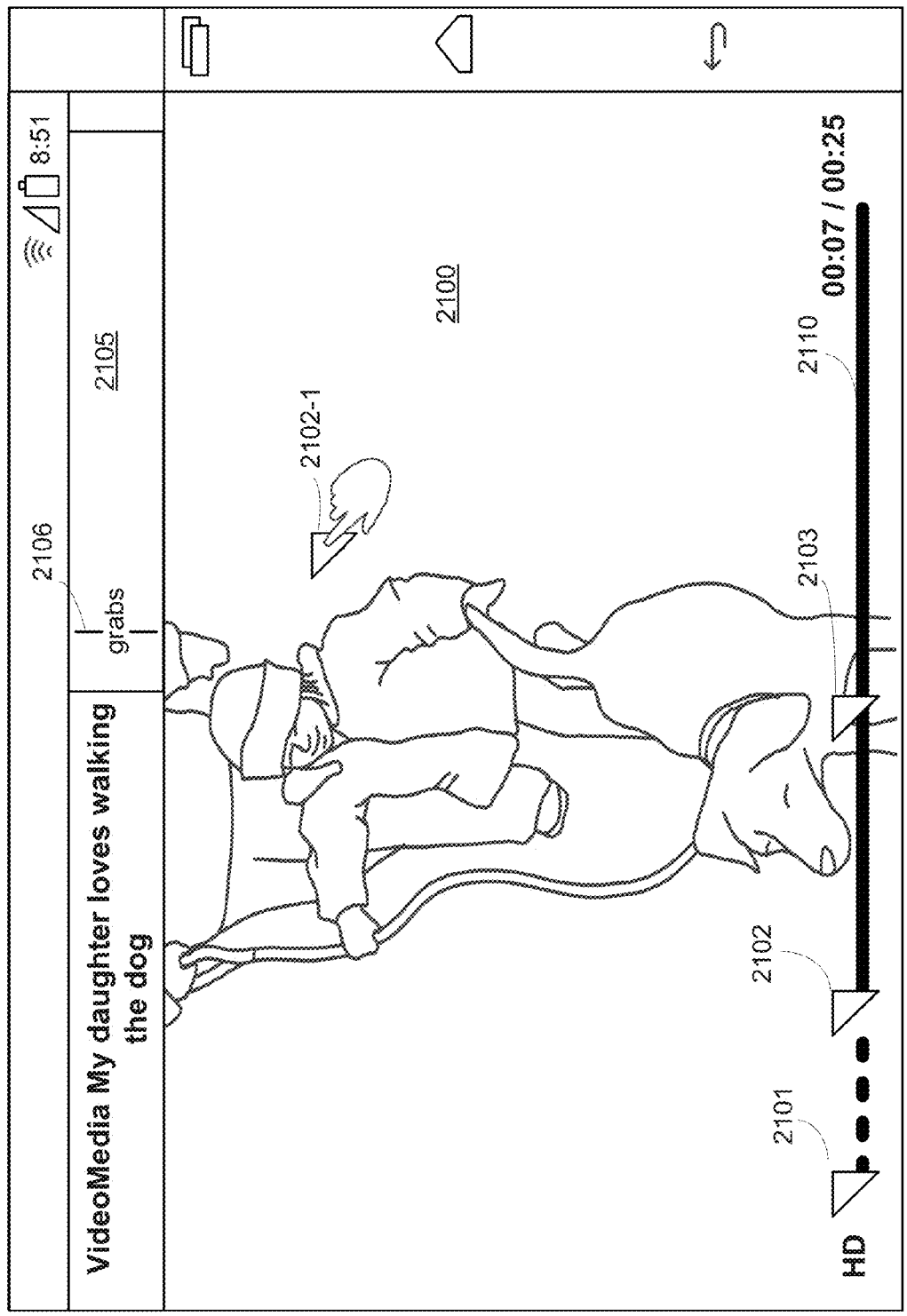
Figure 21E:
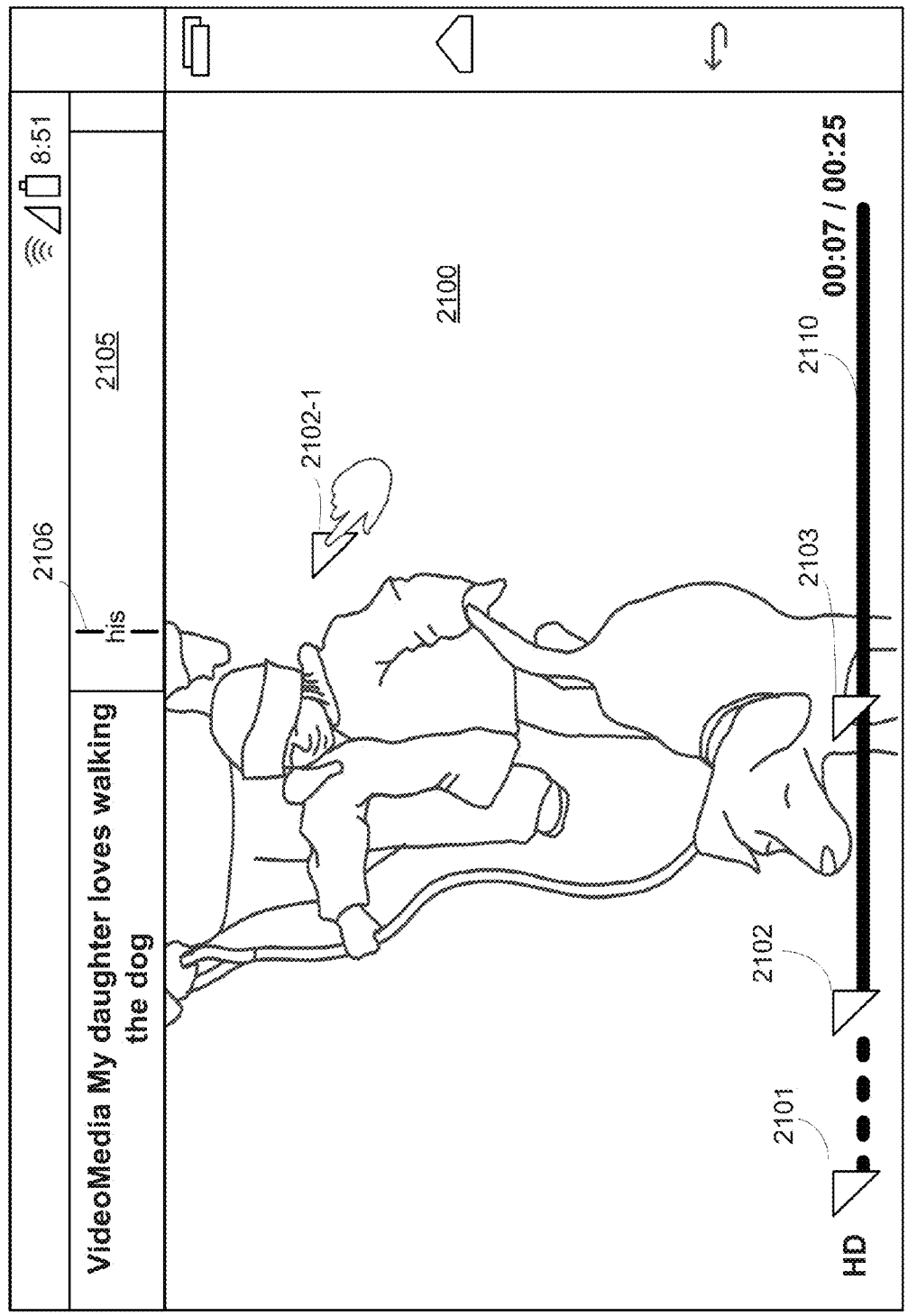
Figure 21F:
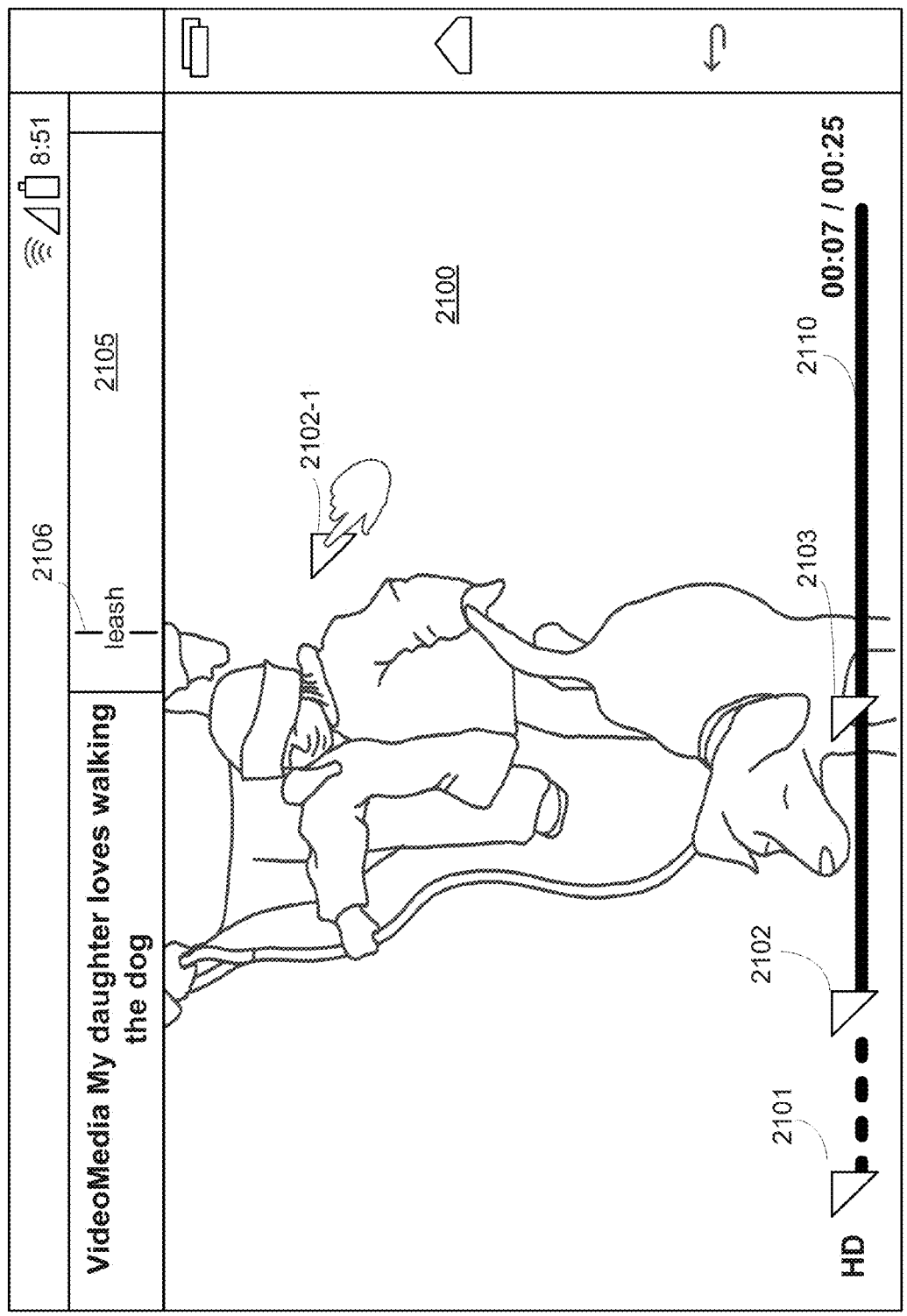

FIG. 21b illustrates the display in window 2100 at seven seconds into the video, which, as shown in the progress bar, corresponds to marker 2102. At this point in the video, window 2100 also displays marker 2102-1 within the video scene to alert the viewer to the presence of RSVP content associated with that time period in the video. As shown in FIG. 21c, when the user selects marker 2102-1, DRDA 2105 appears and begins displaying RSVP content. FIGS. 21c-21f show a time sequence as DRDA displays the content associated with display marker 2102-1. Specifically, FIG. 21c shows display at a first time of the word "she." FIG. 21d shows display at a second time of the word "grabs." FIG. 21e shows display at a third time of the word "his." FIG. 21f shows display at a fourth time of the word "leash." In this particular embodiment, the words are displayed such that an optimal recognition position of each word is at a fixed location within DRDA, the fixed location being indicated by hash marks 2106. In this particular embodiment, the video progress is stopped while the RSVP content is displayed. All the words in the RSVP content associated with marker 2102-1 are displayed while the video is stopped at a frame corresponding to seven second into the video, as shown in FIGS. 21c-21f. However, in alternative embodiments, RSPV content such as that shown in FIGS. 21c-21f could be displayed without stopping the video progress. Because RSVP content allows for faster reading speed than does traditional text presentation, a given amount of text can be presented via RSVP during a video with less time disruption to the viewing of the video than if the text were displayed without using RSVP.

In the illustrated embodiment, RSPV content is displayed in response to a user interaction. However, an alternative embodiment can be configured to display embedded RSVP content automatically at particular time points in a video.

FIG. 21g illustrates the display in window 2100 at nine seconds into the video, which, as shown by progress bar 2110, is past the content associated with marker 2102. Because the RSVP content associated with 2102 has already been selected (by a selection of marker 2102-1) and displayed, marker 2102 is now grayed out to indicate that its associated content has been displayed.

FIGS. 22a-22f illustrate a variation on the example illustrated in FIGS. 21a-21g, the illustrated video and RSVP content being displayed by an embodiment of the present invention.

Figure 22A:
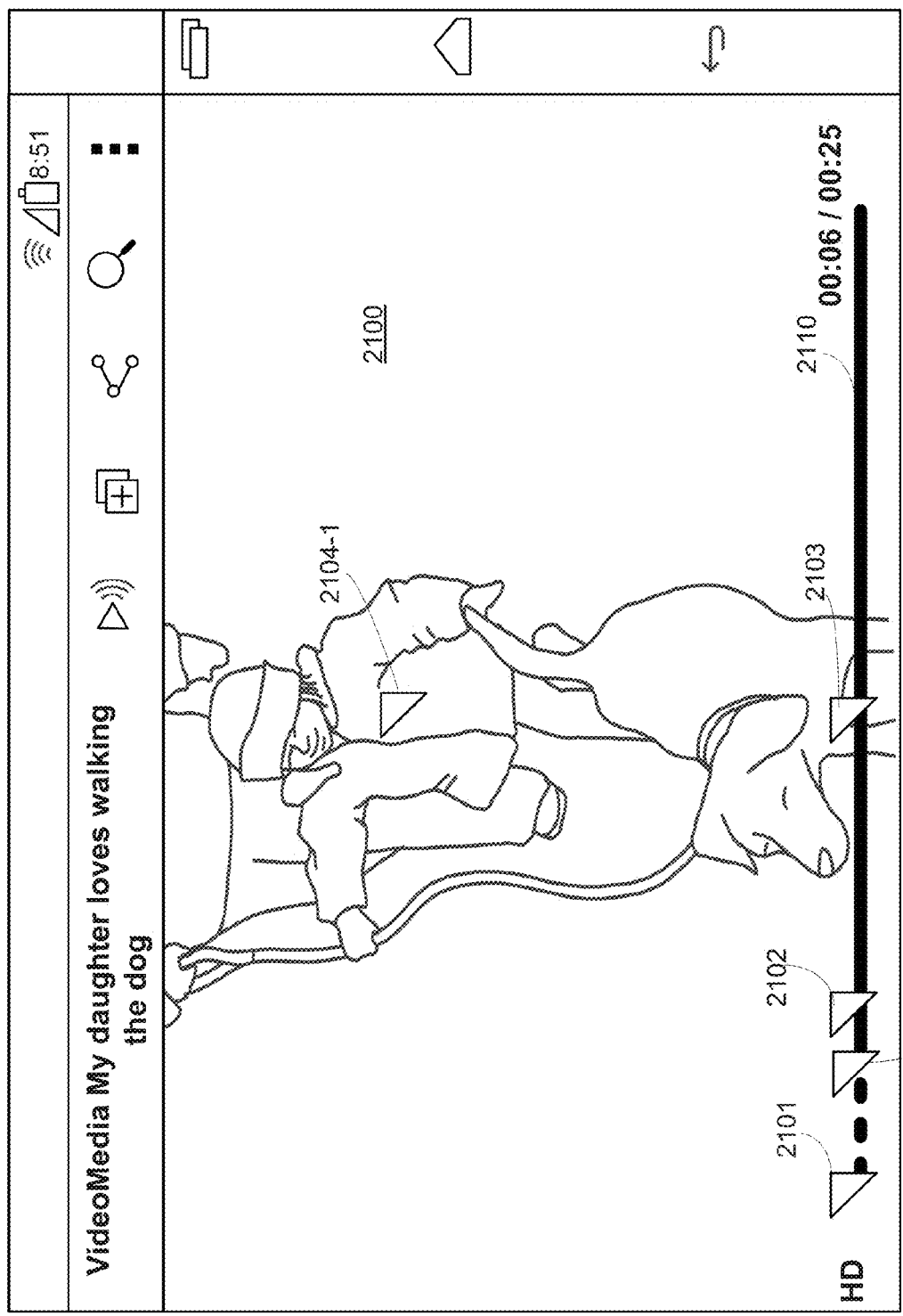
FIGS. 22a-22f illustrate a variation on the example illustrated in FIGS. 21a-21g, the illustrated video and RSVP content being displayed by an embodiment of the present invention

FIG. 22a shows video display window 2100 displaying a frame of the video "My daughter loves walking the dog." The video frame shown in FIG. 22a is at six seconds into the video. In addition to markers 2101, 2102, and 2103 shown on progress bar 2110, window 2100 also displays marker 2104 on progress bar 2110 and related marker 2104-1 on the girl who is an identified object in the video. Marker 2104-1 remains on the identified object while it remains in the frame.

Figure 22B:
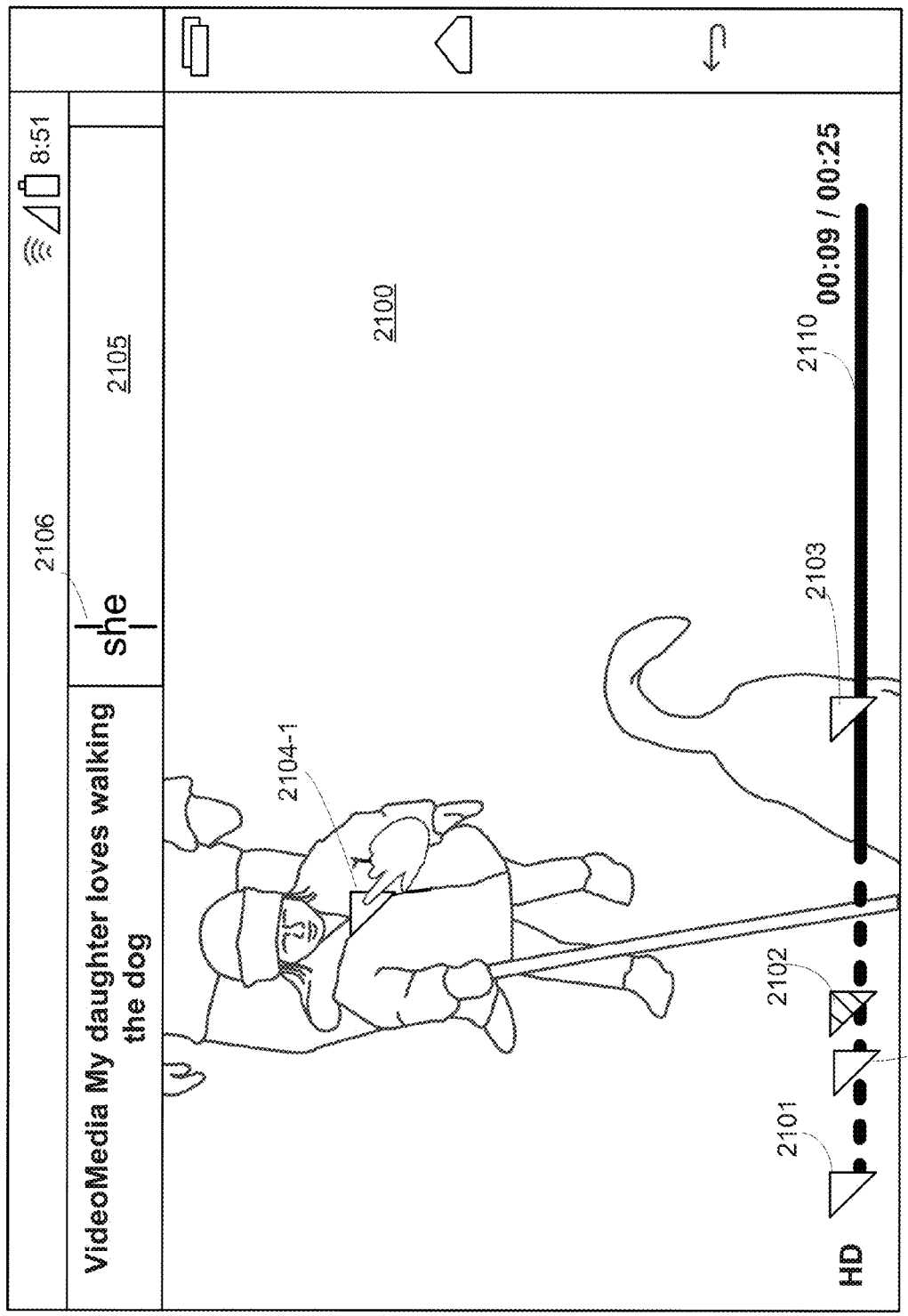
Figure 22C:
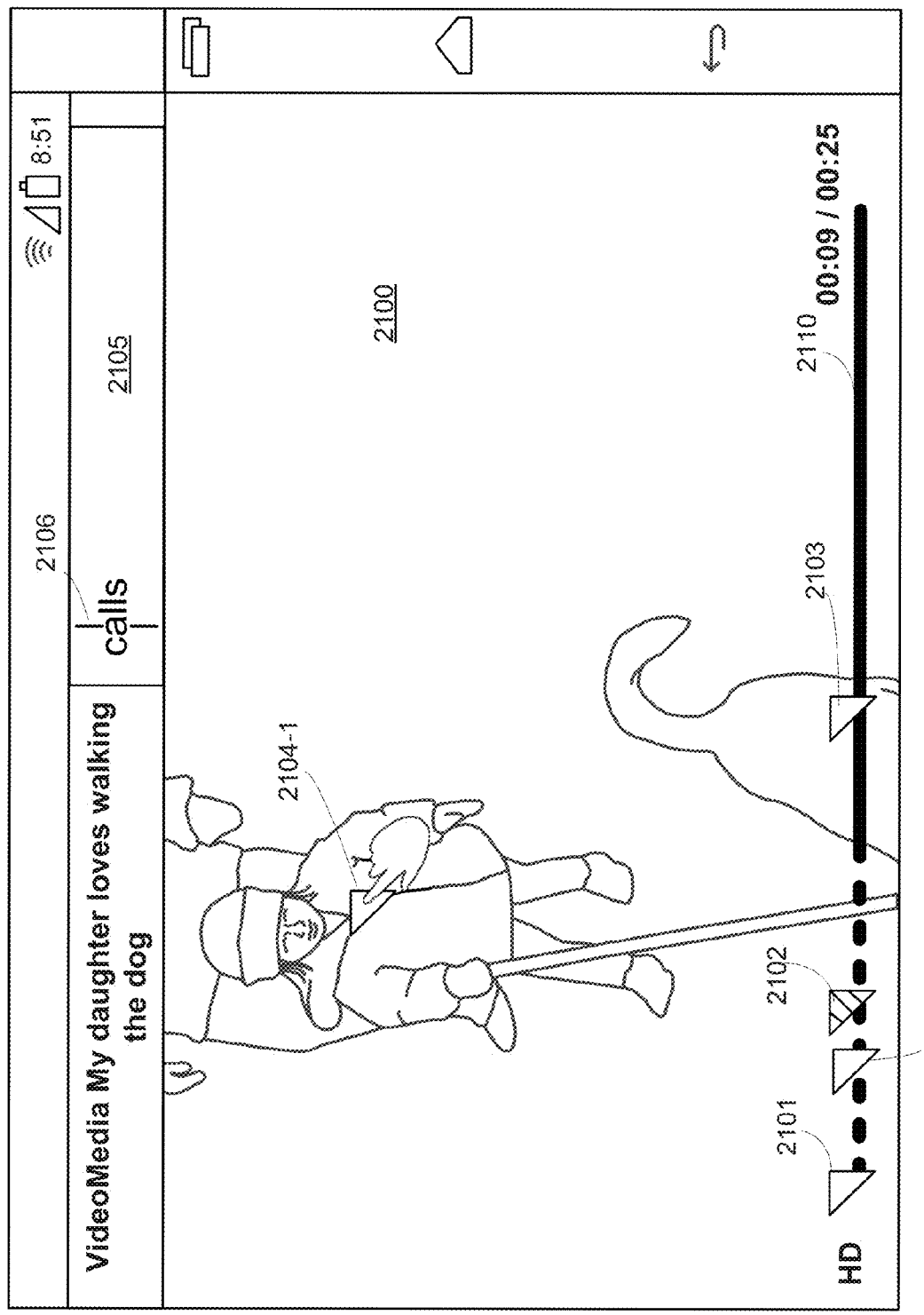
Figure 22D:
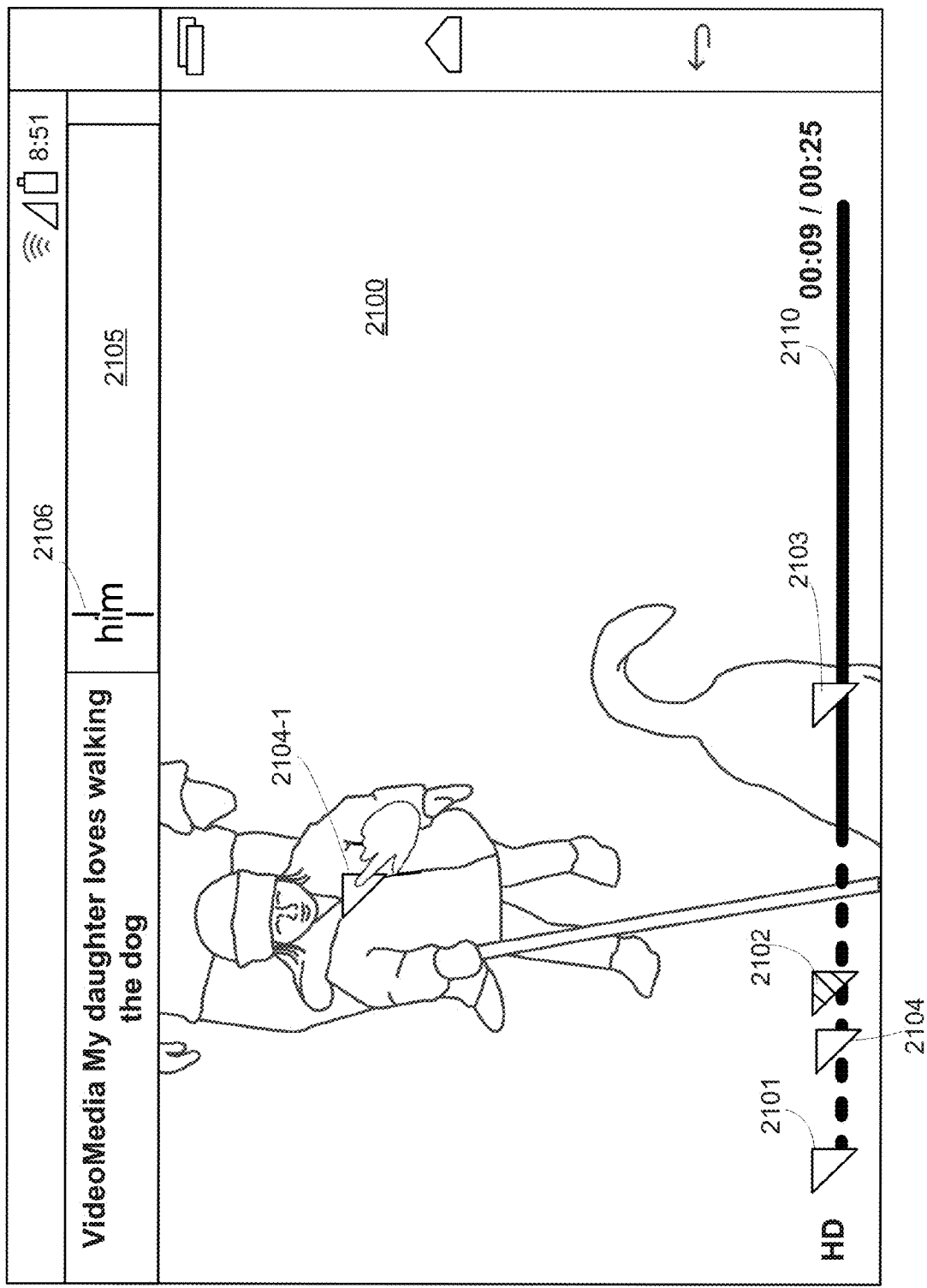
Figure 22E:
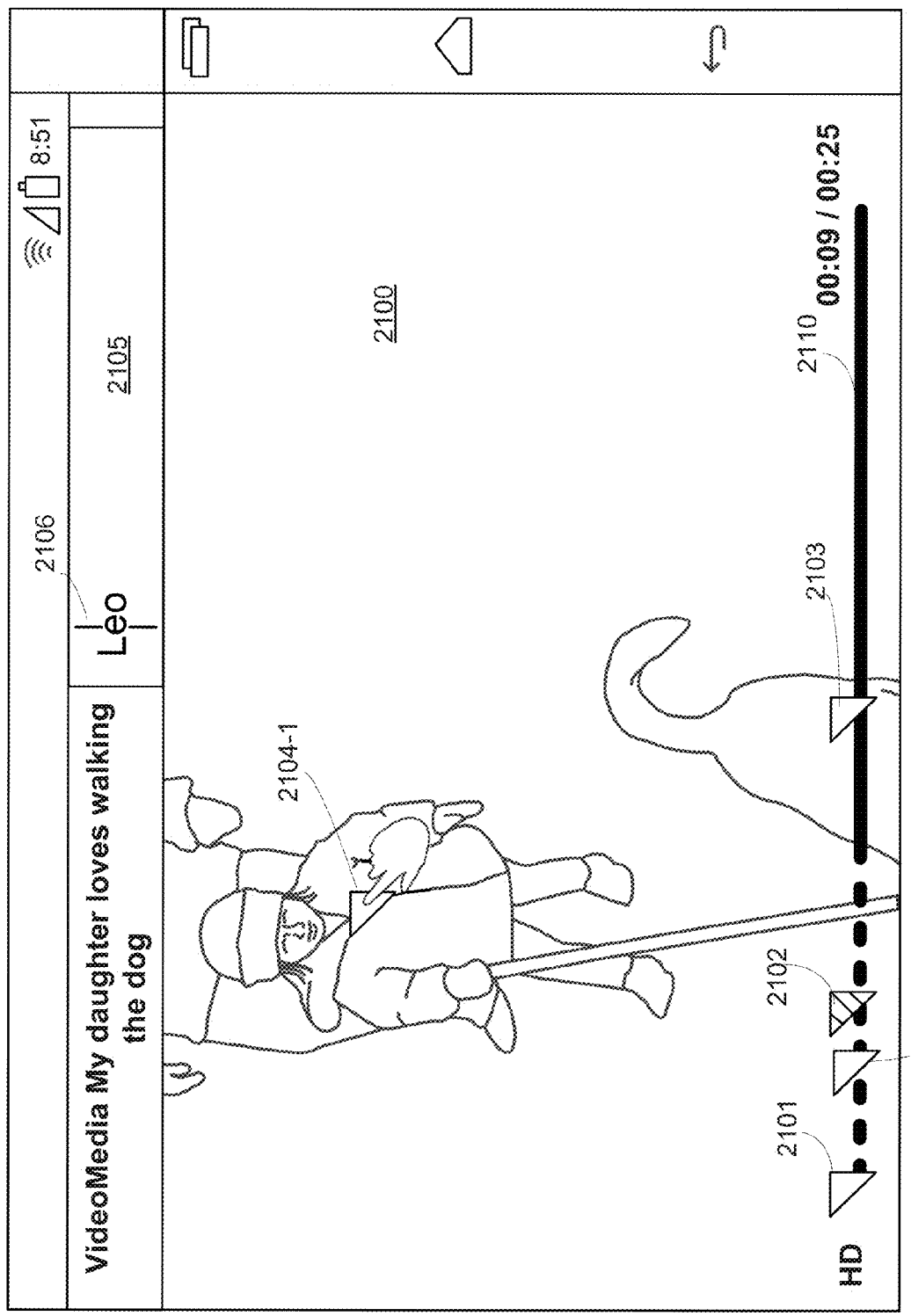

As shown in FIG. 22b, the video has progressed to nine seconds into the video and the RSPV content associated with marker 2102 has already been displayed (in the manner shown in FIGS. 21c-21f). Marker 2104-1 remains displayed on the identified object and it is now selected by a user interface action. As shown in FIG. 22b, when the user selects marker 2104-1, DRDA 2105 appears and begins displaying RSVP content. FIGS. 22c-21e show a time sequence as DRDA displays the content associated with display marker 2104-1. Specifically, FIG. 22b shows display at a first time of the word "she." FIG. 22c shows display at a second time of the word "calls." FIG. 22d shows display at a third time of the word "him." FIG. 22e shows display at a fourth time of the word "Leo." In this particular embodiment, the words are displayed such that an optimal recognition position of each word is at a fixed location within DRDA, the fixed location being indicated by hash marks 2106. In this particular embodiment, the video progress is stopped while the RSVP content is displayed. All the words in the RSVP content associated with marker 2104 are displayed while the video is stopped at a frame corresponding to nine second into the video, as shown in FIGS. 22b-22e. However, in alternative embodiments, RSPV content such as that shown in FIGS. 22b-22e could be displayed without stopping the video progress.

Figure 22F:
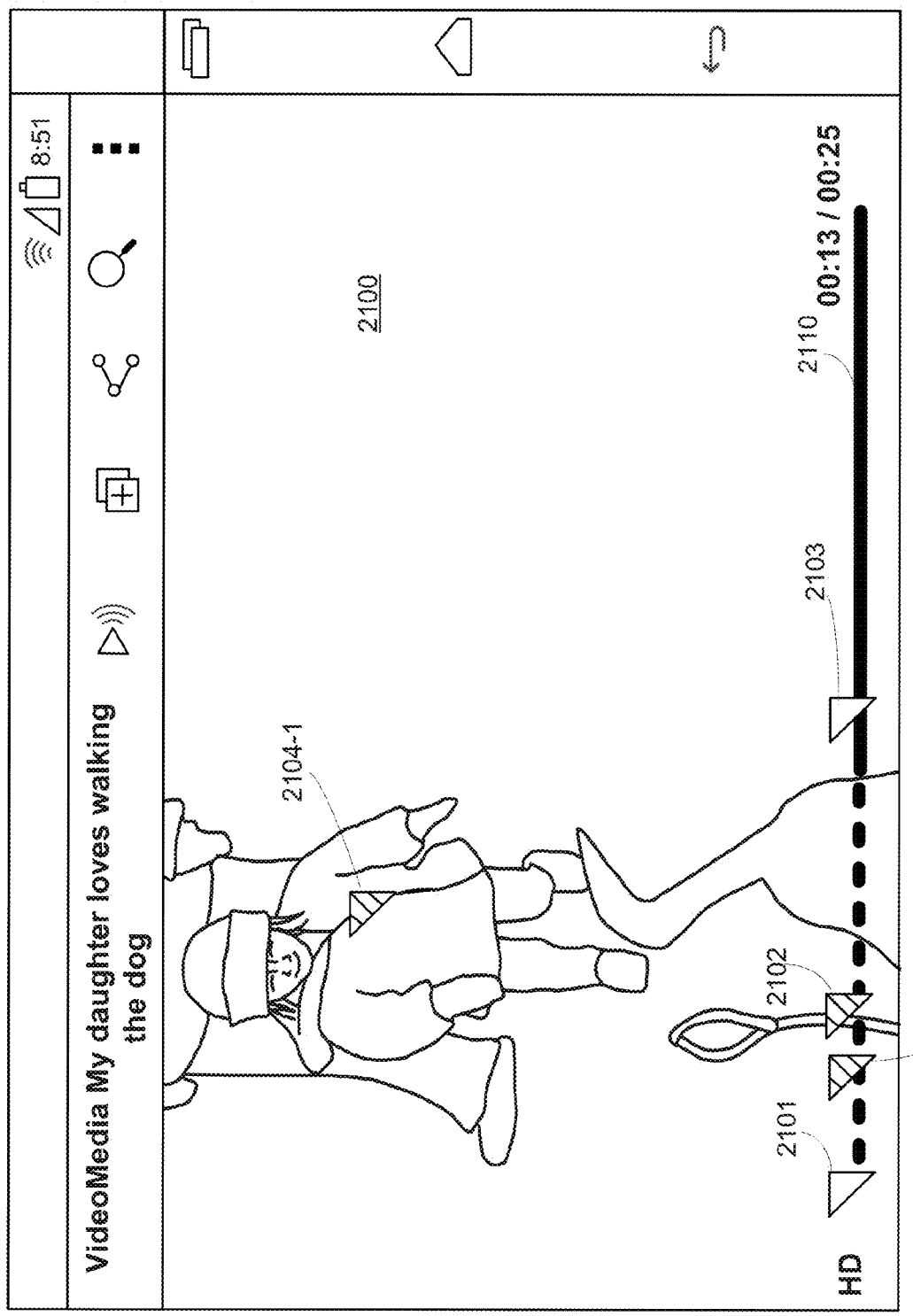

FIG. 22f illustrates the display in window 2100 at thirteen seconds into the video. In this frame, marker 2104-1 is still shown on the identified object (the girl) and it and related marker 2104 are shown as grayed out to indicate that the RSVP content associated with the object marker has already been displayed.

Figure 23A:
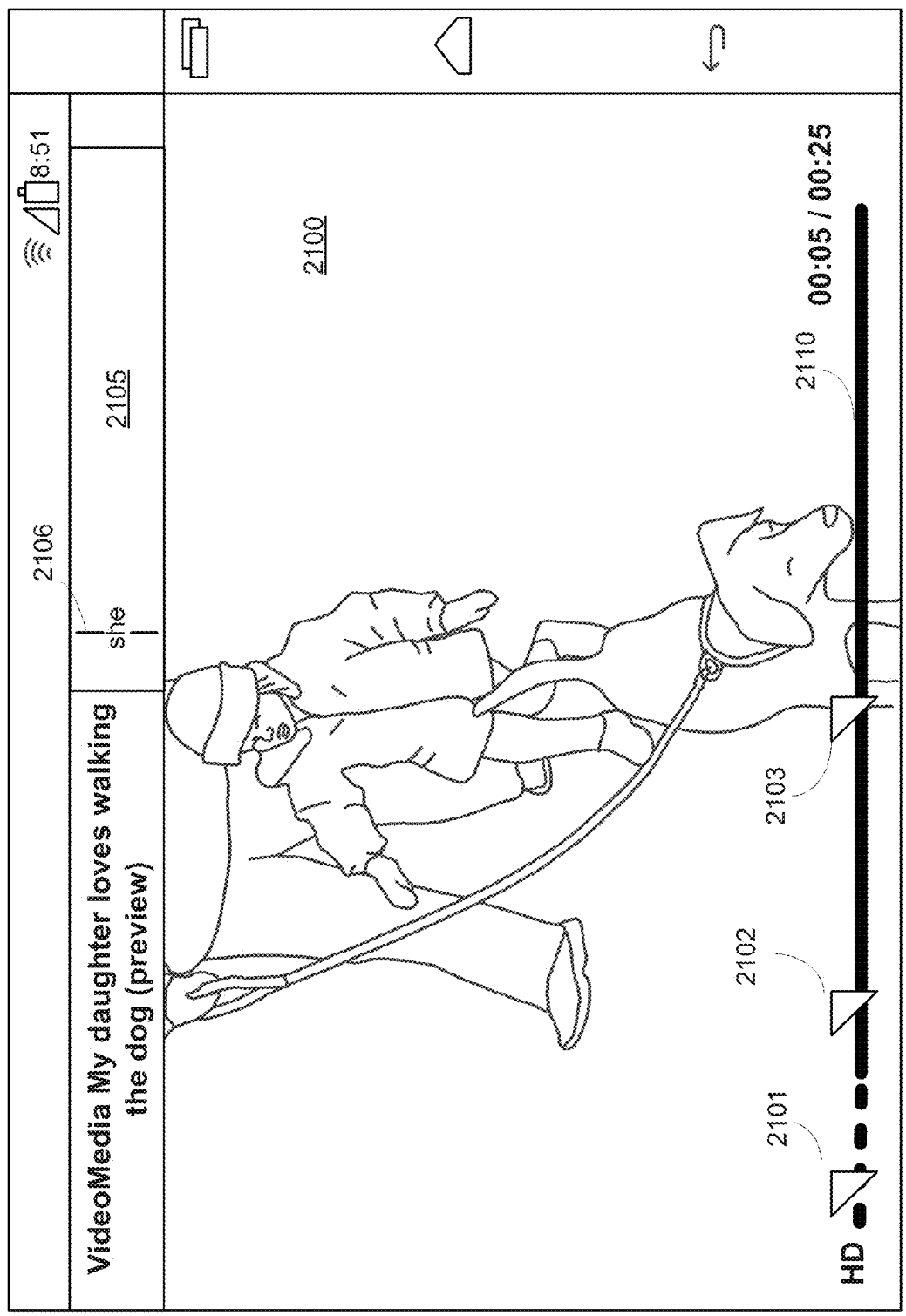
FIGS. 23a-23i show an RSVP-enabled video preview displayed by an embodiment of the present invention.
Figure 23B:
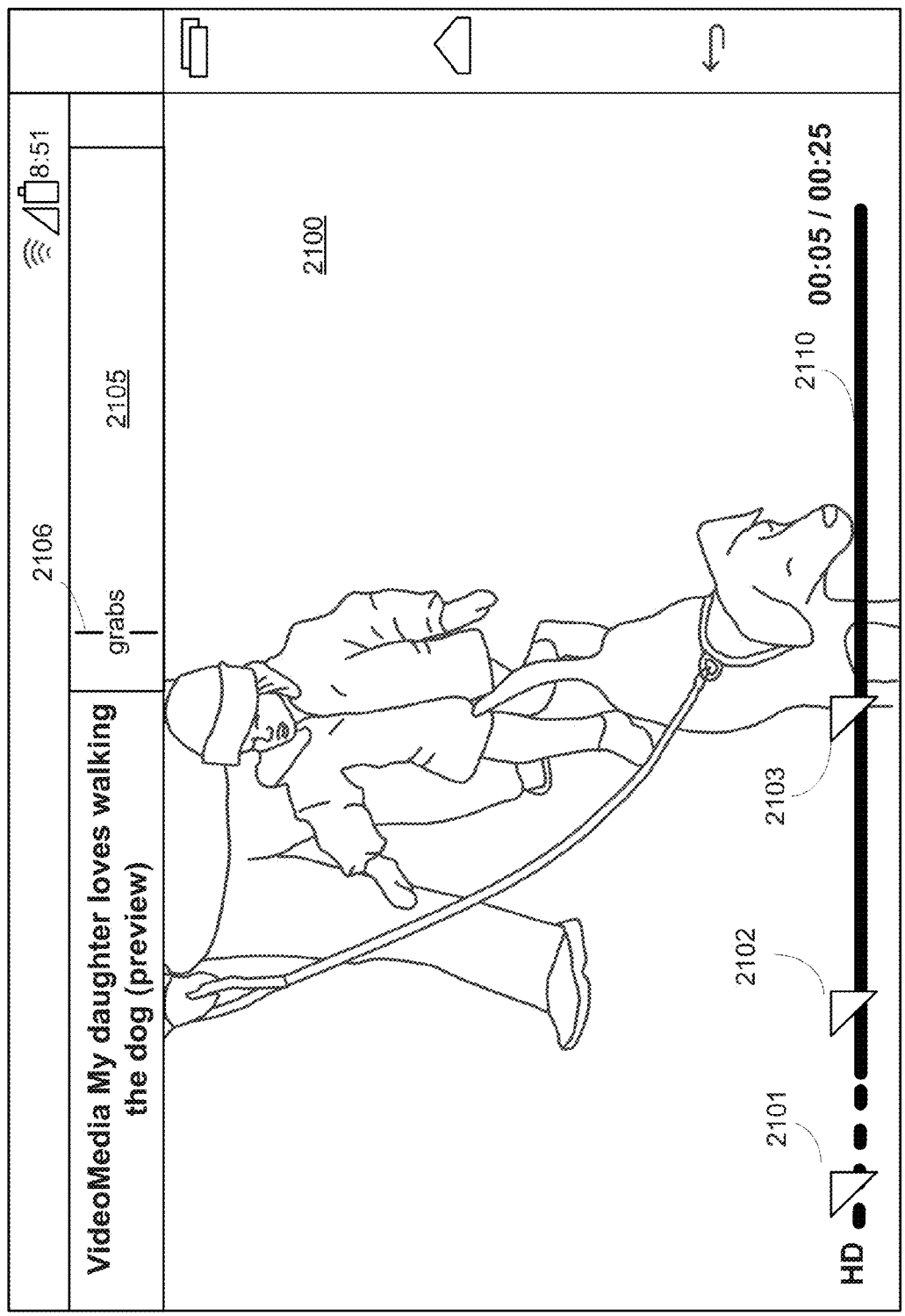
Figure 23C:
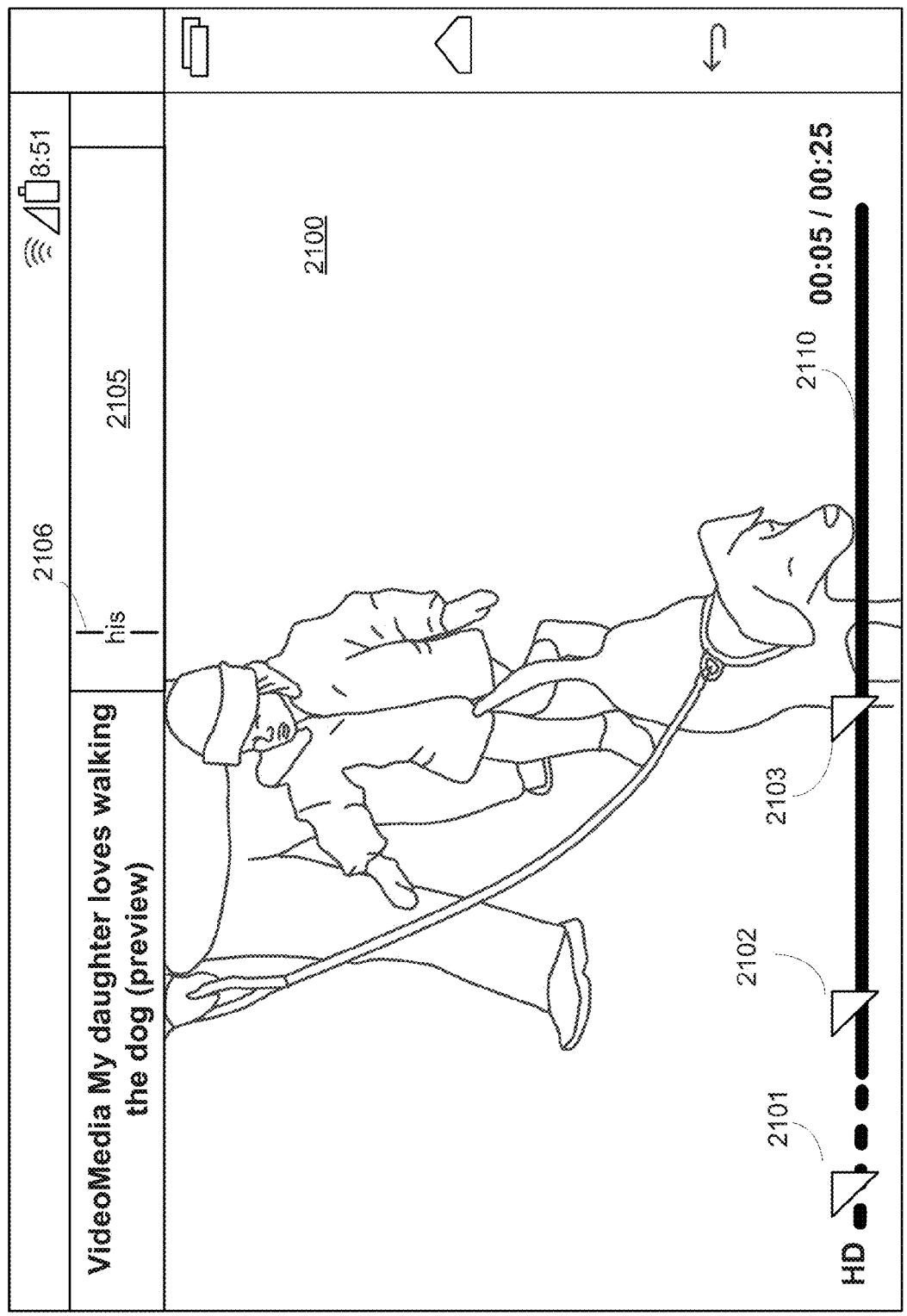
Figure 23D:
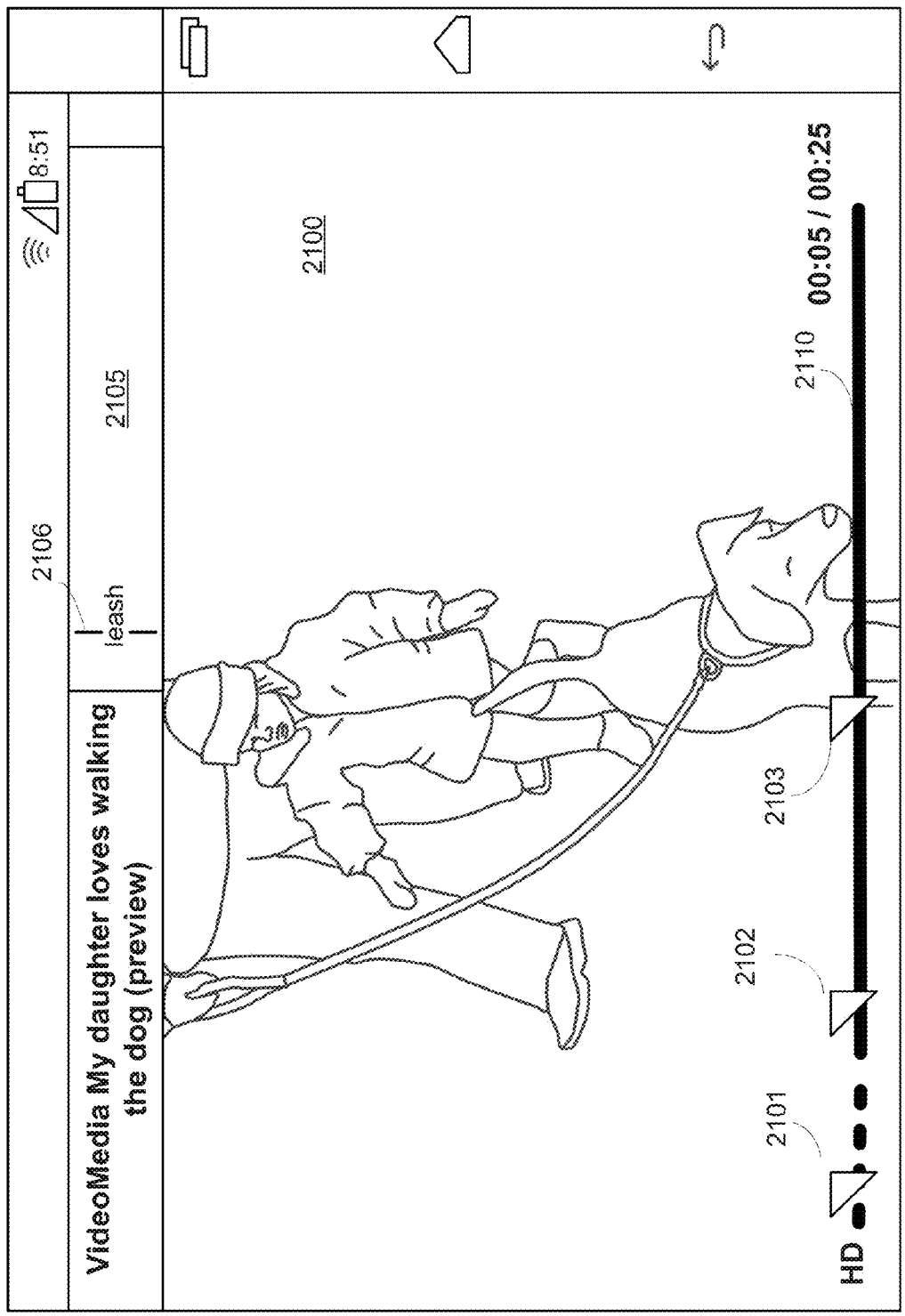
Figure 23E:
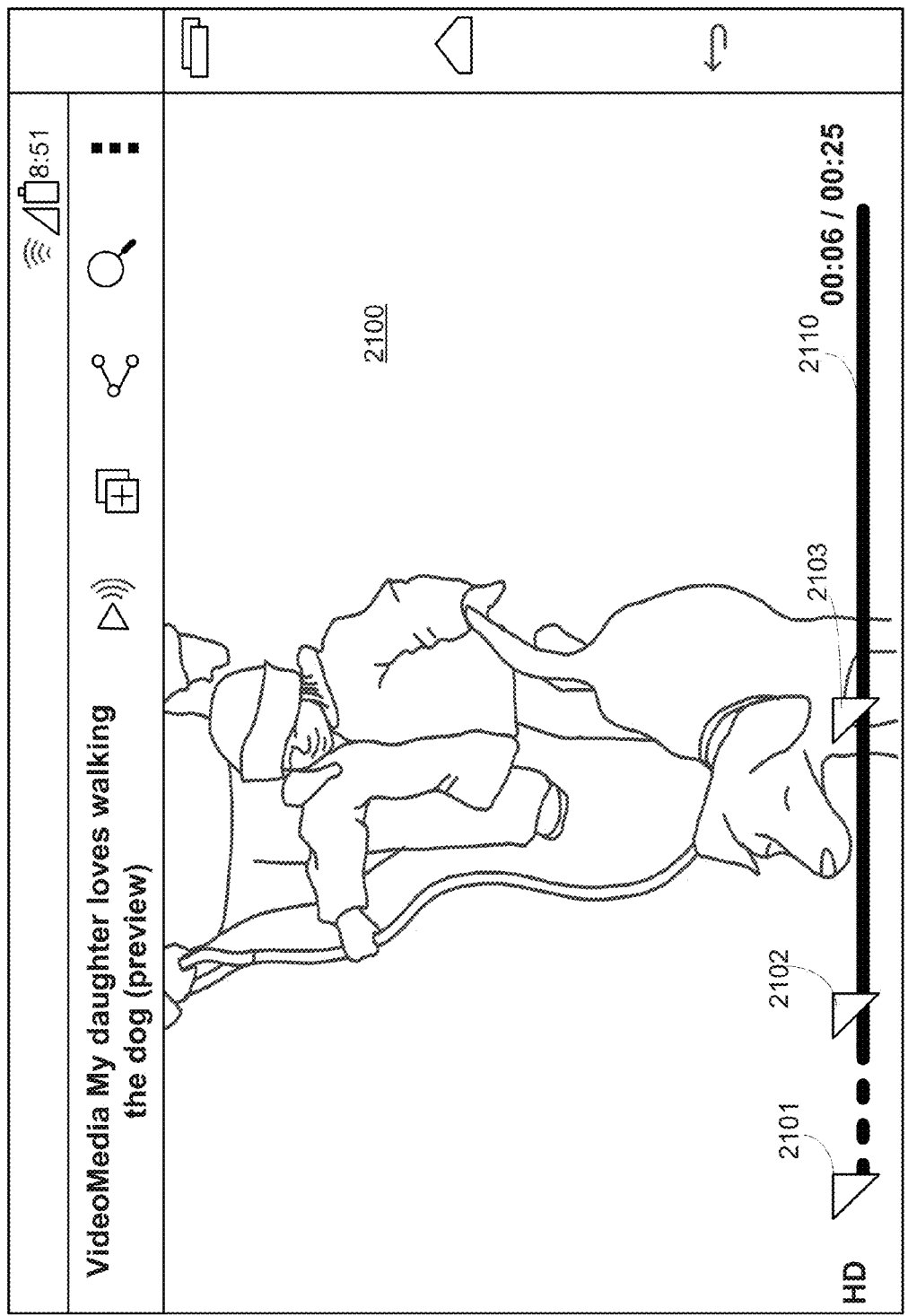
Figure 23F:
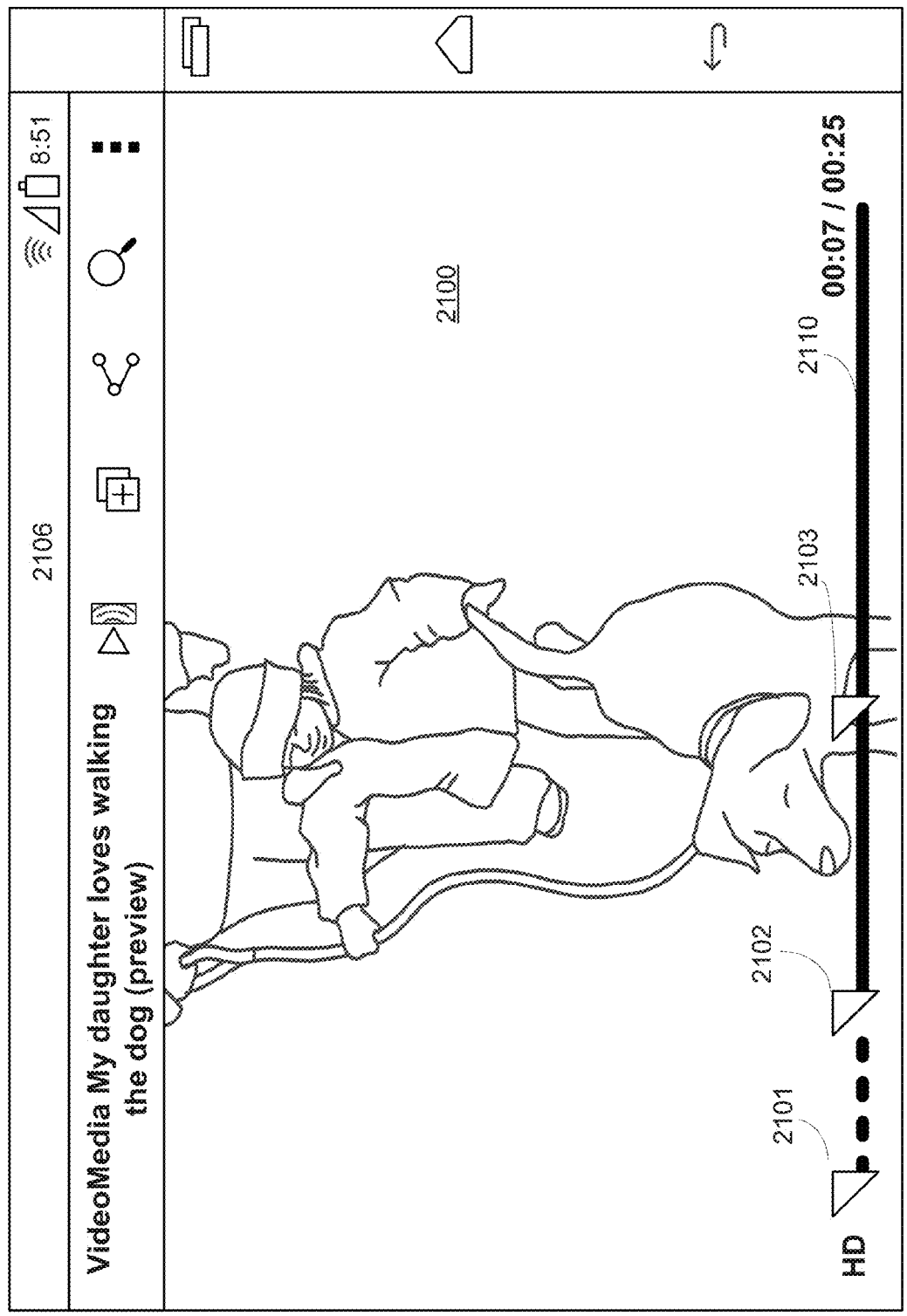
Figure 23G:
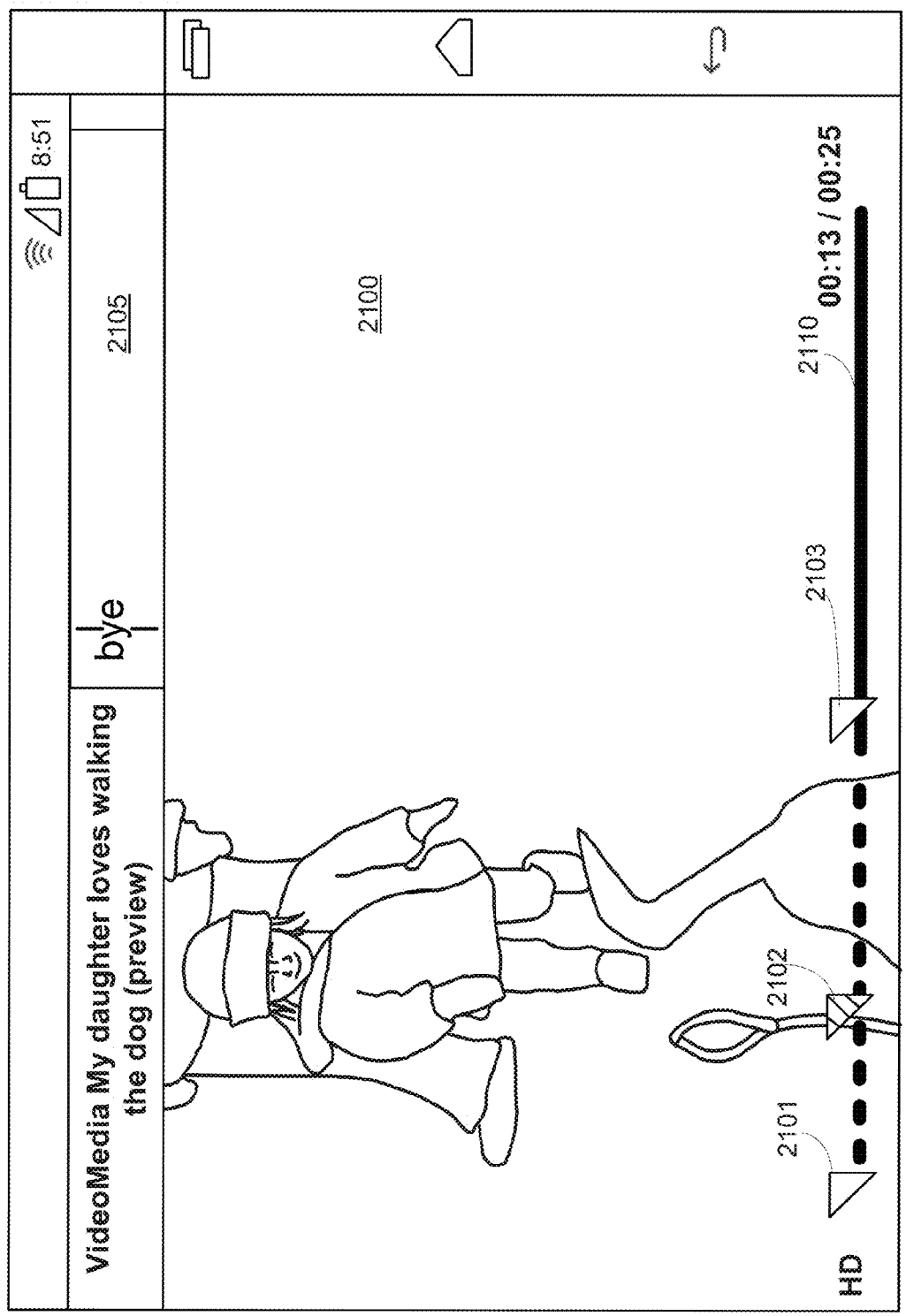
Figure 23H:
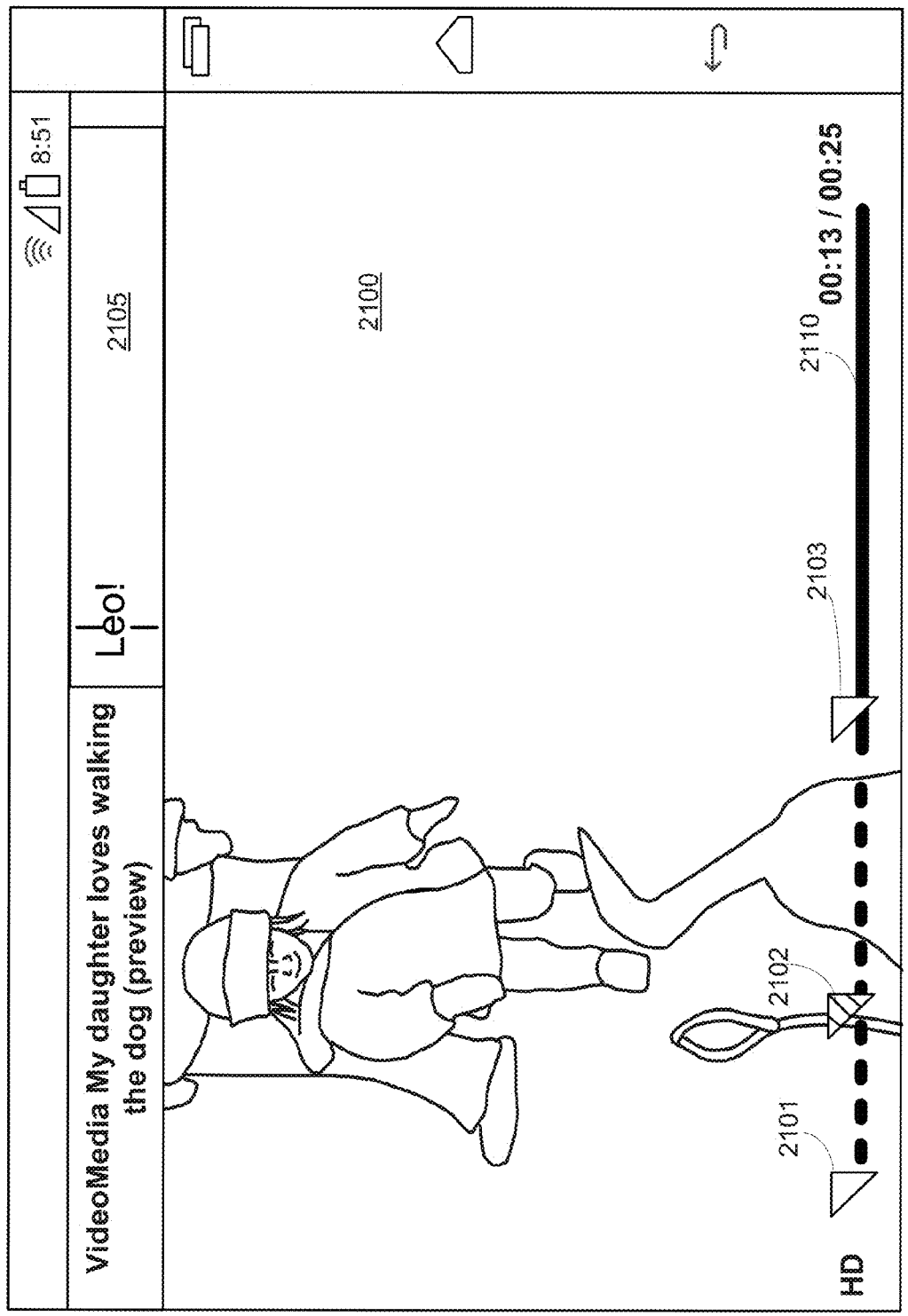
Figure 23I:
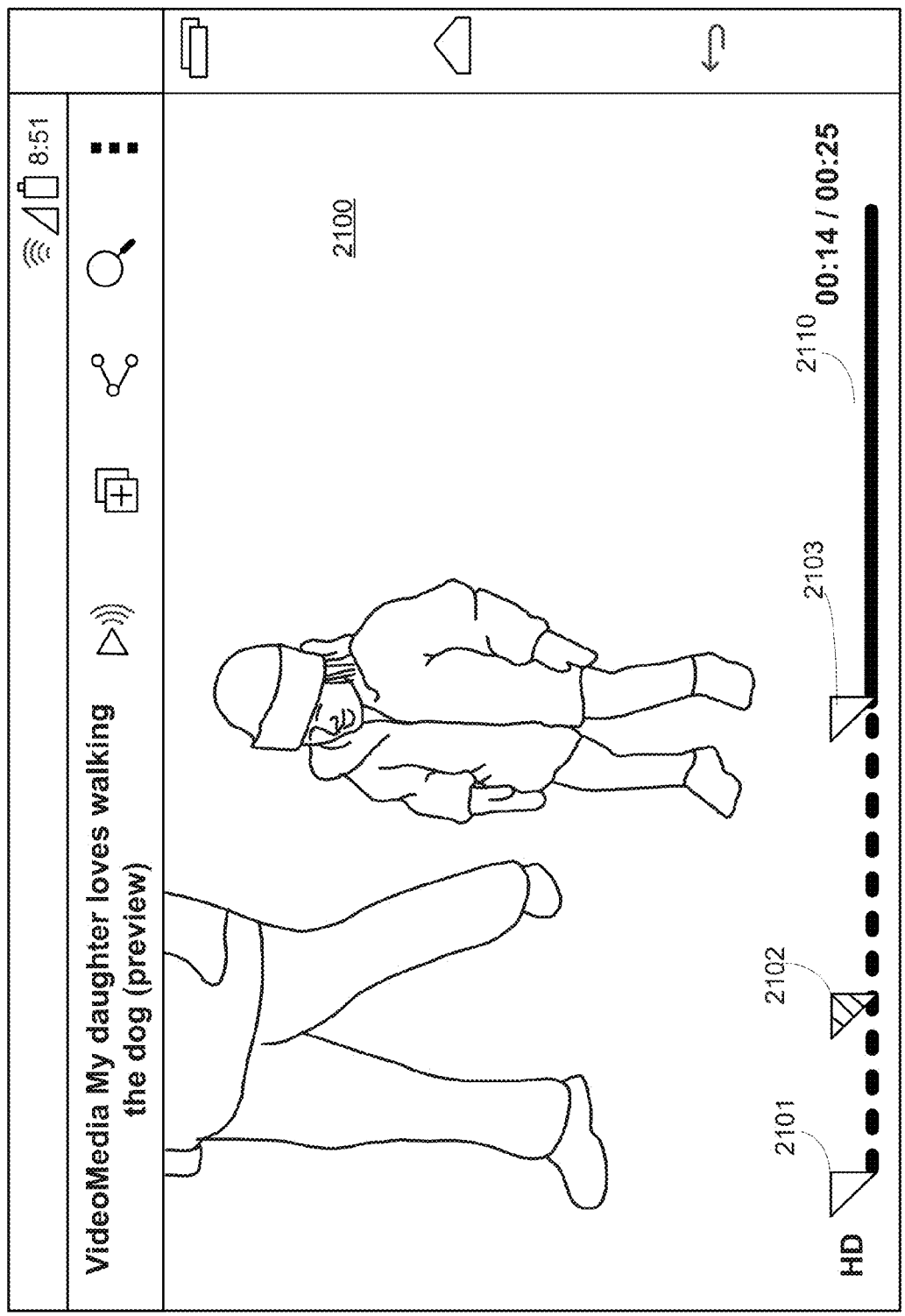

FIGS. 23a-23i show an RSVP-enabled video preview displayed by an embodiment of the present invention. In this embodiment, two excerpts, each comprising frames corresponding to a few seconds, have been selected to be included in the preview. Also, a few words of text for RSVP display have been selected to be displayed at the beginning of each excerpt. FIGS. 23a-23f show RSVP content and video frames corresponding to a first video excerpt and FIGS. 23g-23i show RSVP content and video frames associate with a second video excerpt.

FIG. 23a shows window 2100 displaying a frame at a beginning of a first excerpt, five seconds into the video. FIGS. 23a-23d show a time sequence as DRDA 2105 displays the content associated with the first excerpt. Specifically, FIG. 23a shows display at a time 1 of the word "she." FIG. 23b shows display at a second time of the word "grabs." FIG. 23c shows display at a third time of the word "his." FIG. 23d shows display at a fourth time of the word "leash." FIGS. 23e-23f show two additional video frames of the first except. In this embodiment, the initial frame of the first excerpt (5 seconds into the video) remains displayed while the RSPV content associated with the excerpt is displayed, as shown in FIGS. 23a-23d. Once that segment of RSPV content finishes, window 2100 displays the remaining frames of the first video excerpt. Two of those frames are shown in FIGS. 23e-23f.

In this embodiment, the RSPV content is displayed at the beginning of the excerpt, while the video remains frozen at five seconds into the video. However, in alternative embodiments, RSVP content associated with an excerpt including in a video preview may be presented before and/or during and/or after the playing of the video frames of the excerpt.

FIG. 23g shows window 2100 displaying a frame at a beginning of a second excerpt, thirteen seconds into the video. FIGS. 23g-23h show a time sequence as DRDA 2105 displays the content associated with the first excerpt. Specifically, FIG. 23g shows display at a first time of the word "bye." FIG. 23h shows display at a second time of the word "Leo!" FIG. 23i shows an additional video frame of the second except. In this embodiment, the initial frame of the second excerpt (thirteen seconds into the video) remains displayed while the RSPV content associated with the excerpt is displayed, as shown in FIGS. 23g-23h. Once that segment of RSPV content finishes, window 2100 displays the remaining frames of the second video excerpt. One of those frames is shown in FIG. 23i.

FIGS. 24a-24e illustrate an interface 2400 of a computerized system in accordance with an embodiment of the present invention for adding RSVP content to a video and creating or editing an RSPV-enabled preview of the video.

Figure 24A:
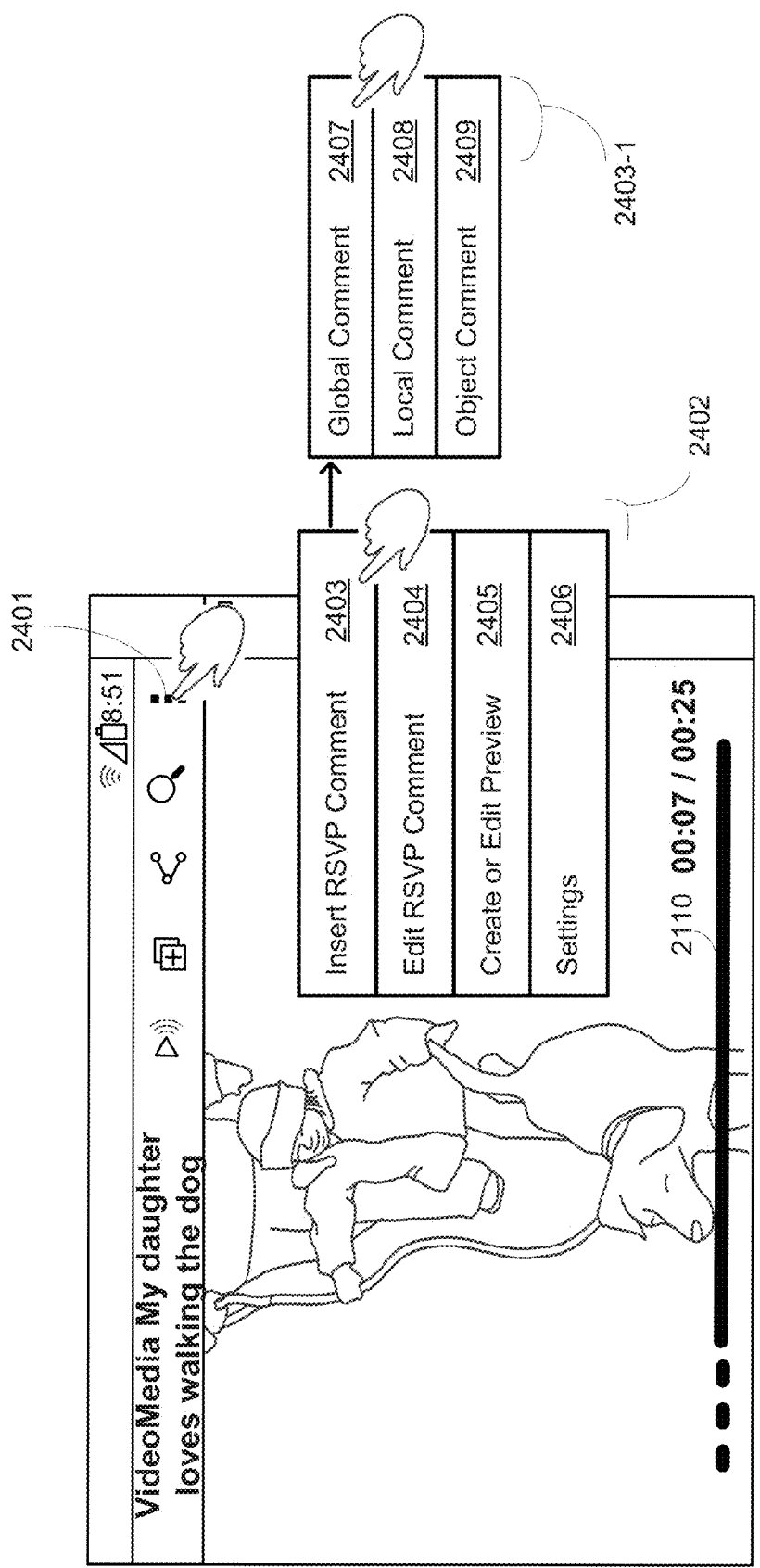
FIGS. 24a-24e illustrate an interface of a computerized system in accordance with an embodiment of the present invention for adding RSVP content to a video and creating or editing an RSVP-enabled preview of the video.

FIG. 24a illustrates an application interface menu 2402 that is activated within a video editing application by selecting menu activation icon 2401. Menu 2402 includes option 2403 for inserting an RSVP comment, option 2404 for editing an existing RSVP comment, option 2405 for creating or editing an RSPV-enabled preview, and settings option 2406.

When a user selects option 2403 from menu 2402 to insert an RSVP comment, a secondary menu 2403-1 appears. Secondary menu 2403-1 includes option 2407 for entering a global comment, option 2408 for inserting a local comment, and option 2409 for inserting an object comment. If option 2407 is selected for inserting a global comment (as shown in FIG. 24a), then a virtual keyboard appears (not separately shown) and the user can type in a comment that will be associated with the entire video. Such a comment will be displayable by RSVP upon, for example, selection of an RSVP marker displayed with a representation of the video as a video item included in a list of items as illustrated and described, for example, in the context of FIGS. 20a-20d. Alternatively, the user may be directed to speak the comment for entry by a speech recognition system (not separately shown); type the comment into a physical keyboard (not separately shown); or provide the comment through other known input techniques (not separately shown).

Figure 24B:
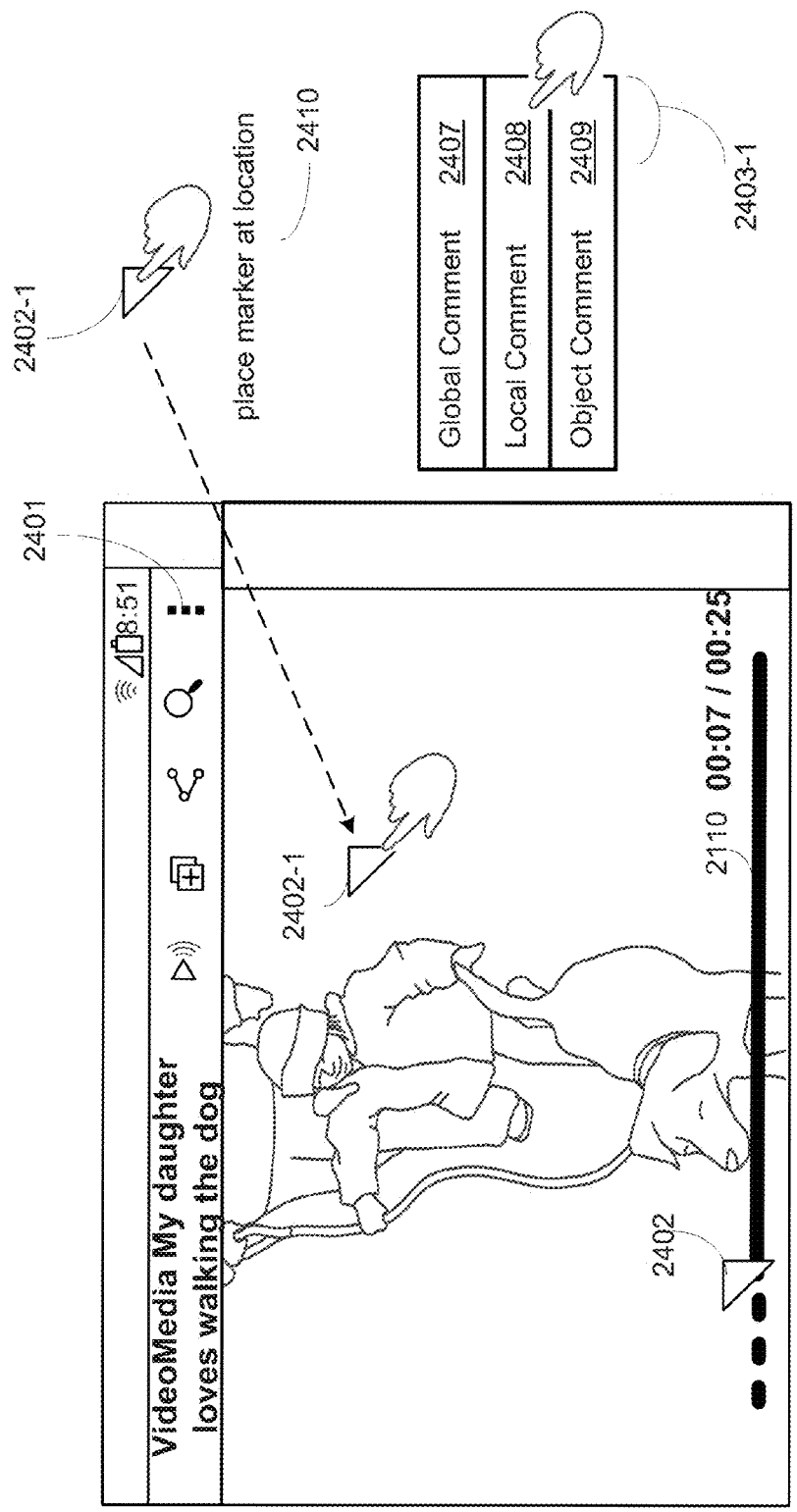

FIG. 24b illustrates further aspects of interface 2400 of FIG. 24a. In particular, when a user selects option 2408 from menu 2403-1 to insert a local RSVP comment, then an RSVP marker such as marker 2402-1 appears to the right of the video window. Instruction 2410 also appears instructing the user to place the marker at the location within the currently displaying video frame at which the user would like the RSVP marker 2402-1 to appear. After the user drags the marker to place it within the video frame, a representation 2402 of the marker also appears along progress bar 2110. Also, upon placement of the marker within the video frame, a virtual keyboard appears (not separately shown) and the user can type in a comment to be displayable by RSVP that will be associated with the displayed frame (which corresponds to a time point in the video). Alternatively, the user may be directed to speak the comment for entry by a speech recognition system (not separately shown); type the comment into a physical keyboard (not separately shown); or provide the comment through other known input techniques (not separately shown). The entered comment (whether entered by text or by speech) will be displayable by RSVP upon, for example, selection of an RSVP marker displayed during play back of the video as illustrated and described in the context of FIGS. 21b-21f.

Figure 24C:
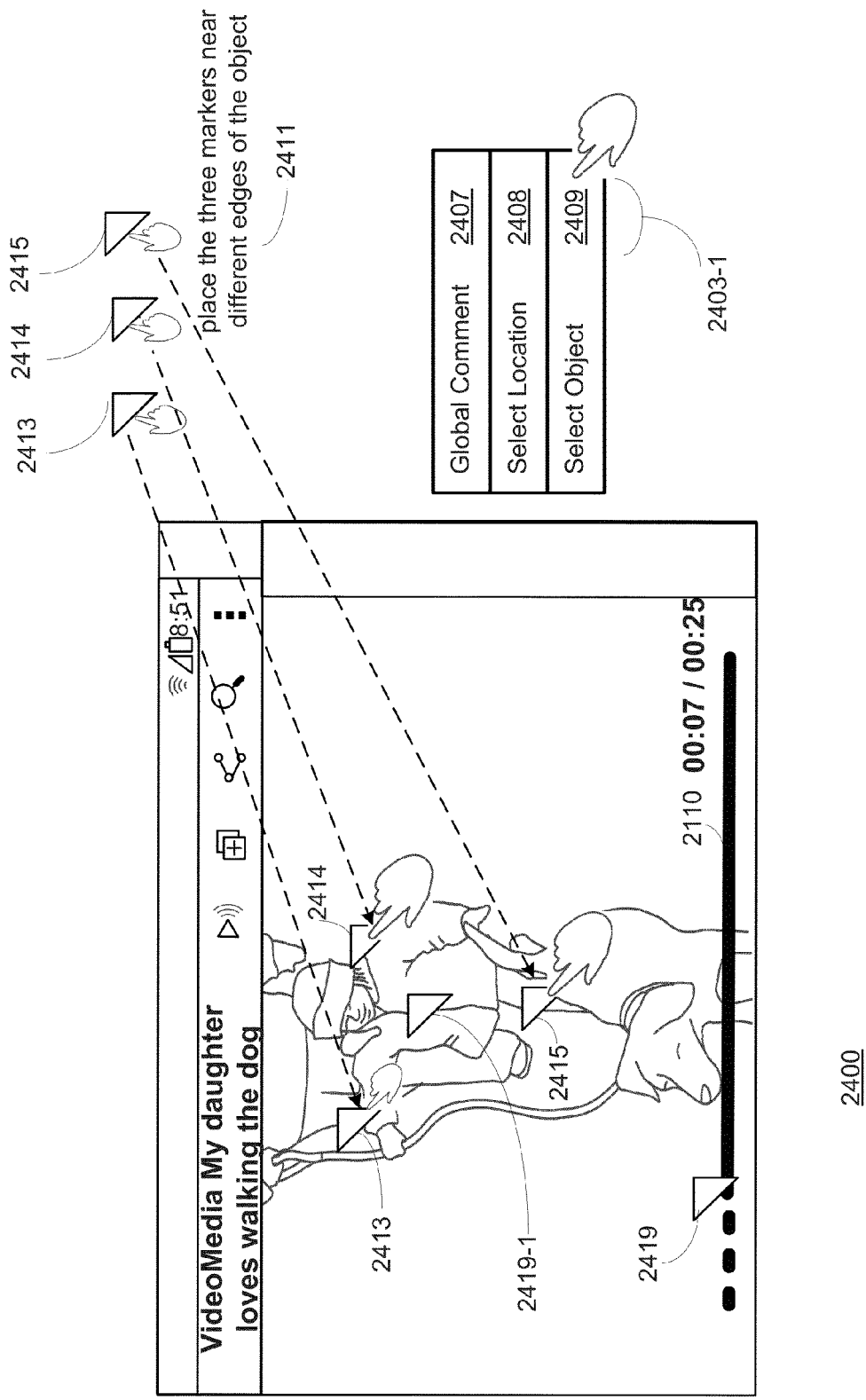

FIG. 24c illustrates further aspects of interface 2400 of FIG. 24a. In particular, when a user selects option 2409 from menu 2403-1 to insert an RSVP comment to be associated with an object, then object selection markers such as markers 2413, 2414, and 2415 appear to the right of the video window. Instruction 2411 also appears instructing the user to place the markers near different edges of the object with which the RSVP comment is to be associated. Once the user places markers 2413, 2414, and 2415 within the frame near edges of the selected object (in this example, the little girl) then RSVP marker 2419-1 appears on a spot near the center of the identified object. In one known video object recognition technique, markers on the perimeter of an object can be used to identify a "hot spot" which tracks the object as it moves in successive frames of the video. A related marker 2419 also appears on progress bar 2110 to indicate the time at which the object-related RSVP comment will first become selectable by a viewer of the video. Also, once the object is identified and the hot spot marker 2419-1 appears on the object, a virtual keyboard appears (not separately shown) and the user can type in a comment to be displayable by RSVP that will be associated with the identified object. Alternatively, the user may be directed to speak the comment for entry by a speech recognition system (not separately shown); type the comment into a physical keyboard (not separately shown); or provide the comment through other known input techniques (not separately shown). The entered comment (whether entered by text or by speech) will be displayable by RSVP upon, for example, selection of an RSVP marker displayed on the object during play back of the video as illustrated and described in the context of FIGS. 22a-22f.

Figure 24D:
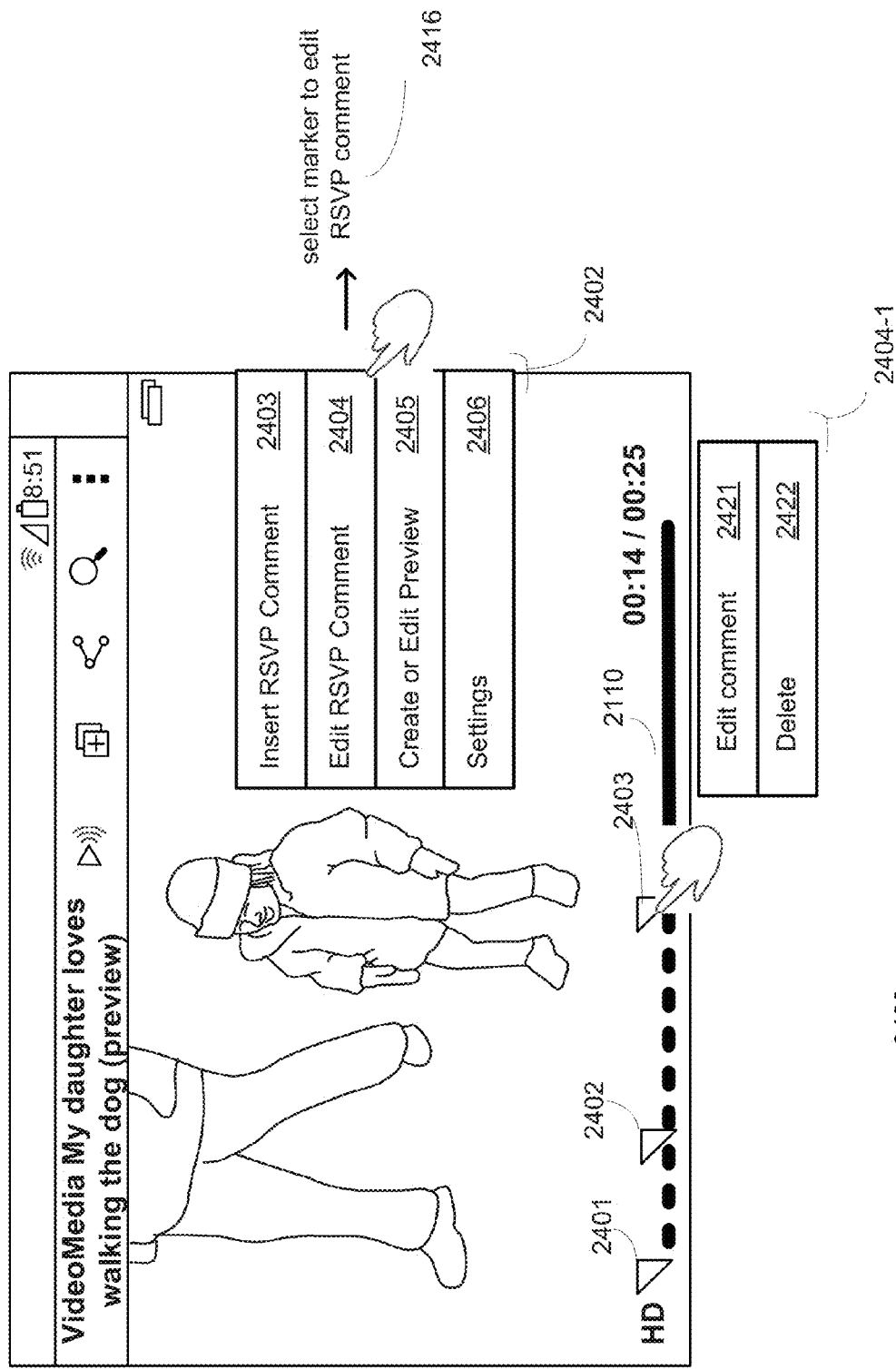

FIG. 24d illustrates further aspects of interface 2400 of FIG. 24a. When a user selects option 2404 from menu 2402 to edit an existing RSVP comment, instruction 2416 then appears asking the user to select the marker associated with the comment that the user would like to edit. This example illustrates the user selecting marker 2403. After the user indicates selection of marker 2403 (for example, by touching it on a touchscreen display), then menu 2404-1 appears. Menu 2404-1 indicates option 2421 to edit the RSVP comment or option 2422 to delete the comment. If option 2422 is selected, a confirmation button appears (not separately shown) and, if the selection to delete is confirmed, the associated marker and comment are removed from the video. If option 2421 is selected, then a virtual keyboard (not separately shown) and a window showing the text of the comment (not separately shown) appear for the user to make edits to the text of the comment. Alternatively, the user may be directed to speak edits to the comment for entry by a speech recognition system (not separately shown); type edits to the comment into a physical keyboard (not separately shown); or provide edits to the comment through other known input techniques (not separately shown).

Figure 24E:
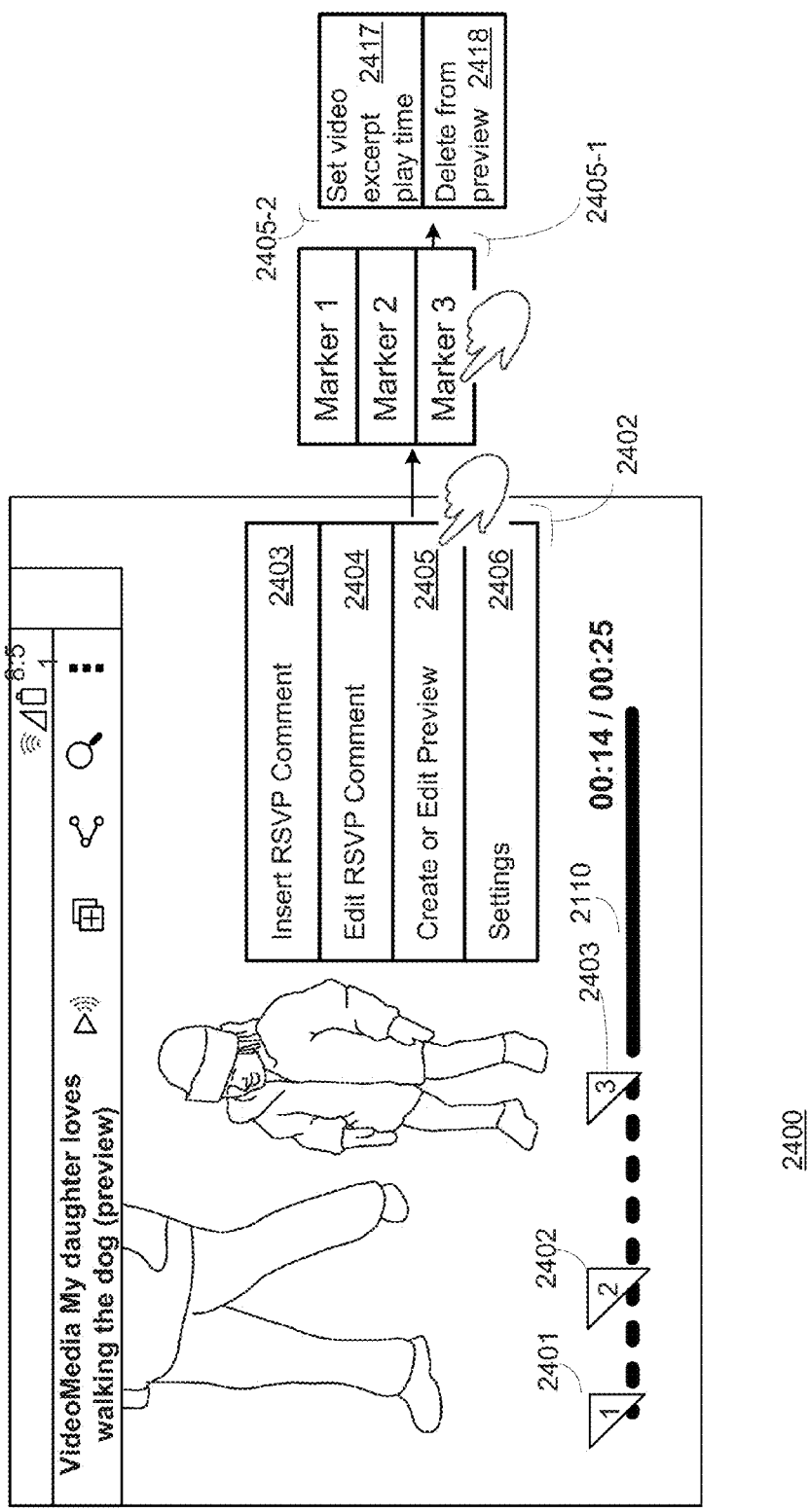

FIG. 24e illustrates further aspects of interface 2400 of FIG. 24a. When a user selects option 2405 from menu 2402 to create or edit an RSVP preview, then secondary menu 2405-1 appears including options for each marker along progress bar 2110 including markers 2401, 2401, and 2403, which are referenced respectively in menu 2405-1 by selectable options for "Marker 1," "Marker 2," and "Marker 3."

The interface also displays the numerals 1, 2, 3 on those markers along the timeline for the user's reference. This example shows the user selecting "Marker 3" from menu 2405-1. A tertiary menu 2405-2 then appears including option 2417 for setting the duration of the video excerpt that is to be displayed in the preview along the RSVP content associated with this marker. Menu 2405-2 also includes option 2418 for deleting Marker 3 and its associated RSVP and video content from a video preview created by the user. Upon selection of option 2417, a user interface (not separately shown) appears allowing the user to enter a video excerpt duration in seconds or in frames that will include video frames including and immediately following the time point of the marker. The interface may be implemented through a virtual keyboard, speech recognition feature, or other human-to-computer interface.

FIGS. 25a-25k illustrate an augmented reality (AR) application supplemented by RSVP content in accordance with an embodiment of the present invention. AR is well known and typically involves viewing real world objects through an AR viewer which provides information about those objects. One example of a device in which an AR viewer may be implemented is a camera view finder associated with a smart phone camera application. Another example is through a head mounted or other near eye display. Examples of such displays and associated RSVP implementations are illustrated and described further in the context of FIGS. 26a-26c and 27a-27d. In some implementations, the user may view the real world either directly (unmediated by any optical material) or through an optical material, and then view relevant information about the real world objects in a near-eye display placed near or in a portion of the user's field of vision. Such implementations are compatible with embodiments of the present invention. However, the implementation illustrated in FIGS. 25a-25k assumes that the user is viewing the real world through an AR application window implemented in conjunction with a camera view finder of a smartphone.

Figure 25B:
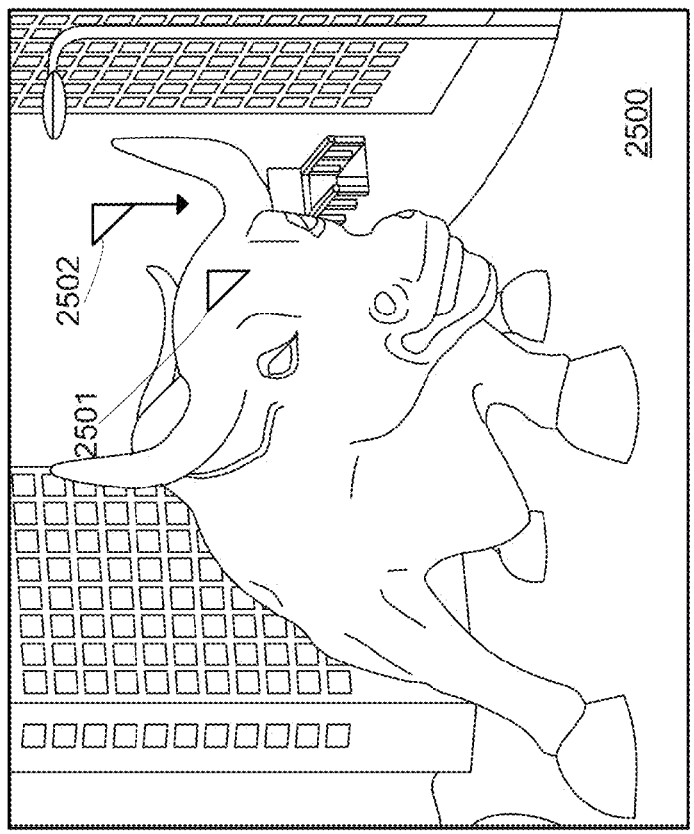
FIGS. 25a-25k illustrate an augmented reality (AR) application supplemented by RSVP content in accordance with an embodiment of the present invention.
Figure 25A:
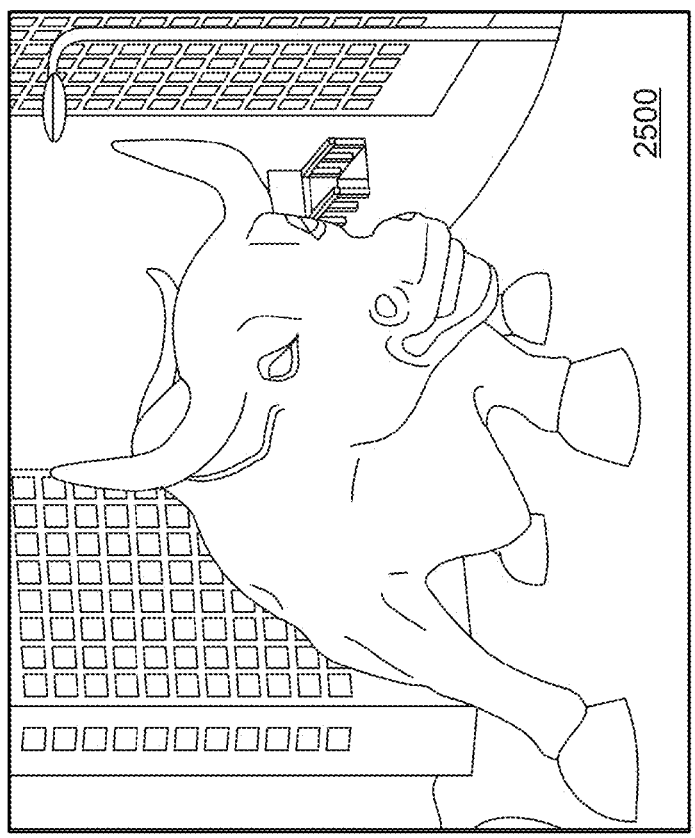

FIG. 25a illustrates an AR application window 2500 prior to activation of AR-related display objects. As shown, a user is viewing a real-world urban scene (in New York City) through the screen view of a smart phone camera application (which typically is able to display a real-world scene on the smart phone display screen).

FIG. 25b illustrates the same scene after the associated AR application has recognized particular real world objects. As shown, window 2500 now displays markers 2501 and 2502 to indicate the presence of RSVP content associated with particular real world objects. Specifically, marker 2501 indicates the presence of RSVP content associated with the statue of a bull and marker 2502 indicates the presence of RSVP content associated with the subway station entrance located by the bull and visible just beneath the bull's left ear.

Figure 25D:
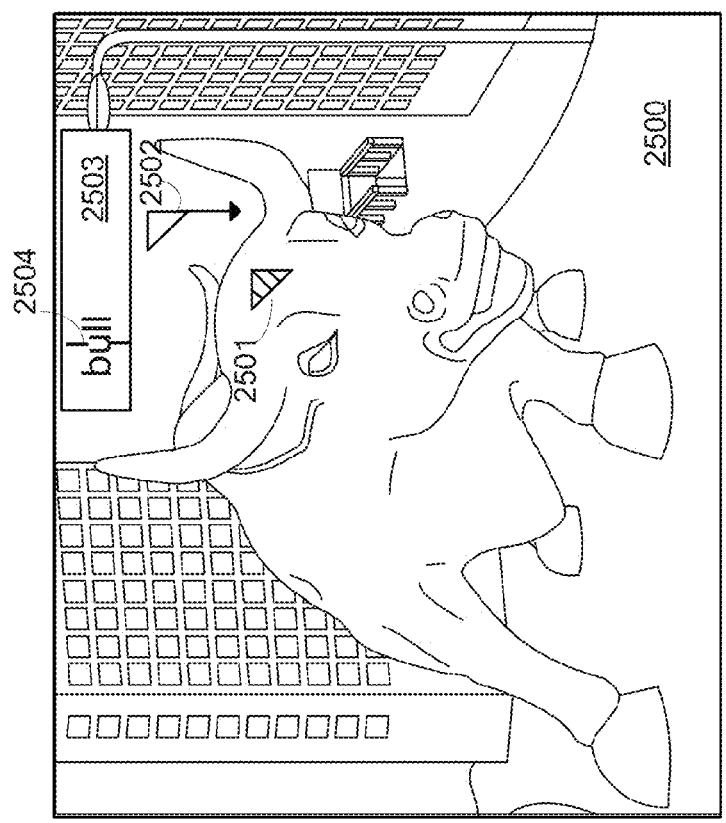
Figure 25C:
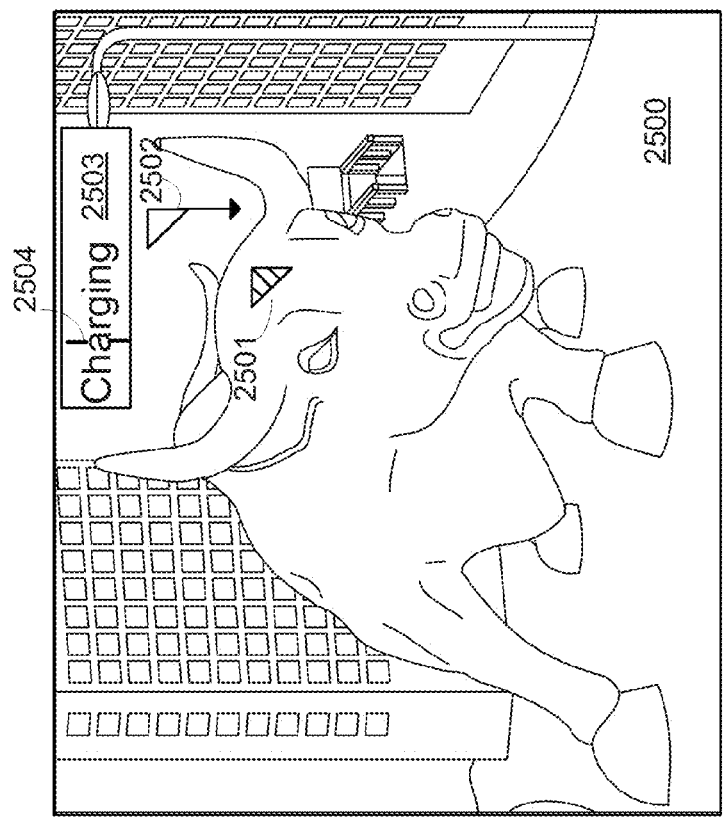
Figure 25F:
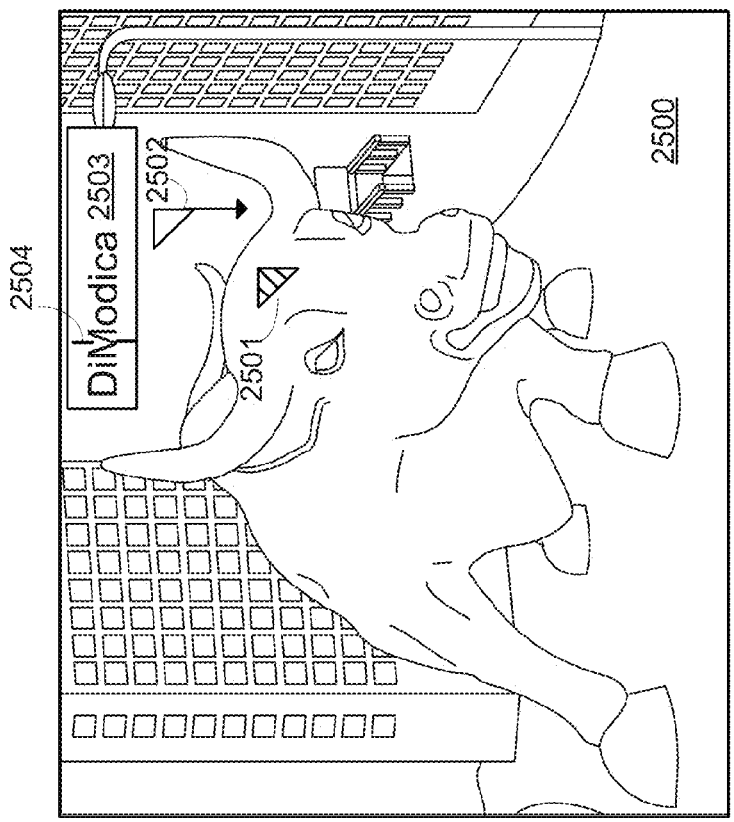
Figure 25E:
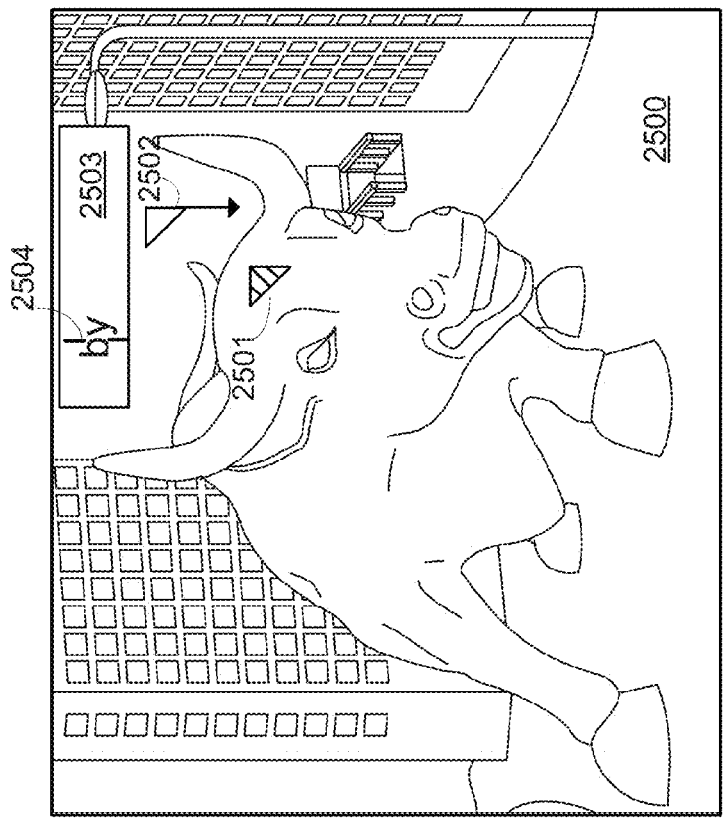

FIGS. 25c-25f show a time sequence of the display of RSVP content associated with the statue after a user-interface action indicates selection of marker 2501. Upon selection of the marker, DDRA 2503 appears and begins displaying words. In this embodiment, DDRA displays the words such that an optimal recognition character position is place a fixed location of the display indicated by hash marks 2504. FIG. 25c shows display of the word "Charging" at a first time. FIG. 25d shows display of the word "Bull" at a second time. FIG. 25e shows display of the word "by" at a third time. FIG. 25f shows display of the word "DiModica" at a fourth time. Window 2500 shows marker 2501 as grayed out in FIGS. 25c-25f to indicate that display of the RSVP content associated with the marker has been initiated. In the illustrated embodiment, the marker is grayed out as soon as the associated RSVP display begins. In alternative embodiments, the marker can be grayed out when or after the RSVP display is finished.

Figure 25G:
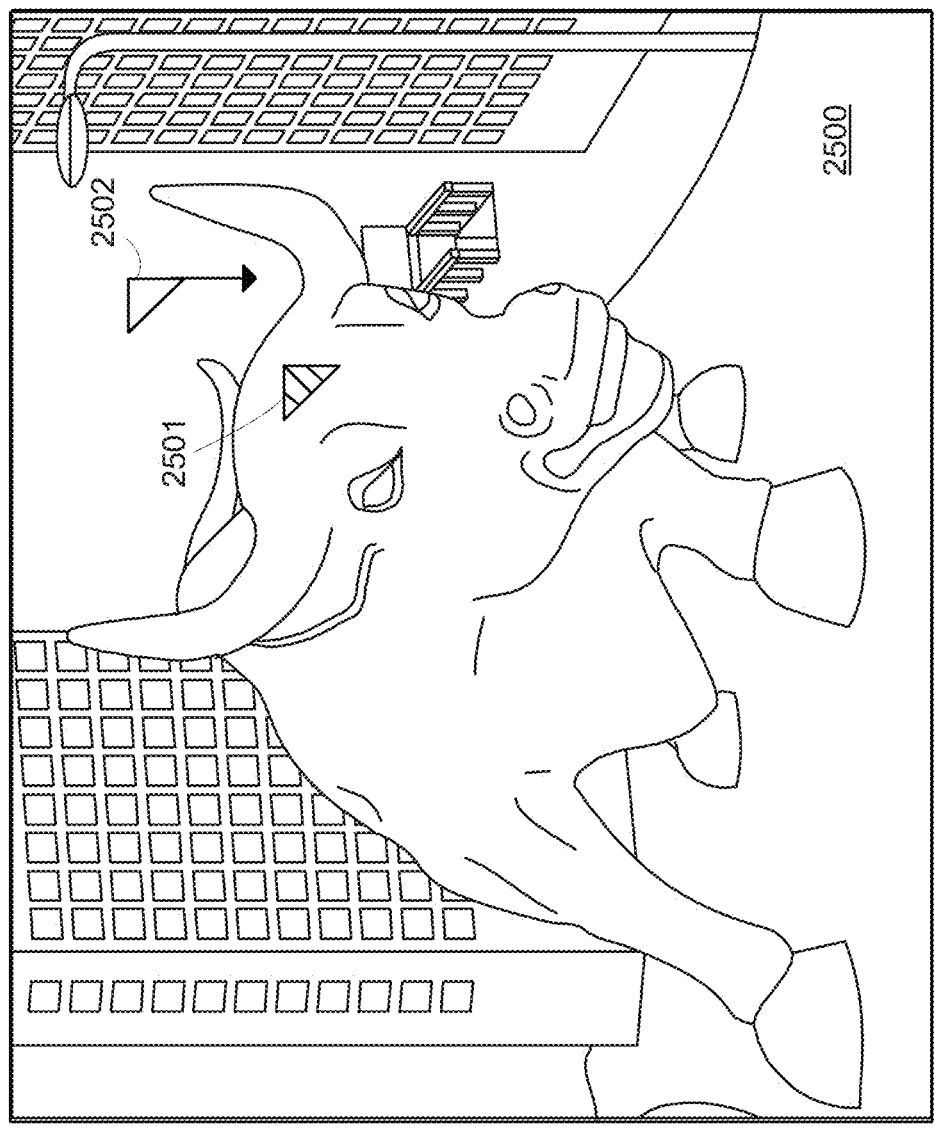

FIG. 25g shows window 2500 after the RSVP content associated with marker 2501 has finished displaying. In this embodiment, the DDRA is no longer displayed when RSVP content is either not selected or has finished displaying. This minimizes obstruction of the user's view of real world objects when RSPV content is not actively displaying. However, in alternative embodiments, a DDRA such as DDRA 2503 may remain on the display view when RSVP content is temporarily not displayed.

Figure 25I:
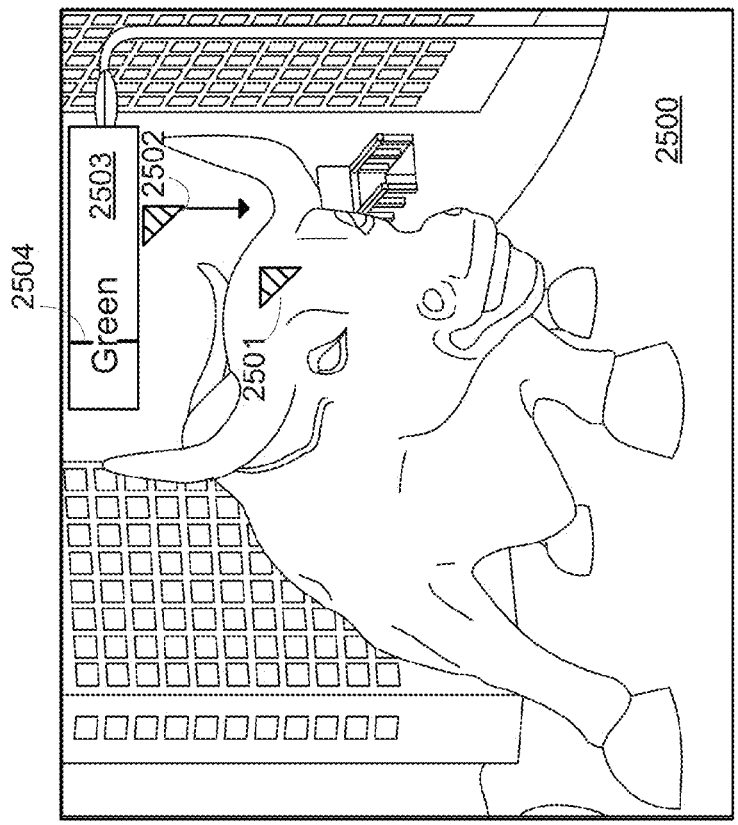
Figure 25H:
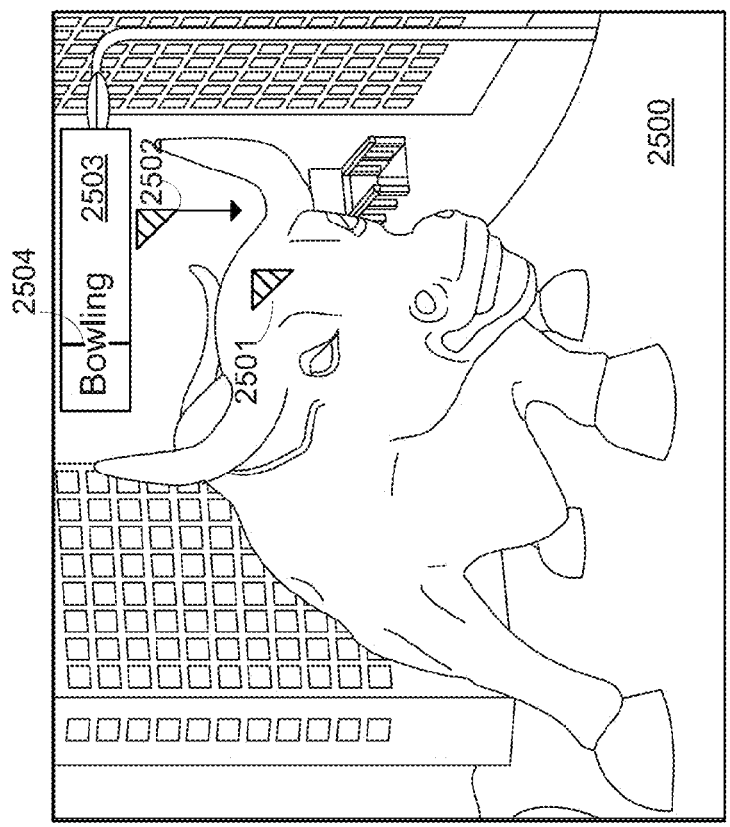
Figure 25K:
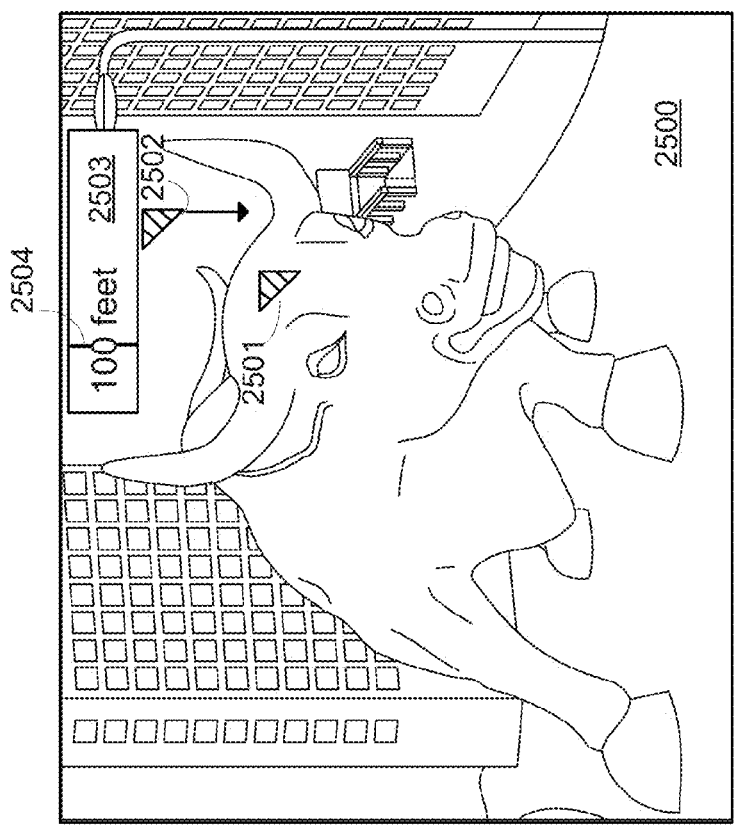
Figure 25J:
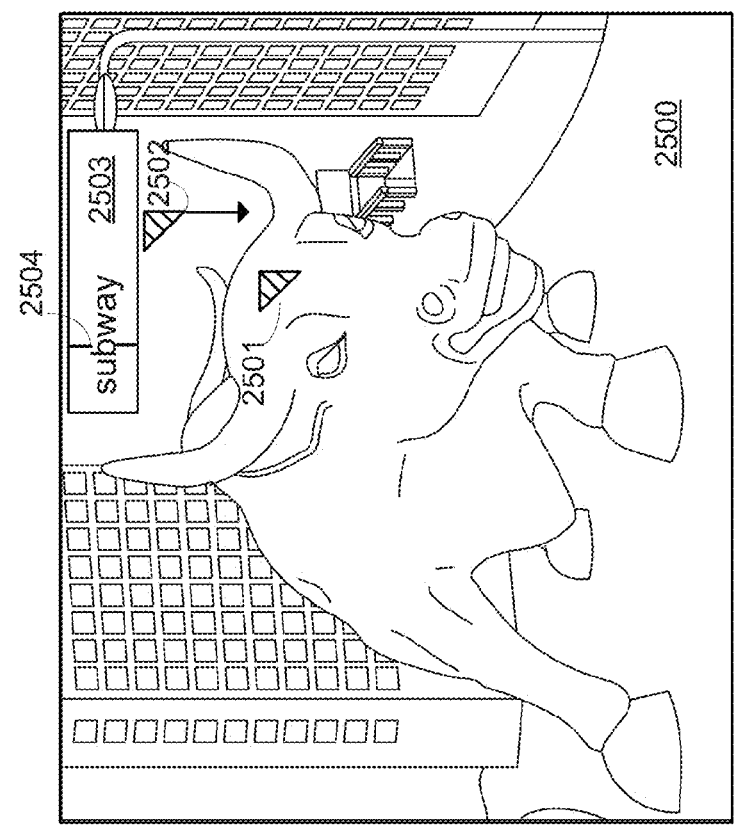

FIGS. 25h-25k show a time sequence of the display of RSVP content associated with the subway entrance after a user-interface action indicates selection of marker 2502. Upon selection of the marker, DDRA 2503 appears again and begins displaying words. FIG. 25h shows display of the word "Bowling" at a first time. FIG. 25i shows display of the word "Green" at a second time. FIG. 25j shows display of the word "Subway" at a third time. FIG. 25k shows display of the word "100 feet" at a fourth time. Window 2500 shows marker 2502 as grayed out in FIGS. 25h-25k to indicate that display of the RSVP content associated with the marker has been initiated.

Figure 26C:
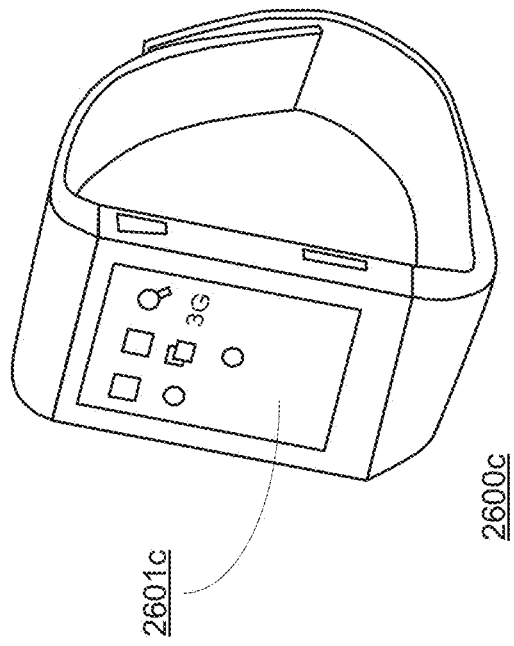
FIGS. 26a-26c show examples of various types of alternative known display devices in which embodiments of the invention might be implemented.
Figure 26A:
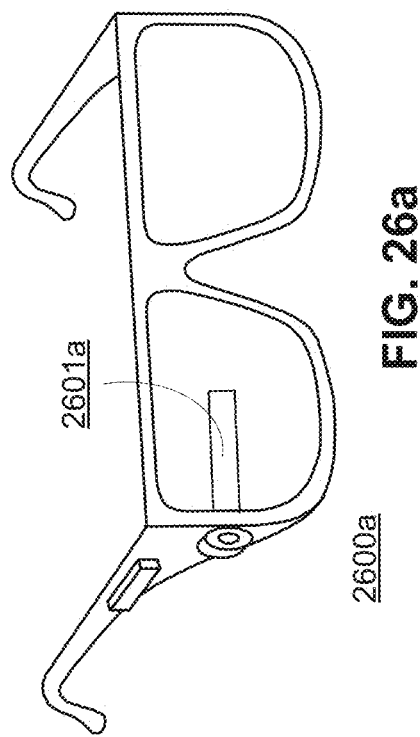
Figure 26B:
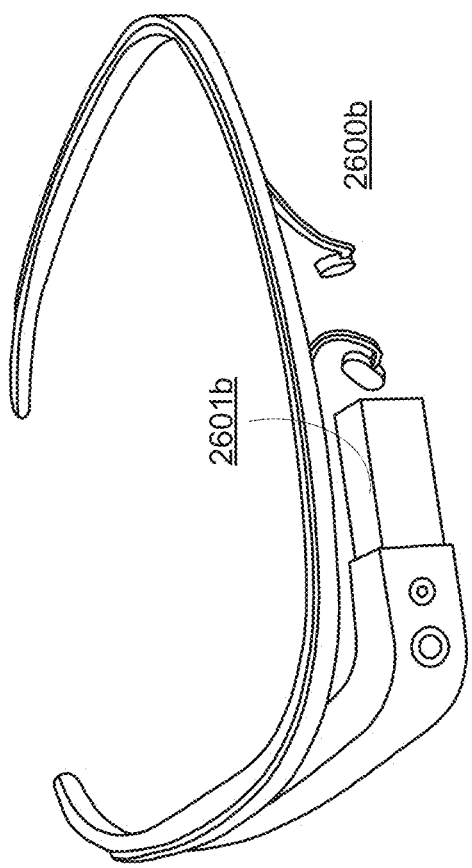

FIGS. 26a-26c show various types of alternative known display devices in which embodiments of the invention might be implemented. While particular embodiments of the invention can be implemented in the context of any electronic device capable of displaying information, small screen display devices such as smart phones and other devices derive particular benefits from the ability of invention embodiments to increase the amount and speed of information displayable within a limited screen space. Other embodiments of the invention have already been illustrated and described in the context of smart phone displays. However, FIGS. 26a-26c show alternative displays devices which also have a particular need for the benefits provided by implementation of embodiments of the present invention. FIG. 26a illustrates a head mounted display HMD device 2600a implemented in the form factor of traditional eyeglasses. In particular, device 2600a includes display 2601a. FIG. 26b illustrates another HMD device 2600b, which includes display 2601b. FIG. 26c illustrates a smart watch device 2600c including a display 2601c.

Figure 27A:
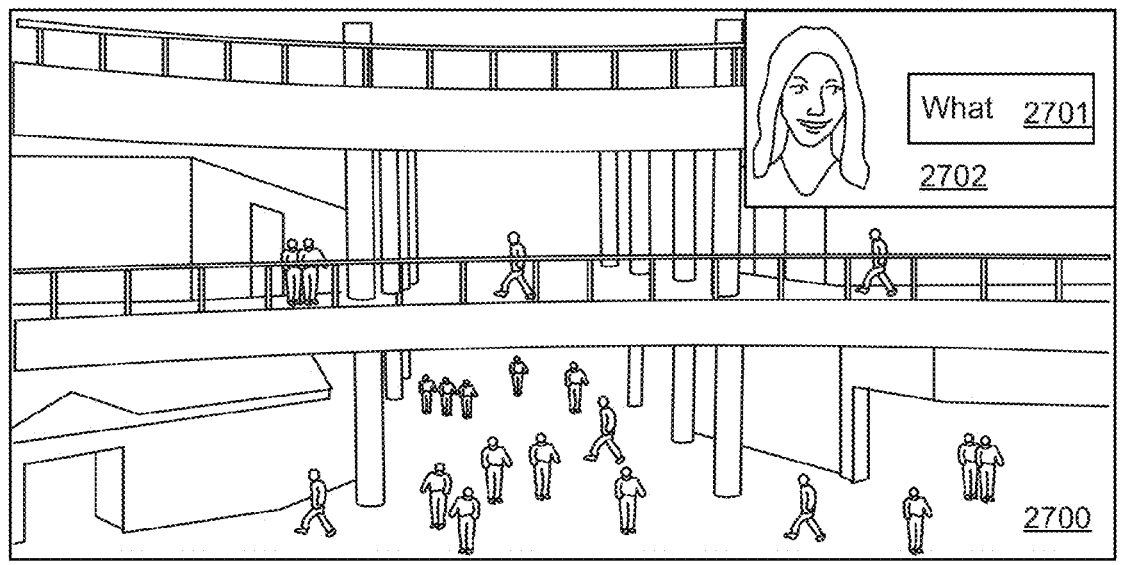
FIGS. 27a-27d show a time sequence of display of RSVP content in an RSVP-enabled interface implemented in a head-mounted display ("HMD") device such as, for example, one of the HMD devices shown in FIGS. 26a-26b.
Figure 27B:
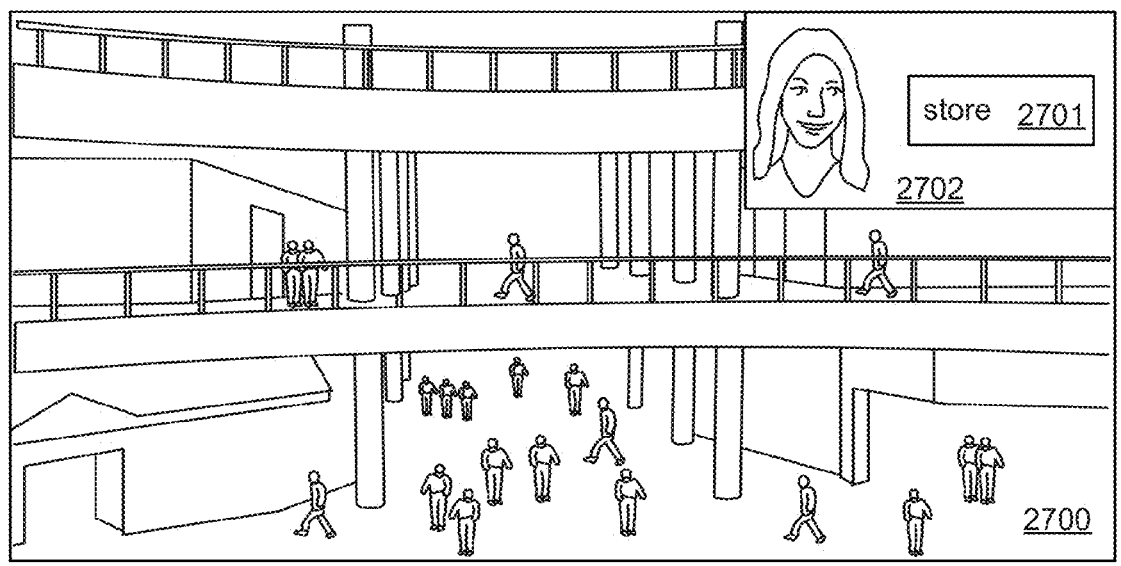
Figure 27C:
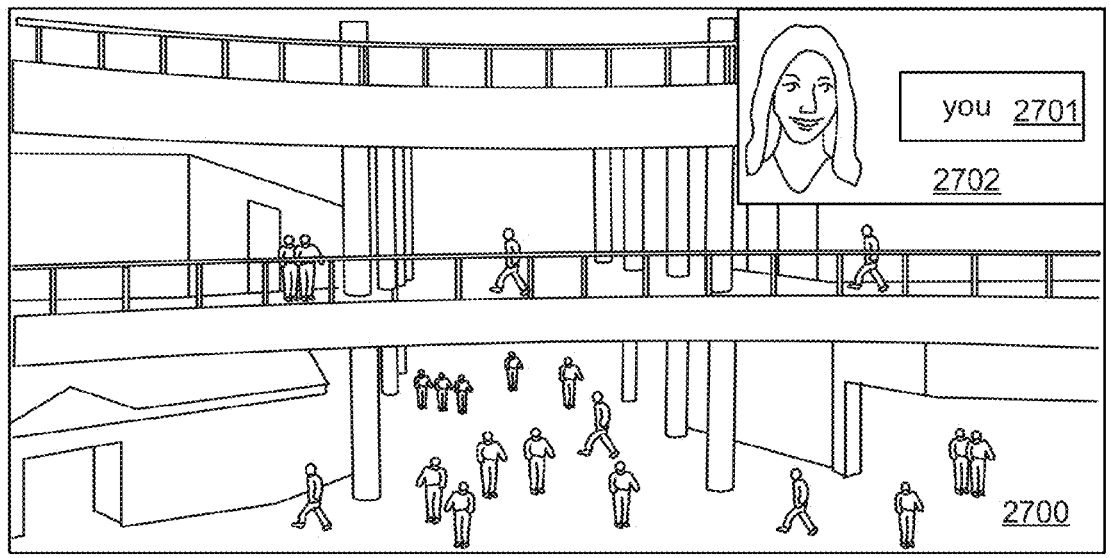
Figure 27D:
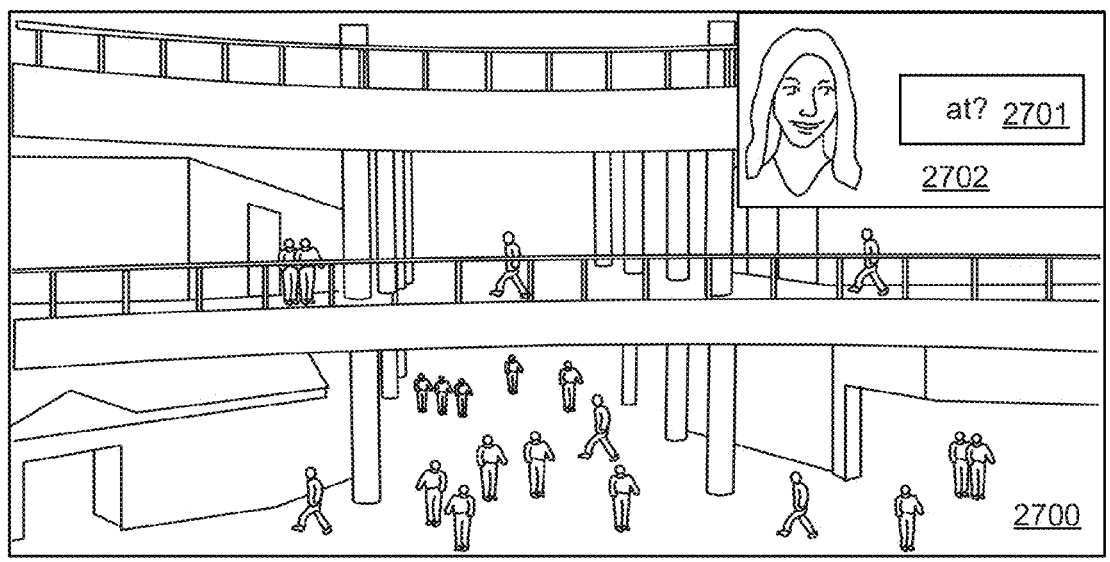

FIGS. 27a-27d show a time sequence of display of RSVP content in an RSVP-enabled interface implemented in an HMD device such as, for example, one of the HMD devices shown in FIGS. 26a-26b. Window 2700 shows the user's field of vision from inside of a shopping mall. The RSVP content is displayed within DRDA 2701 on display 2702. In this example, the user is receiving a message from a friend who is also at the mall. FIG. 27a shows display of the word "What" at a first time. FIG. 27b shows display of the word "store" at a second time. FIG. 27c shows display of the word "you" at a third time. FIG. 27d shows display of the word "at?" at a fourth time.

Figure 28A:
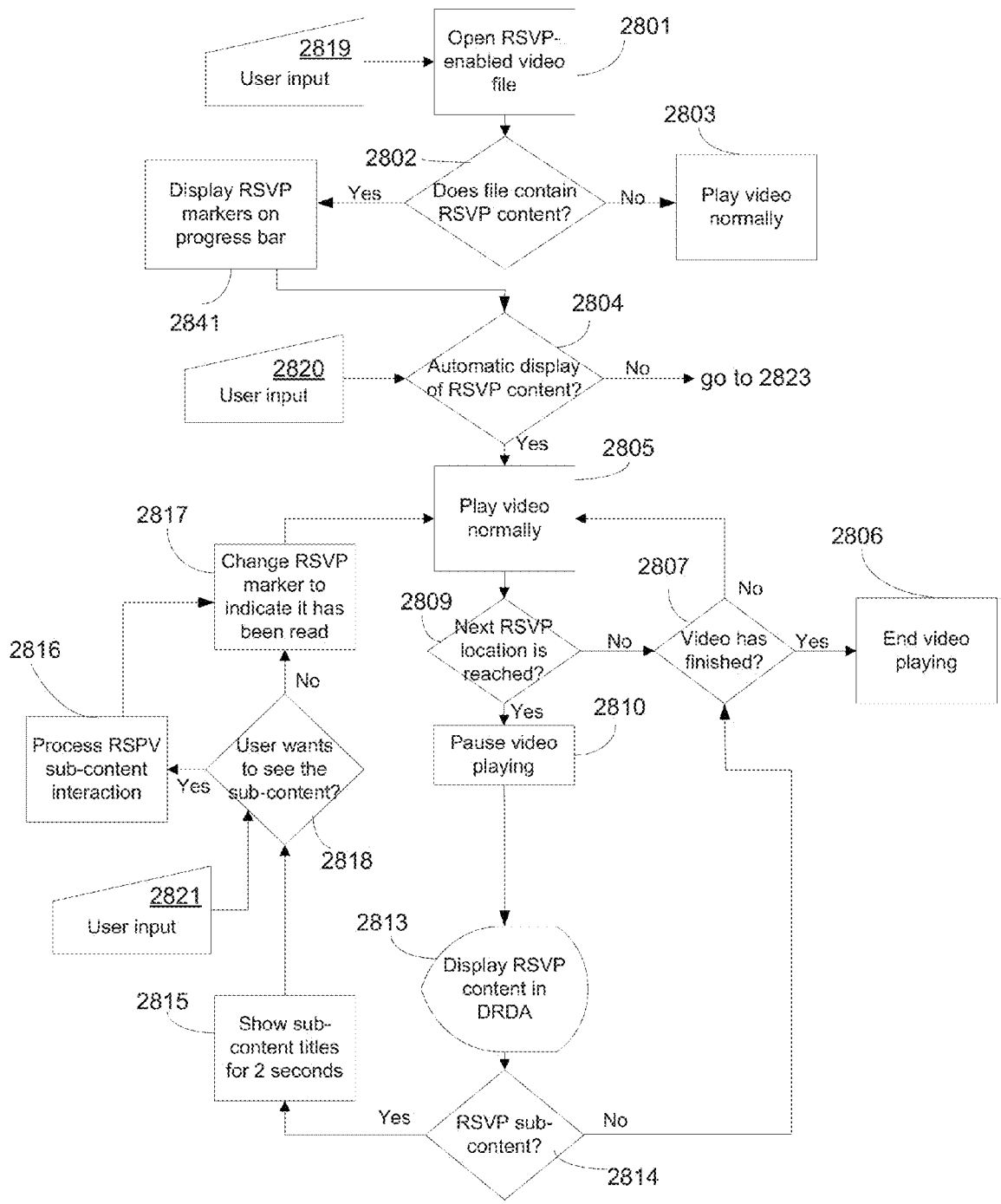
FIGS. 28a-28b show a process flow implemented by a computer system in accordance with an embodiment of the present invention for displaying RSVP content within a video player application.
Figure 28B:
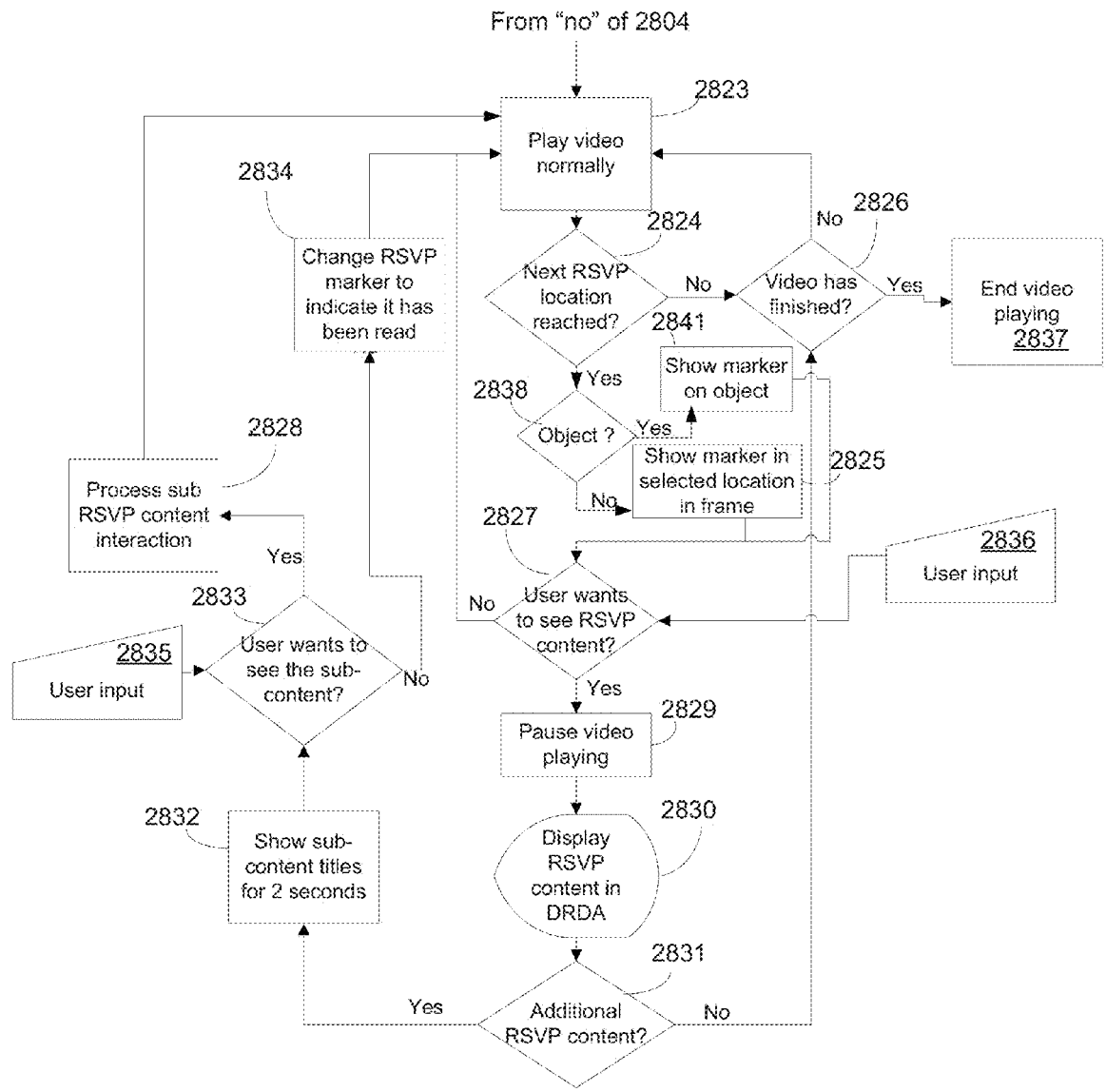

FIGS. 28a-28b show a process flow for a method 2800 implemented by a computer system in accordance with an embodiment of the present invention for displaying RSVP content within a video player application. Method 2800 may be implemented, for example, on a user device executing a video player application such as application 210a of FIG. 2b that is enabled to process RSPV content by RSVP software 211a which utilizes RSVP library 204.

Referring to FIG. 28a, step 2801 opens an RSVP-enabled video file in response to user input 2819. Step 2802 determines whether the file contains any RSVP content. If no, then step 2803 proceeds to play the video in accordance with the video application's normal (i.e., non-RSPV) video playing execution. If yes, the step 2841 displays one or more RSVP markers along the video progress bar/time line. Step 2804 determines whether the user has chosen (based on user input 2820) to have RSPV content in the video file be played automatically. If no, the method proceeds to step 2823 of FIG. 28*b* (described further below). If yes, then step 2805 begins playing the video content. In some embodiments, user input 2820 may be provided after each RSVP-enabled video file is opened. In other embodiments, user input 2820 may be provided through a user settings interface for determining default user preferences with respect to RSVP-enabled video playback (settings interface not separately shown).

During video playback by step 2805, step 2809 determines whether the next RSVP location in the video file has been reached. If no, then step 2807 determines whether the video has finished. If yes, then video playback ends at step 2806. If no, then step 2805 continues playing the video. However, if the result of step 2809 is yes, then step 2810 pauses video playback. Step 2813 displays the associated RSVP content in a DRDA.

Step 2814 determines whether there is RSVP sub-content associated with the RSVP content displayed in step 2813. If no, then the method proceeds to step 2807. If yes, then step 2815 display titles for the sub-content (see, e.g., the example shown in FIG. 7*d*). In this embodiment, the titles of sub-content are shown for 2 seconds. However, alternatives may show the titles for different amounts of time. Step 2818 determines whether user input 2821 has indicated that the user has selected to view the sub-content. If no, then step 2817 changes the marker corresponding to the primary RSVP content to indicate that it has been read (e.g., by graying it out as illustrated in previous figures). If yes, then step 2816 displays the sub-content in the DRDA (see, e.g., as shown in FIGS. 7*e*-7*h*). When the sub-content is finished displaying, then step 2817 changes the RSVP marker as previously described and the method returns to step 2804 to continue playing the video while step 2809 determines whether the next RSVP content segment has be reached during video playback.

Referring to FIG. 28*b*, if RSVP content has not been designated to display automatically in step 2804 (FIG. 28*a*), then step 2823 proceeds to play the video in accordance with the video application's normal video playing execution. During video playback, step 2824 determines whether the next RSVP location in the video file has been reached. If no, then step 2826 determines whether the video has finished. If yes, then video playback ends at step 2837. If no, then step 2823 continues playing the video. However, if the result of step 2824 is yes, then step 2838 determines whether the RSVP content at the current video location is object based (e.g., as shown and described in the context of FIGS. 22*a*-22*f*). If yes, then step 2841 shows an RSPV marker on the relevant object in the video frame. If no, then step 2825 shows an RSVP marker in the frame in a designated location (see, e.g., marker 2102-1 in FIG. 21*b*; in some embodiments, the location may have been designated by an RSVP content author as illustrated in FIG. 24*b* with respect to marker 2402-1).

Step 2827 determines, based on user input 2836, whether the user has selected to view the RSVP content associated with any of the marker(s) currently displayed in the video frame. If no, then the method returns to step 2823. If yes, then step 2829 pauses video playing and step 2830 displays the corresponding textual content in a DRDA using RSVP.

Step 2830 determines whether there is RSVP sub-content associated with the RSVP content displayed in step 2831. If no, then the method proceeds to step 2826. If yes, then step 2832 display titles for the sub-content. Step 2833 determines whether user input 2835 has indicated that the user has selected to view the sub-content. If no, then step 2834 changes the marker corresponding to the primary RSVP content to indicate that it has been read (e.g., by graying it out as illustrated in previous figures). If yes, then step 2828 displays the sub-content in the DRDA. When the sub-content is finished displaying, then step 2834 changes the RSVP marker as previously described and the method returns to step 2823 to continue playing the video while step 2824 determines whether the next RSVP content segment has been reached during video playback.

Figure 29A:
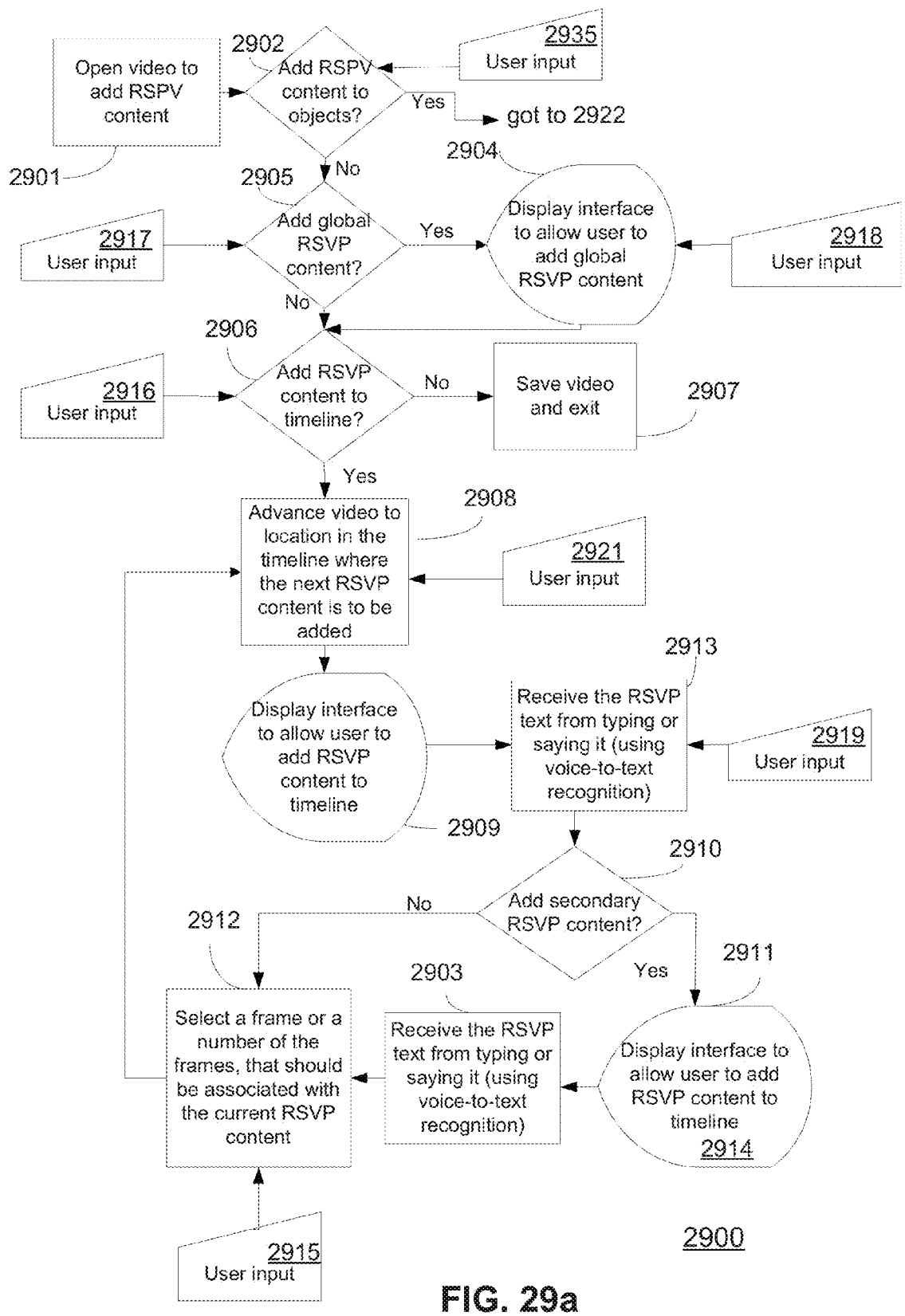
FIGS. 29a-29b show a process flow implemented by a computer system in accordance with an embodiment of the present invention enabling a user to add RSVP content to a video.
Figure 29B:
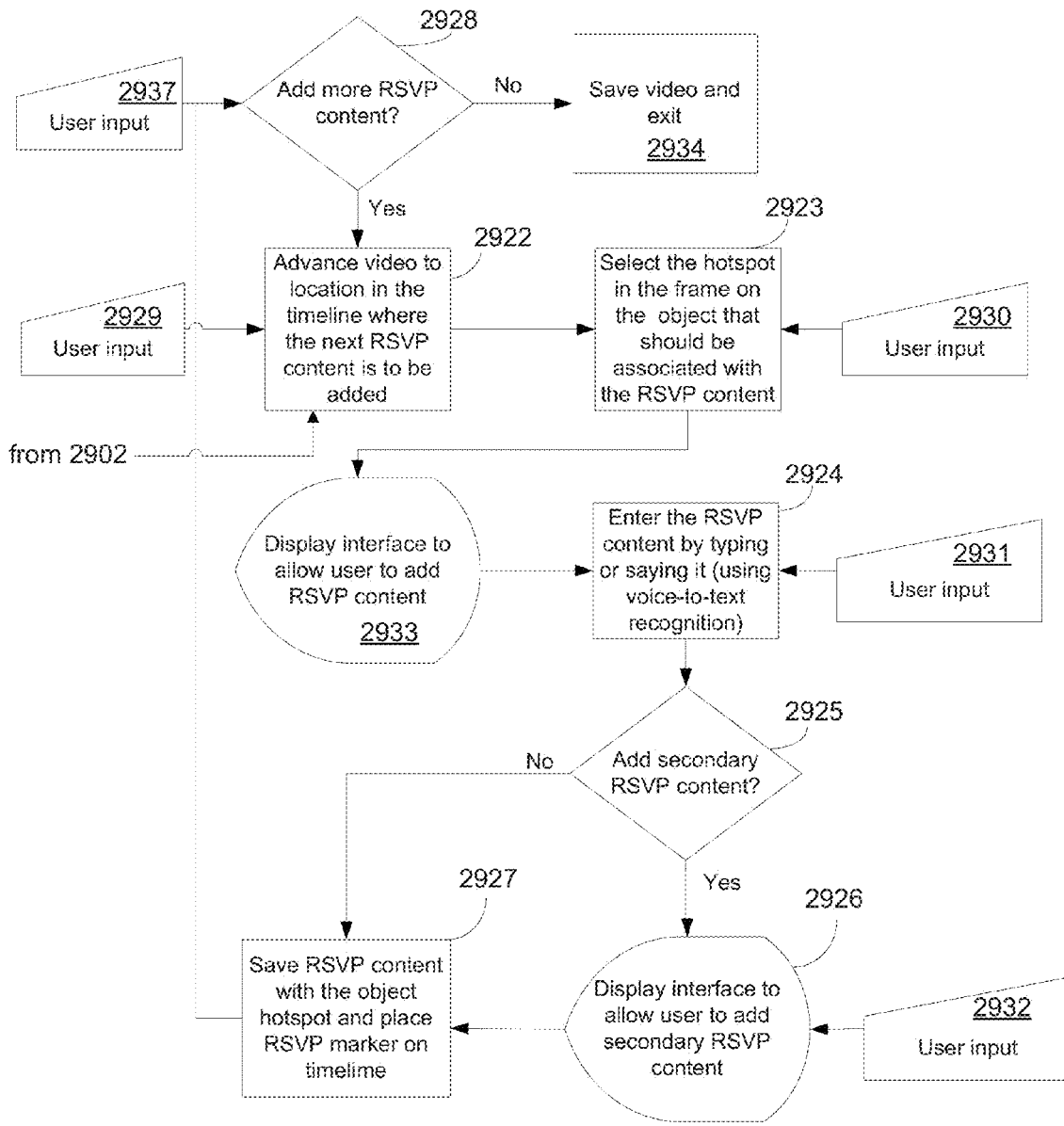

FIGS. 29*a*-29*b* show a process flow for a method 2900 implemented by a computer system in accordance with an embodiment of the present invention enabling a user to add RSVP content to a video. Such a preview may be created, for example, through a user interface as shown and described FIGS. 24*a*-24*e*. However, in this and other examples illustrated herein of various embodiments of aspects of the invention, the exact logic shown in flow diagrams is not necessarily intended to correspond to the exact interface illustrated in other figures. Both are merely intended to provide examples and those skilled in the art will of course appreciate that there are many variations that would not at all depart from the spirit and scope of the present invention.

Method 2900 may be implemented, for example, on a user device executing a video editing/annotating application such as application 210*b* of FIG. 2*b* that is enabled to process RSPV content by RSVP software 211*b* which utilizes RSVP library 204.

Referring to FIG. 29*a*, step 2901 opens the video to which RSVP content is to be added. Step 2902 determines, based on user input 2935, whether the user has selected to add or edit RSPV content related objects in the video. If yes, then the method proceeds to step 2922, shown and described below in the context of FIG. 29*b*. If no, then the method proceeds to step 2905. Step 2905 determines, based on user input 2917, whether the user has selected to add or edit a global RSVP comment. If yes, then step 2904 displays an interface for the user to provide input 2918 to add or edit a global comment to the video that will be displayable by RSVP. The method then proceeds to step 2906. If the result of step 2905 is no, then the method proceeds to step 2906 directly.

Step 2906 determines, based on user input 2916, whether RSVP content is to be added to the video timeline to make the content displayable as a particular time in the video. If no, the step 2907 saves the video and exits. If yes, the step 2908 advances the video, based on user input 2921 (e.g., selecting a point on a progress bar), to the time location in the video where the RSVP content is to be added. Step 2909 then displays an interface to the user to add content to be displayed via RSVP. As described previously in the context of FIGS. 24*a*-24*d*, such an interface may include a virtual keyboard, speech recognition interface, or other user interfaces for entering or editing textual content. Step 2913 receives user input 2919 that enters or edits textual content that is to be displayable to a content consumer via RSVP. Step 2910 then determines whether the user would like to add any secondary RSVP content. As previously described in the context of FIGS. 7*d*-7*h*, indicators for such additional content may be provided at the end of a primary RSVP display so that a content consumer can determine whether to select to view the additional content. The concepts illustrated there also apply to RSVP content added to video.

If the result of step 2910 is yes, then step 2911 displays an interface to receive user input 2920 to add secondary content to be displayable by RSPV. The method then proceeds to step 2903 to receive the entered content. The method then proceeds to step 2912. If the result of step 2910 is no, then the method proceeds directly to step 2912. Step 2912, based on user input 2915, selects how many frames should be associated with the currently entered RSPV content (including the primary RSPV content received at step 2913 and any secondary content received at step 2914). In various alternatives, the frames may be represented by the number of frames or in a time duration of associated video content. The method then returns to step 2908.

FIG. 29b shows the flow of a portion of method 2900 that is executed if the result of step 2902 (in FIG. 29a) is yes and user added content is to be associated with objects. Step 2922 advances the video based on user input 2929 to the time location in the video where the RSVP content is to be added. Step 2923 provides an interface and accepts user input to identify a hotspot on a video object selected by the user for association with RSPV content. Step 2933 then displays an interface to the user to add content to be displayed via RSPV. Step 2924 receives user input 2931 that enters or edits textual content that is to be displayable to a content consumer via RSVP. Step 2925 then determines whether the user would like to add any secondary RSVP content.

If the result of step 2925 is yes, then step 2926 displays an interface to receive user input 2932 to add secondary content to be displayable by RSPV. The method then proceeds to step 2927 to save the RSVP entered content and any secondary entered RSVP content along with the identified object hotspot and to place an associated marker on the video timeline bar. If the result of step 2925 is no, then the method proceeds directly to step 2927. The method then proceeds to step 2928 to determine, based on user input 2937, whether the user would like to add any more RSPV content to objects in the video. If the result of step 2928 is yes, then the method returns to step 2922. If the result of step 2928 is no, then step 2934 saves the video and the process ends.

Figure 30:
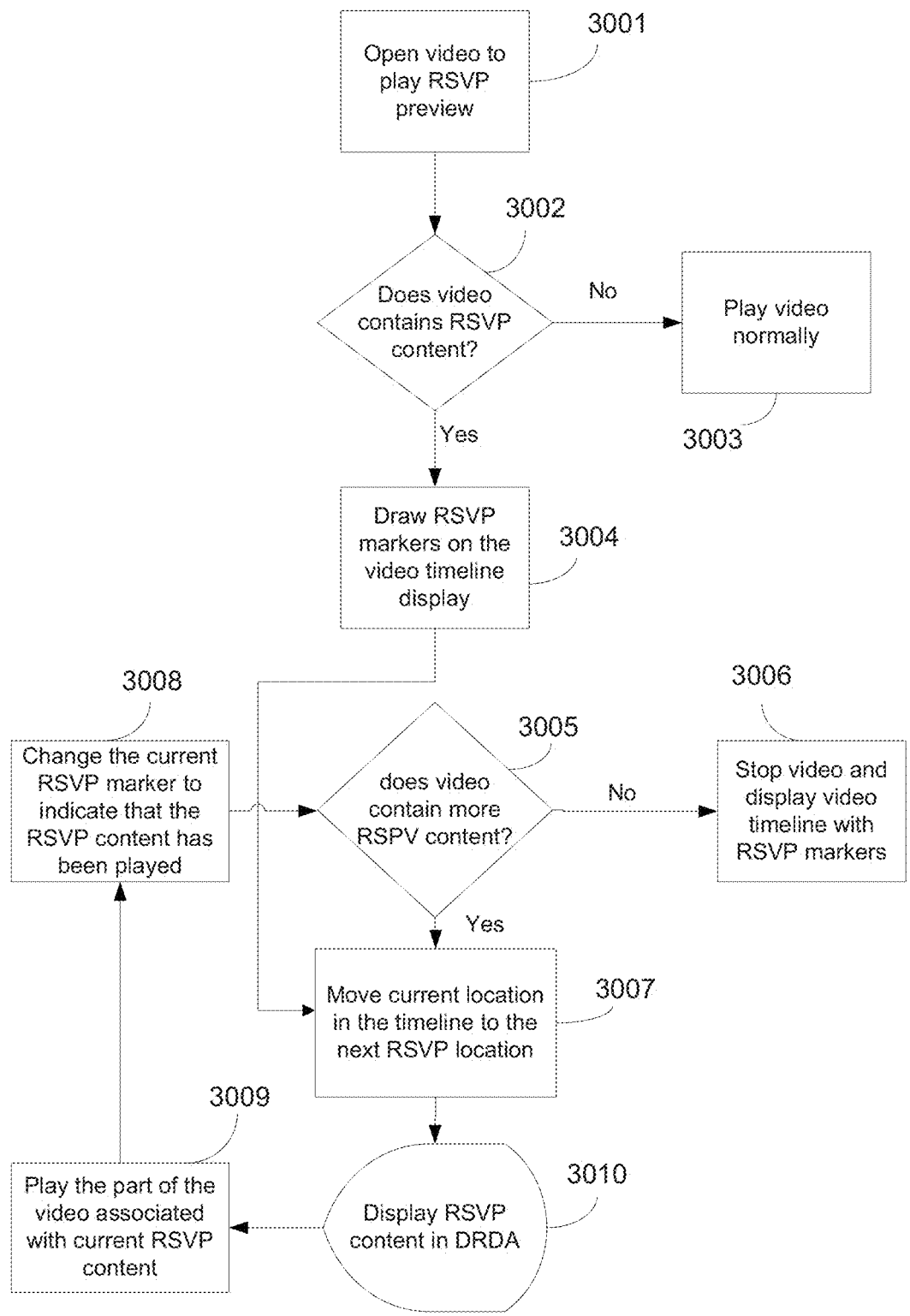
FIG. 30 illustrates a process flow implemented by a computer system in accordance with an embodiment of the present invention for playing an RSVP-enabled video preview.

FIG. 30 illustrates a process flow for a method 3000 implemented by a computer system in accordance with an embodiment of the present invention for playing an RSVP-enabled video preview. Such a preview may be displayed, for example, as shown and described FIGS. 23a-23g. Method 3000 may be implemented, for example, on a user device executing a video player application such as application 210a of FIG. 2b that is enabled to process RSPV content by RSVP software 211a which utilizes RSVP library 204.

Step 3001 opens the video preview (which may be a separate file or data stream distinct from the underlying video that is the subject of the preview while at the same time typically containing a portion of the same of the same content included in the underlying video). Step 3002 determines if the preview has any RSVP content. If no, then step 3003 displays the video preview normally (i.e., as it would any other video without RSVP content). If yes, then step 3004 displays RSVP markers on the video timeline (progress bar). Step 3007 then moves the current location indication on the progress bar to the first RSVP marker location. Step 3010 displays the RSVP content associated with the marker in a DRDA. After the first RSVP content segment finishes displaying, then step 3009 plays the video excerpt that the preview file has associated with that RSVP segment. Step 3008 then changes the current RSVP marker to indicate that the RSVP content associated with that marker has been displayed (e.g., by graying out the marker). Step 3005 determines whether the video preview contains additional RSVP-enabled content. If no, then step 3006 stops the video playback and displays the video timeline with markers. In one alternative, the preview markers are individually selectable so that the user can go back and view individual segments without having to view the entire preview. If the result of step 3005 is yes, then step 3007 repeats and advances to the next RSVP marker location in the timeline.

Figure 31:
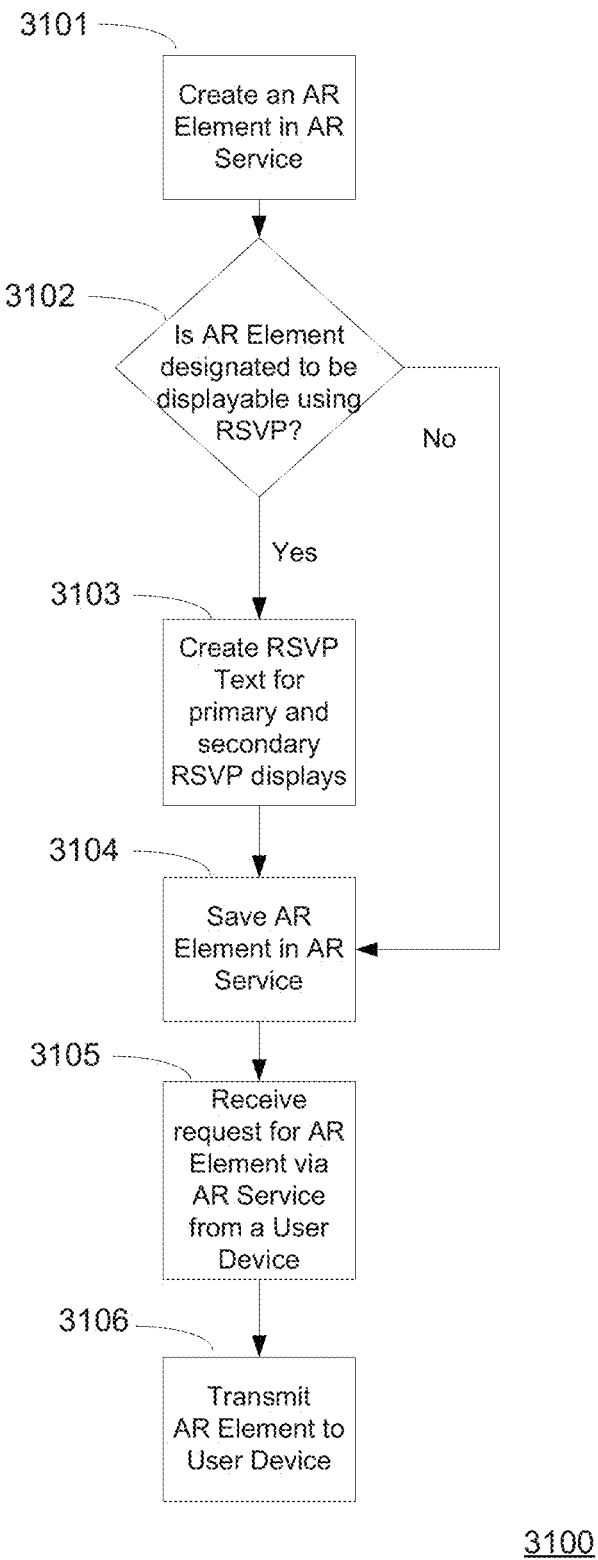
FIG. 31 illustrates a process flow implemented by a computer system in accordance with an embodiment of the present invention for delivering augmented reality ("AR") content elements that are enabled to be displayed via RSPV.

FIG. 31 illustrates a process flow for a method 3100 implemented by a computer system in accordance with an embodiment of the present invention for delivering augmented reality ("AR") content elements that are enabled to be displayed via RSPV. Such a method may be carried out by, for example, an AR service application such as application 217 shown in FIG. 2d including RSVP server library 218 and executing on a server 101.

Step 3101 creates an AR element in the relevant AR service application. Such elements are well known and typically include displayable information that is associated with a real world object viewable by a user of the AR service. Step 3102 determines whether the AR element is designated to be displayable using RSVP. If no, then the process proceeds to step 3104. If yes, then step 3103 prepares the text for RSPV display. In particular embodiments, this may include various additional steps such as, for example, parsing it into a plurality of displayable elements, inserting blank elements where appropriate, calculating display time multipliers based on word length, and determining an optimal recognition position character or proportionate position as further described in co-pending U.S. application Ser. No. 13/547,982 incorporated herein by reference above. As is further explained therein, in a particular implementation, some or all steps for preparing text for RSVP display may be accomplished on a user device rather than remotely on a server computer. If there is any sub-content associated with the AR element, then step 3103 also prepares that sub-content for RSVP display.

Step 3104 saves the AR element on the server. Step 3105 receives, at the AR service application, a request for a particular AR element from a user device. Step 3106 transmits the AR element to the requesting user device.

Figure 32:
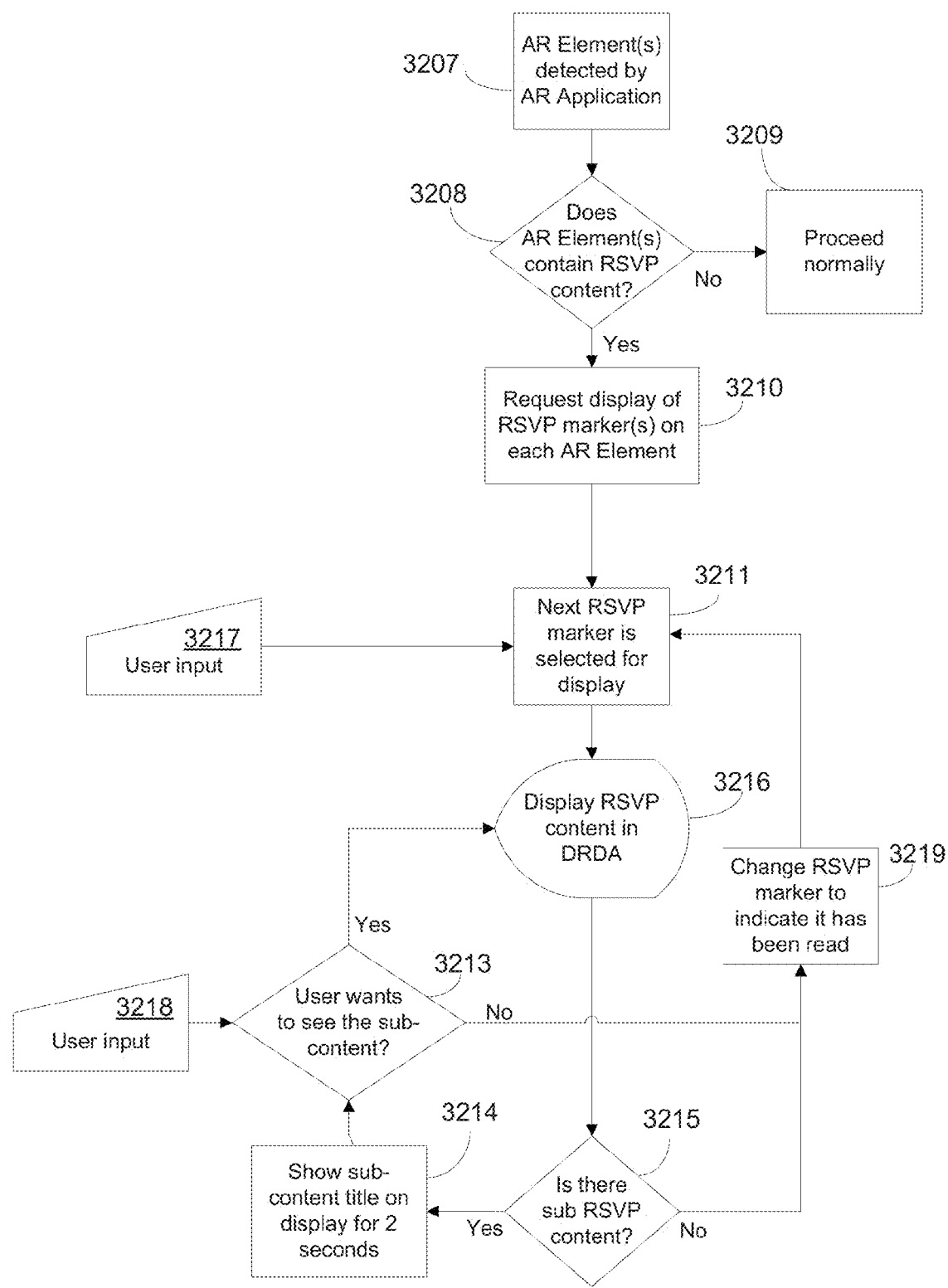
FIG. 32 illustrates a process flow implemented by a computer system in accordance with an embodiment of the present invention for processing and displaying AR content elements that are enabled to be displayed via RSPV.

FIG. 32 illustrates a process flow for a method 3200 implemented by a computer system in accordance with an embodiment of the present invention for processing and displaying AR content elements that are enabled to be displayed via RSPV. Such a method may be carried out by, for example, an AR application such as application 212 shown in FIG. 2c including RSVP software 213 and executing on a user device 210. Those skilled in the art will appreciate that, in a typical implementation, an AR application such as application 212 and/or AR service such as AR service 217 will rely in part on information obtained from a location sensor such as GPS 212 of FIG. 2c. An example of one possible resulting user interface for an RSVP-enabled AR application implementing a method according to an aspect of an invention embodiment is illustrated and described in the context of FIGS. 25a-25k.

Process 3200 begins with step 3207 which detects AR elements received from an AR service (such as AR service 217 executing method 3100 to send AR elements including RSVP displayable content to a user device). Step 3208 determines whether the received AR element or elements include RSVP content. If no, then step 3209 proceeds as the AR application normally would without RSPV content. If yes, the step 3210 displays RSVP markers on objects views associated with real world objects. In one embodiment, these markers include icons such as those illustrated in FIGS. 25a-25k. In an alternative embodiment, these markers may instead be or include short textual titles identifying the real world object. Step 3211 receives user input 3217 selecting a particular RSVP marker for display. Step 3216 displays the RSVP content corresponding to the selected marker in a DRDA. Step 3215 then determines whether there is any RSVP sub-content for display. If no, then step 3219 changes the marker corresponding to the RSVP content to indicated that it has been read. If yes, then step 3214 displays titles for the sub-content for two seconds. Step 3213 determines whether user input 3218 has indicated that the user has selected to view the sub-content. If no, then step 3219 changes the marker corresponding to the primary RSVP content to indicate that it has been read. If yes, then step 3216 displays the sub-content in the DRDA. When the sub-content is finished displaying, then the process returns to step 3215 to determine if there is any additional sub-content (sub-content can also have additional sub-content). Once all the RSVP content and sub-content associated with a particular AR element has either been displayed or declined by the user for display, the process then returns to step 3211 to wait for selection of another RSPV marker for RSVP display of content associated with another AR element.

Figure 33:
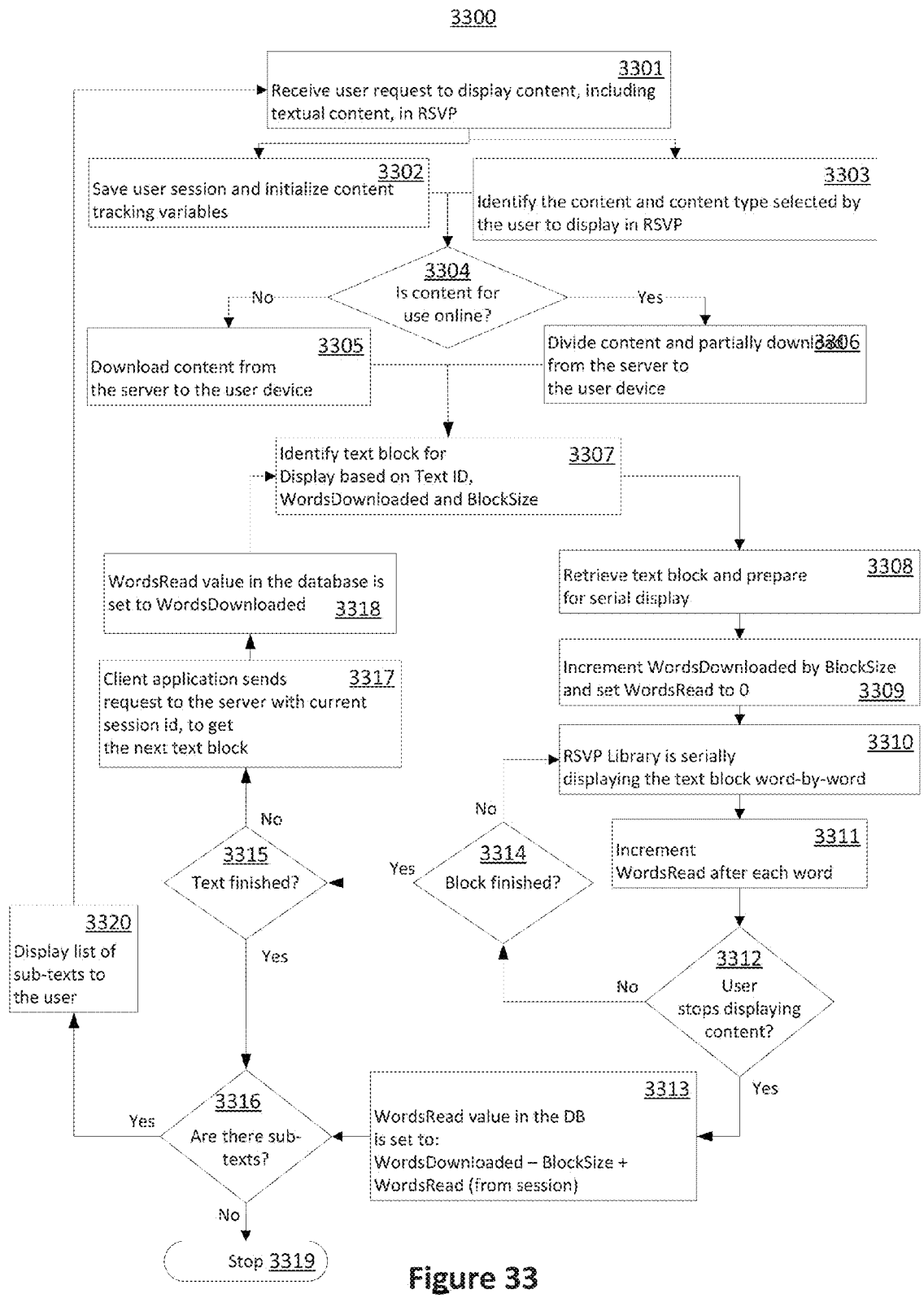
FIG. 33 illustrates a process flow implemented by a computer system in accordance with an embodiment of the present invention for serial content display and tracking, according to an embodiment of the present invention.

FIG. 33 is a process flow diagram illustrating a method 3300, for serial display and tracking of content, including textual content, according to an embodiment of the present invention.

Step 3301 receives a user request to display content, including textual content, in RSVP. The request may be generated as a result of a system event indicating that serial display functionality has been activated by the user, automatically by the system when the RSVP application is launched or by a predetermined user input. The request may include login credentials and content related information, including textual content information.

Step 3302 creates and saves a user session on the client device and on the RSVP server, and initializes the content tracking variables. In some cases, a user session is created including an anonymous User ID to keep track of the words downloaded and words read. The User ID is anonymous in this scenario as one example, and is not limited thereto. For example, the User ID may not be anonymous and may include identifying user information. The user session is used to track content use and includes values for identification variables, including Session ID, User ID, a Text ID, and values for tracking variables such as Words Downloaded and Words Read, as described further in reference to Tables 1-3 below.

Step 3303 identifies the selected content and the content type and stores values for Content ID and Content Type variables. The content type may include the type of media of the selected content, including whether there is textual content, whether the content is paid content such as an online news article or e-book content, or ad content and the like. Each text may be represented as an entry in a texts table in a database, including values for variables such as Text ID, Text Title, Text Icon, Text Content and the like. When the content is ad content, the Text Icon may be used to visually indicate sponsored content, for example a brand logo or a sponsored content icon, or a combination of the two.

The sub-texts may be represented in a sub-texts table, including values for variables such as Text ID and Sub-Text ID, which may be used to link sub-texts to texts. The user information may be tracked in a text users table, including values for variables such as Text ID, Anonymous ID and Current Retry ID. The sub-text may be non-sponsored or sponsored content and it may be free or paid content. Additionally, the sub-text may be reference content, such as a translation of content into another language.

When tracking the user in a session, currently reading content is associated with a particular Text ID, the Text ID value as well as the other session variables Words Downloaded and Words Read are retained from the session, based on the User Session ID.

The content may be entirely downloaded for offline use, or partially downloaded, in sections, for online use, or streamed for online use. When downloaded entirely, the content may be prepared for serial display in segments, for example by retrieving text based on block size. When content is downloaded in sections (e.g., block-by-block), display of a first content section can be initiated for a user without having to wait for the entire download. Additionally, downloading or retrieving by block size allows for efficient use of memory and processing, for example, by storing the content that will actually be used and removing less content when the content will not be used.

Whether entirely downloaded or partially downloaded, for online or offline use, or streamed for online use, the content may be retrieved block by block and displayed and tracked word-by-word. The content (main content) may have sub-content. The sub-content may be non-sponsored content associated with the main content or it may be or include sponsored content (referenced herein as "ads" for convenience) chosen based on keywords in the text of the main content and/or sub-content, for example from a web page in the search results, single webpage on the website, or may include specially prepared texts by a content provider. The text served as sub-text may be based on keywords corresponding to the words that have been serially displayed from the content.

Each retry or re-read of text may be represented in a retries table including Text ID, Retry ID, Words Downloaded and Words Read, to precisely track how much of the text was read when retried. The retries table may also indicate how many times the user has read the same text and for how long.

Currently Reading Text ID, as well as the other session variables, Words Downloaded and Words Read, are retained from the session, based on the anonymous User Session ID.

The Block Size is the size of a block of text to download for the user. The Block Size can be either defined in the application as a constant, for example, 10-100 words, or chosen by the user in the application/OS settings, or computed automatically, based on the network connection quality and user reading speed, and the like.

This process of tracking the text read in the user session provides for accurate tracking, even if the network connection is lost, because the latest downloaded number of words can always be used for further analysis by the text statistics tracker.

Step 3304 determines whether the content is to be used online. If yes, then the content is divided into displayable content elements for partial download in step 3306. If no, then the entire selected content is downloaded to user device in step 3305. The content may be downloaded via an encrypted connection and stored as encrypted content on the user device. Although not shown, some content is only available for use online and thus, steps 3304 and 3305 may be skipped in that case.

Additionally, it may also be determined whether the content is larger than a predetermined size, to determine whether to download fully or partially. The predetermined content size may be set in the user settings, the RSVP server, or determined based on connection quality or user device characteristics, such as available memory, or user characteristics such as reading speed and reading level.

Upon partial (step 3306) or full (step 3305) download, the Content ID and the Session ID are associated and stored in an RSVP tracking database and updated in the user session (not shown).

Step 3307 identifies a text block for serial display by querying the database and prepares it for the user. Each text is represented on the server side in a table (e.g., as a row or column of data in a table) in the database, including a Text ID, for example. The text block is identified by the Text ID, starting from the Words Downloaded with a Block Size number of words. Additionally, the block may be identified by the latest total Words Read by a user.

Step 3308 retrieves the identified text block and prepares it for serial display. The text block may be a section of the content, including textual content. The textual content may be extracted from the content to be displayed using RSVP display on the user device. That is, the text block is configured for RSVP display by parsing text included in the content, and other displayable elements in the content, and dividing the content into a plurality of displayable elements. The content may be flagged as displayable upon retrieving the text block or after preparing the content for serial display.

For example, for webpage content, the textual content may be extracted by parsing the HTML and scrubbing the webpage for text to display serially. As another example, a content provider may provide content, including text, to be serially displayed using RSVP along with the content, without the need for parsing the content.

Step 3309 initializes the content tracking variables, including Words Downloaded and Words Read, for each new block. Words Read is set to zero (0) and Words Downloaded is set to the block size of words to be serially displayed or the number of words downloaded to the device in this request, or the number of words cached for this iteration of the display.

The Block Size can be either defined in the application as a constant, for example, 10-100 words, or chosen by the user in the application/OS settings, or computed automatically, based on the network connection quality and user reading speed. The block size may be also be chosen by a time interval such as the time it takes to read a single block, for example on average, or according to a user speed. For example, if your reading speed is 500 words per minute, then the block size would be determined to be 500. This would require a download every minute, and may also be adjusted, depending on the bandwidth of the user's network connection.

That is, the Block Size may vary during the tracking process depending on other conditions and may also be adjusted during the tracking process by the user or by the system, as needed. At the very least, for example, the block size of the last block of a text will be smaller than the other blocks, unless the words in the text are evenly divisible by the block size.

Step 3310 serially displays the text block word-by-word and, after each word, step 511 increments the Words Read session variable.

Step 3312 determines whether the user is still actively viewing the textual content, for example, by whether the user has stopped the RSVP display of the content. That is, step 3312 determines whether the user stops displaying content. This may be determined, for example, by controlling the RSVP interface to stop the RSVP display or navigating away from the web page or other application interface window in which RSVP display of the content was triggered Additional factors may also be used to determine if the user is still actively viewing the content, for example by monitoring the user's presence, eye position, the user's facial expression, or other indicators via a camera or other monitoring means. Although not illustrated, step 3312 determining may also be performed parallel to step 3310 displaying the content.

If the result of step 3312 is yes, then step 3313 updates the Words Read value in persistent storage on the server side, for example, a database, to be set equal to Words Downloaded minus Block Size, plus Words Read. The Words Read value in the calculation is taken from session where it was incremented for each word read (e.g., each word displayed via RSVP) from the block in step 3311. Method 3300 then proceeds to step 3316 (described further below).

If the result of step 3312 is no, then step 3314 determines whether the current block has finished displaying. If the result of step 3314 is no, then step 3310 continues to serially display the block word-by-word and step 3311 continues to increment the Words Read variable. If the result of step 3314 is yes (i.e., the block finished), then step 3315 determines whether the text is finished.

If the result of step 3315 is yes, then step 3316 determines whether there are sub-texts to display to the user. After step 3315 (not shown), the content may be marked as read to indicate that the user previously accessed and read the content. Alternatively, the content may be marked as read or accessed after step 3301.

If step 3316 determines that there are sub-texts, the sub-texts may be automatically presented based on the content author's request to present particular sub-text. However, they may also be generated based on keywords related to the parent text. For example, a sub-text may be generated to be displayed based on a degree of relatedness between the text content in a text table and text content in a sub-text table.

The same sub-text may appear within multiple related threads and a visual indication may be provided to distinguish such sub-text. A visual indication may include, for example, graying out the title of the sub-text or displaying an indicator or icon distinguishing the sub-text element from other elements.

The sub-text may be based on keywords corresponding to the words that have been serially displayed from the content at a predetermined point in the serial display. The content based on which the sub-content is determined may be referred to as originating content for ease of explanation. The sub-text or the sub-content may be embedded in originating content or looked up dynamically from a lookup list of related keywords. The lookup list may be itself dynamic, based on advertisement supply and demand or bidding outcomes at the time the list is generated.

The sub-text may be displayed under the text display and may be linked to the original text. Specifically, the title of the sub-text is displayed and used to visually represent the sub-text to the user. The sub-text and the text may be visually linked circularly and functionally allow for circular navigation between texts and sub-texts. Each sub-text, similar to the text, may have another sub-text displayed after the sub-text.

If the result of step 3316 is yes, then step 3320 displays the list of sub-texts to the user. That is, representations of the sub-texts (e.g., titles, icons, thumbnails, and/or other markers), retrieved from the sub-text elements are displayed to the user. Alternatively, the sub-texts may be displayed parallel to serially displaying originating content, in addition to, or instead of, being displayed at the end of the block or at the end of the text of the originating content.

Once the user chooses the sub-text to serially display, by selecting the title of the sub-text, the currently serially displaying Text ID is set to the Sub Text ID, and saved in the session, counting variables are reset and the process returns to step 3301.

If the result of step 3315 is no (i.e., the block is finished but the next is not finished) then in step 3317 the client application sends a request to the server with the current Session ID, to get the next text block. Step 3318 sets the Words Read value in the database is set to Words Downloaded and the process return to step 3307 to identify the next block of text.

If the result of step 3316 is no (i.e., there are no more sub-texts), then step 3319 stops the serial displaying and tracking process.

The content tracking described herein may be implemented by using an RSVP tracking database. The RSVP tracking database, for example, may be implemented to include a table such as table 1 below with values for variables including User ID, Content ID, Is Displayable, Words Downloaded and Words Read. The field Is Displayable may be implemented as a flag to mark the selected content serially displayable to the user. The RSVP tracking database may also include additional information relevant to tracking content use, for example a Request ID, Request Entity, Request Type, Total Words, Words Left, Block Size, Is Block Finished, Is Text Finished and Is Charged fields. The tracking database may be used as a buying database to determine the appropriate charge to a user or an advertiser based on content used, and words read.

The variables Is Block Finished and Is Text Finished may be implemented as flags used to indicate whether a downloaded block of text and whether the entire selected text is finished displaying to the user, respectively. The Request ID may be used to keep track of each sequential request for content or partial content. The Request Entity field may be used to track whether the request is by a client or server, or the like. The Request Type may be used to track whether the request is to get content, or to put content, for example by the client and by the server, respectively. Words Left refers to words remaining in content.

The Block Size can be either defined in the application as a constant, for example, 10-100 words, or chosen by the user in the application/OS settings, or computed automatically, based on the network connection quality and user reading speed. Thus, the Block Size varies during the tracking process depending on other conditions and may also be adjusted during the tracking process by the user or by the system, as needed. At the very least, for example, the block size of the last block of a text will be smaller than the other blocks, unless the words in the text are evenly divisible by the block size.

When selecting the next block, the beginning of the block may be identified based on the latest Words Downloaded and Block Size values or may be identified based on Total Words Read or another bookmarking variable, for example when the user stops reading a block and decides to finish the block at another time.

Table 1 shows one example of an RSVP tracking database table for tracking content, including textual content, as described herein.

TABLE 1

| Request ID | Request Entity | Request Type | Text ID | Total Words | Words Left | Block Size | Words Downloaded | Words Read | Is Block Finished? | Is Text Finished? |
|---|---|---|---|---|---|---|---|---|---|---|
| 1 | Client | GET | 1234 | 0 | 0 | 100 | 0 | 0 | No | No |
| 2 | Server | PUT | 1234 | 325 | 225 | 100 | 100 | 0 | No | No |
| 3 | Client | GET | 1234 | 325 | 225 | 100 | 100 | 100 | Yes | No |
| 4 | Server | PUT | 1234 | 325 | 125 | 100 | 200 | 100 | No | No |
| 5 | Client | GET | 1234 | 325 | 125 | 100 | 200 | 200 | Yes | No |
| 6 | Server | PUT | 1234 | 325 | 25 | 100 | 300 | 200 | No | No |
| 7 | Client | GET | 1234 | 325 | 25 | 100 | 300 | 300 | Yes | No |
| 8 | Server | PUT | 1234 | 325 | 0 | 25 | 325 | 300 | No | Yes |
| 9 | Client | SET | 1234 | 325 | 0 | 0 | 325 | 325 | Yes | Yes |
| 10 | Server | ACK | 1234 | 325 | 0 | 0 | 325 | 325 | Yes | Yes |

In the example shown in Table 1, a user is represented as Client in the Request Entity field. The user requests Text ID 1234 which is 325 words long, from the Server. In this case, the Block Size is set as 100. The block size may be determined from the user settings, the server settings, or dictated by the content provider. The block size indicates that the text will be downloaded and used 100 words at a time. As described above, words may refer to any displayable elements, for example serially displayable textual content or other types of content of one or more words. The last entry in the tracking database, where the Request Type value is Acknowledgement (ACK), may be used to update the user session by setting the final words read for Text ID to equal Words Read in the ACK entry.

Table 2 shows a case where the user loses connection before the ACK entry is sent or stored in the tracking table.

TABLE 2

| Request ID | Request Entity | Request Type | Text ID | Total Words | Words Left | Block Size | Words Downloaded | Words Read | Is Block Finished? | Is Text Finished? |
|---|---|---|---|---|---|---|---|---|---|---|
| 1 | Client | GET | 2768 | 0 | 0 | 100 | 0 | 0 | No | No |
| 2 | Server | PUT | 2768 | 276 | 176 | 100 | 100 | 0 | No | No |

TABLE 2-continued

| Request ID | Request Entity | Request Type | Text ID | Total Words | Words Left | Block Size | Words Downloaded | Words Read | Is Block Finished? | Is Text Finished? |
|---|---|---|---|---|---|---|---|---|---|---|
| 3 | Client | GET | 2768 | 276 | 176 | 100 | 100 | 100 | Yes | No |
| 4 | Server | PUT | 2768 | 276 | 76 | 100 | 200 | 100 | No | No |
| 5 | Client | GET | 2768 | 276 | 76 | 100 | 200 | 200 | Yes | No |
| 6 | Server | PUT | 2768 | 276 | 0 | 76 | 276 | 200 | No | No |

As shown in Table 2, the latest entry, in Request ID 6, is used to update the user session, with the latest Words Downloaded value 276. Alternatively, depending on the settings on the server, or user device, set by the content provider or other entity, the latest Words Read value may be used to update the user session.

Table 3 shows a scenario where the user stops display of the content before the content is finished.

TABLE 3

| Request ID | Request Entity | Request Type | Text ID | Total Words | Words Left | Block Size | Words Downloaded | Words Read | Is Block Finished? | Is Text Finished? |
|---|---|---|---|---|---|---|---|---|---|---|
| 1 | Client | GET | 919 | 0 | 0 | 100 | 0 | 0 | No | No |
| 2 | Server | PUT | 919 | 793 | 693 | 100 | 100 | 0 | No | No |
| 3 | Client | GET | 919 | 793 | 693 | 100 | 100 | 100 | Yes | No |
| 4 | Server | PUT | 919 | 793 | 593 | 100 | 200 | 100 | No | No |
| 5 | Client | SET | 919 | 793 | 593 | 0 | 200 | 147 | No | Yes |
| 6 | Server | ACK | 919 | 793 | 593 | 0 | 200 | 147 | No | Yes |

As shown in Table 3, there are a total of 793 words for Text ID 919. The content is downloaded 100 words at a time, based on the Block Size of 100 words. After reading the first block, the reading is terminated mid-use, during the second block and the total Words Read are set to 147. The content use may be terminated mid-use in various ways, for example by monitoring the user via a camera or other monitoring means.

Alternatively, or in addition to using a tracking database table, these variables may be tracked in the user session, with only the latest entry of values being saved in the user session and overwritten with the next request ID. In this case, if a user stops reading mid-use, the last entry of values may be used. Additionally, the user device will have the latest Words Read, and thus the total words read may be updated when a connection is regained by calculating Words Downloaded minus Block Size plus Words Read.

The serial content display and tracking the analytics about the use of content, relies on hardware configuration and data acquisition to track the amount of content used.

Table 4 shows a sample pseudo code for word counting with block size:

TABLE 4

```
1    void function TrackingWordsRead
2       TotalWords=325;
3       BlockSize=100;
4       userIsReading=true;
5       WordsRead=0;
6       while (WordsDownloaded<=TotalWords)
7       {
8          WordsDownloaded+=BlockSize;
9          WordsReadCount=0;
10         while (userIsReading=true and WordsReadCount<=BlockSize)
11         {
12            if confirmUserReading (AnonUserID) = false
13            {
14               userIsReading=false
15               WordsRead=WordsDownloaded-BlockSize+WordsReadCount
16            }
17            else
18               WordsReadCount++;
19         }
20         WordsRead = WordsDownloaded;
21      }
```

In Table 4, tracking the analytics about the use of content may be implemented as follows. As a downloaded block is being displayed, line 18 continues to track words displayed by incrementing the WordsReadCount while the user is reading the words in the block (i.e., while userIsReading=true and WordsReadCount<=BlockSize as indicated in line 10). If the user stops reading, line 15 calculates the words read (i.e., the words displayed) as Words Downloaded-Block Size+Words Read (WordsReadCount).

Figure 34:
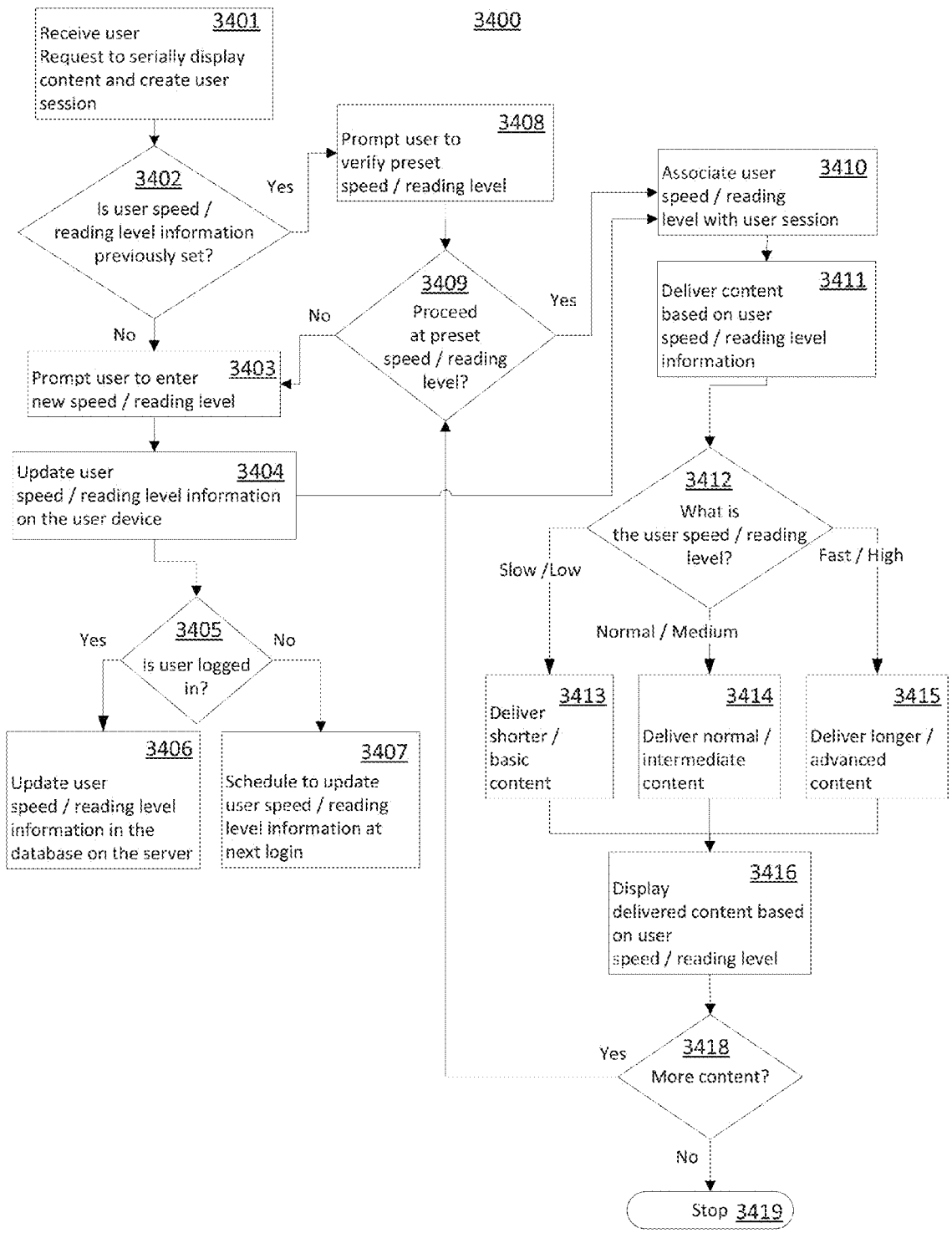
FIG. 34 illustrates a process flow implemented by a computer system in accordance with an embodiment of the present invention for serial content display and tracking, taking into consideration user speed, according to an embodiment of the present invention.

FIG. 34 is a process flow diagram of a method 3400 for content display and analytics tracking, by taking into consideration user speed and/or reading level, according to an embodiment of the present invention. That is, the content may be delivered, displayed and tracked based on a user RSVP reading speed or reading level or both. User reading speed and reading level are used as examples for clarity of explanation of the tracking and displaying process 3400 based on a user or content specific variables and is not limited thereto. The process 3400 may rely on other user or content relevant factors to deliver, display and track content use.

In FIG. 34, the user may choose a reading level used to select particular content. The user may also choose a reading speed for displaying content. Alternatively, the system may choose the speed and level based on user settings or other settings to avoid repeatedly prompting the user to confirm or update speed setting. The content amount can be varied according to a user reading speed. The complexity level of the content, including textual content, may also be varied by a content provider according to reading speed or user reading level.

In FIG. 34, speed and reading level are referred to simultaneously and both user speed and reading level may be used in process 3400 together or separately. The example illustrated in FIG. 34 assumes, for ease of explanation only, that reading speed and reading level vary together (i.e., slow speed corresponds to low reading level, normal speed to medium level, and fast speed to high level). However in alternative examples, these values might vary differently. For example, a user might have a low reading speed but set a high reading level in order to obtain more difficult content.

Step 3401, receives a user request to serially display content, including textual content, and creates a user session. The user session may include a Session ID, a User ID, a Text ID, and tracking variables such as Words Downloaded and Words Read. The user session may also include user speed and reading level, extracted from user information stored on the user device or on the server.

Step 3402 determines whether there is a previously set user speed and/or reading level in the user device or the server, specific to the user, or to the content. If there is no previously set speed and/or level information, as determined in step 3402, then step 3403 prompts the user to enter a new user speed and/or level. Here, the user may enter a new custom speed or accept a proposed average speed or proposed custom speed. Additionally, the user may be prompted in step 3403, to choose from various speed ranges of slow, normal or fast speeds and reading levels of low, medium or high.

Step 3404 updates the user speed and/or level on the user device. If the user is logged in, as determined in step 3405, then step 3406 updates the user speed and/or level in a user database on the server. If the user is not logged in, then step 3407 schedules to update the information on the user's next login. Whether or not the user is logged in, after step 3404, step 3410 associates the updated user speed and/or level with the user session.

If the result of step 3402 is yes, then step 3408 prompts the user to verify the preset user speed and/or level before proceeding. Step 3409 determines whether the user has chosen to proceed at the preset speed and/or level. If not, then step 3403 prompts the user to enter a new user speed and/or level as described above. If the result of step 3409 is yes, then step 3410 associates the user speed and/or level with the user session.

Step 3411 delivers the selected content based on user speed and/or level. As described above, the user speed and/or level may affect the speed of displaying the selected content. Further, the complexity or level of the content, including textual content, may be set according to the user reading speed and/or reading level, or a combination of the two.

Step 3412 determines the speed or level as low, medium or high. Depending on the user reading speed, step 3413, 3414, or 3415 delivers, respectively, shorter, normal or longer content. As such, a content publisher or an advertiser may be able to address different market demographics, depending on speed or reading level. For example, an advertiser may provide several different ads to serve based on the speed or reading level. Step 3416 serially displays the content delivered (shorter, normal or longer).

Step 3418 determines whether there is more content to display. If no, then the process stops at step 3419. If yes, then the process returns to step 3409.

Figure 35:
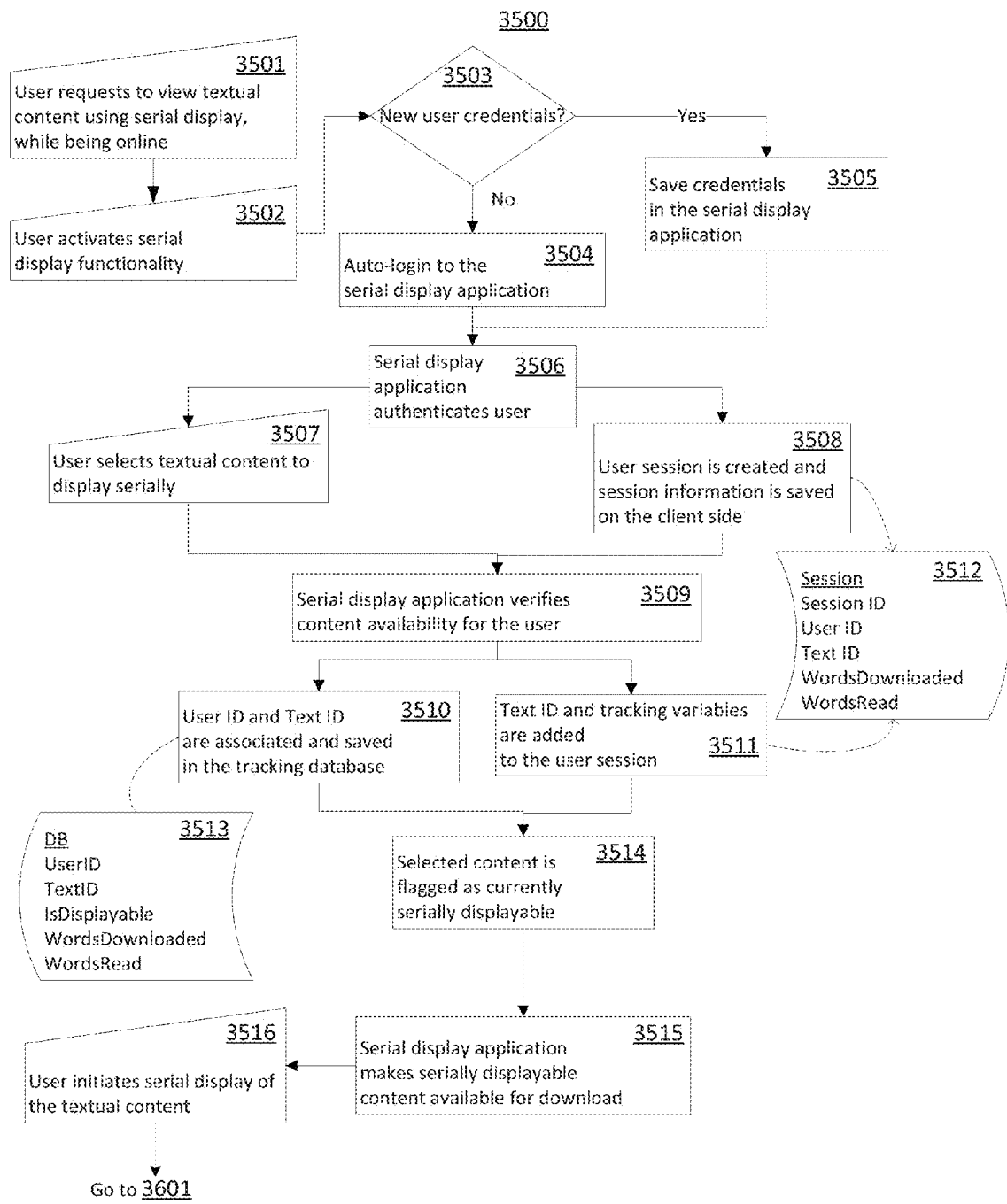
FIG. 35 illustrates a process flow implemented by a computer system in accordance with an embodiment of the present invention for serially displaying and tracking content, including textual content, when the content is paid text and the user is online while displaying the content, according to an embodiment of the present invention.
Figure 36:
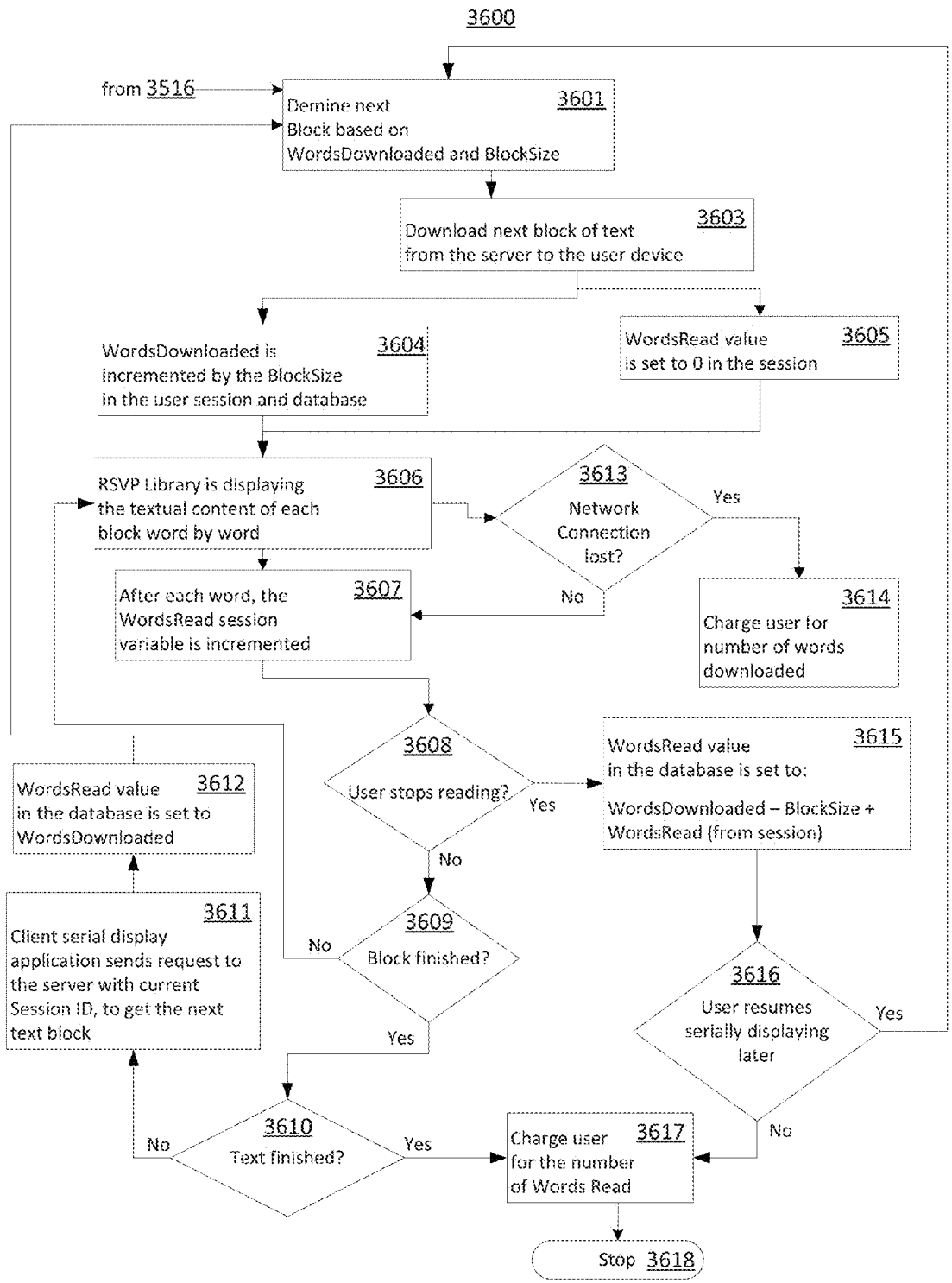
FIG. 36 illustrates a process flow implemented by a computer system in accordance with an embodiment of the present invention for serially displaying and tracking content, including textual content by choosing a text block to display word-by-word to the user, according to an embodiment of the present invention.

FIG. 35 and FIG. 36 illustrate process flow diagrams for methods 3500 and 3600 for serially displaying and tracking content, including textual content, when the content is paid text and the user is online while displaying the content, according to an embodiment of the present invention.

Referring to FIG. 35, Step 3501 provides a user request to view textual content using serial display, while being online. Step 3502 provides input from the user to activate serial display functionality. Here, the functionality can be automatically activated by selecting serially displayable content or may be activated by launching a serial display enabled application.

Step 3503 determines whether the user is a new user by checking the user credentials. The credentials may be saved on the user device, including a user name and password or may be anonymous credentials. If the result of step 3503 is no, then step 3504 logs in the user automatically to the serial display enabled application. If the result of step 3503 is yes, then step 3505 saves the new credentials in the serial display enabled application.

Step 3506 authenticates the user. Step 3507 provides user input selecting the textual content to display serially. Additionally, step 3508 creates the user session and saves the session information 3512 on the client side. The session information 3512 may also be saved on the server side.

Session information 3512 includes the Session ID, User ID, Text ID, Words Downloaded and Words Read. Words Read in the session is a value relative to the text block size.

Step 3509 verifies content availability for the user. Step 3510 associates and saves the User ID and the Text ID in tracking database (DB) 3513. DB 3513 is a tracking database table, including User ID, Text ID, Is Displayable, Words Downloaded and Words Read fields.

Step 3511 adds the Text ID and tracking variables to the user session. Specifically, at this stage, the tracking variables, Words Downloaded and Words Read are initialized to zero (0). Step 3514 flags the user selected content as currently serially displayable to the user in the Is Displayable field of DB 3513.

Step 3515 provides the selected serially displayable content for download. Step 3516 receives a user request to serially display content, including textual content. The request may be generated as a result of a system event indicating that serial display functionality has been activated by the user, automatically by the system when the RSVP application is launched or by a predetermined user input. The request may also include session information or login credentials, including for example, tracking variables and user-specific information extracted from user settings or server settings, such as user speed and reading level. The method then proceeds to step 3601.

Referring now to FIG. 36 and method 3600, step 3601 determines the next block (which is the first block when 3601 initially executes in response to user input from 3516) based on Words Downloaded and Block Size. Block Size may be a preset constant (10-100 words), chosen by the user in settings, or determined based on various factors such as, for example, the network connection quality and/or user speed.

Step 3603 downloads the text block (determined by step 3601) from the server to the user device. Step 3604 increments Words Downloaded by the Block Size in the user session and the tracking database 3513. Step 3605 sets the Words Read value to zero (0) in the user session.

Step 3606 displays the textual content of each block (i.e., the next block) word-by-word. After each word is displayed, step 3607 increments the Words Read session variable by one (1) word.

Step 3608 determines whether the user stops reading. In the illustrated embodiment, this is determined by whether the user has stopped the RSVP display of the content by, for example, controlling the RSVP interface to stop the RSVP display or navigating away from the web page or other application interface window in which RSVP display of the content was triggered In alternative embodiments, additional factors might be used to determine if the user is still actively viewing the content, for example by monitoring the user's presence, eye position, the user's facial expression, or other indicators via a camera or other monitoring means. Additionally, the user device may be monitored for going to idle state, disconnected state, or the user may affirmatively indicate that the user stopped reading.

If the result of step 3608 is no, then step 3609 determines whether the block is finished. If the result of step 3609 is yes, then step 3610 determines whether the text is finished. If the result of step 3610 is no, then step 3611 sends a request to the server with the current Session ID to get the next text block. Step 3612 updates the Words Read value to Words Downloaded and method 3600 returns to step 3601 to determine the next block. If the result of step 3610 is yes, then step 3617 charges the user based on the current value of the Words Read variable and the process stops at step 3618.

If the result of step 3608 is yes, then step 3615 sets the Words Read value to Words Downloaded minus Block Size plus Words Read from the user session. Step 3616 determines whether the user resumes reading the text via serial display at some later point in time (i.e., resumes before a predetermined maximum passage of time or by a predetermined date). Resumption in reading may be indicated by, for example, the events described above with reference to step 3516. If the result of step 3616 is no, then step 3617 charges the user based on current value of the Words Read variable and the process stops at step 3618. If the result of 3616 is yes, then the process returns to step 3601.

While step 3606 displays text word-by-word, step 3613 determines whether the network connection was lost. If no, then the method proceeds as indicated. However, if step 3613 determines that the connection is lost, then step 3614 charges the user based on the value of Words Downloaded. Thus, the user is either charged for the blocks of text downloaded (step 3614), or for total words read, i.e., the value of the Words Read variable in the database (step 3617).

Although not illustrated, step 3613 may determine whether a network connection was lost, throughout method 3600. Additionally, although not illustrated, 3614 may schedule a charge for the user based on words downloaded and charge the user if a network connection is not regained in a predetermined period of time. If step 3616 resumes serially displaying later, the scheduled charge may be reset.

That is, if at any time after step 3515 makes the content available for download and step 3516 initiates serial display, the network connection is lost, the tracking process waits for a network connection and continues attempting to check for the network connection. Once the network connection is re-established, the process communicates the latest tracking information to the server.

Figure 37:
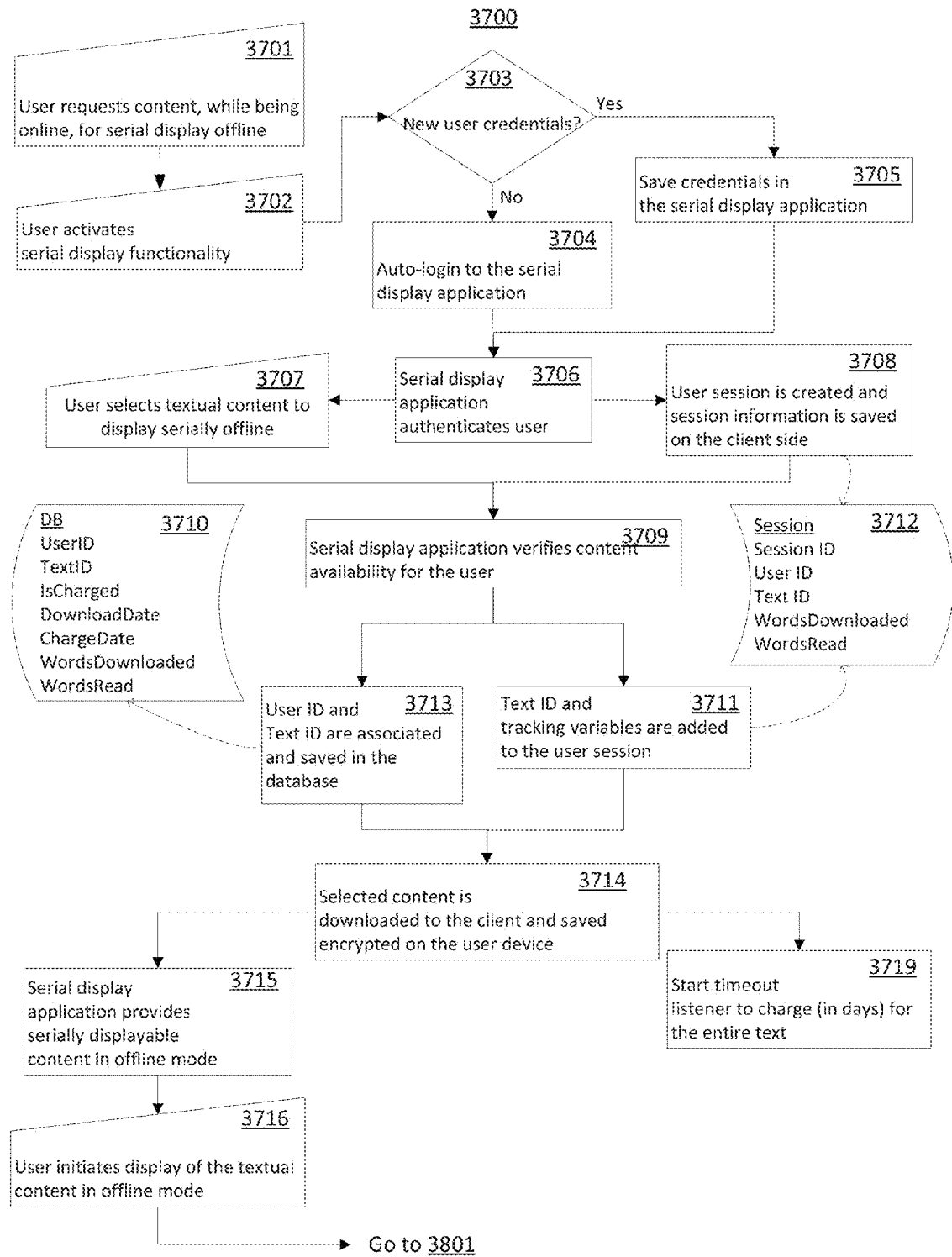
FIG. 37 illustrates a process flow implemented by a computer system in accordance with an embodiment of the present invention for serially displaying and tracking content, including textual content, when user is offline while displaying paid content, according to an embodiment of the present invention.
Figure 38:
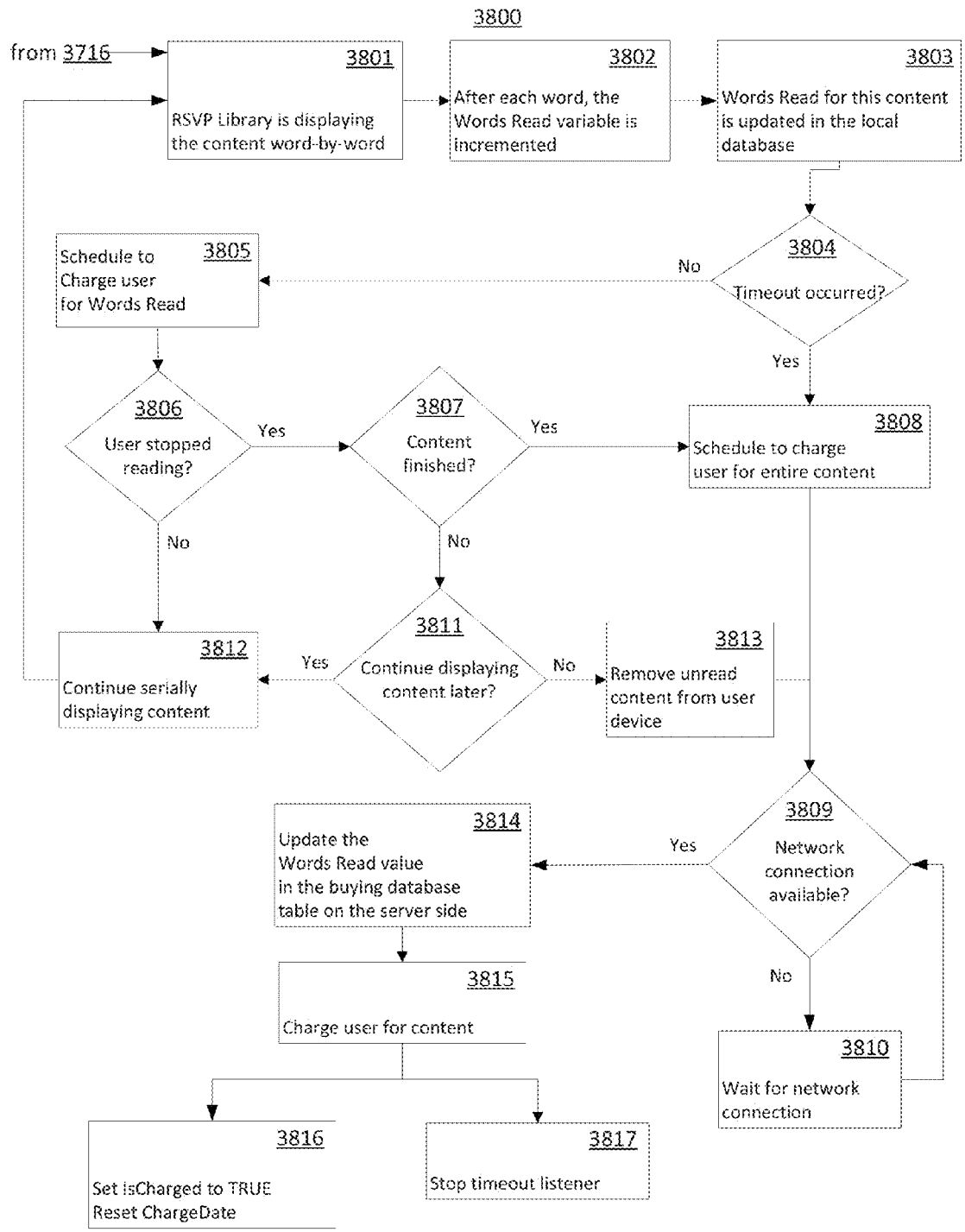
FIG. 38 illustrates a process flow implemented by a computer system in accordance with an embodiment of the present invention for serially displaying and tracking content, including textual content offline, according to an embodiment of the present invention.

FIG. 37 and FIG. 38 illustrate methods 3700 and 3800 for serially displaying and tracking content, including textual content, when the content is paid text and the user is offline while displaying the content, according to an embodiment of the present invention.

Referring first to FIG. 37, step 3701 receives a user content request, made online, for serial display of the content viewed offline. Step 3702 receives a user request to activate serial display functionality. The user may initiate the request by, for example, the user accessing the serial display application on the user device or by performing a shortcut or gesture input on the user device.

Step 3703 determines whether the user has new user credentials. If no, then step 3704 logs the user into the serial display application automatically. If yes, then step 3705 saves the credentials for future logins. Step 3706 authenticates the user. Step 3707 receives user input to select the textual content to display serially offline.

Step 3708 creates the user session is created and saves session information 3712 on the client device. The session information 3712 includes a Session ID, a User ID, a Text ID, Words Downloaded and Words Read.

Step 3709 verifies content availability for the user. The verification may involve, for example, determining whether the content is serially displayable to the user or whether the user has rights to view the content.

User session information is also saved in DB 3710, which includes User ID, Text ID, Is Charged, Download Date, Charge Date, Words Downloaded and Words Read. Step 3711 adds the Text ID and tracking variables to the user session information 3712. Step 3713 associates the User ID and Text ID by saving them together in DB 3710. DB 3710 may be a buying database, i.e., a tracking database used to determine the amount to charge based on words read, or content used, by the user or the advertiser.

Step 3714 downloads and saves the user selected content, including textual content. Step 3715 prepares the content to be serially displayed and provides serially displayable content in offline mode to the user. The serial display application prepares the content, for example, by configuring content, including textual content for RSVP display by parsing text included in the content, and other displayable elements in the content, and dividing the content into a plurality of displayable elements.

Step 3719 starts a timeout listener to charge the user for the entire text after a predetermined amount of time. For example, the user may have 10 days to check out the content and if the user does not check the content back in and provide an update on how much of the content was read, the user will be charged for the entire content by the end of 10 days. Use of the timeout period for charging is described further in the context of FIG. 38.

Step 3716 receives a user request to start serially displaying content, including textual content, in offline mode. The request may be generated as a result of a system event indicating that serial display functionality has been activated by the user, automatically by the system when the RSVP application is launched or by a predetermined user input. The process then proceeds to step 3801 of process 3800 illustrated in FIG. 38.

Referring now to FIG. 38 step 3801 displays the text word-by-word. After each word is displayed, step 3802 increments the Words Read variable by one (1). Step 3803 updates the Words Read value for this Text ID in the local database based on the new value.

Step 3804 determines whether a timeout has occurred, based on the predetermined number of days, as described with reference to step 3719 in FIG. 37. If the result of step 3804 is yes, then step 3808 schedules to charge the user for the entire content. If the result of step 3804 is no, then step 3805 schedules to charge the user based on the latest value of Words Read.

Step 3806 determines whether the user stopped reading. If the user did not stop reading, then step 3812 continues serially displaying the content and the process returns to step 3801. If the result of step 3807 is yes, then step 3807 determines whether the content is finished. If the content is finished, then step 3808 schedules to charge the user for the entire content.

If the result of step 3807 is no, then step 3811 determines whether the user requests to continue displaying the content later (i.e., before the timeout references in step 3804). If yes, then step 3812 continues serially displaying the content and the process returns to step 3801. If not, then step 3813 removes unread content from the user device.

Step 3809 determines whether a network connection is available. If no, then step 3810 waits for a connection and loops back to step 3809. If a network connection is available, then step 3814 updates the Words Read variable in the server-side buying database using the value from the local (user device) database. Step 3815 charges the user for the content based on the words read. Step 3816 sets the flag Is Charged for the User ID and Text ID to true. Step 3817 stops the timeout listener.

Figure 39:
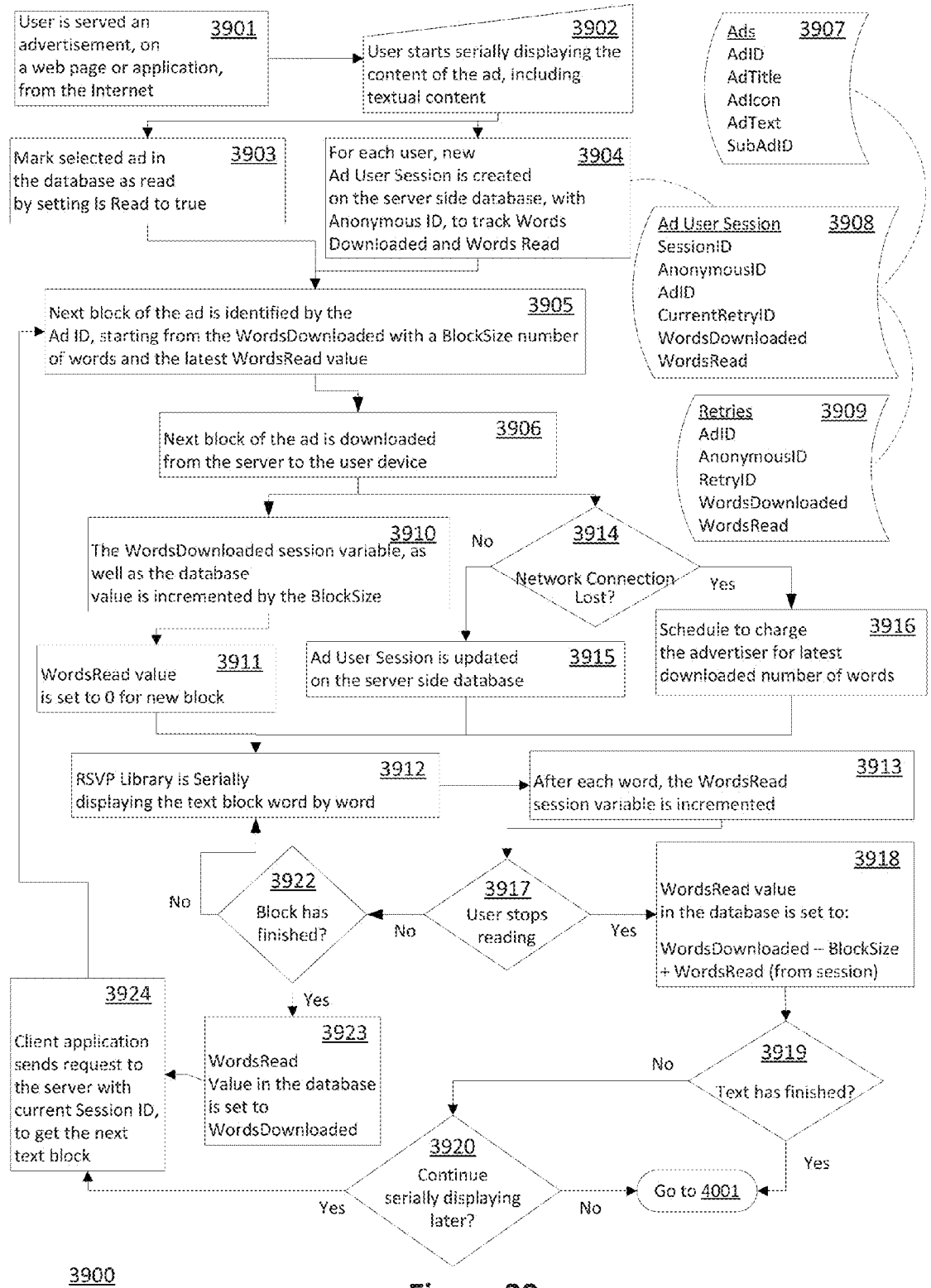
FIG. 39 illustrates a process flow implemented by a computer system in accordance with an embodiment of the present invention for tracking serially displayed advertisements, according to an embodiment of the present invention.
Figure 40:
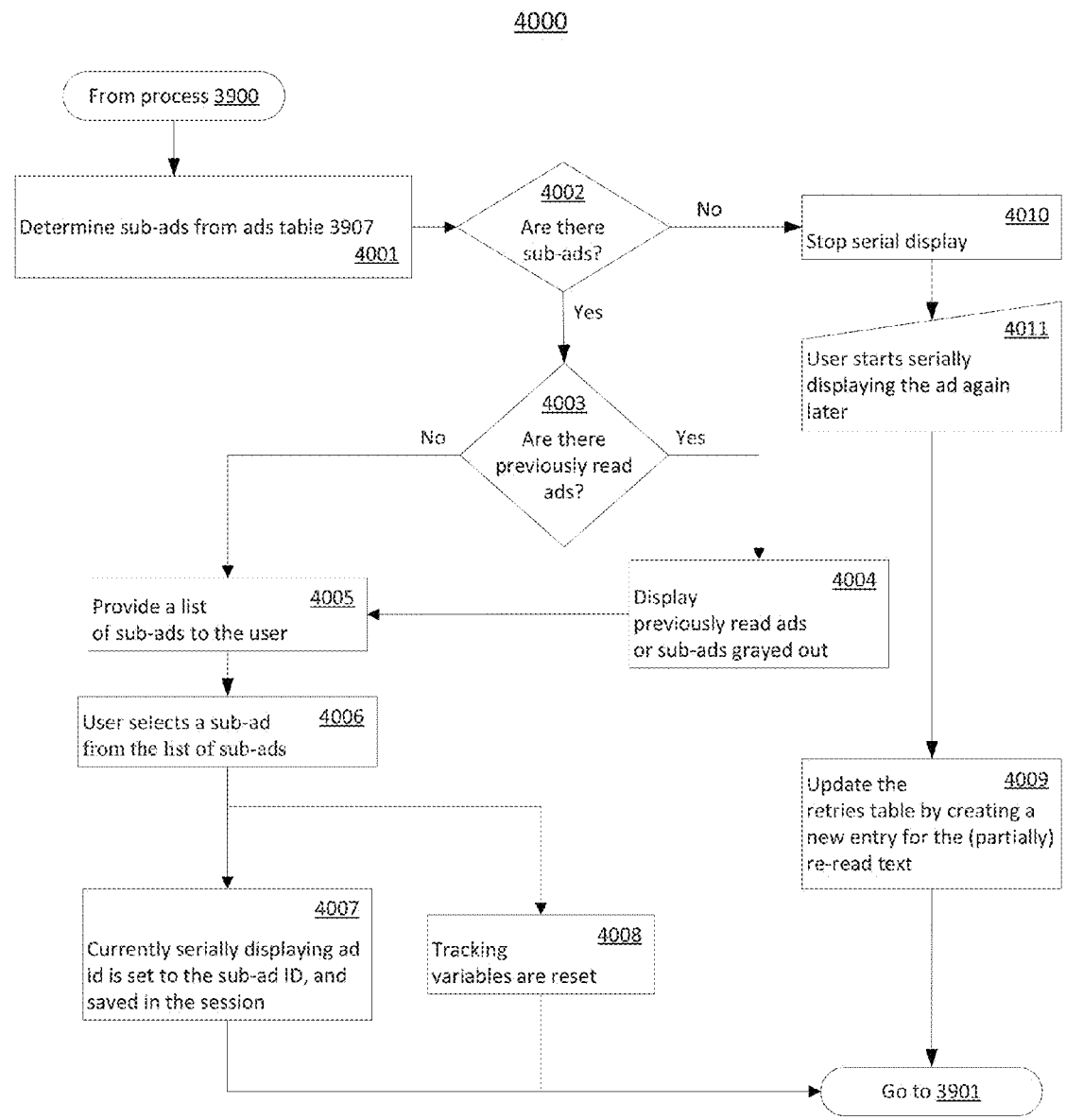
FIG. 40 illustrates a process flow implemented by a computer system in accordance with an embodiment of the present invention for serially displaying and tracking ads and sub-ads, according to an embodiment of the present invention.

FIG. 39 and FIG. 40 illustrate methods 3900 and 4000 for tracking serially displayed targeted content and according to an embodiment of the present invention. A particular example of targeted content is sponsored content such as an advertisement (ad). For ease of explanation, the examples of FIGS. 39-40 are described in the context of ads. Each ad is represented on the server side in a table (e.g., as a row or column of data in a table) in the database, for example as illustrated by ads table 3907. An ad can have sub-ads. A sub-ad is connected to the ad by Sub Ad ID in Ads table 3907. A sub-ad may be connected to an ad by a text identification within the metadata of the ad or otherwise encoded in the parent content, or originating content. In an alternative embodiment, the sub-ad may be dynamically generated by using a lookup table, based on key words displayed in the parent ad, for example as described below with reference to FIG. 42 with respect to ads dynamically generated based on words displayed in non-sponsored text.

The sub-ads may be pre-generated by the advertiser or content publisher based on pre-determined keywords within the originating ad or content and embedded within the originating ad or content upon serving the selected content to the user. In an alternative embodiment, the sub-ads may be dynamically generated, based on the keywords related to the content read thus far, while tracking the serial display of content, by the advertiser or content publisher, based on keywords within a pre-determined keyword lookup table linking keywords to sub-content, for example, sub-ads or other sub-content. However, in the embodiment describe below, sub-ads are linked to the parent ad by the provider of the parent ad while the parent ad is dynamically generated based on the words that are serially displayed in non-sponsored text.

RSVP content may include embedded text, an attachment and/or a URL, as sub-content. In addition to displaying an indication of a sub-content on the display, an indication of the type of sub-content may also be indicated, for example distinguishing whether the sub-content is a text, a file attachment or a URL. The file attachment may be, for example a photo, a map, a document, etc. When a user selects a sub-content item, for example, a file attachment, the application associated with the sub-content is launched to open the sub-content.

In the described embodiments sub-ads and sub-texts (described below) appear when the reading of text is stopped, either by the user during the reading of the main ad or text, or when the main ad or text reached the end. Additionally, the sub-ads and sub-texts may be configured to appear during the main ad or text to allow the user to instantly recognize that the proper noun or key word will be available to read later so that the user does not need to stop to look for it during the currently displaying text. Although not illustrated, the sub-ads and sub-texts may appear after a user initiated interruption in the serial display and tracking method.

The sub-ads (or other sub-content items) may be displayed on the interface of the user device as a circular path of cascading sub-content items and upon navigation may end up back at a previous point in the loop. A previously read ad or other item can be displayed as grayed out to indicate to the user not to continue repeating the cycle. However, a different visual feedback may be used to prevent the user from re-looping unnecessarily.

When tracking ads, the Ad User Session is updated on the server side database. For each user viewing an ad, a new session with an anonymous ID is created to keep track of words downloaded and serially displayed.

A block of the ad is downloaded from the server to the user device. The Words Downloaded session variable, as well as the database value is incremented by the Block Size upon each block download. Block Size can be either defined in the application as a constant, for example of 10-100 words, or chosen by the user in the application/OS settings, or computed automatically, based on the network connection quality and user reading speed. Upon downloading the new block, Words Read value in the session is set to zero (0). While the RSVP Library is serially displaying the text block word-by-word, the Words Read session variable is incremented for each word. If the network connection is lost, latest downloaded number of words can be used for charging the company being advertised. Otherwise, the advertiser may be charged based on words read within the ads being served.

The ad displaying and tracking process begins in step 3901, when a user is served an advertisement or a sub-advertisement, on a web page or application, from the Internet.

Step 3902 receives a request to initiate serial display of the ad content, including textual content. The request may be generated as a result of a system event indicating that serial display functionality has been activated by the user, automatically by the system when the RSVP application is launched or by a predetermined user input.

Step 3903 marks the serial-displayed sub-ad as read by setting a corresponding Is Read variable associated with the content as true. The Is Read flag may be maintained in a user session or in a server side database, corresponding to content.

Step 3904, for each user, creates a new ad user session 1108 with value for variables including SessionID, AnonymousID, AdID, CurrentRetryID, WordsDownloaded and WordsRead. The user session information 3908 is partially associated with the information in ads table 3907 and retries table 3909. The ads table 3907 includes AdID, AdTitle, AdIcon, AdText and SubAdID. The retries table 3909 includes AdID, AnonymousID, RetryID, WordsDownloaded and WordsRead. The retries table may be used to track how many retries were used for serially displaying the content. The words read and words downloaded, upon retry, may be tracked separately for each retry. That is, each retry entry in the retries table 3909 may include different amounts for words read and words downloaded, for each retry. The information in the retries table 3909 may be used when aggregating analytics about content use and when determining a charge for the advertiser based on the retries. For example, an advertiser may be charged more if a user retried the sponsored content or may not be charged for any retries.

Step 3906 identifies the next block of the ad using the Ad ID, Words Downloaded and Block Size information variables or by counting from the latest Words Read variable value. Step 3907 downloads the block identified in step 3906 from the server to the user device. Step 3911 increments the Words Downloaded session variable and database value by the Block Size. Step 3911 initializes the Words Read value to zero (0), for counting the new block. While blocks are downloaded at step 3910, step 3914 monitors the network connection to determine if it has been lost.

If the network connection has not been lost, then step 3915 continues to update the ad user session information 3908 on the server. If yes, then step 3916 schedules to charge the advertiser based on the latest number of downloaded words.

Although not illustrated, step 3914 may monitor whether a network connect was lost, throughout method 3900. Additionally, although not illustrated, 3916 may schedule a charge for the user based on words downloaded and charge the user if a network connection is not regained in a predetermined period of time.

That is, if at any time after step 3903 starts serially displaying the content of the ad, including textual content, the network connection is lost, the tracking process waits for a network connection and continues attempting to check for the network connection. Once the network connection is re-established, the process resets the scheduled charge and communicates the latest tracking information to the server.

Step 3912 displays the content, including textual content, word-by-word. After each word is displayed in step 3912, step 3913 increments the WordsRead session variable by 1.

Step 3917 determines if the user stops reading (e.g., by determining serial display of the ad has stopped). If yes, then step 3918 updates the WordsRead value in the database to reflect the words read thus far by setting the Words Read value to equal to WordsDownloaded minus the BlockSize plus the WordsRead so far from the session. Step 3919 then determines whether the text has finished. If yes, then the process goes to 4001 of method 4000 (described further below with reference to FIG. 40) for displaying any sub-ads. If no, then step 3920 determines whether the serial display of the ad resumes within a predetermined period of time (e.g., before a timeout timer expires). If no, then the process goes to 4001 of method 4000. If yes, then the process proceeds to step 3924 to get the next text block.

If the result of step 3917 is no, then step 3922 determines if the block has finished. If no, then step 3912 continues serially displaying the block word-by-word. If yes, then step 3923 sets the WordsRead value in the database to the value of WordsDownloaded.

Step 3924 sends a request to the server with the Session ID, to get the next text block to display and the process continues with step 3905. At the end of method 3900 (not shown), the user may be charged based on the latest words read.

FIG. 40 is a diagram illustrating a method 4000 of serially displaying sub-ads. Sub-ads are related to the main ad and are linked together by AdIDs and SubAdIDs. As billing information is already saved in the database, sub-ads can be tracked similar to ad tracking in FIG. 39.

Step 4001 determines the sub-ads, if any, to be displayed to by identifying any sub-ads associated with the displayed ad in ads table 3907. Step 4002 determines whether step 4001 identified any sub-ads to display. If yes, then step 4003 determines whether any of the identified sub-ads are ads that have been previously read (e.g., displayed). If there are previously read ads, then step 4004 displays those ads as grayed out. If there are not any previously read sub-ads, then step 4005 provides a list of sub-ads to the user.

Step 4006 receives a user action selecting a sub-ad from the list provided in step 4005, the user action triggering RSPV display of the ad. In some embodiments, the user action may be an active selection of an ad from the list. In other embodiments, the user action may be a passive action, for example, simply not navigating away from or closing the window or page on which the list is displayed. In the latter case, the first sub-ad in the list is selected for display by RSVP. Upon determining that a sub-ad is selected for display the system begins RSVP display of the sub-ad.

Step 4007 sets the Ad ID in the user session to the sub-ad ID to indicate the currently serially displaying ad, and saves in the session information 3908.

Step 4008 resets the tracking variables in the user session, for example, Session ID, U ID, Ad ID, Current Retry ID, Words Downloaded and Words Read. The process then proceeds to step 3901 in FIG. 39, where a user is served an advertisement or a sub-advertisement. The process tracks the sub-ad selected in step 4006, for example, in the same way as tracking an ad in FIG. 39.

If step 4002 determines that there are not any (or any more) sub-ads to be displayed, then step 4010 stops the serial display stops serial display. If the user re-initiates serial display of the ad that has already been displayed in step 4011, then step 4013 updates the retries table by creating a new entry for the re-read or partially re-read content.

Then, the process may continue from the beginning, or proceed to the ad tracking process in FIG. 39.

Figure 41:
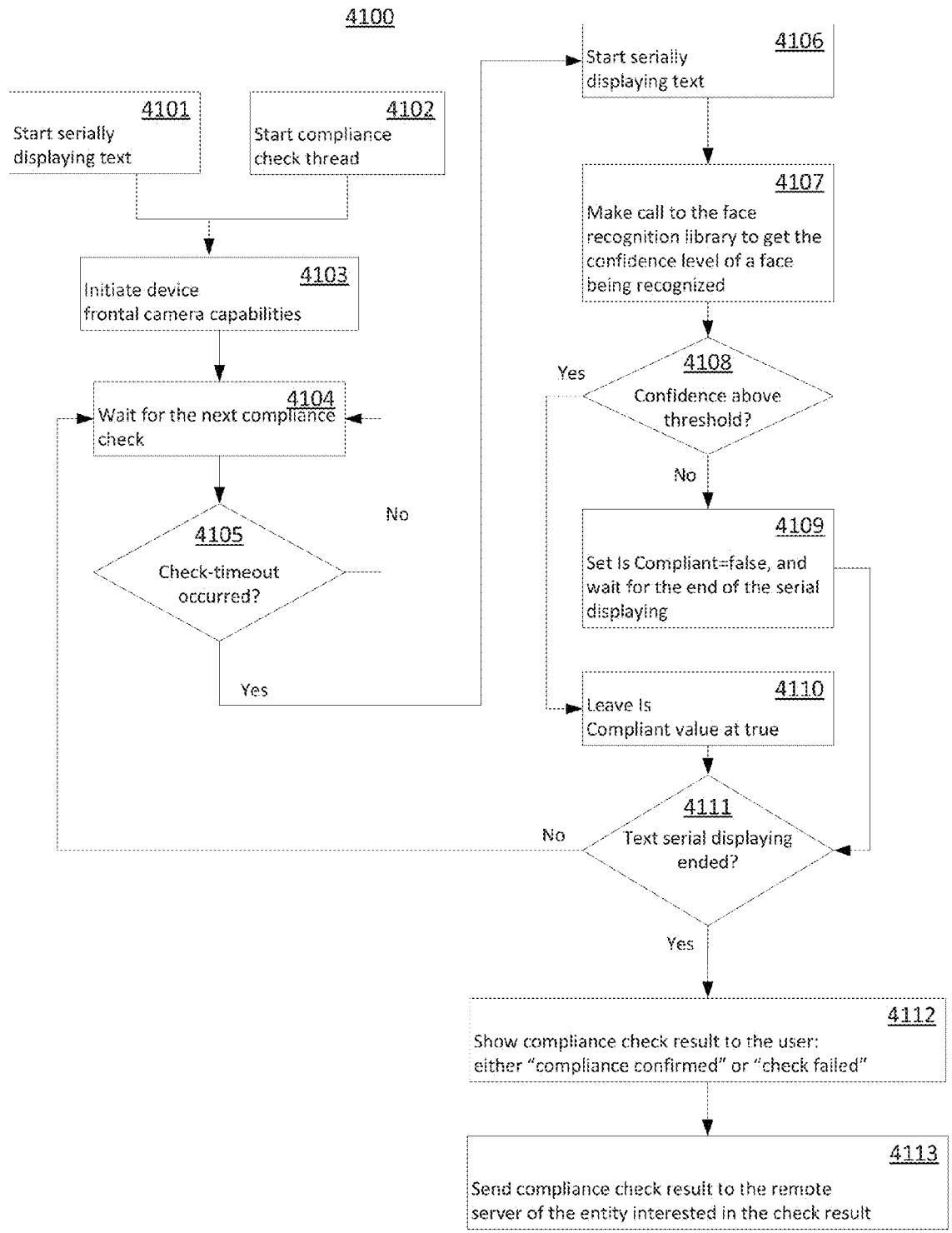
FIG. 41 illustrates a process flow implemented by a computer system in accordance with an embodiment of the present invention for serially displaying text and tracking reading compliance, according to an embodiment of the present invention.

FIG. 41 is a process flow diagram illustrating a method 4100 for serially displaying text and tracking reading compliance, according to an embodiment of the present invention.

Step 4101 begins serially displaying a text that the user is required to read. Alternatively, the text may be optional to read and compliance may refer to whether the user is continuously reading the text. Step 4102 starts a compliance check thread. Step 4103 initiates a frontal camera device. Most modern mobile devices include a frontal camera. Additionally, most modern desktop PCs and laptops may include a frontal video camera, for example a webcam. The camera may be integrated within the device or connected to the device, or accessible and connected with the device.

In step 4104, the compliance thread sleeps for a predetermined number of milliseconds, waiting for the compliance next check. The sleep time may be set by the user or the content provider in user or server settings.

Step 4105 determines whether a check-timeout occurred. If yes, then the content, including textual content, begins serially displaying. If a check-timeout did not occur (No in step 4105), then the compliance thread continues to sleep for the predetermined number of milliseconds in step 4104, before checking again.

Step 4107 determines a confidence level of a face being recognized. In some embodiments, this is done by calling a face recognition library. Such libraries are well known. Such a call routine and the associated library may be part of the OS on the mobile device or implemented as a third party library. Step 4108 determines whether the confidence level is above a predetermined threshold. For a confidence factor between 0 and 1, a value of above 0.3 is usually a good threshold but other values may be considered. In alternative embodiments, additional factors might be used to determine compliance, for example by monitoring the user's presence, eye position, or other indicators via a camera or other monitoring means.

If the result of step 4108 is no, than an Is Compliant variable value is set to false, and the process proceeds to step 4111. If the result of step 4108 is yes, then the Is Compliant variable value is left at true (if previously initialized as true).

Step 4111 determines whether serial displaying of text ended. If not, the process returns to step 4104 and waits for the next check. If serial displaying has ended, then step 4112 shows the compliance check result to the user. The result is either that compliance is confirmed or that the compliance check shows failure. Alternatively, the compliance check result can be represented as a mean value of all confidence factors measured throughout the serial display.

When determining the mean confidence of factors, checking intervals may be used to see if you are still in front of the camera by analyzing various levels of recognition. A thirty percent confidence factor that a person is in front of the camera may be a sufficient threshold for a successful compliance check, for that time interval, indicating a user being in front of the camera. Otherwise the compliance check is marked as failed for that time interval. When some checks fail and some checks pass, mean value of all of the confidence factors may be used. If the mean is above 30% then the overall compliance check is successful. The time interval for compliance checks may be pre-determined or could be a function of a user reading speed. For example, the method may check compliance every 1000 words.

Figure 42:
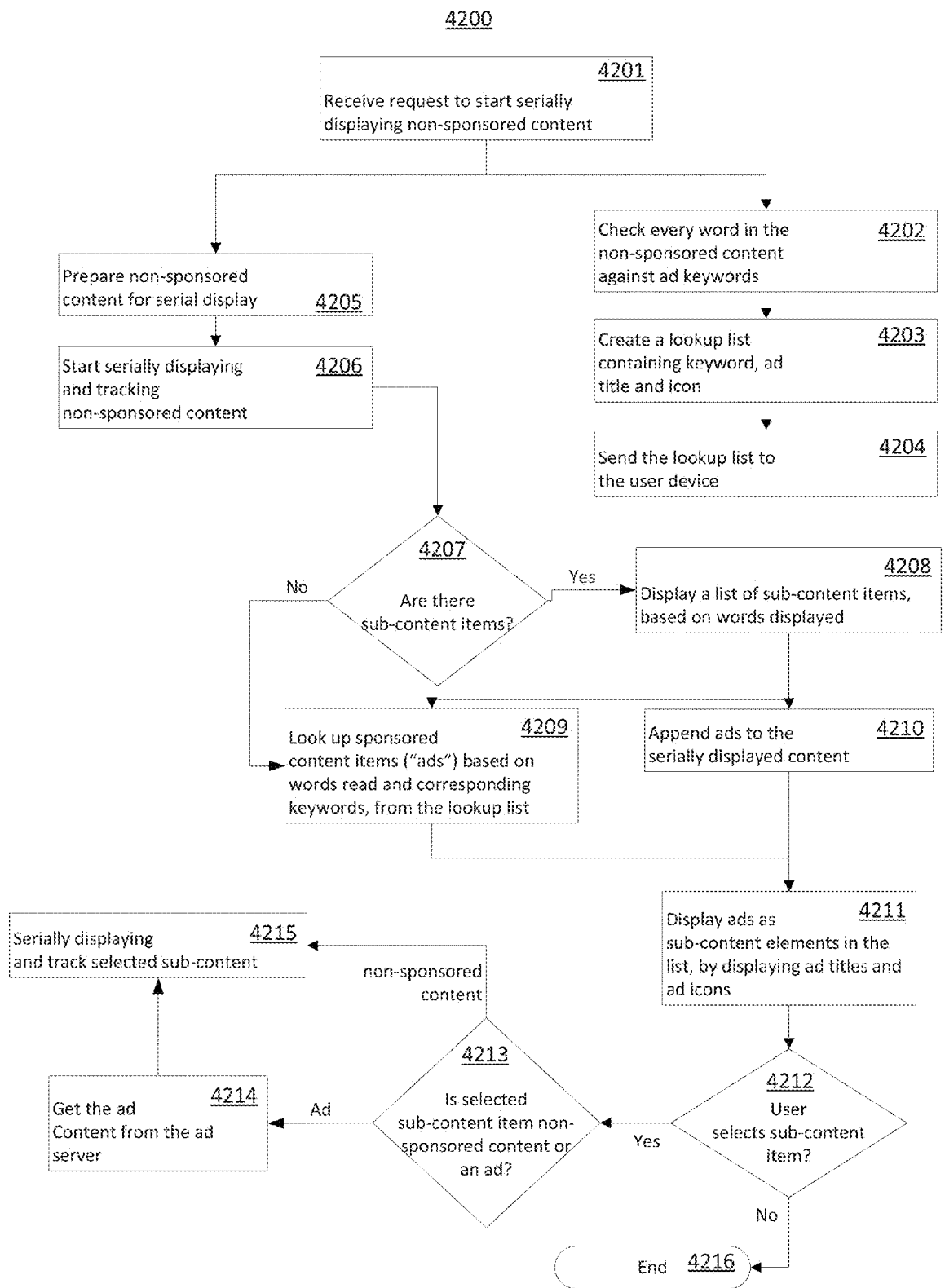
FIG. 42 illustrates a process flow implemented by a computer system in accordance with an embodiment of the present invention for serially displaying and tracking text and sub-text based on keywords, according to an embodiment of the present invention.

FIG. 42 is a process flow illustrating a method 4200 for serially displaying and tracking content and sub-content, according to an embodiment of the present invention. The content includes non-sponsored content and sponsored content ("ads"). The non-sponsored content may also include non-sponsored sub-content. The ads are displayed as sub-content items along with (e.g., after) any non-sponsored sub-content items.

Step 4201 receives a request to start serially displaying non-sponsored content in RSVP. The request may be generated by a user, or as a result of a system event indicating that serial display functionality has been activated by the user, automatically by the system when the RSVP application is launched or by a predetermined user input. The request may also include session information or login credentials, including for example, tracking variables and user specific information extracted from user settings or server settings, such as user speed and reading level. The text may be currently accessible by the user device, for example, it might be saved locally on the device or on a user memory accessible by the user device such as a removable drive or cloud storage, the textual content may be parsed to check the text for keywords. Alternatively, a parser may be invoked before serving content to a user. The advertiser can provide a list of ads to be used with particular keywords. Similarly, a content provider can provide a list of content to be used with particular keywords.

Step 4202 checks every word in the text of the non-sponsored content against a database table containing advertising keywords.

Step 4203, based on the checking of step 4202, creates a lookup list containing keywords, titles and icons in preparation for delivery to the user. This list may be used as a lookup list, in the form of a lookup table stored on the server, to retrieve sponsored content based on words displayed, the sponsored content to be displayed as sub-content along with other sub-content items, if any. The title and icon information in the lookup list may be used to show ads as sub-content items at the end of a list of any non-sponsored sub-content items.

Step 4204 sends the list of found keywords to the user device. Step 4205 prepares the content to be serially displayed.

The content is prepared by, for example, by configuring content, including textual content for RSVP display by parsing text included in the content, and other displayable elements in the content, and dividing the content into a plurality of displayable elements, to display the elements serially.

In the illustrated embodiment, the ads to be displayed as sub-content items are generated dynamically from a lookup based on words displayed by RSVP in the non-sponsored content. The lookup list may be itself dynamic (not shown), based on advertisement supply and demand or bidding outcomes at the time the list is generated. However, in alternative embodiments, the ads to be displayed as sub-content items may be embedded in the requested non-sponsored content.

Step 4206 serially displays the non-sponsored content, word-by-word and tracks words displayed. Once display has ended, step 4207 determines whether there are sub-content items.

If the result of step 4207 is yes, then step 4208 displays a list of the sub-content items. Step 4209 looks up ads based on words read (i.e., displayed by RSVP) and corresponding keywords, from the lookup list created in step 4203. Step 4210 appends the ad titles to the list of other sub-content items displayed in step 4208. If the result of step 4207 is no, then the process proceeds directly to step 4209 to lookup the ads. In either case, the method proceeds to step 4211 which displays the ads as sub-content items by displaying representations of the ad (e.g., ad title and/or any corresponding ad icon).

Step 4212 determines if the user has selected a sub-content item. If no, then the process ends at step 4216. If yes, then step 4213 determines whether the item is a non-sponsored content item or an ad. If an ad, then step 4214 retrieves the full ad content from the ad server. If non-sponsored content, then the process proceeds directly to step 4215. Step 4215 displays and tracks the sub-content (whether an ad retrieved by step 4214 or non-sponsored sub-content that has been retrieved already or by other means). The process then ends at step 4216.

The tracking techniques described herein may be applied to any content, including textual content that can be divided into displayable elements and serially displayed. The divided elements may be treated as words and the use of content, including textual content, may be tracked by the tracking methods and systems described herein. Further, analytics can be performed for serial displays that are classified by the type of media that contain integrated serial displays. One example of tracking the creation and consumption of mixed media content that includes RSVP content and other content is shown in FIG. 43*a*, 43*b*, and 43*c*.

Figure 43A:
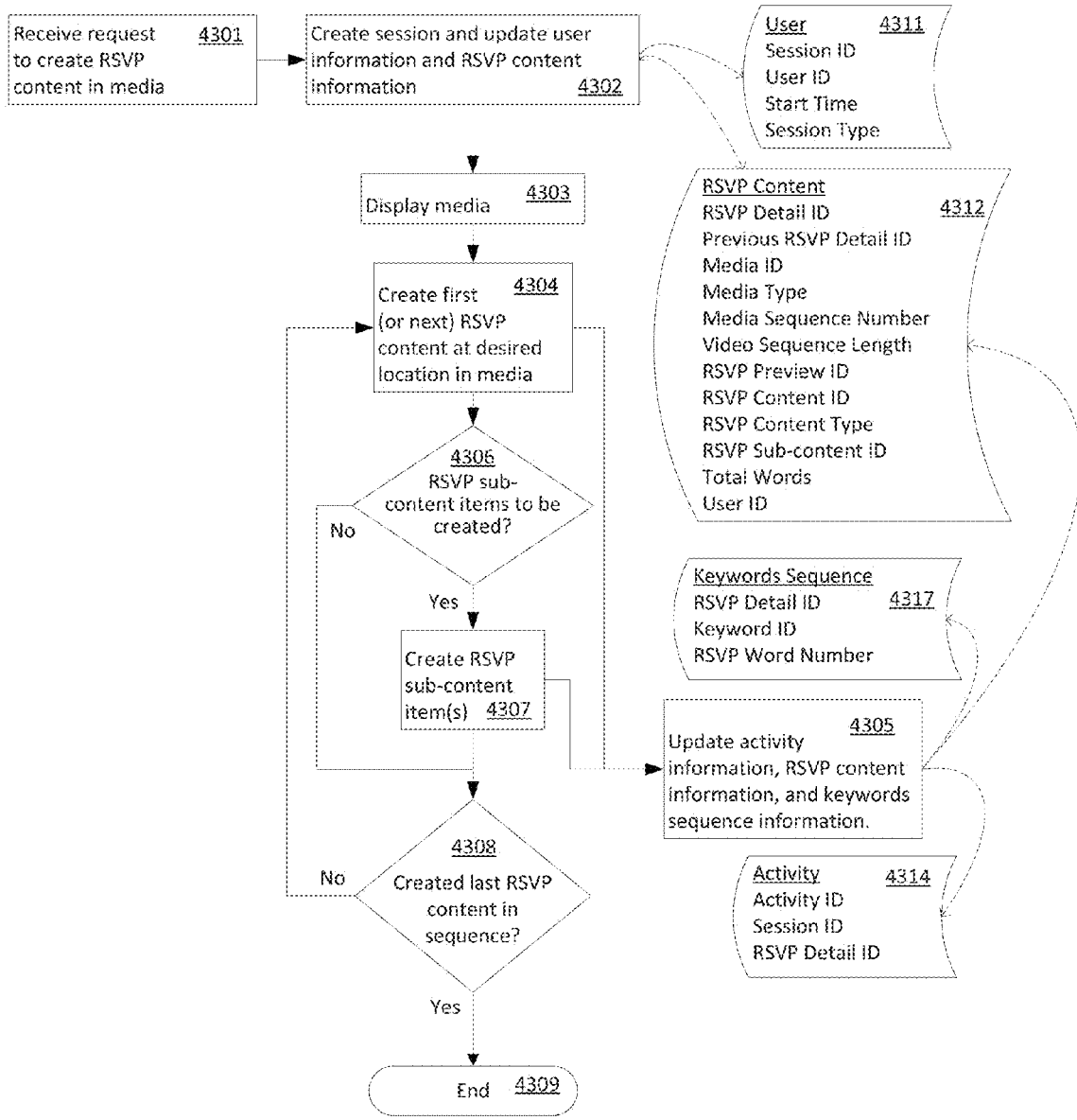
FIGS. 43a, 43b and 43c illustrate process flows implemented by a computer system in accordance with an embodiment of the present invention for tracking the creation and viewing of RSVP content integrated in media to capture data that can be used for analytics.
Figure 43B:
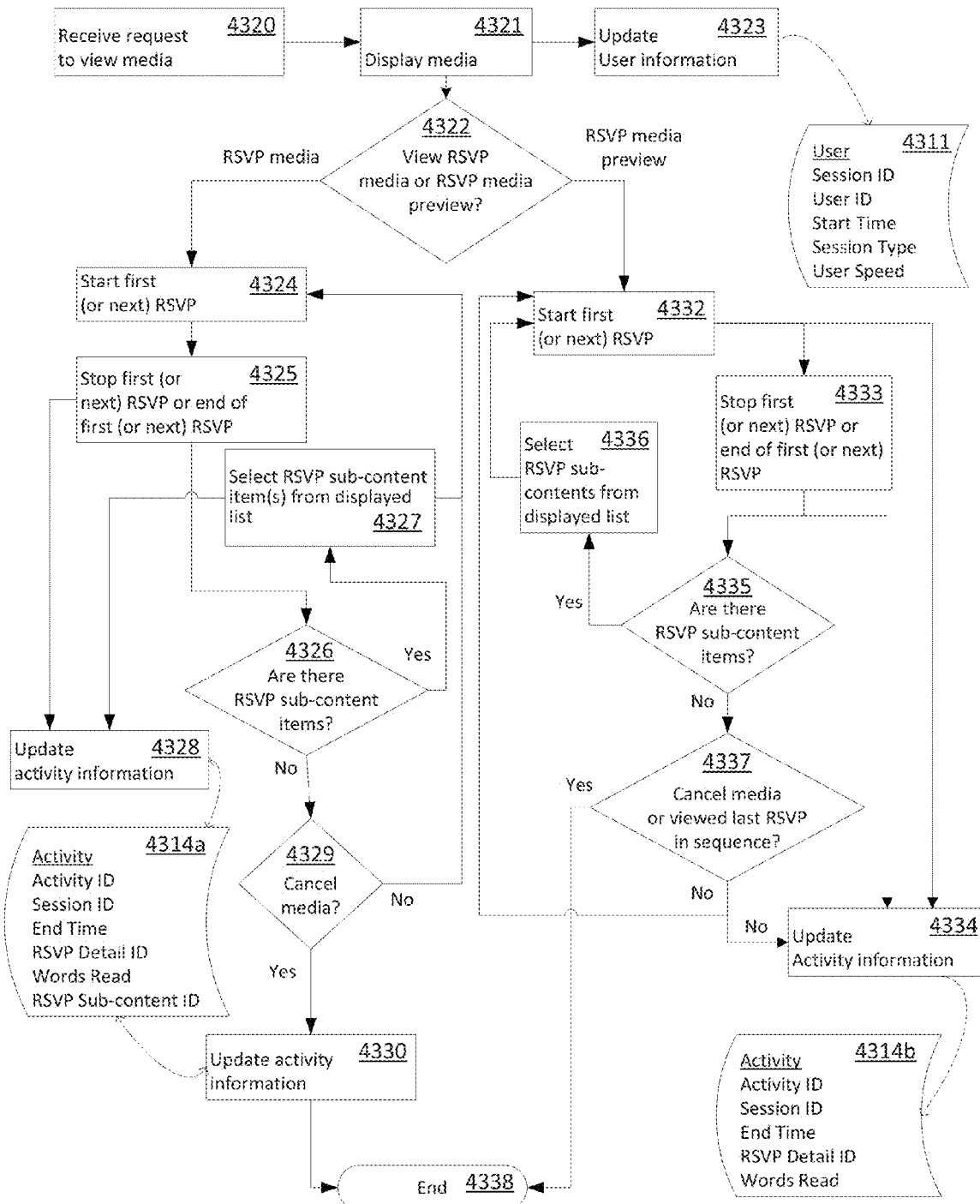
Figure 43C:
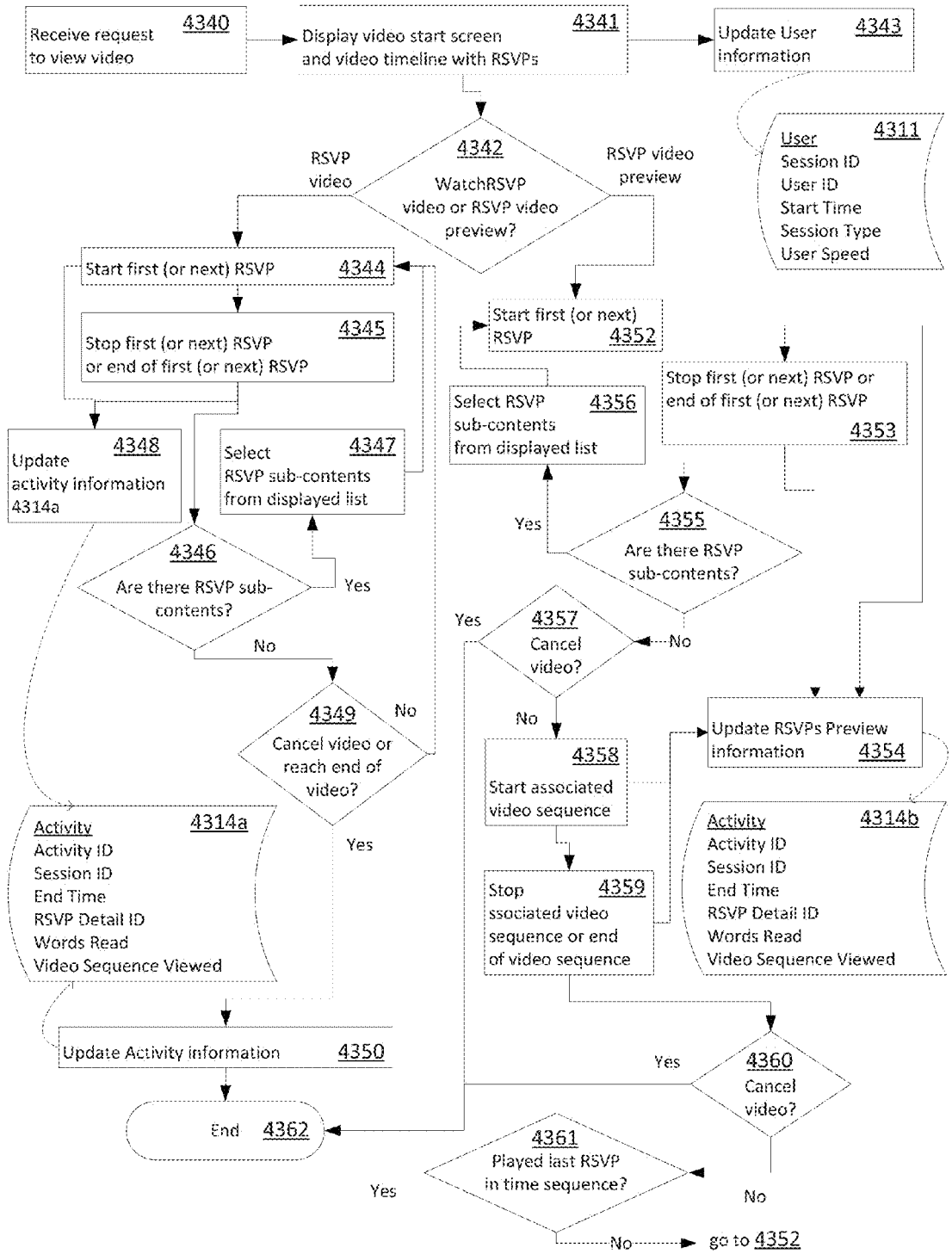

FIGS. 43*a*, 43*b* and 43*c* are process flow diagrams illustrating methods 4300*a*, 4300*b*, and 4300*c* for tracking the creation and viewing of RSVP content integrated in media to capture data that can be used for analytics, according to an embodiment of the present invention. In particular, the methods illustrated provide for tracking RSVP creation and consumption information to readily allow for aggregating data about consumption of a particular media item across multiple users (aggregating the data gathered using the methods illustrated in FIGS. 43*a-c* is discussed further in the context of FIGS. 44a-44b). Media types that can include or be intermixed with RSVP content may be, for example, texts, photos, maps, and videos. FIGS. 43a and 43b are described in the general context of any media type. However, because video media may include time-based sequencing of RSVP content segments, FIG. 43c provides a process flow in the context of videos that include RSVP content and for RSVP-enabled video previews. In general, RSVP text may be tracked and analyzed when it is created and then later consumed to produce various metrics.

FIG. 43a is a process diagram illustrating a method 4300a for tracking data related to creation of RSVP-enhanced media. Step 4301 receives a request to create RSVP content in a media item. The request may be generated as a result of a system event indicating that RSVP content creation functionality has been activated by the user on a webpage containing a media item (e.g., an article, story, photo, map, video, or mixed-media item) or that itself is a media item (e.g., a user page, product page, home page, etc.). It may also be generated automatically by the system when the RSVP application is launched to edit a media item or by a predetermined user input. The request may also include session information or login credentials, including for example, user specific information extracted from user settings or server settings, such as editing preferences.

Step 4302 updates user information 4311 by storing values for Session ID (identifying the request), User ID (identifying the user), Start Time (establishing the time stamp for the initiation of that session), and the Session Type (indicating whether the session is for creating RSVP or viewing RSVP content—in this case, the former). Step 4302 also updates RSVP content information 4312 with values for Media ID (identifying the media item that to which the user has requested to add RSVP content), Media Type (identify whether the media request is for video, photo, map, or text), and the User ID (connecting RSVP content information 4312 to the user session identified in table 4311).

Step 4303 displays the requested media item in the RSVP-enabled application. Step 4304 creates, based on user input, the first RSVP content item, i.e., a particular segment of text to be displayed by RSVP either as global content associated with the entire media item, or as embedded content associated with a particular location within the media item. The word "embedded" in this context simply means that it appears as "local" content within the media item, i.e., in association with a particular part (i.e., visual location and/or time location) of the media item. Various interfaces for viewing and creating RSVP-enabled media as well as RSVP sub-content are described in co-pending U.S. patent application Ser. No. 13/730,163 filed Dec. 28, 2012, incorporated herein by referenced. Interfaces for viewing and creating RSVP-enabled videos and RSVP-enabled video previews are more fully described in co-pending U.S. patent application Ser. No. 13/919,848 filed Jun. 17, 2013, incorporated herein by reference above. As the text in the RSVP content item is created in Step 4304, certain text segments within the RSVP content item may be designated as keywords, based on user input or by algorithms designed to identify proper nouns and word combinations. The position of each keyword within the RSVP content item may be identified by the number of the first word in the keyword in the sequence of words in the RSVP content item.

After completion of step 4304, step 4305 updates activity information 4314 by adding and relating values that are associated with the Session ID including values for the following variables: Activity ID (which is used to record the creation or viewing of an RSVP content item in the session—in this case the former) and the RSVP Detail ID (which uniquely identifies a particular RSVP content item in association with a particular Media ID, RSVP Content ID, and, if applicable, a particular RSVP Preview ID). Step 4305 also updates RSVP content information 4312 with the User ID and values for RSVP Preview ID (identifying that RSVP content as part of a particular preview, if so designated by the user); RSVP Content ID (identifying that RSVP content item in association with a particular Media ID); RSVP Detail ID (described above); Previous RSVP Detail ID (present if the RSVP content item is an updated version of a previously-created RSVP content item—this allows for associating multiple versions of RSVP content items as a content-providing user attempts to improve consumption of particular content items as described more fully in the context of FIG. 46a-b and 47a-d), RSVP Content Type (identifying the type as global or embedded), Total Words (the number of words in that RSVP content), the Media Sequence Number (identifying the order of display of that specific RSVP content if a preview is being created), and Video Sequence Length (the time length of a video sequence that is associated with that RSVP content if a video preview is being created). Step 4305 also updates keyword sequence information 4317 with the RSVP Detail ID, Keyword ID (identifying each keyword that has been designated in that RSVP content) and RSVP Word Number (the word number of the first word in each keyword in the sequence of words in that RSVP content).

Step 4306 determines whether the user wants to create any RSVP sub-content items related to the RSVP content item that was created in step 4304. If no, the process proceeds to step 4308. If yes, the process proceeds to step 4307 to enable the user to create the RSVP sub-content item or items. As each RSVP sub-content item is created, step 4305 updates activity information 4314 by adding and relating values for the Activity ID (identifying the creation of the sub-content item), and the RSVP Detail ID (uniquely identifying the particular RSVP sub-content item created). Step 4305 also updates RSVP content information 4312 with values for RSVP Content ID (associating the new RSVP sub-content item with the specific RSVP content item created in step 4304), the RSVP Sub-content ID (identifying the RSVP item as an RSVP sub-content item), RSVP Detail ID, RSVP Content Type (identifying its type as embedded or global), and Total Words (the number of words in that RSVP content item).

Step 4308 determines if additional RSVP content items are to be created and added to the sequence in another desired location of the media. If yes, then the process proceeds to back to step 4304. If no, then the process ends at step 4309 and the session is concluded.

FIG. 43b illustrates a method 4300b for tracking RSVP text as it is consumed (i.e., viewed, which is generally determined by methods referenced herein based on tracking RSVP display of text on a user device) to produce various metrics. FIG. 43b illustrates a method for tracking data related to consumption of RSVP-enhanced media (left flow) and for tracking consumption of RSVP-enabled media previews (right flow).

Turning to FIG. 43b in detail, step 4320 receives a request to view a media item. In some embodiments, the request may include session information or login credentials, including for example, tracking variables and user specific information extracted from user settings or server settings, such as user speed and reading level. The requested media with RSVP content is identified by its Media ID or, if applicable, the combination of its Media ID and its Preview ID, originally generated and stored as part of RSVP Content information 4312 of FIG. 43*a*.

Step 4321 displays a media item in which RSVP content has been previously created and tracked according to the example in FIG. 43*a*. Step 4323 then updates user information 4311 by storing values for Session ID (identifying the request for the media), User ID (identifying the user), Start Time (establishing the time stamp for the initiation of that session), the Session Type (records that the session is to view—rather than create—RSVP content), and User Speed (identifying the reading speed that has been selected for displaying RSVP to the user for the current request). Step 4322 determines whether the requested media item is a full version of the RSVP-enabled media item or an RSVP-enabled preview version for the item.

Continuing with the left flow (result of step 4322 is that the selected content is a full-version RSVP-enabled media item), step 4324 starts RSVP display of the first (or next) RSVP content segment (i.e., RSVP content item) in the media. Note that, depending on the application, the type of media item and/or settings of the author, provider, and/or user of the item, each RSVP content segment may display (at step 4324) automatically in a predetermined sequence or, alternatively, may display only in response to a specific user interface action. Step 4325 indicates that the current RSVP content segment (i.e., the segment started at step 4324) has been stopped or has ended.

While the media and associated RSVP content segments are displaying, step 4328 continues to update activity information 4314*a* by adding and relating values associated with the Session ID including values for the following variables: Activity ID (which identifies a request for viewing a particular RSVP content segment that is part of the media item associated with the Session ID), End Time (the time at the conclusion of the requested activity (e.g., the time when the RSVP content segment ends or otherwise stops displaying)), RSVP Detail ID (identifying the specific RSVP content segment), and Words Read (value that is incremented as additional words in the RSVP content segment are displayed), and RSVP Sub-content ID (identifying each RSVP sub-content that has been selected by the user).

Step 4326 determines if there are any RSVP sub-content items related to the RSVP content displayed in step 4324. If no, then the process proceeds to step 4329. If yes, the process proceeds in step 4327 to display a list of titles of the RSVP sub-content items from which the user can make a selection. If the user makes a selection, the RSVP Sub-content ID is updated in step 4328. The process then proceeds back to step 4324 so that the selected RSVP sub-content item can be displayed and tracked.

Step 4329 determines if display of the media has been canceled by the user (e.g., the user has navigated away from the page or otherwise stopped display of the media). If yes, then the process proceeds to step 4330 which updates activity information 4314 by adding and relating values that are associated with Session ID, after which the process ends at step 4338 and the session is concluded. If no, then the process returns to step 4324 and the user may select another RSVP content item (or display of the next RSVP content segment may be initiated automatically) and the process is repeated until the user decides to cancel the media.

Now turning to the right flow (result of step 4322 is that the selected RSVP-enabled content is an RSVP-enabled media preview), step 4332 starts RSVP display of the first (or next) RSVP content segment in the media preview. Step 4333 indicates that the current RSVP content segment (i.e., the segment started at step 4332) has been stopped or has ended. Step 4335 determines if there are any RSVP sub-content items related to the RSVP content segment displayed in step 4332. If no, the process proceeds to step 4337. If yes, then step 4336 displays a list of titles of the RSVP sub-content items from which the user can make a selection. The process then proceeds back to step 4332 so that the selected RSVP sub-content item can be displayed and tracked.

While the media and associated RSVP content segments are displaying, step 4334 continues to update activity information 4314*b* by adding and relating values associated with the Session ID including values for the following variables: Activity ID (which identifies a request for viewing a particular RSVP content segment that is part of the media item associated with the Session ID), End Time (the time at the conclusion of the requested activity (e.g., the time at the when the RSVP content segment ends or otherwise stops displaying)), RSVP Detail ID (identifying the specific RSVP content segment), and Words Read (value that is incremented as additional words in the RSVP content segment are displayed).

Step 4337 determines if playing of the media preview has been canceled. If yes, then the process ends at step 4339 and the session is concluded. If no, then step 4332 starts the display of the next RSVP content in the sequence.

FIG. 43*c* illustrates a method 4300*c* for tracking RSVP text as it is consumed (i.e., viewed, which is generally determined by methods referenced herein based on tracking RSVP display of text on a user device) to produce various metrics. Method 4300*c* is similar to method 4300*b*; however, method 4300*c* is particularly adapted for tracking RSVP display of text in the context of RSVP-enhanced video media. It is also potentially applicable to other time-sequenced media contexts, but the method is presented herein in the context of video media for ease of explanation. FIG. 43*c* illustrates a method for tracking data related to consumption of RSVP-enhanced video (left flow) and for tracking consumption of RSVP-enabled video previews (right flow).

Now turning to FIG. 43*c* in detail, step 4340 receives a request to view a video. In some embodiments, the request may include session information or login credentials, including for example, tracking variables and user specific information extracted from user settings or server settings, such as user speed and reading level. The requested media with RSVP content is identified by its Media ID or, if applicable, the combination of its Media ID and its Preview ID, originally generated and stored as part of RSVP Content information 4312 of FIG. 43*a*.

Step 4341 displays a video start screen and video timeline with RSVP markers. As described in co-pending U.S. patent application Ser. No. 13/919,848 (incorporated by reference above), RSVP markers may be placed on a video timeline/progress bar to indicate the presence of RSVP content associated with certain time points in the video. Step 4343 then updates user information 4311 by storing values for Session ID (identifying the for request for the media), User ID (identifying the user), Start Time (establishing the time stamp for the initiation of that session), the Session Type (records that the session is to view—rather than create—RSVP content), and User Speed (identifying the reading speed that has been selected for displaying RSVP to the identified user for the current request). Step 4342 determines whether the selected content is a full RSVP-enabled video or an RSVP-enabled video preview.

Continuing with the left flow (result of step 4342 is that the selected RSVP-enabled content is an RSVP-enabled video), step 4344 starts RSVP display of the first (or next) RSVP content segment in the video. Note that it is assumed (but not separately shown) for purposes of this diagram, that the user has selected the start button and that the video has begun playing. Step 4345 indicates that the current RSVP content segment (i.e., the segment started at step 4344) has been stopped or has ended.

While the video and associated RSVP content segments are displaying, step 4348 continues to update activity information 4314a by adding and relating values that are associated with Session ID including values for the following variables: Activity ID (which identifies a request for a particular RSVP content segment that is part of the video associated with Session ID), End Time (the time at the conclusion of the requested activity (e.g., the time when the RSVP content segment ends or otherwise stops displaying)), RSVP Detail ID (identifying the specific RSVP content segment), Words Read (value that is incremented as additional words in the RSVP content segment are displayed), and Video Sequence Viewed (indicating the time amount of the video that has been viewed thus far).

Step 4346 determines if there are any RSVP sub-content items related to the RSVP content displayed in step 4344. If no, then the process proceeds to step 4349. If yes, the process proceeds in step 4347 to display a list of titles of the RSVP sub-content items from which the user can make a selection. The process then proceeds back to step 4344 so that the selected RSVP sub-content item can be displayed and tracked.

Step 4349 determines if viewing of the video has ended (either because playback was canceled by the user or because the end of the video was reached). If yes, then the process proceeds to step 4350 which updates activity information 4314a the value of the Video Sequence Viewed variable (which indicates the time amount of video that been viewed up to the point where it ends or has been canceled by the user in step 4349). The process ends at step 4362 and the session is concluded. If the result of step 4349 is no, then video continues to play and the process returns to step 4344 to start the next RSVP segment when it is reached.

Now turning to the right flow (result of step 4342 is that the selected RSVP-enabled content is an RSVP-enabled video preview), step 4352 starts RSVP display of the first (or next) RSVP content segment in the video preview. Note that it is assumed (but not separately shown) for purposes of this diagram, that the user has selected the start button and that the video preview has begun playing. Step 4353 indicates that the current RSVP content segment (i.e., the segment started at step 4352) has been stopped or has ended. Step 4355 determines if there are any RSVP sub-content items related to the RSVP content segment displayed in step 4352. If no, the process proceeds to step 4357. If yes, then step 4356 displays a list of titles of the RSVP sub-content items from which the user can make a selection. The process then proceeds back to step 4352 so that the selected RSVP sub-content item can be displayed and tracked.

While the RSVP content segments are displaying, step 4354 continues to update activity information 4314b by adding and relating values that are associated with Session ID including values for the following variables: Activity ID (which identifies a request for a particular RSVP content segment that is part of the video preview associated with Session ID), End Time (the time at the conclusion of the requested activity (e.g., the time when the RSVP content segment ends or otherwise stops displaying)), Words Read (value that is incremented as additional words in the RSVP content segment are displayed), and Video Sequence Viewed (indicating the time amount of the video preview that has been viewed thus far).

Step 4357 determines if playing of the video preview has been canceled. If yes, then the process ends at step 4362 and the session is concluded. If no, then step 4358 starts the video sequence associated with the RSVP content segment just displayed. Step 4359 indicates that the current video sequence (i.e., the sequence started at step 4358) has been stopped or has ended. Step 4360 determines if playing of the video preview has been canceled. If yes, then the process ends at step 4362 and the session is concluded. If no, then step 4361 determines whether the last RSVP content segment in the current preview has been displayed. If the result of step 4319 is yes, then the process ends at step 4362 and the session is concluded. If the result of step 4319 is no, then the process returns to step 4352 to begin displaying the next RSVP content segment of the current RSVP-enabled video preview.

While the video sequences and RSVP content segments are displaying, step 4354 continues to update activity information 4314b by adding and relating values that are associated with Session ID including values for the following variables: Activity ID (which identifies a request for a particular RSVP content segment that is part of the video associated with Session ID), End Time (the time at the conclusion of the requested activity (e.g., the time when the RSVP content segment ends or otherwise stops displaying)), Words Read (value that is incremented as additional words in the RSVP content segment are displayed), and Video Sequence Viewed (indicating the time amount of the video that has been viewed thus far).

In FIG. 43c, the process order is shown such that RSVP content is displayed before the related video sequence. However, in an alternative embodiment, this order can be reversed such that the video sequence is displayed first and then the RSVP content is displayed.

Examples of analytics data aggregated for creation and consumption of multimedia content integrated with RSVP content are shown below in Tables 5-7. For purposes of illustration, data associated with RSVP-enabled video previews that would be generated by the portion of process 4300 shown in the right side of the flow diagram of FIG. 43c is shown. However, those skilled in the art will understand how comparable data for RSVP-enabled videos could be generated by the portion of process 4300 shown on the left side of the FIG. 43c and that comparable data could also be generated for RSVP-enabled media generated by process 4300b shown in FIG. 43b.

Tables 5-7 are conceptually linked based on relationships between the attributes (i.e., column/field names). This is explained further in the context of the examples below.

Table 5 shows an example of data for user information 4311 of FIGS. 43a and 43c.

TABLE 5

| Session ID | User ID | Start Time | Session Type | Speed |
|---|---|---|---|---|
| 1 | xyz | 01.06.2013 09:00 | Create | — |
| 2 | rst | 02.06.2013 09:00 | Create | — |
| 3 | klm | 03.06.2013 09:00 | Create | — |
| 4 | rst | 04.06.2013 10:00 | Create | — |
| 5 | rst | 04.06.2013 11:00 | Create | — |
| 6 | klm | 05.06.2013 10:00 | Create | — |
| 7 | klm | 05.06.2013 10:30 | Create | — |
| 8 | abc | 06.06.2013 10:00 | View | 300 |
| 9 | abc | 07.06.2013 11:00 | View | 300 |

TABLE 5-continued

| Session ID | User ID | Start Time | Session Type | Speed |
|---|---|---|---|---|
| 10 | abc | 08.06.2013 12:00 | View | 350 |
| 11 | abc | 09.06.2013 13:00 | View | 400 |
| 12 | def | 10.06.2013 15:00 | View | 350 |
| 13 | ghi | 11.06.2013 09:00 | View | 350 |

In this example, there are thirteen (13) sessions which are each uniquely identified by the Session ID. The User ID records which of the six users has initiated each session and Start Time records when each session was initiated. The Session Type records whether the user created or viewed RSVP content. Speed records the setting of the RSVP speed by the user if the Session Type is view.

Table 6 shows an example of data for RSVP content information 4312 of FIG. 43a that is related to the data from Table 5. As described above, the RSVP-enabled video preview includes a combination of video sequences and text information presented via RSPV. The RSVP-enabled preview may be published by combining global RSVPs and/or timeline specific (embedded) RSVPs with sequences of video. RSVP sub-content items may be published by other users for selected RSVP content items.

TABLE 6

| RSVP Detail ID | Media ID | Media Type | RSVP Preview ID | RSVP Content ID | Media Seq. No. | RSVP Content Type | RSVP Sub-content ID | Total Words | Video Sequence Length | User ID |
|---|---|---|---|---|---|---|---|---|---|---|
| 1 | 001 | Video | 1 | 1 | 1 | Global | — | 36 | — | xyz |
| 2 | 001 | Video | 1 | 2 | 2 | Embedded | — | 59 | 00:51 | xyz |
| 3 | 001 | Video | 1 | 3 | 3 | Embedded | — | 22 | 01:09 | xyz |
| 4 | 001 | Video | 2 | 1 | 1 | Global | — | 55 | — | rst |
| 5 | 001 | Video | 2 | 2 | 2 | Embedded | — | 67 | 00:34 | rst |
| 6 | 001 | Video | 2 | 3 | 3 | Embedded | — | 28 | 00:20 | rst |
| 7 | 001 | Video | 3 | 1 | 1 | Global | — | 33 | — | klm |
| 8 | 001 | Video | 3 | 2 | 2 | Embedded | — | 21 | 00:17 | klm |
| 9 | 001 | Video | 1 | 1 | | Global | 1 | 29 | — | rst |
| 10 | 001 | Video | 3 | 1 | | Global | 1 | 18 | — | rst |
| 11 | 001 | Video | 3 | 2 | | Embedded | 1 | 19 | — | rst |
| 12 | 001 | Video | 1 | 1 | | Global | 2 | 41 | — | klm |
| 13 | 001 | Video | 2 | 1 | | Global | 1 | 44 | — | klm |

In Table 6, the RSVP content for three different RSVP previews of one video (identified by Media ID and Media Type) is stored and identified. In this example, each RSVP Detail ID uniquely identifies each RSVP content item in the context it appears in a media item and, if applicable, a media preview item. As shown in Table 6, the RSVP Detail ID attribute is related to other attributes including an RSVP Content ID, RSVP Sub-content ID (if that RSVP content item is a sub-content RSVP), as well as other attributes of each RSVP content item including RSVP Content Type, Total Words, and Video Sequence Length (if that RSVP content item is "embedded," and therefore has an associated video sequence). The Media Sequence Number identifies the sequence in which the particular RSVP segment appears in the corresponding RSVP-enabled media preview. In this example the Media Sequence Number is only provided for "embedded" RSVP content items since "global" items do not necessarily appear in a sequence along the video timeline. In this example, the values for Media Sequence Number correspond to the values for RSVP Content ID. However, in alternative examples, different previews might be created using the same content segments in a different order.

Table 7 shows an example of data for Activity information 4314b of FIG. 43c that is related to the data from Tables 5 and 6 above.

TABLE 7

| Activity ID | Session ID | End Time | RSVP Detail ID | Words Read | Video Sequence Viewed |
|---|---|---|---|---|---|
| 101 | 8 | 06.06.2013 10:01 | 1 | 36 | — |
| 102 | 8 | 06.06.2013 10:02 | 9 | 29 | — |
| 103 | 8 | 06.06.2013 10:03 | 12 | 41 | — |
| 104 | 8 | 06.06.2013 10:05 | 2 | 59 | 00:51 |
| 105 | 8 | 06.06.2013 10:07 | 3 | 22 | 01:09 |
| 106 | 9 | 07.06.2013 11:01 | 4 | 55 | — |
| 107 | 9 | 07.06.2013 11:02 | 13 | 44 | — |
| 108 | 9 | 07.06.2013 11:04 | 5 | 67 | 00:34 |
| 109 | 9 | 07.06.2013 11:06 | 6 | 28 | 00:20 |
| 110 | 10 | 08.06.2013 12:01 | 4 | 19 | — |
| 111 | 10 | 08.06.2013 12:02 | 13 | 10 | — |
| 112 | 10 | 08.06.2013 12:03 | 5 | 12 | — |
| 113 | 10 | 08.06.2013 12:04 | 6 | 14 | 00:20 |
| 114 | 11 | 09.06.2013 13:01 | 1 | 12 | — |
| 115 | 11 | 09.06.2013 13:01 | 9 | — | — |
| 116 | 11 | 09.06.2013 13:01 | 12 | — | — |
| 117 | 11 | 09.06.2013 13:02 | 3 | 8 | 00:00 |
| 118 | 11 | 09.06.2013 13:03 | 3 | 7 | 00:05 |
| 119 | 12 | 10.06.2013 15:01 | 4 | 55 | — |
| 120 | 12 | 10.06.2013 15:02 | 13 | 44 | — |
| 121 | 12 | 10.06.2013 15:04 | 5 | 67 | 00:21 |
| 122 | 12 | 10.06.2013 15:05 | 6 | 28 | 00:20 |

TABLE 7-continued

| Activity ID | Session ID | End Time | RSVP Detail ID | Words Read | Video Sequence Viewed |
|---|---|---|---|---|---|
| 123 | 13 | 10.06.2013 15:06 | 7 | 33 | — |
| 124 | 13 | 10.06.2013 15:06 | 12 | — | — |
| 125 | 13 | 10.06.2013 15:07 | 8 | 21 | 00:10 |
| 126 | 13 | 10.06.2013 15:07 | 13 | — | — |

In Table 7, the Activity information records the activities within six sessions and identified, for example, by the Activity IDs. Each Activity ID identifies the RSVP content item that is viewed by each user by its RSVP Detail ID and records for that activity the Words Read (if the RSVP content item's text is displayed to the user) and Video Sequence Viewed (if that RSVP content item has an associated video sequence).

Referring to Table 7, the first row shows that, for Activity ID "101" of Session ID "8" (which, from Table 5, is associated with user "abc" at time of "10:00" on date "06/06/13" and is of session type "view" with a speed of "300" words per minute, and which, from Table 6, is associated with the RSVP preview "1" for video "001"), "36" words were read of the RSVP content of RSVP Detail ID "1". Referring to Table 6, the RSVP content of RSVP Detail ID "1" is a global RSVP of 36 words. Therefore, all the content of this RSVP item was displayed for the user. Because the RSVP content was global, and therefore associated with the preview as a whole rather than with any particular video sequence, the values for Video Sequence Length in Table 6 and Video Sequence Viewed in Table 7 (which are only relevant for particular sequences associated with non-global RSVP content segments) are necessarily null.

The second row indicates that during the second activity of the same session for the RSVP preview (i.e., Session ID "8", associated with user "abc" and preview "1"), an RSVP sub-content segment was requested having an RSVP Detail ID "9." Referring to Table 6, the RSVP content of RSVP Detail ID "9" is a global sub-content item (RSVP Sub-content ID "1" and related to RSVP Content ID "1") with 29 words. Referring back to Table 9, all 29 words were displayed for the user (i.e., Words Read=29).

The third, fourth, and fifth rows show data associated with the remaining three activities of this session, completing the RSVP preview (which, from Table 6, can be established as RSVP Preview ID "1" has only five (5) RSVP content items). The last two RSVP content items of the RSVP preview, RSVP Detail IDs "4" and "5", contain video sequences (which, from Table 6, have lengths of "00:51" and "01:09" respectively) and were viewed completely as the Video Sequence Viewed values are the same as the Video Sequence Length values.

The remaining rows of Table 7 provide the data from the other sessions by the same user and several other users, as listed in Table 5, including the same RSVP preview and two other previews listed in Table 6. As shown in Table 6, the illustrated previews (corresponding to Preview IDs "1," "2," and "3,") are all associated with the same video (corresponding to Media ID "1").

The variables and tables described above are examples used merely for clarity of explanation of the tracking and analytics aggregating process and are not limited thereto. Also, the particular table relationships illustrated above are selected in part for ease of explanation and might be varied in a particular implementation. To cite just one example, Table 6 as shown includes a "Media Type" column. However, such a variable and its corresponding data could be present instead in a separate media table that is related to Table 6 through the Media ID variable. Therefore, in a more detailed example, a table such as Table 6 would not necessarily need to include a "Media Type" column if it is included in a related table.

Figure 44A:
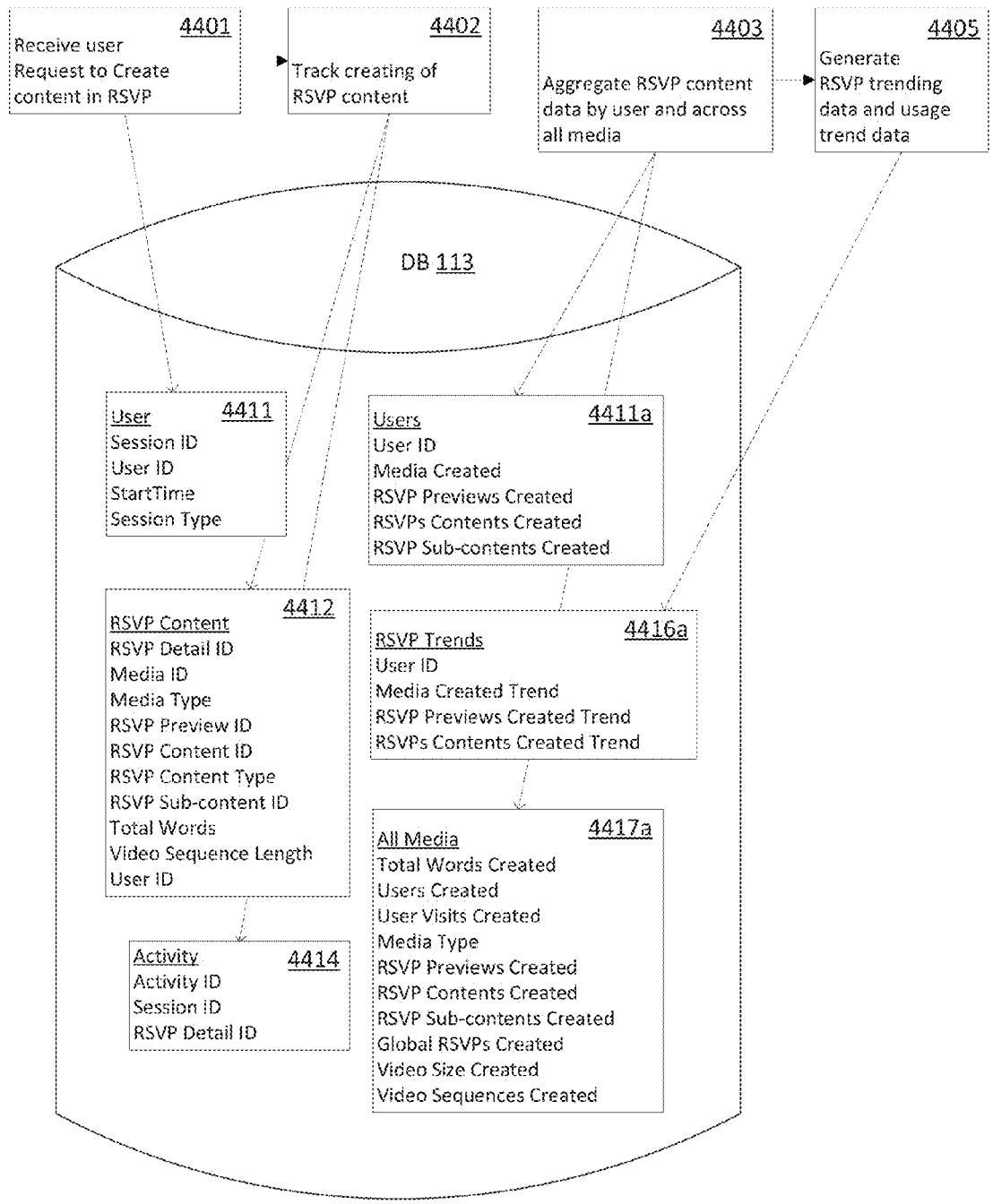
FIGS. 44a and 44b illustrates process flows implemented by a computer system in accordance with an embodiment of the present invention for tracking and aggregating creation and usage data for RSVP content and for generating trending data for that content.
Figure 44B:
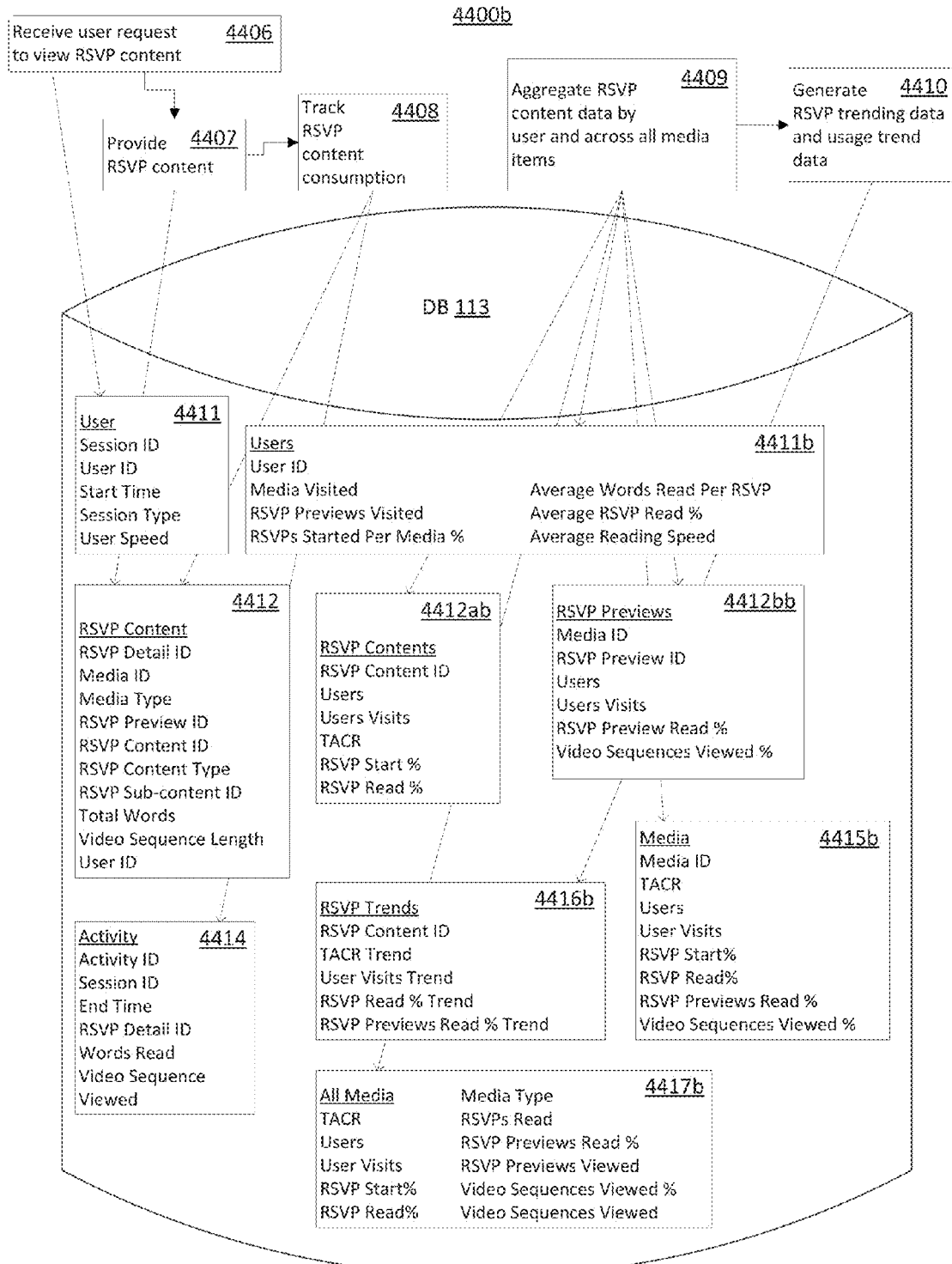

FIGS. 44*a* and 44*b* are process flow diagrams illustrating methods 4400*a* and 4400*b* for tracking and aggregating creation and usage data for RSVP content and for generating trending data for that content. The example illustrates an embodiment of the present invention.

Referring to FIG. 44*a*, method 4400*a* may be implemented on a user device such as user device 210 of FIG. 1 and one or more server computers such as server 101 of FIG. 1 including a database such as DB 113 of FIG. 1. In this embodiment, DB 113 stores various tracking and trending data related to serially displaying content and tracking content creation. RSVP server computer 101 or a server to which it is communicatively coupled. Thus, process 4400*a* may be distributed across multiple servers and devices.

Steps 4401 and 4402 of FIG. 44*a* are not necessarily intended to be distinct from method 4300*a* illustrated in FIG. 43*a*. Rather, in this example, steps 4401 and 4402 represent a summarized view of the steps of method 4300*a* so that the tracking illustrated in FIG. 43*a* can be shown together and in context with the aggregating steps and data structures of FIG. 44*a*. Similarly, user information 4411, RSVP content information 4412, and activity information 4414 are not necessarily intended to be distinct from user information 4311, RSVP content information 4312, and activity information 4314 of FIG. 43*a*. Rather, those data structures are illustrated again in FIG. 44*a* so that they may be shown together and in context with the aggregated data structures generated by method 4400*a* of FIG. 44. At the same time, in particular embodiments, data that is tracked in a method such as method 4300*a* may, in some implementations, be restored on the same or different computers prior to being aggregated.

As illustrated, DB 113 includes information for each session from method 4300*a* in FIG. 43*a*, including user information 4411 (e.g., tracking information for the user who has created RSVP content), RSVP content information 4412 (tracking information for each RSVP content item), and Activity information 4414 (tracking information for each activity by RSVP Detail ID).

DB 113 also includes information that has been aggregated in users information 4411*a* (e.g., tracking information aggregated for each user), all media information 4417*a* (e.g., total aggregated tracking information for all users) and RSVP trends information 4416*a* (trending information that has been generated from "all media" information 4417*a*).

Step 4401 receives a user request to create RSVP content in a media on a user device. The request may be input by a user via a web browser or an RSVP-enabled application on the user device or automatically triggered by a system event on the user device. Step 4401 stores the user data created in step 4302 of method 4300 from FIG. 43*a* in user information 4411.

Step 4402 stores the RSVP content data created in steps 4302 and 4305 of method 4300 from FIG. 43*a* in RSVP Content information 4412. The content in this example includes media integrated with RSVPs as described with reference to FIG. 43*a*. Step 4402 also stores the activity data created in step 4305 of method 4300 from FIG. 43*a* in activity information 4414.

Step 4403 aggregates content creation data, including RSVP tracking information, by user, RSVP content, RSVP preview, and media information and stores the aggregated information in DB 113 in users information 4411*a*. Step 4403 stores the user data aggregated from all session data of each user (User ID). Specifically, for each User ID, step 4403 determines and stores values for the following variables: Media Created (a count of all RSVP-enabled media items created by that user), RSVP Previews Created (a count of all RSVP previews created by that user), RSVP Contents Created (a count of all RSVP content items created by that user), RSVP Sub-contents Created (a count of all RSVP sub-content items created by that user).

Step 4403 also stores in all media information 4417*a* the media content data aggregated from all create sessions data from all users who created content. Specifically, step 4403 creates and stores values for the following variables: Total Words Created (a count of total words created in all media), Users Created (a count of the total number of unique users who created content), User Visits Created (a count of the total number of sessions where content was created), Media Type (a count of the total number of media created of each type), RSVP Previews Created (a count of the total number of RSVP previews created), RSVP Contents Created (a count of the total number of RSVP content items created), RSVP Sub-contents Created (a count of the total number of RSVP sub-content items created), Global RSVPs Created (a count of the total number of RSVP content items created which are of the global type), Video Size Created (a count of the total amount of time of video created), and Video Sequences Created (a count of the total number of video sequences created).

Step 4405 generates and stores in DB 113 RSPV trends information 4416*a* generated from all create session data for each user who created the associated content. The trending data may be computed as the rate of change in certain tracked data over time, such as the RSVP previews, RSVP contents, and media. The User ID of the content creator is included in RSVP trends information 4416*a*, which contains RSVP Previews Created Trend (the current rate of change of RSVP Previews Created in Users information 4411*a*), RSVP Contents Created Trend (the current rate of change of RSVP Contents Created in Users information 4411*a*), and RSVP Contents Created Trend (the current rate of change of Media Created in Users information 4411*a*). Those skilled in the art will understand that the variables and data structures shown are examples for illustrative purposes. Alternative embodiments may divide, track, and aggregate data from RSVP-related activity in a different manner to obtain similarly useful results.

Now referring to FIG. 44*b*, method 4400*b* may be implemented on a user device such as user device 210 of FIG. 1 and one or more server computers such as server 101 of FIG. 1 including a database such as DB 113 of FIG. 1. In this embodiment, DB 113 stores various tracking and trending data related to serially displaying content and tracking content consumption. Thus, process 4400*b* may be distributed across multiple servers and devices.

Steps 4406, 4407, and 4408 of FIG. 44*b* are not necessarily intended to be distinct from method 4300*b* illustrated in FIG. 43*b* or method 4300*c* illustrated in FIG. 43*c*. Rather, in this example, those steps represent a summarized view of the steps of methods 4300*b* and/or 4300*c* so that the RSVP view tracking illustrated in FIGS. 43*b* and/or 43*c* can be shown together and in context with the aggregating steps and data structures of FIG. 44*b*. Similarly, user information 4411, RSVP content information 4412, and activity information 4414 are not necessarily intended to be distinct from user information 4311, RSVP content information 4312, and activity information 4314*a* and 4314*b* of FIGS. 43*b* and/or 43*c*. Rather, those data structures are illustrated again in FIG. 44*b* so that they may be shown together and in context with the aggregated data structures generated by method 4400*b* of FIG. 44*b*. At the same time, in particular embodiments, data that is tracked in a method such as method 4300*b* and/or 4300*c* may, in some implementations, be restored on the same or different computers prior to being aggregated.

DB 113 includes information for each session from method 4300*b* in FIG. 43*b*, including user information 4411 (tracking information for the user who has viewed RSVP content) and activity information 4414 (tracking information for each activity by RSVP Detail ID). DB 113 also includes information that has been aggregated in users information 4411*b* (tracking information aggregated for each user who viewed content), RSVP contents information 4412*ab* (tracking information aggregated for each RSVP content viewed), RSVP previews information 4412*bb* (tracking information aggregated for each RSVP preview viewed), Media information 4415*b* (tracking information aggregated from RSVP contents information 4412*ab* and RSVP Previews information 4412*bb* for each media viewed), and all media information 4417*b* (total aggregated tracking information for all users who viewed media). DB 113 includes RSVP trends information 4416*b* (trending information that has been generated from Media information 4415*b*).

Step 4406 receives a user request to display content in RSVP at a user device. The request may be input by a user via a web browser or an RSVP-enabled application on the user device or automatically triggered by a system event on the user device. Step 4406 stores the user data, created in step 4323 from FIG. 43*b* or step 4343 from FIG. 43*c*, in user information 4411.

Step 4407 provides the RSVP content to the user. The content, including textual content, is serially displayed. The content may include media integrated with RSVPs as described with reference to FIG. 43*a*.

After step 4407 provides the RSVP content to the user, step 4408 tracks content consumption, according to RSVP tracking methods described above, for example, with respect to FIGS. 43*b* and 43*c*. Step 4408 stores the activity data created in steps 4328 and 4333 from FIG. 43*b* and steps 4348 and 4354 from FIG. 43*c* in activity information 4414.

Step 4403 aggregates content creation data, including RSVP tracking information, by user, RSVP content, RSVP preview, and media information and stores the aggregated information in DB 113 in users information 4411*a*. Step 4403 stores the user data aggregated from all session data of each user (User ID). Specifically, for each User ID, step 4403 determines and stores values for the following variables: Media Created (a count of all RSVP-enabled media items created by that user), RSVP Previews Created (a count of all RSVP previews created by that user), RSVP Contents Created (a count of all RSVP content items created by that user), RSVP Sub-contents Created (a count of all RSVP sub-content items created by that user).

Step 4409 aggregates content creation data, including RSVP tracking information, by user, RSVP content, RSVP preview, and media information and stores the aggregated information in DB 113 in users information 4411*b*. Step 4409 stores the user data aggregated from all session data of each user (User ID). Specifically, for each User ID, step 4409 determines and stores in users information 4411*b* values for the following variables: Media Visited (total number of media visited), RSVP Previews Visited (total number of RSVP previews visited), RSVPs Started Per Media % (determined by the number of RSVP details viewed by the user as a percentage of the total RSVP Detail IDs for all media viewed by the user), Average Words Read Per RSVP (average of the total words read in all RSVP details divided by the number of RSVP details viewed by the user), Average RSVP Read % (average of all RSVP Read % values for the user, each RSVP Read % determined by dividing the Words Read by the Total Words for each RSVP detail) and Average Reading Speed (average of User Speed values from 4411 for all sessions of that user).

Step 4409 also stores in DB 113 the RSVP content data for each RSVP content item (identified by its unique RSVP Detail ID), aggregated from all view sessions data, in RSVP contents information 4412*ab*. Specifically, step 4409 determines and stores values for the following variables: Users (a count of total number of users who viewed that RSVP content), User Visits (a count of the total number of sessions where content was viewed), TACR (a count of the total number of words viewed in that RSVP content in all sessions), RSVP Start % (a percentage of the total number of sessions in which the RSVP display of that RSVP content was started divided by the total number of sessions in which the media containing the RSVP content was included), and RSVP Read % (an average of the RSVP Read % from all sessions, which is determined in each session by dividing Words Read by Total Words).

Step 4409 also stores in DB 113 the RSVP preview data for each RSVP preview (identified by its RSVP Preview ID and Media ID), aggregated from all view sessions data, in RSVP previews information 4412*bb*. Specifically, step 4409 determines and stores, for each preview, values for the following variables: Users (a count of total number of users who viewed that RSVP preview), User Visits (a count of the total number of sessions in which that preview was viewed), RSVP Preview Read % (an average of the RSVP Preview Read % from all sessions in which that RSVP preview was viewed, which is determined in each session by dividing Words Read by Total Words), and Video Sequences Viewed % (an average of the Video Sequences Viewed % from all sessions, which is determined in each session by dividing Video Sequence Viewed by the total number of video sequences in that RSVP preview).

Step 4409 also stores in DB 113 the media content data, aggregated from all data in RSVP contents information 4412*ab* and RSVP Previews information 4412*bb*. Specifically, step 4409 determines and stores in media information 4415*b*, for each Media ID values for the following variables: TACR ("total aggregate content read," which is this example is a count of total words displayed by RSVP in all view sessions for that media item), Users (a count of the total number of unique users who viewed that media item), User Visits (a count of the total number of sessions in which that media item was viewed), RSVP Start % (an average of the RSVP Start % from all sessions in which that media was viewed), RSVP Read % (an average of the RSVP Read % from all sessions in which that media was viewed), RSVP Preview Read % (an average of the RSVP Preview Read % from all sessions in which an RSVP preview of that media was viewed), and Video Sequences Viewed % (an average of the Video Sequences Viewed % from all sessions in which an RSVP preview of that media was viewed).

Step 4409 also stores in DB 113 the media content data, aggregated from all data in Media information 4415*b*. Specifically, step 4409 determines and stores in all media information 4417*b*, values for the following variables: TACR (a count of total words viewed in all media items), Users (a count of the total number of unique users who viewed content), User Visits (a count of the total number of sessions where content was viewed), RSVP Start % (an average of the RSVP Start % from all sessions), RSVP Read % (an average of the RSVP Read % from all sessions), RSVP Preview Read % (an average of the RSVP Preview Read % from all sessions in which an RSVP preview was viewed), and Video Sequences Viewed % (an average of the Video Sequences Viewed % from all sessions in which an RSVP preview was viewed). All media information 1617*b* may also include Media Type (a count of the total number of media viewed of each type), RSVPs Read (a count of the total number of RSVP content items viewed in all sessions), and RSVP Previews Read (a count of the total number of RSVP previews viewed in all sessions).

Step 4410 stores in DB 113 the RSPV trends data generated from certain data in RSVP contents information 4412*ab* and RSVP previews information 4412*bb*, in RSVP trends information 4416*b*. The trending data may be computed as the rate of change in certain tracked data over time, such as the user visits and certain RSVP content items data. RSVP Trends information 4416 may include TACR Trend (the rate of change of a count of total words viewed in that content), User Visits Trend (the rate of change of a count of total user visits for that content), RSVP Read % Trend (the rate of change in an average of the RSVP Read % from all sessions in which that content was viewed), and RSVP Preview Read % (the rate of change in an average of the RSVP Preview Read % from all sessions in which that content is an RSVP preview).

Examples of RSVP data aggregated according to methods 4400*a* and 4400*b* are shown in tables 8-12. Tables 8 and 9 show examples of data aggregated from sessions of type "create" according to method 4400*a* in FIG. 44*a* and Tables 10-12 show examples of data aggregated from sessions of type "view" according to method 4400*b* in FIG. 44*b*.

Table 8 shows an example of aggregated data on Users 4411*a* of FIG. 44*a* for the examples provided in Tables 5-7.

TABLE 8

| User ID | Media Created | RSVP Previews Created | RSVP Content Items Created | RSVP Sub-content Items Created |
|---------|---------------|-----------------------|----------------------------|--------------------------------|
| xyz     | 1             | 1                     | 3                          | 0                              |
| rst     | 1             | 1                     | 3                          | 2                              |
| klm     | 1             | 1                     | 2                          | 2                              |

In Table 8, user analytics are aggregated to each user, including running totals for the number of RSVP previews created (RSVP Previews Created) for the total number of media (Media Created), the number of RSVP content items created (RSPV Contents Created), and the number of RSVP sub-content items created (RSVP Sub-contents Created). User analytics may be aggregated by combining information from user information 4411 and RSVP content information 4412 of FIG. 44*a*. Table 9 shows an example of selected aggregated data for media created related to users and RSVP previews, as one example of all media information 4417*a* of FIG. 44*a*, using selected data from the examples provided in Tables 5-7.

TABLE 9

| Total Words Created | Users Created | User Visits Created | Media Type | RSVP Previews Created | RSVP Contents Created | RSVP Sub-Contents Created |
|---------------------|---------------|---------------------|------------|------------------------|------------------------|---------------------------|
| 472                 | 3             | 7                   | Video      | 3                      | 8                      | 4                         |

In Table 9, the video RSVP preview analytics are aggregated, including running total numbers, for all video media (Media Type), all RSVP previews created (RSVP Previews), all RSVP content items created (RSVP Contents Created), all RSVP sub-content items created (RSVP Sub-contents Created), all users who created RSVP content items (Users Created), all user sessions in which the RSVP content was created (User Visits Created), and the total number of words in the created RSVP content (Total Words Created). These analytics may be aggregated by combining information from users information 4411*a* and RSVP content information 4412 of FIG. 44*a*. Table 10 shows an example of aggregated data on RSVP previews 4412*bb* of FIG. 44*b* for the previous examples provided in Tables 5-7.

TABLE 10

| Media ID | RSVP Preview ID | Users | Users Visits | RSVP Preview Read % | Video Sequences Viewed % |
|---|---|---|---|---|---|
| 001 | 1 | 1 | 2 | 58 | 57 |
| 001 | 2 | 2 | 3 | 77 | 77 |
| 001 | 3 | 1 | 1 | 50 | 59 |

In Table 10, RSVP preview analytics are aggregated by a query on the RSVP Detail ID to extract the Media ID and RSVP Preview ID and report the running totals for the number of users (Users), the number of user visits (User Visits) and percentages for RSVP content read (RSVP Read %), and associated video sequences watched (Video Sequences Viewed %) for each RSVP preview (RSVP Preview ID). The analytics may be aggregated by combining information from RSVP Content information 4412, User information 4411 and Activity information 4414.

Table 11 shows an example of aggregated data on Users 4411b of FIG. 44b for the examples provided in Tables 5-7, related to RSVP previews and videos as the media type.

TABLE 11

| User ID | Media Visited | RSVP Previews Viewed | RSVPs Started Per Media % | Average Words Read Per RSVP | Average Worse Read Per RSVP % | Average Reading Speed |
|---|---|---|---|---|---|---|
| abc | 1 | 2 | 89 | 29 | 69 | 338 |
| def | 1 | 1 | 100 | 49 | 100 | 350 |
| ghi | 1 | 1 | 75 | 27 | 50 | 350 |

In Table 11, user analytics are aggregated to each user, including running totals for the number of RSVP previews viewed (Media Visited), percentages on RSVP segments started per media (RSVPs Started Per Media %), words read per RSVP segment (Words Read Per RSVP %), and running averages for words read per RSVP segment (Average Words Read Per RSVP) and user reading speed (Average Reading Speed), for each user (User ID). User analytics may be aggregated by combining information from user information 4411, RSVP content information 4412, and RSVP previews information 4314 of FIG. 44b.

Table 12 shows an example of aggregated data for media related to users and RSVP previews, as one example of media information 4415b of FIG. 44b, using data from the examples provided in Tables 5-7.

TABLE 12

| Media ID | RSVP Previews | TACR | Users | Users Visits | Average RSVPs PreviewsRead % | Average Video Sequences Viewed % |
|---|---|---|---|---|---|---|
| 001 | 3 | 711 | 4 | 6 | 62 | 64 |

In Table 12, video RSVP preview analytics are aggregated, including running totals for each video (Media ID) for the number of RSVP previews (RSVP Previews), TACR, and running averages for the percentages of RSVPs read (RSVP Read %) and video sequences viewed in all RSVP previews (Video Sequences Viewed %). These analytics may be aggregated by combining information from RSVP contents information 4412ab, and RSVP previews information 4412bb of FIG. 44b.

The variables and tables described above are used as examples for clarity of explanation of the tracking and analytics aggregating process and are not limited thereto.

Figure 45:
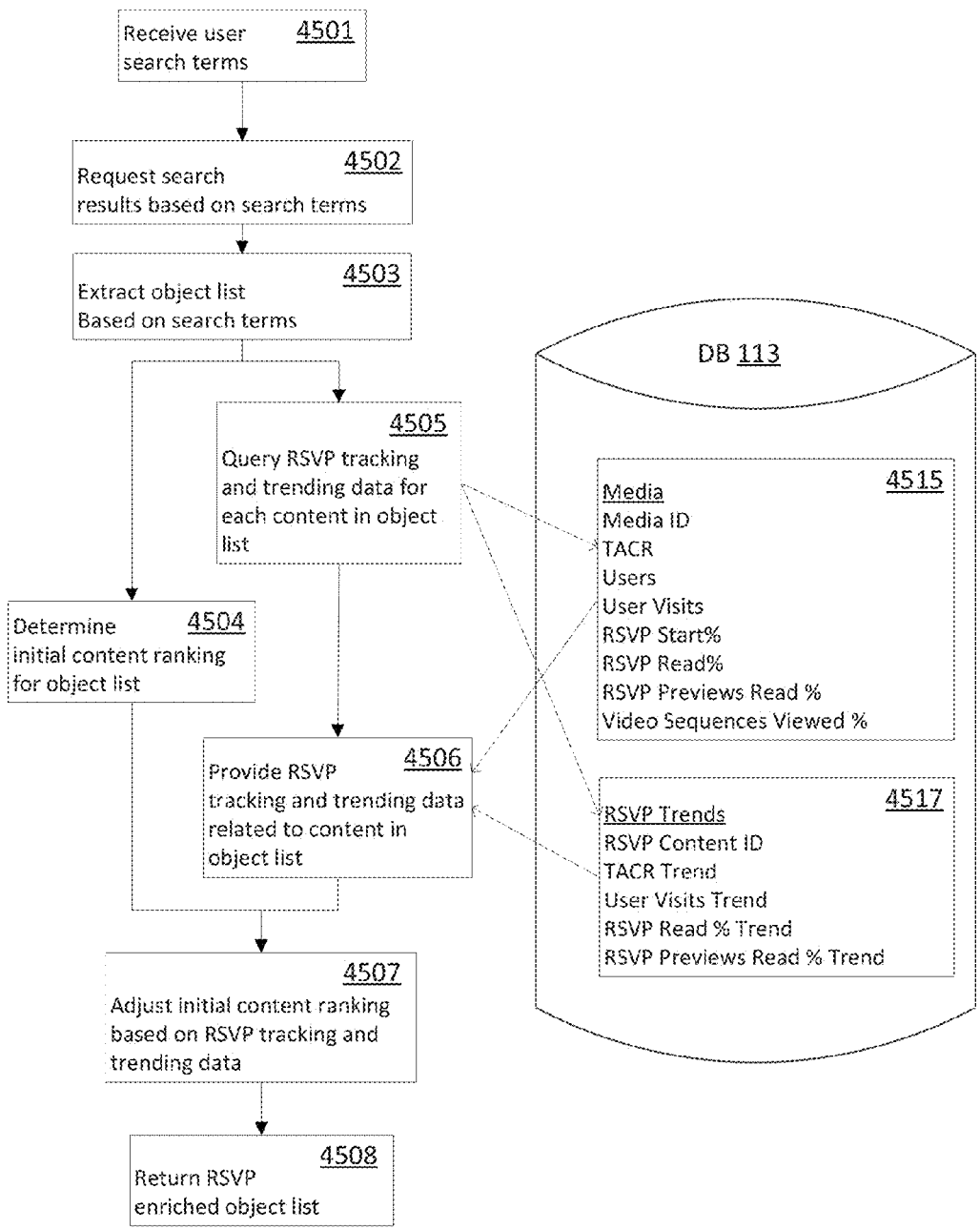
FIG. 45 illustrates a process flow implemented by a computer system in accordance with an embodiment of the present invention for applying RSVP tracking and trending data to search results.

FIG. 45 is a process flow diagram illustrating a method 4500 for applying RSVP tracking and trending data to search results, according to an embodiment of the present invention.

Relevancy of a search result on a web page is subjective to a user performing the search. Therefore, evidence of how likely a user is to find the result relevant combined with keyword scoring or other criteria can provide better search results. The RSVP tracking and trending data may be used to determine relevancy of a search result, by an RSVP search enrichment process, as described herein.

The RSVP search enrichment process begins when a user request is received to display content in RSVP. The RSVP content is provided and the content consumption is tracked. At the same time, the content consumption data is generated and refined. Further, content consumption data is aggregated and grouped by content, user, media and various other analytics. This data is used to enrich the user search results and provide more relevant results to the user.

When a user provides a search term, an object list is extracted based on the search terms and provided to the user in the most relevant order to the user. The object list contains a list of content or pages that relate to at least one keyword or search term. The object list may be initially sorted by assigning an initial rank to each content or page within the list. This initial ranking may be determined using one or more various known search criteria including, for example, the number of other pages that link to the page or the frequency of keywords or search terms within the content or page.

The search results object list is then enriched by the RSVP analytics data to obtain an adjusted ranking to provide more relevant results. One example of enriching the object list is to adjust the ranking after assigning a higher weight to words read (e.g., the total words displayed using RSVP) in a page than to other factors (e.g., user clicks, links to the page, etc.) when determining the adjusted ranking of the object. Another example includes assigning a higher weight to the recent trend trajectory for words read of that website. Thus, page ranking within an object list can be determined according to the Words Read, or other RSVP tracking and trending data, in addition to other weighting variables.

An object within an object list of search results would show up higher in search results because it has a higher number of words read (as a running total of words read) or because of an upward trending trajectory of most recent words read. Ranking can also be determined in combination with other criteria, for example, a number of links that lead to that content based on the search criteria, or a number of clicks. In this case, words read data or RSVP trending data may be used to adjust the existing ranking RSVP enriched search may also be applied to searching videos based on the analytics gathered for RSVP previews and video RSVP data. A video specific search may use RSVPs started and video tracking data, as described further herein.

Now turning to FIG. 45 in detail, step 4501 receives search terms, generated at least in part by a user performing a search. A user may perform a search by submitting search terms to a search application, a web browser, an RSVP enabled application, or an RSVP search ranking application implementing method 4500. The user search query includes at least one keyword or search term. In cases of using a web browser, the search terms and clicks are tracked by search engines and web crawlers to generate usage data for generating search results.

Step 4502 requests a search result based on the search terms and the keywords in the entered search terms.

Step 4503 extracts an object list comprised of content and each content matches the search terms and at least one keyword. The object list includes search results, each entry in the list may include, for example, a sort position, a rank for the object, an object identifier, an object title, and an object preview, such as the first few characters or words of the textual content. The object list format may depend on the type of content being searched. For example, when searching photos, the object list may include a thumbnail of the photo being searched and the textual content associated with the photo, for example from the caption of the image. As another example, the content being searched may include a file being searched in a file system, an email and/or various other types of content. The sort position may be determined, for example, by how many times a file or photo has been opened or an email has been read.

After step 4503 extracts the object list, step 4505 queries DB 113 for relevant RSVP tracking data while step 4504 determines the initial content ranking for the objects in the object list, as follows.

Step 4504 determines the initial content ranking of each content or page in the object list, for example, by determining the number of keywords present in the content or the number of user clicks, or a combination of other factors. Step 4504 may be performed parallel to steps 4505-4506.

Step 4505 queries DB 113 for relevant RSVP tracking and trending data. DB 113 contains an aggregation of data which reflects how content on the Internet is actually viewed and read through the use of an RSVP application implementing the displaying and tracking methods previously described and an RSVP search ranking application implementing method 4500. The RSVP data may also contain other knowledge about content usage such as content consumption trends. As described in the context of FIGS. 43*a-c* and 44*a-b*, RSVP tracking and trending data may be aggregated and gathered in various ways to provide aggregated data that is available to queries for enriching search results. Aggregated tracking data includes a total aggregate of content read (TACR) for a particular media item (Media ID), as shown in media information 4515 (which corresponds to media information 4415*b* of FIG. 44*b*). TACR for a particular media item is determined based on the total count of words displayed using RSPV across all user view sessions. Trending data may be computed as the rate of change in the tracked data over a predetermined period of time.

Thus, for example, step 4505 may query DB 113 to return, from media information 4515, total aggregate content read (i.e. TACR), for each content (media) item in the object list. As another example, step 4505 may request a trend trajectory factor from RSVP trends information 4517 for each content item in the object list.

Step 4506 provides the query result from DB 113, which includes RSVP tracking and trending data, relevant to the object list.

Applying the query result, step 4507 adjusts the initial content ranking based on RSVP tracking and trending data in the query result. For example, the initial rank may be adjusted by a factor of a TACR score for each content in the search results or object list. Additionally, other RSVP data such as RSVP Read % or RSVP Previews Read % from Media information 4515, and RSVP Read % Trend or RSVP Previews Read % Trend from RSVP Trends information 4517, may be used to adjust each object rank.

Here, RSVP data measures such as TACR and TACR Trend, as described above, may be used to increase or decrease initial content ranking of content to better indicate how interesting that content might be to the user performing the search. For example, the initial content ranking of each content in the object list is adjusted by adding or multiplying by a fraction (e.g., 0.1) of the page's trending score to the initial content ranking.

Additionally, TACR and TACR trending factors may be combined to rank the content in the object list. For example, the initial content ranking of each content in the object list is adjusted by adding some fraction (e.g., 0.1) of the page's RSVP trending score and some fraction (e.g., 0.01) of the page's TACR score to the initial content ranking. However, in alternative implementation, both factors are not necessarily needed to determine ranking. For example, in particular alternative implementations, only the trending information may be used or only the TACR may be used to determine the rank.

After adjusting the object list ranking by applying RSVP tracking and trending data, step 4508 returns the RSVP enriched object list to the user. The object list may be returned entirely, or in segments.

The data in RSVP DB 113 is built from actual user attention related data (reading of RSVP content) collected from RSVP applications that can be distributed to users in all parts of the world. Thus, the RSVP trending and tracking data stored in DB 113 contains useful information that can be used to adjust an initial content ranking and produce more relevant and interesting results.

Initial content ranking, or initial page ranking, may be based, for example, on simple keyword frequency and the order in which search terms appear in an object (or other factors such as click count or links), to influence the initial page ranking RSVP data may be used in conjunction with initial rank data to rank search results, or object lists.

The tracking and trending data in the RSVP database (i.e., DB 113) is continually being enhanced to support search engines and RSVP search ranking applications implementing method 4500, or any applications or programs that may rely on RSVP DB 113 or RSVP tracking and trending data.

Accordingly, using this data in a content-ranking algorithm (e.g., RSVP search ranking application implementing method 4500 or other ranking algorithm) is an improvement over previous approaches in that it relies at least in part on more direct evidence of content consumption of individual users in the form of words displayed to users via RSVP.

RSVP search ranking application implementing method 4500 or other ranking algorithm may use two types of aggregated RSVP tracking and trending data stored in DB 113 to gauge how relevant a particular content or page is for a given search term or keyword, total aggregated data and trending data collected in part by RSVP content tracking. For example, aggregated RSVP data may include Total Aggregate Content Read (TACR) data and RSVP trending data.

TACR data includes a total aggregate amount of content read for a specific media (i.e., content) item. TACR data goes beyond the concept of the page being linked from other locations and more accurately indicates the actual amount of content read (i.e., displayed by RSVP) on that page when linking to that page.

TACR trending data may be computed as the rate of change in the TACR data over time. If more people are reading a content than what is "normal" (for that page), the content is considered to have an upward trending trajectory. If fewer people are reading less content than normal (for that content), the content is considered to have a downward trending trajectory. If approximately the expected amount of content is being read in the content, the trending is considered to be neutral, or normal.

Normal or neutral trending may be determined by an average trend of a predetermined number of people a day reading a predetermined amount of content per day per user. If the number of people per day increases or the amount of content being read increases per day, then the content is considered to have an upward trending trajectory. The trend may also be determined based on a number of unique people reading a predetermined percentage of the content.

With this measure, a downward trending trajectory may actually decrease the content's rank. That is, even though there are many keywords that match, people are currently losing interest in the content.

The trend trajectory of content may be computed as (Latest Trend-Average Trend)/Average Trend, where Latest Trend is the most recent value of the trending and Average Trend is the expected (average) trending over a historical time period.

Latest Trend and Average Trend may be calculated over predetermined time periods. Latest Trend may be calculated over a short predetermined time period, for example one hour. Thus, the Latest Trend can be computed by subtracting the value of the TACR from the previous hour from the current value of the TACR. Average Trend may be calculated over a longer predetermined time period, for example one day or one week, by averaging the Latest Trend values for that time period. Thus, a trending of zero is neutral.

When Latest Trend is greater than Average Trend, the trajectory is determined as upward trending. When Latest Trend is less than Average Trend, the trajectory is determined as downward trending.

Trending may be represented in decimal form or as a percentage. For example, when half as much content of a content is read than expected, the trending trajectory may be represented as −0.5 or −50%; when twice as many users read the content as expected, the trending trajectory may be represented as 1.0 or 100%.

RSVP trending can produce more relevant results, for example, in a case where a famous company announces its intention to acquire another company. Many people flock to all of the news stories to learn about the details of the acquisition plans. The news content and pages start with a handful of visitors and the number continues to increase. This results in an increased upward trending trajectory for the content. Even though the news stories do not mention the name of the company more often than old content, such as the company home page itself, those pages would still rank higher in the search results due to their strongly upward trending trajectory. Furthermore, even though the TACR may not be as high for the news content as compared to the company homepage itself, the upward increase in TACR may result in a higher rank for the news results.

As another example, the initial content rank can be normalized by the RSVP ranking program implementing method 4500 for a given content to lie within zero (0) and one (1). One tenth (0.1) of the content's trending score (−0.05 or +0.1, from the examples above) and one hundredth (0.01) of the content's TACR score are added to the initial content ranking to obtain the RSVP enriched content ranking for that content.

Accordingly, RSVP tracking and trending data can be used to adjust an estimate of how relevant a content is (its ranking) based on the actual reading of content (not just clicks where it is not known if the content has been read), and such ranking adjustments can be made in real time. This gives the ranking method described herein an advantage in that it can react quickly to the fluid nature of content on the Internet.

Table 13 shows an example of an initial search ranking result prior to applying enrichment using RSVP content tracking data. Position is the initial position based on the initial rank or raw rank of a search result.

TABLE 13

| Position | Object Rank | Object ID | Object Title | Object Content |
| --- | --- | --- | --- | --- |
| 1 | 1 | 123456 | Tips on choosing a lawyer | Be confident and prepared: ask the right questions. When do I need a lawyer? How can a lawyer help me? How do I find the right . . . |
| 2 | 0.99 | 234567 | Choosing a Lawyer | Learn Tips to help you Choose an Attorney . . . |
| 3 | 0.98 | 345678 | How to Choose A Lawyer | To help in this process, this pamphlet was prepared by the State of Georgia to aid and assist individuals and businesses in choosing a lawyer. Identifying . . . |
| 4 | 0.97 | 456789 | How to Choose a Lawyer | Choosing a lawyer among a sea of qualified attorneys can be a challenge. These five steps outline how to hire the best lawyer for your case . . . |
| 5 | 0.96 | 567890 | Choosing the Right Lawyer | Now that you have decided to hire a lawyer, the next step is choosing a specific lawyer who can handle your particular legal situation. While there are an . . . |

Object ID can be a unique identifier for the object or a permalink directed to the content or a combination of the two. Each object ID is queried against the RSVP tracking and trending database to determine relevant RSVP tracking data.

Table 14 shows how the search result order from Table 13 may be adjusted by applying RSVP content tracking data, specifically, a normalized TACR value and a TACR trend value, as described above.

TABLE 14

| Initial Position | Initial Object Rank | Normalized TACR | TACR Trend | RSVP Enrichment Factor | Enriched Object Rank | Adjusted Position |
| --- | --- | --- | --- | --- | --- | --- |
| 1 | 1 | 0.01 | −0.2 | −0.0199 | 0.9801 | 4 |
| 2 | 0.99 | 0.08 | 0 | 0.0008 | 0.9908 | 3 |
| 3 | 0.98 | 0.01 | 0.2 | 0.0201 | 1.0001 | 2 |
| 4 | 0.97 | 0.05 | 0.5 | 0.0505 | 1.0205 | 1 |
| 5 | 0.96 | 0.10 | −0.05 | −0.004 | 0.956 | 5 |

In this example, the RSVP content tracking data is the TACR, normalized for all objects, and the TACR Trend, computed by the formula described above where (Latest Trend-Average Trend)/Average Trend, where Latest Trend is the most recent value of the trending and Average Trend is the expected (average) trending over a historical time period. The RSVP Enrichment factor is then computed by the formula described above where one tenth (0.1) of the object's TACR Trend score and one hundredth (0.01) of the object's TACR score. The RSVP Enrichment Factor is then added to the initial Object Rank to obtain the RSVP Enriched Object Rank, which is then used to determine the Adjusted Position in the search results. In the example above in Table 14, the object with an Initial Position of 4 has the highest TACR Trend (indicating that its TACR is increasing the most of all the objects) and corresponding RSVP Enrichment Factor, thereby achieving the best Adjusted Position.

As previously described, although the above example uses both Normalized TACR and TACR Trend values to obtain an RSPV enrichment factor, in particular alternative implementations, only the trending information may be used or only the TACR may be used to determine the rank. Also, alternative formulas may be used that contain a different combination of both values than the formula set forth above.

The fields, variables and tables described above are used as examples for clarity of explanation of the RSVP search result enrichment process and are not limited thereto.

Figure 46A:
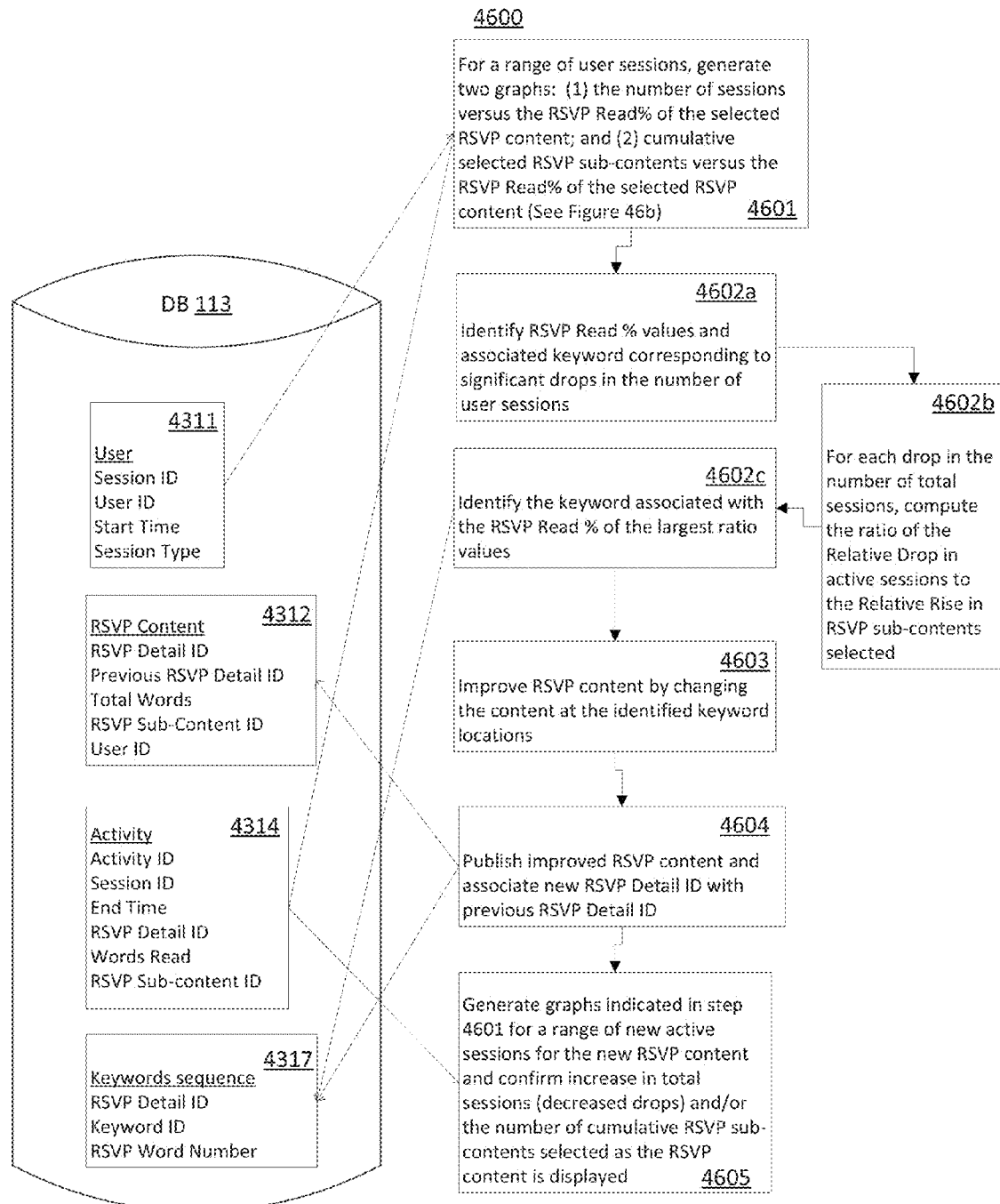
FIGS. 46a-46b are flow diagrams illustrating a method in accordance with an embodiment of the present invention for identifying potential opportunities to increase the amount of RSVP content read by users. Most or all of the method may be implemented by a computer system in accordance with an embodiment of the present invention.

FIG. 46a is a process flow diagram illustrating method 4600 in accordance with an embodiment of the invention for identifying potential opportunities to increase the amount of RSVP content read by users.

If the RSVP content is sponsored content, it may include RSVP sub-content that is intended by the sponsor to be selected by the user, in what is typically known in the advertising industry as a "click-through" or "conversion." An aspect of method 4600 may also be used to increase the total number of click-throughs by users who are viewing the sponsored RSVP content.

Referring to FIG. 46a, method 4600 may be implemented on a user device such as user device 210 of FIG. 1 and one or more server computers such as server 101 of FIG. 1 including a database such as DB 113 of FIG. 1. In this embodiment, DB 113 stores various tracking data related to tracking content creation and viewing by RSVP server computer 101 or a server to which it is communicatively coupled. Thus, process 4600 may be distributed across multiple servers and devices.

The steps for tracking RSPV content creation and RSVP content viewing are illustrated in FIG. 43a and are not repeated here in the context of FIG. 46a. However, the selected relevant data fields from the same data structures (tables) of FIG. 43a are shown here in FIG. 46a. Specifically, the relevant information from DB 113 includes user information 4311 (e.g., tracking information for the user who has created or viewed RSVP content), RSVP content information 4312 (tracking information for each RSVP content item and its related RSVP sub-content items), activity information 4314 (tracking information for each activity by RSVP Detail ID), and keyword information 4317 (e.g., tracking information for each keyword in the RSVP content item by Keyword ID and RSVP Word Number).

Figure 47A:
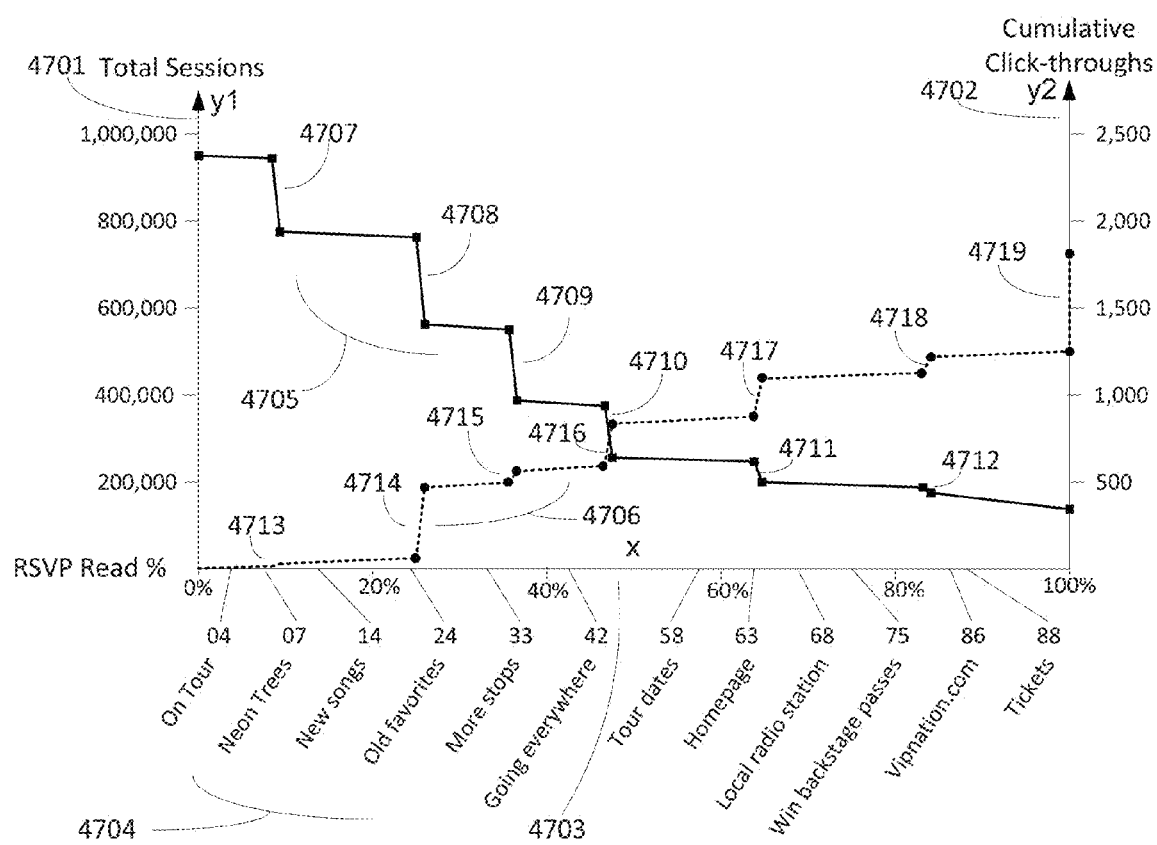
FIGS. 47a-47d are graphs displaying data generated by systems and methods in accordance with an embodiment of the present invention.

Process 4600 begins with step 4601 which uses the data stored in DB 113 to generate graphs including, for example, the two graphs plotted for a range of user view sessions of a specific RSVP content item as shown in FIG. 47a. The first graph shows the relationship between total sessions in which users are engaged with particular piece of RSPV content and the percentage of words in the RSVP content that have been displayed in those sessions. The second graph plotted shows the relationship between selections of RSPV sub-content items and the percentage of words in the RSVP content that have been displayed to users making such selections.

Figure 46B:
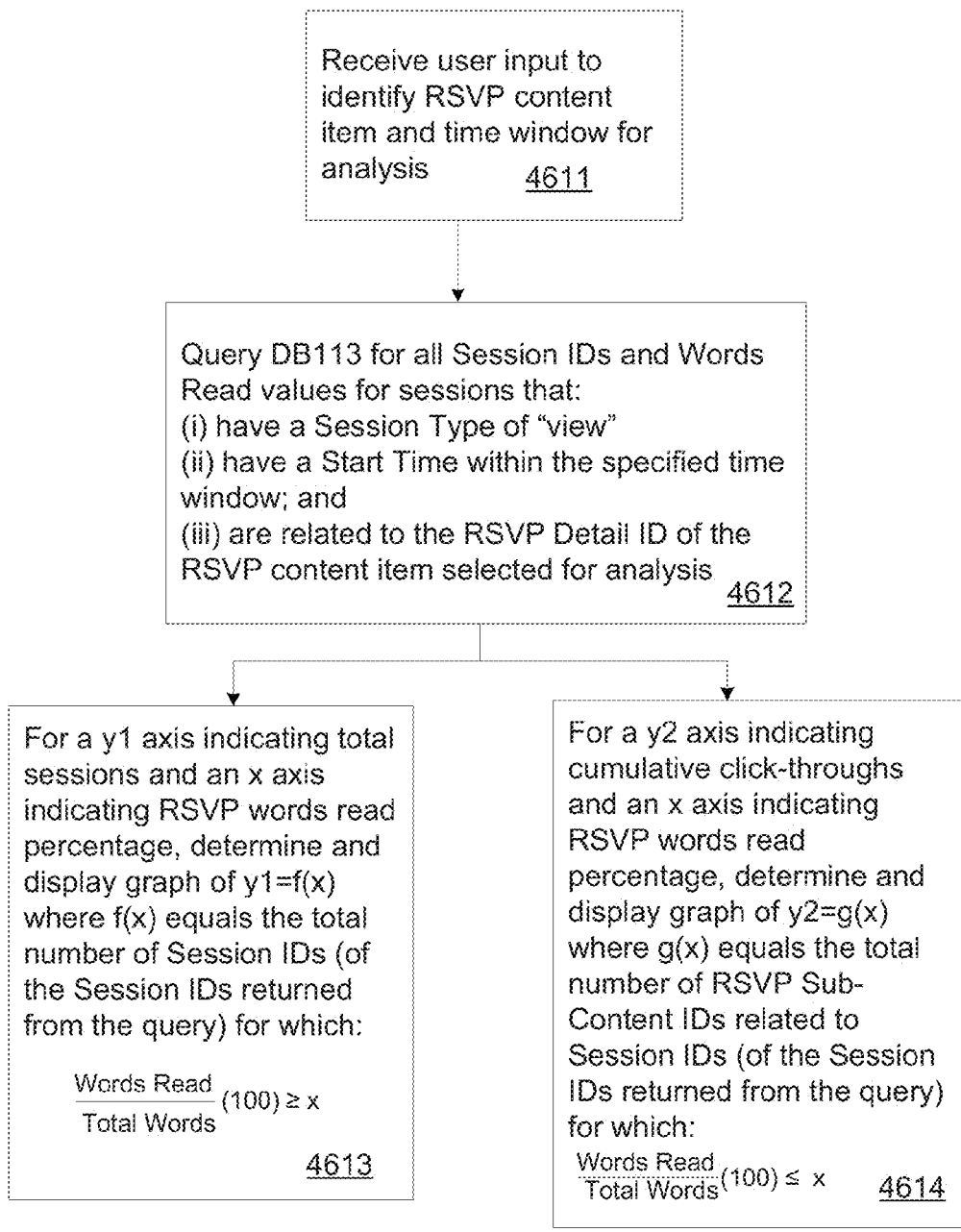

FIG. 46b illustrates process steps used to carry out step 4601 of FIG. 46a for plotting graphs of the type shown in FIG. 47a. Step 4611 receives user input to select a particular RSVP content item to be analyzed as well as the time window for user-session start times used to identify the user sessions across which consumption of the selected content item will be analyzed. Step 4612 conducts a query of DB 113 to obtain all Session IDs, Words Read values, and any related RSVP Sub-content IDs for all Session IDs of sessions that: (i) have a Session Type of "view" (i.e., the sessions are session in which users are reading the RSVP content item rather than creating or editing it) (ii) a Start Time value within the desired time range; and (iii) are related to the particular RSVP Detail ID of the content of interest (the relation being defined by activity information table 4314).

Step 4613 uses the returned data (from the query of step 4612), along with the Total Words of the selected RSVP content (obtained from the RSVP Content information 4312), to plot a relationship between active sessions (see, e.g., "y1" axis 4701 in FIG. 47a, representing Total Sessions) and the relative word position within the content (see, e.g., "x" axis 4701 in FIG. 47a, representing RSVP Read %, which defines the relative word position of a displayed word in the stream of words of the relevant RSVP content—the "words read" percentage in this case in fact being a "words displayed by RSPV" percentage). Step 4613 generates graph 4705 of FIG. 47a by plotting y1=f(x), where f(x) equals the total number of Session IDs (of the Session IDs returned from the query) for which $$\frac{WordsRead}{TotalWords}(100) \geq x.$$

Step 4614 uses the same returned data (from the query of step 4612), along with the Total Words of the selected RSVP content, to plot a relationship between RSVP Read % (x axis 4703 of FIG. 47a) and Cumulative Click-throughs (y2 axis 4702 of FIG. 47a). Note that, although "click-through" is a term generally associated with sponsored content (ads), the illustrated principles can be applied to enhance selection of sub-content items whether the items are sponsored content or non-sponsored content. Using the Session IDs obtained from the query of step 4612, the presence of any RSVP Sub-Content ID associated with the Session ID in activity information 4314 indicates that selection of a sub-content item occurred in that session (in this context, such a selection is considered to be a "click-through"). Step 4614 generates graph 4706 by plotting y2=g(x) where g(x) equals the total number of RSVP Sub-content IDs related to Session IDs for which $$\frac{WordsRead}{TotalWords}(100) \leq x.$$

Note that, in this context, the relevant Words Read value refers to the Words Read value related to the RSVP Detail ID of the initial RSVP content item in activity information 4314, not the Words Read value related to the RSVP Detail ID of a selected RSVP sub-content item.

In the illustrated embodiment, y1=f(x) and y2=g(x) are not plotted for every word. Rather, they are only plotted for values of x corresponding to the first word of a sentence and the last word of a sentence. For example, graph 4705 in FIG. 47a shows black rectangles for the y1 data points corresponding to the first word of a sentence and the last word of a sentence. Similarly, graph 4706 shows black circles for the y2 data points corresponding to the first word of a sentence and the last word of a sentence. Straight lines connect those data points. It can be empirically demonstrated that users are more likely to select to end RSVP display between sentences than mid-sentence. Moreover, a preferred RSVP implementation inserts short pauses between the last word of one sentence and the first word of a next sentence. Because users are more likely to stop display between sentences than mid-sentence, it will generally be efficient to determine user drops by only plotting data at the end of one sentence and the beginning of another. However, in alternative embodiments, graphs may be obtained by plotting data at more frequent intervals such as, for example, at every word.

Returning to FIG. 46a, steps 4602a-4602c identify potential opportunities for improving the amount of RSVP content read. To facilitate this identification, a system implementing method 4600 displays keywords 4704 (e.g., "On Tour," "Neon Trees," etc.) along x axis 4703 (see FIG. 47a) at a position corresponding to their location within the RSVP content, i.e., using the corresponding "RSVP Word Number" from keywords sequence information 4317. For example, as shown in FIG. 47a, the keyword "On Tour" appears four words into the content, "Neon Trees" appears seven words into the content, etc. In this example, one set of opportunities is identified by identifying the portions of the content associated with the most significant drops in the number of sessions. Identifying opportunities in this way is most relevant for RSPV content that does not have sub-content items, particularly RSVP content that does not have sponsored sub-content items. The drops are visible in, for example, graph 4705 (FIG. 47a) of Total Sessions versus RSVP Read %. The line connecting the data points typically drops after each sentence in the RSVP content.

A second set of opportunities, particularly applicable to content with sponsored sub-content items (for which obtaining a "click-through" is particularly important), is identified by determining the portions of the content associated with the smallest increases in Cumulative Click-throughs. This can be seen, for example, by analyzing graph 4706 (FIG. 47a). The line connecting the data points typically rises after each sentence in the RSVP content.

In some embodiments, at least a portion of step 4602a may be performed manually by inspecting graphs generated on a user device screen that is part of a computer system implementing method 4600. For example, as shown in FIG. 47a, visual inspection makes clear that particularly steep drops in Total Sessions occur at drops 4707, 4708, and 4709. Therefore, a content-providing user might decide to alter the portion of the content that precedes each drop to determine if more content-consuming users can be retained, further into the content. Similarly, with respect to graph 4706, visual inspection shows that only small increases in cumulative click-throughs occur at rises 4715, 4716, and 4718. Therefore, a content-providing user might decide to alter the portion of the content that immediately precedes each of the smallest rises in click-throughs to determine if click-throughs can be increased.

Alternatively, this portion of step 4602a could be performed automatically using an algorithm executed by the computer system. In some cases, the locations of the most significant drops on a graph like 4705, or the smallest rises on a graph like 4706, might not be visually clear on the graph, in which case such automation identifying relevant content portions may be useful or necessary. An automated process for identifying drops and ranking is described further below in the context of step 4602b.

A drop in Total Sessions along graph 4705 is not necessarily a negative event in terms of enhancing RSVP content consumption (particularly with respect to content that has sponsored sub-content items) if the reason for the drop is that consuming user(s) clicked on an RSPV sub-content item at a point during consumption of the main RSVP content item corresponding to the drop. Therefore, step 4602b computes a numerical index with respect to certain drops in Total Sessions and certain rises in Cumulative Click-throughs. In this example, for each sentence, the drop in Total Sessions and the rise in Cumulative Click-throughs between that sentence and the next sentence is used. Specifically, a computer system used to carry out process 4600 computers, for each drop in Total Sessions between sentences of the content, the following values: a "Relative Drop" weighting the selected drop in Total Sessions against the total number of sessions for that content item and starting within the selected time window; a "Relative Rise" weighting each corresponding rise in Cumulative Click-throughs (identified as corresponding to the selected drop in Total Sessions, i.e., the Cumulative Click-through rises are analyzed between the same sentences for which respective corresponding drops are analyzed) against the total Cumulative Click-throughs for the analyzed sessions; and a numerical index defined as the ratio of "Relative Drop" to "Relative Rise." For convenience, the numerical index is referenced herein as the "Relative Drop Ratio."

More, specifically, the Relative Drop is computed from variables defined as follows (referencing the axis labels of FIG. 47a for ease of explanation): "TotalSessionsBeforeDrop," i.e., the value of y1 just before the drop; "TotalSessionsAfterDrop," i.e., the value of y1 just after the drop; and "TotalSessionsAtStart," i.e., the value of y1 at x=0, which is the total number of sessions selected for analysis based on query 4612 (see FIG. 46b). Relative Drop is then given by the following equation:

$$RelativeDrop = \left(\frac{TotalSessionsBeforeDrop - TotalSessionsAfterDrop}{TotalSessionsAtStart}\right) \times 100.$$

The corresponding Relative Rise in Cumulative Click-throughs is computed from variables defined as follows (referencing again axis labels found in FIG. 47a): "CumulativeClick-throughsBeforeRise," i.e., the value of y2 just before the rise; "CumulativeClick-throughsAfterRise," i.e., the value of y2 just after the rise; and "CumulativeClick-throughsAtEnd," i.e., the value of y2 at x=100, which is the total number of click-throughs in all the sessions selected for analysis based on query 4612 (see FIG. 46b). Relative Rise is then given by the following equation:

$$RelativeRise = \left(\frac{CumulativeClickthroughsAfterRise - CumulativeClickthroughsBeforeRise}{CumulativeClickThroughsAtEnd}\right) \times 100.$$

The ratio of Relative Drop to Relative Rise yields a numerical index, i.e., the Relative Drop Ratio. For a given drop in total sessions, the Relative Drop Ratio is equal to the corresponding Relative Drop divided by the corresponding Relative Rise. (To avoid an invalid number in case Relative Rise is zero, a minimum value for relative rise can be specified as 1). All the drops in Total Sessions occurring between the end of one sentence and the start of another can then be ranked in descending order of the value of their Relative Drop Ratios. The process then proceeds to step 4602c.

Step 4602c identifies the keywords closely preceding the top ranked drop identified in step 4602. The following process can be used by a computer performing step 4602c: Using the RSVP Word Number (call it RSVP Word Number$_n$) for the word immediately preceding the drop identified in 46b, attempt a lookup of RSVP Word Number$_n$ to determine if it is present in keywords sequence information 4317; if yes, then return corresponding Keyword Name value (see Table 16 showing the relevant relations of data values); if the user has not requested to obtain additional keywords, then stop; if no, or if yes but the user has requested additional keywords, then decrement n and repeat until the desired quantity of keywords have been returned.

In step 4603, the process of improving the RSVP content identified in step 4602a or Step 4602c is conducted manually by the content creator. In particular embodiments, this manual analysis may involve various strategies including modifying, repositioning or removing the identified content. Associations may be determined between other keywords or click-through options which can guide the analysis.

Step 4604 publishes the improved RSVP content and gives it a new RSVP Detail ID that is associated with the RSVP Detail ID of the previous version of the RSVP content in RSVP Content information 4312 ("Previous RSVP Detail ID"). As previously described, creation of any updated RSVP content is tracked by method 4300a (FIG. 43a) which updates RSVP content information 4612 and keywords sequence information 4617 for the improved RSVP content in DB 113.

Figure 47B:
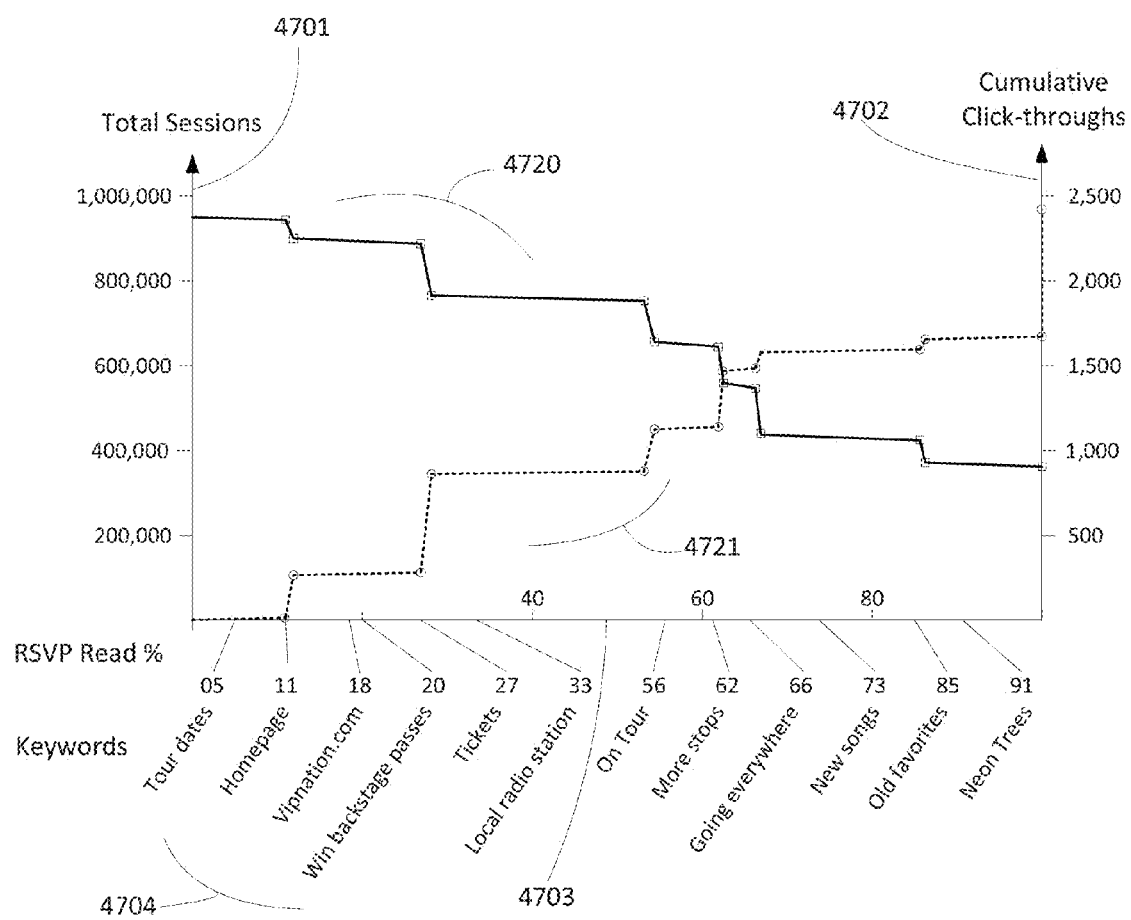

Step 4605 generates and displays graphs for the new RSVP content version published in step 4604. Specifically, once step 4604 publishes the updated content, it is tracked for a range of new user view sessions as previously described in the context of method 4300b of FIG. 43b. Once sufficient data from new user view sessions related to the new RSVP content version has been obtained, then step 4605 operates to generate graphs for a range of new user sessions in the same manner that step 4601 generated graphs for a range of user sessions viewing the prior RSVP content version. FIG. 47b, as described further below, shows an example of graphs generated for improved versions of the RSVP content associated with the graphs in FIG. 47a. The new graphs can, if desired, be displayed together with the graphs for the prior versions of the content. Such compared graph displays are shown and described in the context of FIGS. 47c and 47d. This makes possible measuring, for example, the increase in Total Sessions and/or Cumulative Click-throughs at various points in the new RSVP content version as compared to the previous version.

As indicated above in the context of FIG. 45, the search result rankings generated by method 4500 of FIG. 45 depend in part on Words Read values. Therefore, aside from the independent benefits of potentially increasing reader retention, implementing method 4600 with respect to particular content can potentially also increase a search result ranking for that content when method 4500 is applied to search results that include that content.

FIGS. 47a-d and tables 15-19 are described below in the context of describing in further detail an example of improving RSVP content according to method 4600 of FIG. 46a. For this example, an RSVP content item has been published with the following text (keywords 4704 are bolded and underlined for illustrative purposes only):

"Check us out on tour with the Neon Trees! We will be performing some new songs that we've been working on and all of your old favorites. You told us we needed to hit more stops and we listened. This time we're not only going everywhere we did last time. We've planned for other dates and venues so look at the Tour Dates section of our homepage. And keep listening to your local radio station for a chance to win back stage passes when we get to your town! And visit vipnation.com for tickets and other great opportunities to get up close and personal with the band."

The above text is presented to a user using RSVP, which is illustrated and described in previous figures including, for example, FIGS. 7a-7h, 10a-10c as well as in many other previous figures. Also, examples of presenting selectable sub-content item representations (designated as "click-through" options) along with a primary RSVP content item are shown in FIGS. 6a, 6b, 7d, and 7h. In the primary example on which the data from FIGS. 47a-47d is based, it is assumed that when RSVP display stops, either because the end of the text has been reach, or because a user interface action stops the RSVP display prior to the end of the text, selectable representations linking to sub-content are displayed to the user. Presenting sub-content selection options after the RSVP has stopped running is preferable in some respects because then sub-content representations do not distract the user's eye from reading the main RSVP content while it is running. However, in alternative embodiments, sub-content selection options can be presented before, during, and/or after the main RSVP content has displayed.

In the example used to generate the data of FIGS. 47a-47d, after RSVP display of the above text ends or is stopped by the user, the words "homepage," "win backstage passes" and "tickets" are presented to the user as selectable options representing links to sub-content. The word "homepage" is linked to the band's homepage url, www.maroon5.com, and the phrases "win back stage passes" and "tickets" are linked to the ticket service promotion's url, www.vipnation.com/backstagepasses. The linked sub-content may, for purposes of counting "click-throughs," be RSVP content or other content; however, in a preferred embodiment, the sub-content includes at least some content that is presented via RSPV.

Table 15 shows the RSVP content information 4612 for this example:

TABLE 15

| RSVP Detail ID | Total Words | RSVP Content ID | RSVP Sub-content ID | User ID |
|---|---|---|---|---|
| 1001 | 107 | 3001 |  | Abc |
| 1002 | 1 | 3001 | 2001 | Abc |
| 1003 | 1 | 3001 | 2002 | Abc |

Table 16 shows the keywords sequence information 4617 for this example:

TABLE 16

| RSVP Detail ID | Keyword ID | Keyword Name | RSVP Word Number | Total Words | RSVP Read % |
|---|---|---|---|---|---|
| 1 | 101 | On Tour | 4 | 107 | 4 |
| 1 | 102 | Neon Trees | 8 | 107 | 7 |
| 1 | 103 | New songs | 15 | 107 | 14 |
| 1 | 104 | Old favorites | 26 | 107 | 24 |
| 1 | 105 | More stops | 35 | 107 | 33 |
| 1 | 106 | Going everywhere | 45 | 107 | 42 |
| 1 | 107 | Tour dates | 62 | 107 | 58 |
| 1 | 108 | Homepage | 67 | 107 | 63 |
| 1 | 109 | Local radio station | 73 | 107 | 68 |
| 1 | 110 | Win back stage passes | 80 | 107 | 75 |
| 1 | 111 | Vipnation.com | 92 | 107 | 86 |
| 1 | 112 | Tickets | 94 | 107 | 88 |

FIG. 47a shows display 4700a including graphs 4705 and 4706 created according to step 4601 (as previously described in the context of FIGS. 46a-46b) using data from a range of 940,000 sessions in which the example RSVP content has been viewed. As previously described, display 4700a shows a horizontal "x" axis 4703 labeled "RSVP Read %" indicating, in the form of a percentage (from 0% to 100%) of the amount of the RSVP content item that has been displayed; these percentage values may also be thought of as representing the relative position within the RSVP content item. Display 4700a also shows two vertical axes. A "y1" vertical axis 4701, labeled Total Sessions, shows the amount of user sessions in which the RSVP content was viewed. A "y2" axis 4702, labeled Cumulative Click-throughs, shows the amount of RSVP sub-content items selected during the sessions.

The data in graph 4705, represented by square data points connected with a solid line, shows the amount of users who have read a certain amount of the RSVP content. Approximately 940,000 users started reading the RSVP content. As shown, approximately 50,000 users stopped reading after 5% of the RSVP content has been displayed. The significant drops of the graph appear at the end of sentences. Users are more likely to stop reading at these points than in mid-sentence, because the users have consumed a "concluded," i.e., somewhat self-contained amount of content; furthermore, in some embodiments, RSVP display pauses slightly after each sentence.

The data in graph 4706, represented by circular data points connected with a dashed line, shows the total number of click-through options selected across the analyzed user sessions ("Cumulative Click-throughs"). Graph 4706 rises while graph 4705, showing total active user sessions viewing the main RSVP content item, drops. This is expected because, in this particular example, selection of a click-through option stops RSVP display of the main RSVP content item. When the horizontal "x" axis 4703 reaches 100%, graph 4706 ends. The amount of users at this point represents the users who have read the complete RSVP content. Although the RSVP content item has fully displayed, the users still have the option of selecting click-through options. Therefore, the last rise segment 4719 of graph 4706 has a purely vertical direction (i.e., infinite slope).

Display 4700a also shows keywords 4704, along x-axis 4703. In display 4700a, keywords 4704 include keywords from the example of Table 15 shown with their corresponding RSVP Word Number at the position along axis 4703 that corresponds to the percentage of words displayed when the first word of the particular keyword is displayed. Combined consideration of graph 4705 and keywords 4704 provides a way to identify how many users have read what part of the RSVP content.

Following the process in steps 4602a-4602c of FIG. 46a as previously described, the best opportunities to improve the RSVP content of the example can be identified from analyzing graphs 4705 and 4706 of display 4700a. The RSVP content in this particular example is sponsored content, so a primary objective is to increase the total number of Cumulative Click-throughs. Using the process described above in the context of FIG. 46a, a Relative Drop Ratio can be computed for each clearly identifiable drop Total Session shown by graph 4705 of FIG. 47a. As shown, graph 4705 has identifiable drops including drops 4707, 4708, 4709, 4710, 4711, and 4712. The data for each drop is shown in Table 17, including the Drop ID (the drawing reference numbers for each drop are used as the "Drop ID" for ease of explanation), Total Sessions before Drop, and Total Sessions after Drop. The Drop Amount and Relative Drop values are computed according to the formula described above in the context of step 4602b. As shown, graph 4706 has identifiable rises including rises 4713, 4714, 4715, 4716, 4717, and 4718. The data for each of these rises in Cumulative Click-throughs is also shown in Table 17, including the Rise ID (the drawing reference numbers for each rise are used as the "Rise ID" for ease of explanation). The Rise Amount (which is the Cumulative Click-through value after the rise minus the Cumulative Click-through value before the rise) and Relative Rise value as well as the Relative Drop Ratio are computed according to the formula described above in the context of step 4602b. The Relative Drop Ratio is computed by dividing Relative Drop by Relative Rise.

TABLE 17

| Drop ID | Total Sessions before Drop | Total Sessions after Drop | Drop Amount | Relative Drop | Rise ID | Rise Amount | Relative Rise | Relative Drop Ratio |
|---|---|---|---|---|---|---|---|---|
| 4707 | 940000 | 775000 | 165000 | 17.6 | 4713 | 50 | 2.8 | 6.3 |
| 4708 | 765000 | 560000 | 205000 | 21.8 | 4714 | 400 | 22.2 | 1.0 |
| 4709 | 550000 | 390000 | 160000 | 17.0 | 4715 | 100 | 5.6 | 3.1 |
| 4710 | 380000 | 255000 | 125000 | 13.3 | 4716 | 230 | 12.8 | 1.0 |
| 4711 | 245000 | 200000 | 45000 | 4.8 | 4717 | 300 | 16.7 | 0.3 |
| 4712 | 190000 | 180000 | 10000 | 1.1 | 4718 | 130 | 7.2 | 0.1 |

In Table 17, it is evident that the two drops with the highest Relative Drop Ratio values are drop 4707 and drop 4709. According to Step 4602c, the keywords in the example that are associated with (i.e., in the sentence prior to) drop 4707 are on tour and Neon Trees (found in the first sentence of the RSVP content) and the keywords associated with drop 4709 are more stops (found in the third sentence of the RSVP content).

As previously described, step 4603 (FIG. 46a) for improving the RSVP content is conducted by manually by the content creator. In this example, the manual analysis includes modifying and repositioning content at the beginning of the content item, including the content associated with the drops 4707 and 4709, e.g., the first and third sentences, which immediately precede those drops. Associations between other keywords and the click-through options can also guide the analysis. For example, the keywords "homepage," "tickets" and "win backstage passes" are also used after RSVP display stops to represent the click-through options ("homepage" is linked to www.maroon5.com and "win backstage passes" and "tickets" are linked to www.vipnation.com/backstagepasses). A rewritten version can place language more closely associated with the click-through options near the beginning of the passage. Such a modification can improve the likelihood that if a user does stop reading early, the user will select the click-through options that are presented when RSVP stops.

"Check out the new tour dates and venues on our homepage! And don't forget to visit vipnation.com to win back stage passes and maybe even tickets. And keep listening to your local radio station for other great opportunities to get up close with the band when we get to your town. This time on tour we have planned for more stops. We're simply going everywhere. We will be performing some new songs that we've been working on and all of your old favorites. And we bring the Neon Trees with us, the hottest band of this summer!"

As previously described, the improved RSVP content is published according to Step 4604. Table 18 shows the RSVP content information 4612 in DB 113 for the improved RSVP content example.

TABLE 18

| RSVP Detail ID | Previous RSVP Detail ID | Total Words | RSVP Content ID | RSVP Sub-content ID | User ID |
|---|---|---|---|---|---|
| 1001 | | 107 | 3001 | | Abc |
| 1002 | | 1 | 3001 | 2001 | Abc |
| 1003 | | 1 | 3001 | 2002 | Abc |
| 1004 | 1001 | 97 | 3002 | | Abc |

Table 19 shows the keywords sequence information 4617 in DB 113 for the improved RSVP content example:

TABLE 19

| RSVP Detail ID | Keyword ID | Keyword Name | RSVP Word Number | Total Words | RSVP Read % |
|---|---|---|---|---|---|
| 1004 | 101 | Tour dates | 5 | 97 | 5 |
| 1004 | 102 | Homepage | 11 | 97 | 11 |
| 1004 | 103 | Vipnation.com | 17 | 97 | 18 |
| 1004 | 104 | Win back stage passes | 19 | 97 | 20 |
| 1004 | 105 | Tickets | 26 | 97 | 27 |
| 1004 | 106 | Local radio station | 32 | 97 | 33 |
| 1004 | 107 | On tour | 54 | 97 | 56 |
| 1004 | 108 | More stops | 60 | 97 | 62 |
| 1004 | 109 | Going everywhere | 64 | 97 | 66 |
| 1004 | 110 | New songs | 71 | 97 | 73 |
| 1004 | 111 | Old favorites | 82 | 97 | 85 |
| 1004 | 112 | Neon Trees | 88 | 97 | 91 |

FIG. 47b illustrates display 4700b showing the results for the next 940,000 user sessions in which the improved RSVP content was served. Graph 4720 shows the Total Sessions versus RSVP Read % for the analyzed sessions viewing the improved RSVP content. Graph 4720 is generated in the same manner previously described for generating graph 4705 of FIG. 47a. Similarly, graph 4721 shows Cumulative Click-throughs versus RSVP Read % for the analyzed sessions viewing the improved RSVP content. Graph 4721 is generated in the same manner previously described for generating graph 4706 of FIG. 47a. As shown in display 4700b, the keywords 4704 and their corresponding RSVP Word Number values displayed along the x-axis 4703 reflect the updated, improved RSVP content (and are therefore have different keywords and word number values than keywords 4704 shown in FIG. 47a). The general improvement of the RSVP content results in more users reading the entire RSVP content, which also results in an increase in total Cumulative Click-throughs.

Figure 47C:
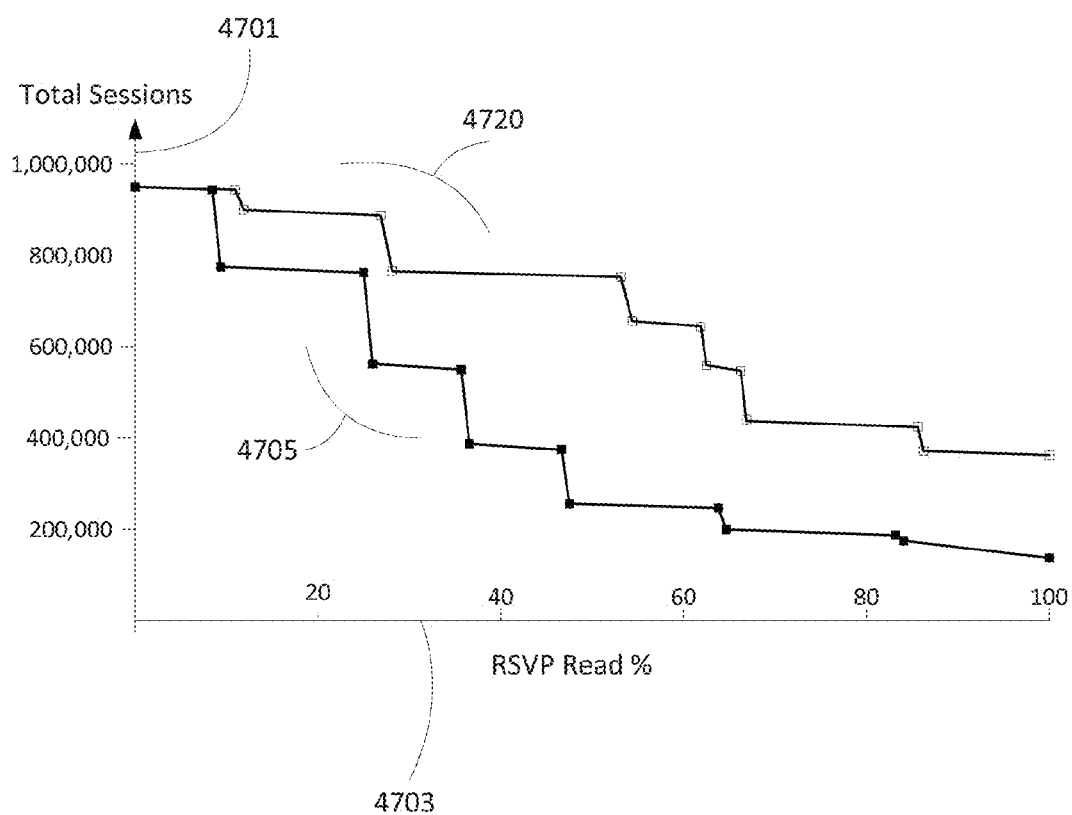

FIG. 47c compares the Total Sessions graphs generated from analysis of sessions viewing the original and the improved RSPV content to highlight the improvement obtained. Display 4700c of FIG. 47c, shows graph 4705 (originally shown in FIG. 47a) illustrating the drop of user sessions as the RSVP Read % progresses with respect to the original, non-improved RSVP content. Display 4700c also shows graph 4720 (originally shown in FIG. 47b) showing the drop of user sessions as the RSVP Read % progresses for the improved RSVP content. Comparing both graphs in display 4700c shows that fewer users drop after reading the first or third sentences of the improved RSVP content (graph 4720), confirming that the changes result in more users reading the entire RSVP content.

Figure 47D:
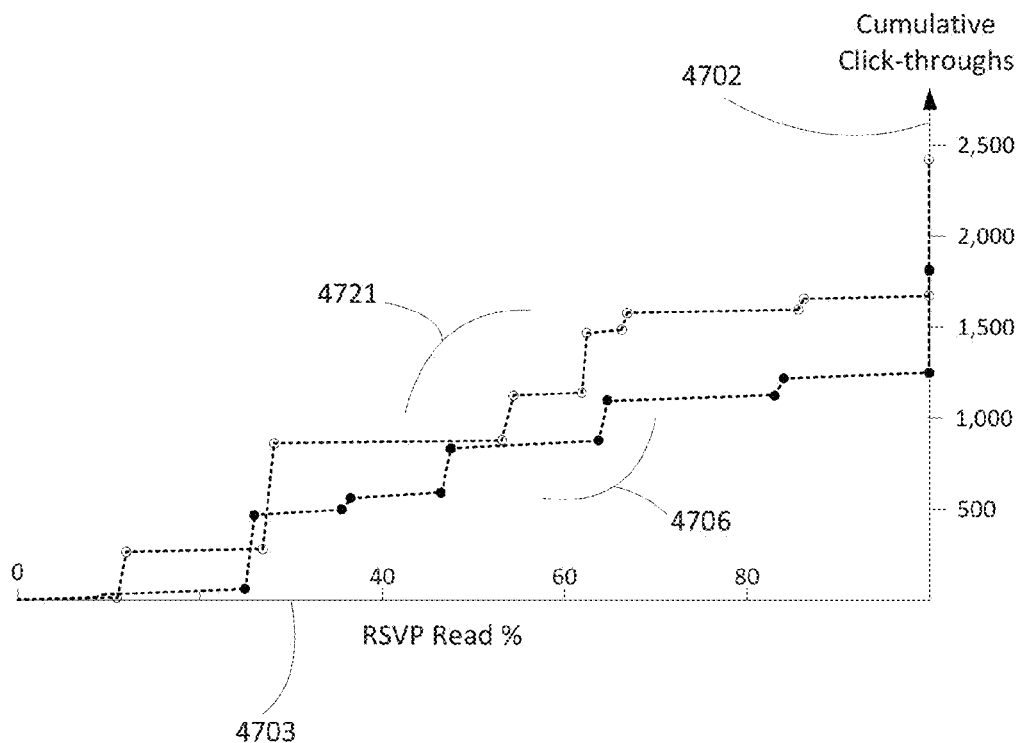

FIG. 47d compares the Cumulative Click-through graphs generated from analysis of sessions viewing the original and the improved RSPV content to highlight the improvement obtained. Display 4700d of FIG. 47d, shows graph 4706 (originally shown in FIG. 47a) illustrating the rise of Cumulative Click-throughs as the RSVP Read % progresses with respect to the original, non-improved RSVP content. Display 4700d also shows graph 4721 (originally shown in FIG. 47b) showing the rise of Cumulative Click-throughs as the RSVP Read % progresses for the improved RSVP content. Comparing both graphs in display 4700d shows that, for the most part, Cumulative Click-throughs increased more earlier in the improved RSPV content (graph 4721) and more overall, confirming that the changes result improved click-through results.

The fields, variables and tables described above are used as examples for clarity of explanation of the RSVP content improvement process and are not limited thereto.

ADDITIONAL EMBODIMENTS

First additional embodiments include method(s), computer program product(s), and/or system(s) for display of information regarding video content on a user electronic device, the user device being enabled to display an interface comprising a plurality of selectable video item representations, the first additional embodiments accomplish this by at least: enabling the user device to display, in response to a user interface action selecting to receive additional information regarding one of a plurality of video items corresponding to one of the plurality of video item representations, a designated display area while continuing to display at least a portion of the interface comprising the plurality of video items, the designated display area being designated for rapid serial visual presentation (RSVP); and enabling the user device to display in the designated display area, in response to the user interface action, textual content corresponding to a selected video item using RSVP.

In some embodiments, the textual content corresponding to the selected video item is displayable without downloading a video file associated with the selected video item.

In some embodiments, the textual content corresponding to the selected video item is displayable without receiving a stream of video content associated with the selected video item.

In some embodiments, the plurality of selectable video item representations are received from a server computer in response to a search query sent from the user device.

In some embodiments, the plurality of selectable video item representations are received from a server computer in response to the user device accessing a listing of featured video items.

In some embodiments, a plurality of serially displayed words in the textual content are displayed such that an optimal recognition position of each of the plurality of serially displayed words is placed at a fixed location on a display of the user electronic device.

In some embodiments, the textual content includes primary content and sub-content, the sub-content being selectable by a user interface action during a time period after RSVP display of the primary content is initiated, selection of the sub-content initiating RSVP display of the sub-content. In some embodiments, the time period occurs after RSVP display of the primary content has finished. In some embodiments, a selectable title of the sub-content is displayed for selection of the sub-content by the user interface action.

Second additional embodiments include method(s), computer program product(s), and/or system(s) for display of providing for text-enhanced video display on a user electronic device, the second additional embodiments accomplish this by at least: enabling the user electronic device to receive media content that includes video content and related textual content, the related textual content being received for display by rapid serial visual presentation (RSVP) on the user electronic device; and enabling the user electronic device to, with display of the video content, display the related textual content in a designated display area on the user device using RSVP at one or more time locations within the video content.

In some embodiments, the related textual content is displayed automatically at the one or more time locations within the video content.

In some embodiments, playing of the video content is paused while the related textual content is displayed using RSVP.

In some embodiments, playing of the video content continues while the related textual content is displayed using RSVP.

Some embodiments are also for: enabling the user electronic device to display one or more markers indicating presence of the related textual content. In some embodiments, one or more markers that indicate presence of textual content displayable by RSVP are displayed along a progress bar interface that indicates progress of playing of the video content. In some embodiments, one or more markers that indicate presence of textual content displayable by RSVP are displayed in one or more frames of the video content, the one or more markers being selectable by a user interface action to initiate RSVP display of related textual content associated with a selected marker.

In some embodiments, the textual content includes primary content and sub-content, the sub-content being selectable by a user interface action during a time period after RSVP display of the primary content has begun, selection of the sub-content by the user interface action being operable to initiate RSVP display of the sub-content. In some embodiments, the time period occurs after RSVP display of the primary content has finished. In some embodiments, a selectable title of the sub-content is displayed for selection of the sub-content by the user interface action.

Third additional embodiments include method(s), computer program product(s), and/or system(s) for display of providing for text-enhanced video display on a user electronic device, the second additional embodiments accomplish this by at least: enabling the user electronic device to receive media content that includes video content and related textual content, the related textual content being received for display by rapid serial visual presentation (RSVP) on the user electronic device, the video content comprising one or more respective video excerpts providing partial video content of video item, the related textual content comprising one or more respective textual content segments corresponding to the one or more respective video excerpts; and enabling the user electronic device to display a first textual content segment using RSVP and display a first video excerpt with the first textual content segment.

In some embodiments, enabling the user electronic device to display the first video excerpt with the first textual content segment comprises enabling the user electronic device to display the first textual segment prior to displaying the first video excerpt. In some embodiments, the first video excerpt displays in response to a user interface action selecting the first video excerpt, the first user interface action being receivable when or after the first textual content segment is displayed using RSVP.

Fourth additional embodiments include method(s), computer program product(s), and/or system(s) of providing an augmented reality ("AR") interface on a user electronic device that is enabled to receive an AR content unit including information related to a real world object in the vicinity of the user electronic device, the fourth additional embodiments accomplish this by at least: enabling the user electronic device to display a selectable representation of the AR content unit, the selectable representation being selectable for initiating display of the AR content unit by rapid serial visual presentation (RSPV); and enabling the user electronic device to display text of the AR content unit using RSPV in response to a user interface action selecting the selectable representation of the AR content unit.

In some embodiments, the selectable representation of the AR content unit comprises an icon.

In some embodiments, the selectable representation of the AR content unit comprises a title of the AR content unit.

In some embodiments, the textual content includes primary content and sub-content, the sub-content being selectable by a user interface action during a time period after RSVP display of the primary content has begun, selection of the sub-content initiating RSVP display of the sub-content. In some embodiments, the time period occurs after RSVP display of the primary content has finished. In some embodiments, a selectable title of the sub-content is displayed for selection of the sub-content by the user interface action.

In some of the first, second, third, and fourth additional embodiments, the user electronic device is a smart phone. In some of the first, second, third, and fourth additional embodiments, the user electronic device is a smart watch. In some of the first, second, third, and fourth additional embodiments, the user electronic device is a head mounted display.

Fifth additional embodiments includes method(s), computer program product(s), and/or system(s) for enabling a user electronic device to create text-enhancements to video content in response to user interface actions, the fifth additional embodiments accomplish this by at least: enabling the user device to display a video frame at a time location in a video file; enabling the user electronic device to display a menu including a user selectable option for adding textual content to be associated with the time location in the video file, the textual content to be designated for display using rapid serial visual presentation ("RSVP"); enabling the user electronic device to, in response to selection of the user selectable option, provide an interface for entering the textual content; and enabling the user electronic device to receive and store the textual content such that it is associated with the time location of the video file.

Some embodiments also enable the user electronic device to provide an interface for placing a marker within the video frame, the marker indicating the presence of textual content designated to be displayed using RSPV.

Some embodiments also enable the user electronic device to provide an interface for selecting an object within the video frame such that the object is displayed with a marker, the marker indicating the presence of textual content designated to be displayed using RSVP.

In some embodiments, selection of the object creates a hotspot on the object where the marker is displayed such that in subsequent video frames containing the object, the marker remains displayed on the object hotspot.

Some embodiments also enable the user electronic device to provide an interface for enabling user interface actions selecting one or more respective video excerpts to be associated with one or more respective textual content segments to be included in a video preview associated with the video content, the respective textual content segments designated to be displayed using RSPV.

While aspects and examples of the present invention has been particularly described with respect to certain illustrated embodiments above, it will be appreciated that various alterations, modifications and adaptations may be made based on the present disclosure, and are intended to be within the scope of the present invention. Therefore, the present invention is only limited by the claims presented below.

What is claimed is:

1. A method for tracking digital content consumption by a plurality of respective users of a plurality of respective user electronic devices, the method comprising:
   using one or more computers to provide first content to respective ones of the plurality of user electronic devices in response to respective content requests, the first content including textual content, the user electronic devices being enabled to display words of the first content using rapid serial visual presentation (RSVP);
   using one or more computers to track words of the first content that are displayed using RSVP on the plurality of electronic devices for consumption by the plurality of respective users of the user electronic devices by determining at least one of a quantity and an identity of words that are displayed on the plurality of user electronic devices using RSPV; and
   determining, using one or more computers, a total aggregate words displayed value for the first content, the total aggregate words displayed value corresponding to a count of total words of the first content displayed by RSVP across the plurality of user electronic devices for consumption by the plurality of respective users of the user electronic devices.

2. The method of claim 1 wherein tracking comprises determining how many words of the first content are displayed using RSVP on the plurality of user electronic devices.

3. The method of claim 1 wherein tracking comprises tracking what words of the first content are displayed using RSVP on the plurality of user electronic devices.

4. The method of claim 1 further comprising:
   determining, for respective ones of the plurality of user electronic devices, whether one or more words of the first content that are displayed using RSVP correspond to one or more keywords that identify second content; and
   providing the second content to respective ones of the plurality of user electronic devices that have, using RSVP, displayed one or more words of the first content that correspond to one or more keywords that identify the second content.

5. The method of claim 1 wherein the first content is non-sponsored content and the respective content requests are initiated by respective ones of the plurality of user electronic devices.

6. The method of claim 1 wherein the first content is sponsored content and the respective content requests are initiated by one or more sever computers.

7. The method of claim 4 wherein the second content is sponsored content.

8. The method of claim 1 further comprising:
   providing the total aggregate words displayed value to a computerized search engine for use in determining a ranking of the first content in ranked search results provided by the computerized search engine.

9. The method of claim 1 further comprising:
   determining, using one or more computers, a rate of change of the total aggregate words displayed value for the first content and using the rate of change to provide a trending value for the first content.

10. The method of claim 9 further comprising:
    providing the trending value to a computerized search engine for use in determining a ranking of the first content in ranked search results provided by the search application.

11. A method for providing and tracking consumption of digital content, the method comprising:
    using one or more computers to provide first content to a user electronic device, the first content including textual content, the user electronic device being enabled to display words of the first content using rapid serial visual presentation (RSVP);
    using one or more computers to determine a quantity of words in the first content that are displayed on the user electronic device using RSPV for consumption by a user of the user electronic device, by determining a total aggregate words displayed value for the first content, the total aggregate words displayed value corresponding to a count of total words of the first content displayed by RSVP across the plurality of user electronic devices for consumption by the user of the user electronic device; and
    using one or more computers to determine a charge amount for charging an entity based upon the determined quantity of words.

12. The method of claim 11 wherein the entity is a consumer of the first identified content using the user electronic device.

13. The method of claim 11 wherein the first identified content is sponsored content and the entity is a provider of the sponsored content.

14. The method of claim 11 wherein the one or more computers used to determine the quantity of words includes the user electronic device.

15. The method of claim 11 wherein the one or more computers used to determine the charge amount includes the user electronic device.

16. A method for tracking aggregated consumption of a digital media item accessible over a communications network to a plurality of user electronic devices, the method comprising:
tracking, using one or more computers, words displayed by rapid serial visual presentation (RSPV) for consumption by the plurality of users on the plurality of user electronic devices over a period of time, the words displayed by RSPV being displayed as part of the digital media item; wherein tracking comprises determining an aggregate total quantity of the words displayed by RSVP across the plurality of user electronic devices during the period of time, the aggregate total quantity corresponding to a count of total words of the digital media item displayed by RSVP across the plurality of user electronic devices for consumption by the plurality of users of the user electronic devices.

17. The method of claim 16 wherein the digital media item comprises an RSVP-enabled preview of a full-version digital media item.

18. The method of claim 16 wherein the digital media item comprises a web page.

19. The method of claim 16 wherein the digital media item comprises an RSVP-enabled video.

20. The method of claim 16 wherein the digital media item comprises textual content.

21. The method of claim 20 wherein the digital media item further comprises at least one of a photo, a video, and a map.

22. The method of claim 16 further comprising tracking, using one or more computers, a percentage of words in the digital media item that are displayed by RSPV on each user device that displays the digital media item.

23. The method of claim 16 further comprising using results of tracking to affect a ranking of a web page corresponding to a search result, the web page including the digital media item.

24. The method of claim 23 wherein the digital media item is the web page.

25. A computer program product embedded in a non-transitory computer readable medium including instructions executable by a computer processor for tracking digital content consumption by a plurality of respective users of a plurality of respective user electronic devices, the instructions being executable by a computer processor to:
provide first content to respective ones of the plurality of user electronic devices in response to respective content requests, the first content including textual content, the user electronic devices being enabled to display words of the first content using rapid serial visual presentation (RSVP);
track words of the first content that are displayed using RSVP on the plurality of electronic devices for consumption by the plurality of respective users of the user electronic devices by determining at least one of a quantity and an identity of words that are displayed on the plurality of user electronic devices using RSPV; and
determining, using one or more computers, a total aggregate words displayed value for the first content, the total aggregate words displayed value corresponding to a count of total words of the first content displayed by RSVP across the plurality of user electronic devices for consumption by the plurality of respective users of the user electronic devices.

26. The computer program product of claim 25 wherein tracking comprises determining how many words of the first content are displayed using RSVP on the plurality of user electronic devices.

27. The computer program product of claim 25 wherein tracking comprises tracking what words of the first content are displayed using RSVP on the plurality of user electronic devices.

28. The computer program product of claim 25, the instructions being further executable by a computer processor to:
determine, for respective ones of the plurality of user electronic devices, whether one or more words of the first content that are displayed using RSVP correspond to one or more keywords that identify second content; and
provide the second content to respective ones of the plurality of user electronic devices that have, using RSVP, displayed one or more words of the first content that correspond to one or more keywords that identify the second content.

29. The computer program product of claim 25 wherein the first content is non-sponsored content and the respective content requests are initiated by respective ones of the plurality of user electronic devices.

30. The computer program product of claim 25 wherein the first content is sponsored content and the respective content requests are initiated by one or more sever computers.

31. The computer program product of claim 28 wherein the second content is sponsored content.

32. The computer program product of claim 25, the instructions being further executable by a computer processor to: provide the total aggregate words displayed value to a computerized search engine for use in determining a ranking of the first content in ranked search results provided by the computerized search engine.

33. The computer program product of claim 25, the instructions being further executable by a computer processor to:
determine a rate of change of the total aggregate words displayed value for the first content and using the rate of change to provide a trending value for the first content.

34. The computer program product of claim 33, the instructions being further executable by a computer processor to:
provide the trending value to a computerized search engine for use in determining a ranking of the first content in ranked search results provided by the search application.

35. A computer program product embedded in a non-transitory computer readable medium including instructions executable by a computer processor for providing and tracking digital content consumption, the instructions being executable by a computer processor to:
provide first content to a user electronic device, the first content including textual content, the user electronic device being enabled to display words of the first content using rapid serial visual presentation (RSVP);

determine a quantity of words in the first content that are displayed on the user electronic device using RSPV for consumption by a user of the user electronic device, by determining a total aggregate words displayed value for the first content, the total aggregate words displayed value corresponding to a count of total words of the first content displayed by RSVP across the plurality of user electronic devices for consumption by the user of the user electronic device; and determine a charge amount for charging an entity based upon the determined quantity of words.

36. The computer program product of claim 35 wherein the entity is a consumer of the first identified content using the user electronic device.

37. The computer program product of claim 35 wherein the first identified content is sponsored content and the entity is a provider of the sponsored content.

38. A computer program product embedded in a non-transitory computer readable medium including instructions executable by a computer processor for tracking aggregated consumption of a digital media item accessible over a communications network to a plurality of user electronic devices, the instructions being executable by a computer processor to:

track words displayed by rapid serial visual presentation (RSPV) for consumption by each respective user of the plurality of user electronic devices on the plurality of user electronic devices over a period of time, the words displayed by RSVP being displayed as part of the digital media item; wherein tracking comprises determining an aggregate total quantity of the words displayed by RSVP across the plurality of user electronic devices during the period of time, the aggregate total quantity corresponding to a count of total words of the digital media item displayed by RSVP across the plurality of user electronic devices for consumption by the plurality of respective users of the user electronic devices.

39. The computer program product of claim 38 wherein the digital media item comprises an RSVP-enabled preview of a full-version digital media item.

40. The computer program product of claim 38 wherein the digital media item comprises a web page.

41. The computer program product of claim 38 wherein the digital media item comprises an RSVP-enabled video.

42. The computer program product of claim 38 wherein the digital media item comprises textual content.

43. The computer program product of claim 42 wherein the digital media item further comprises at least one of a photo, a video, and a map.

44. The computer program product of claim 38, the instructions being further executable by a computer processor to: track a percentage of words in the digital media item that are displayed by RSPV on each user device that displays the digital media item.

45. The computer program product of claim 38, the instructions being further executable by a computer processor to: use the results of tracking to affect a ranking of a web page corresponding to a search result, the web page including the digital media item.

46. The computer program product of claim 45 wherein the digital media item is the web page.

* * * * *